US008625769B1

(12) United States Patent
Allen et al.

(10) Patent No.: US 8,625,769 B1

(45) Date of Patent: Jan. 7, 2014

(54) SYSTEM FOR MANAGING, SCHEDULING, MONITORING AND CONTROLLING AUDIO AND VIDEO COMMUNICATION AND DATA COLLABORATION

(75) Inventors: Scott David Allen, Kettering, OH (US); Rebekah Anne Allen, Kettering, OH (US); Isaac Josiah Hogue, Cummings, GA (US)

(73) Assignee: Signal Perfection, Ltd., Tampa, FL (US)

( * ) Notice: Subject to any disclaimer, the term of this patent is extended or adjusted under 35 U.S.C. 154(b) by 463 days.

(21) Appl. No.: 12/816,611

(22) Filed: Jun. 16, 2010

Related U.S. Application Data

(60) Provisional application No. 61/250,914, filed on Oct. 13, 2009.

(51) Int. Cl.
*H04M 3/42* (2006.01)

(52) U.S. Cl.
USPC .................................. 379/203.01; 348/14.08

(58) Field of Classification Search
USPC .......... 348/14.01, 14.02, 14.03, 14.04, 14.07, 348/14.08, 14.12, 14.11; 379/93.21, 158, 379/202.01, 203.01, 204.01, 205.01
See application file for complete search history.

(56) References Cited

U.S. PATENT DOCUMENTS

| | | | |
|---|---|---|---|
| 5,572,248 A | 11/1996 | Allen et al. | |
| 5,642,156 A | 6/1997 | Saiki | |
| 5,751,337 A | 5/1998 | Allen et al. | |
| 6,160,573 A | 12/2000 | Allen et al. | |
| 6,445,405 B1 | 9/2002 | Allen et al. | |
| 6,654,045 B2 | 11/2003 | Allen et al. | |
| 7,116,350 B2 | 10/2006 | Allen et al. | |
| 7,352,809 B2 | 4/2008 | Wenger et al. | |
| 7,848,265 B2 | 12/2010 | Levy et al. | |
| 7,975,073 B2 | 7/2011 | Gonen et al. | |
| 8,234,641 B2 | 7/2012 | Fitzgerald et al. | |
| 2005/0034079 A1* | 2/2005 | Gunasekar et al. | 715/753 |
| 2007/0120954 A1 | 5/2007 | Allen et al. | |
| 2007/0239899 A1 | 10/2007 | Gonen et al. | |
| 2008/0084984 A1 | 4/2008 | Levy et al. | |
| 2008/0134177 A1 | 6/2008 | Fitzgerald et al. | |
| 2009/0112671 A1 | 4/2009 | Grodum | |
| 2010/0191771 A1 | 7/2010 | Jones | |
| 2012/0117153 A1 | 5/2012 | Gunasekar et al. | |

OTHER PUBLICATIONS

"PathNavigator User Guide"; Polycom, Inc.; 3725-20335-001, Rev B; Oct. 2004.
"TANDBERG Management Suite 12.1—Administrator's Guide"; TANDBERG D13741, Rev 8; Feb. 2009.
"Global Management System User Guide"; Polycom, Inc.; Doc. 2091A, Rev. May 2004.
"ReadiManager Operations Guide"; Polycom, Inc.; 3725-18013-001B3, Aug. 2008.

* cited by examiner

*Primary Examiner* — Olisa Anwah
(74) *Attorney, Agent, or Firm* — Jacox, Meckstroth & Jenkins

(57) ABSTRACT

This invention relates to a conferencing and data collaboration operation and management system and method and, more particularly, to a managing, system and method for scheduling, monitoring and controlling of audio and video communication and data collaboration.

122 Claims, 129 Drawing Sheets
(94 of 129 Drawing Sheet(s) Filed in Color)

AUTOMATED CONFERENCE MANAGEMENT AND CONTROL ENGINE

ACMCS Connection Point-to-Point
(i.e., no multi-point)
Within a single location

Multi-Terminal Multi-Network with ACMCS 12

Multi-Terminal Multi-Network with ACMCS 12

ACMCS 12 with a plurality of enterprise systems 44

514b1

514

517

520

522

FIG. 31S
Now user will have option for submit or cancel from confirmation screen
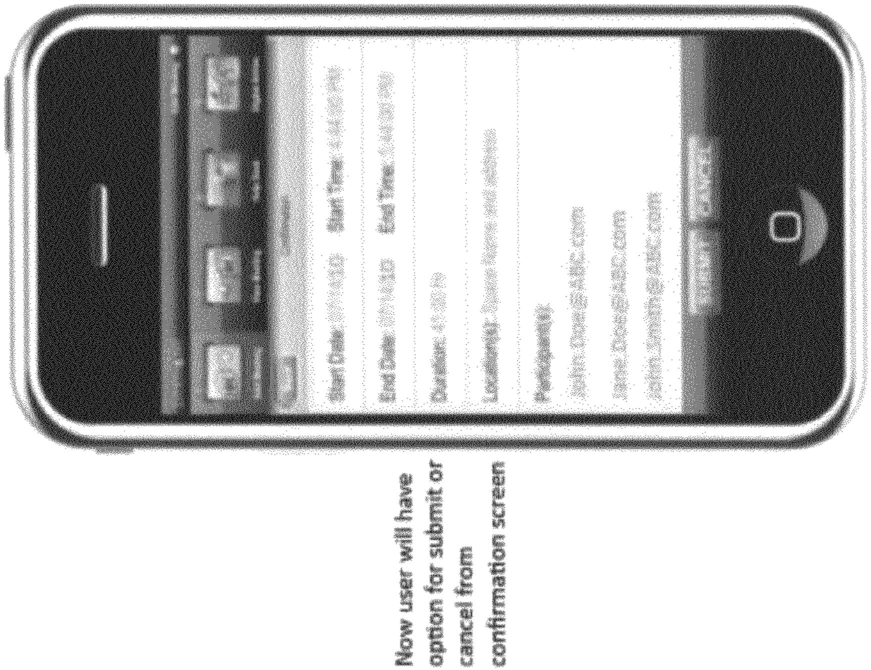
As user selects submit button, confirmation message will appear
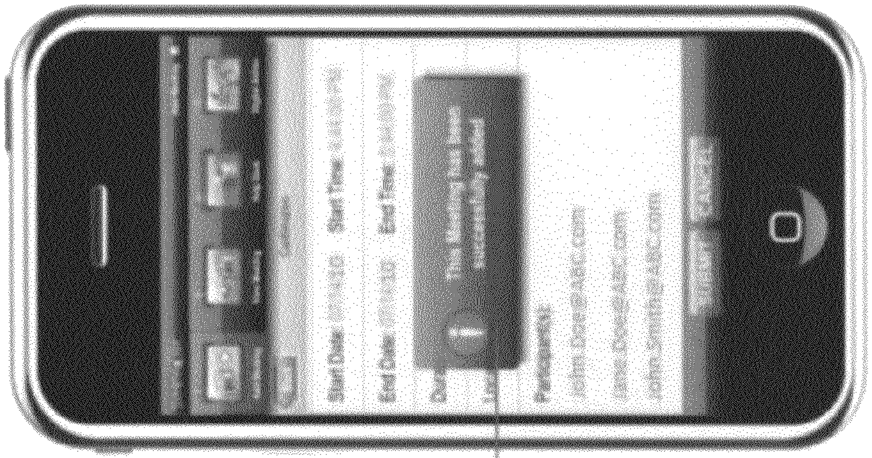

FIG. 40A

```
From: ABC Corp VNOC Symphony Notifications [mailto:notifications@ABCcorp.com]
Sent: Monday, April 19, 2010 3:46 PM
To: Reservations
Cc:
Subject: Conference Modification:  ABC Corp  TMS Testing at 4/19/2010 3:26:48 PM

Title:  ABC Corp  TMS Testing at 4/19/2010 3:26:48 PM
Status: Modification

Confirmation Number: 10105

Requestor Email: John.Doe@ABC.com
Owner Email: John.Doe@ABC.com

Conference Type: Point to Point

 ABC     - Dayton, OH - USA
 -  Local Start Time: 4/19/2010 3:26 PM (EDT)
 -  Local End Time: 4/19/2010 3:46 PM (EDT)
 -  Local Participants:
Host - Iformata - Dayton, OH - USA - INOC
 -  Local Start Time: 4/19/2010 3:26 PM (EDT)
 -  Local End Time: 4/19/2010 3:46 PM (EDT)
 -  Local Participants:
Notes: Conference created by VnocObserver
```

41

FIG. 40B

From: ABC Corp VNOC Symphony Notifications [mailto:notifications@ABCcorp.com]
Sent: Tuesday, May 25, 2010 4:04 AM
To: John.Doe@ABC.com
Subject: CRITICAL EVENT / 10105 / OPEN / ABC - 111 - RPX The VNOC has identified the following video endpoint status change.

STATUS: ENDPOINT DOWN 192.X.X.X
Office/Space: Iformata - Dayton, OH - USA - VNOC Conference Room
Identified: 5/25/2010 8:03:42 AM (UTC)
Conference Affected: NO

Priority: Critical
VNOC Ticket: 10105
Ticket Status: Open
Required Updates: Every 4-Hours If you have any questions or concerns, please contact the VNOC at XXX-XXX-XXXX
This is an automated message and does not require a response.

43

SYSTEM FOR MANAGING, SCHEDULING, MONITORING AND CONTROLLING AUDIO AND VIDEO COMMUNICATION AND DATA COLLABORATION

CROSS-REFERENCE TO RELATED APPLICATION

The present application claims priority to provisional U.S. Application Ser. No. 61/250,914 filed Oct. 13, 2009, to which Applicant claims the benefit of the earlier filing date. This application is incorporated herein by reference and made a part hereof.

BACKGROUND OF THE INVENTION

1. Field of the Invention

This invention relates to a conferencing and data collaboration operation and management system and method and, more particularly, to a managing, system and method for scheduling, monitoring and controlling of audio and video communication and data collaboration.

2. Description of the Related Art

In the field of audio and video conferencing, it is common to connect one or more locations for purposes of conducting an audio or video teleconference. U.S. Pat. Nos. 5,572,248, 5,751,337, 6,160,573, 6,445,405, 6,654,045, 7,352,809, 7,116,350 illustrate a system and method for performing a real time and life size video conference wherein a plurality of conference participants participate in a video conference.

It is now becoming common that multiple conference locations and participants at different geographic locations are being networked together for purposes of conducting an audio or video conference.

In some prior art systems, a network operations center or ("NOC"), pronounced "knock" is used to control the conference and the network which enables the conference between two or more participants to occur.

In general, NOCs are responsible for monitoring the network for alarms or certain conditions that may require special attention to avoid impact on the network's performance. For example, power failures, communication line alarms (such as bit errors, framing errors, line coding errors and circuit down errors) and other performance issues may affect the network. NOCs analyze the problems and perform trouble shooting to try to eliminate the problems. Typically, this was done with site technicians and skilled computer technicians and other NOC personnel to identify the problem, analyze it and resolve it if possible. If a critical problem arises, for example, it is not uncommon that NOCs have procedures in place to immediately contact a human technician to remedy the problem.

NOCs typically escalate issues or problems in a hierarchic manner so if an issue is not resolved in a specific timeframe, the level of personnel is informed to speed up the problem remediation. For example, many NOCs identify problems with labels, such as critical, moderate and the like.

For video and audio conferencing, it is also necessary to provide personnel who schedule conferences, who monitor the conference for any problems and who can cause the conferences to occur as scheduled, at the correct starting time, with the correct participants, with the correct resources and the like. It is not uncommon that a typical operations center may have multiple personnel who are dedicated to scheduling conferences, monitoring them and then resolving issues relative to them.

Unfortunately, the NOC systems of the prior art were very labor intensive, requiring network engineers, software specialists and other high-level personnel to adequately perform the functions required by the NOC.

Another drawback of the prior art is that it impedes scalability that occurred by adding additional human operators which introduces additional opportunity for error.

Another problem with prior art is that it hindered or in some cases did not permit convergence of disparate systems or systems that ran on different platforms. For example, a commercial system from a first company that ran on a non-standard based platform could not interface with another company that was running on a different platform whether that platform was standard or non-standard. Interoperability is the ability for non-standard based system to communicate with the standard infrastructures and systems.

What is needed, therefore, is a system and method that improves the management, monitoring and control of audio and video network operations, scheduling, monitoring and maintaining a high quality audio and video teleconference or data collaboration between or among a plurality of participants or locations and that reduces or eliminates the need for the technicians and engineers required in the past.

SUMMARY OF THE INVENTION

One object of the invention is to provide an automatic system and method to automate, manage and control a plurality of resources used during at least one or a plurality of conferences.

Another object of the invention is to provide an automated system and method for automated managing and controlling provisioning of resources for an organization or enterprise system, with such resources being capable of being scheduled by the scheduling entity, which can be the same or different from a provisioning entity or user.

Still another object of the invention is to provide an automated system and method for automating at least one or a plurality of resources and runbook processes or programs that are required, necessary or desired to be run in order to automate, manage and control the scheduling of a plurality of resources for a conference.

In one aspect, this invention comprises a system for managing at least one audio and video conference among a plurality of resources, the system comprising: an information and data repository for storing virtual network operation information for establishing and managing the at least one audio and video conference, a processing engine adapted to access and use the virtual network operation information, wherein the virtual network operation information comprises: at least one runbook process for performing at least one activity associated with the at least one audio and video conference, video network operations center data, user data inputted by a user into the information and data repository, wherein the processing engine executes the at least one runbook process to perform the at least one activity using at least one of the video network operations center data or the user data in order to schedule, manage and control the at least one audio and video conference.

In another aspect, this invention comprises a video network operations center management system for managing at least one conference between a first terminal, desktop or gatekeeper and at least one second terminal, desktop or gatekeeper, the video network operations center management system comprising: a process composer for composing a plurality of runbook processes to be executed to automate, manage and control the at least one conference, each of the plurality of runbook processes comprising at least one activity, a process conductor for executing the plurality of runbook processes, a repository for storing each of the plurality of runbook processes and data for use by at least one of the plurality of runbook processes, the plurality of runbook processes comprising at least one of the following: provisioning runbook process, a service runbook process, a supported terminals, software versions and enterprise systems runbook process, a scheduling runbook process, a notification runbook process, conference management runbook process, an escalation runbook process, a remediation runbook process, a fault management runbook process, a daily site sweep runbook process, a conference log runbook process, a quality control runbook process, a root cause analysis (RCA) template runbook process, or a reporting deliverables runbook process.

In still another aspect, this invention comprises a system for establishing and managing conferences comprising: a conference management database for storing a plurality of runbook processes and operation data, a plurality of activities and data associated with the plurality of runbook processes, an automated conference management and control engine for using the plurality of runbook processes and operation data, the plurality of activities and the data associated with the plurality of runbook processes to automatically initiate, manage and control each of the conferences, an observer/poller/launcher for launching at least one of the plurality of runbook processes in response to a command from the automated conference management and control engine.

In yet another aspect, this invention comprises a method for initiating and managing a conference among a plurality of participants, the method comprising the steps of: providing access to an information and data repository of a plurality of runbook processes and a plurality of activities required to initiate and manage the conference, enabling provisioning of a plurality of resources for the plurality of participants using a first one of the plurality of runbook processes, enabling a user to schedule the conference using a second one of the plurality of runbook processes, and automatically initiating the conference using the plurality of resources as scheduled.

In still another aspect, this invention comprises a method for automated scheduling, management and control of a plurality of conferences, the method comprising the steps of: enabling each of a plurality of users to provision in an automated conference management and control system a plurality of resources that will be accessed and used during at least one of the plurality of conferences, each of the plurality of users having at least one enterprise system, enabling at least one scheduling entity associated with each of the plurality of users to access the automated conference management and control system in order to schedule such plurality of resources using at least one user entry point, the scheduling entity using at least one user entry point to schedule at least one of the plurality of conferences and the plurality of resources for use during the at least one of the plurality of conferences.

These and other objects and advantages of the invention will be apparent from the following description, the accompanying drawings and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 40A and FIG. 40B are illustrative notices generated when the system is used;

DETAILED DESCRIPTION OF THE PREFERRED EMBODIMENTS

Figure 1:
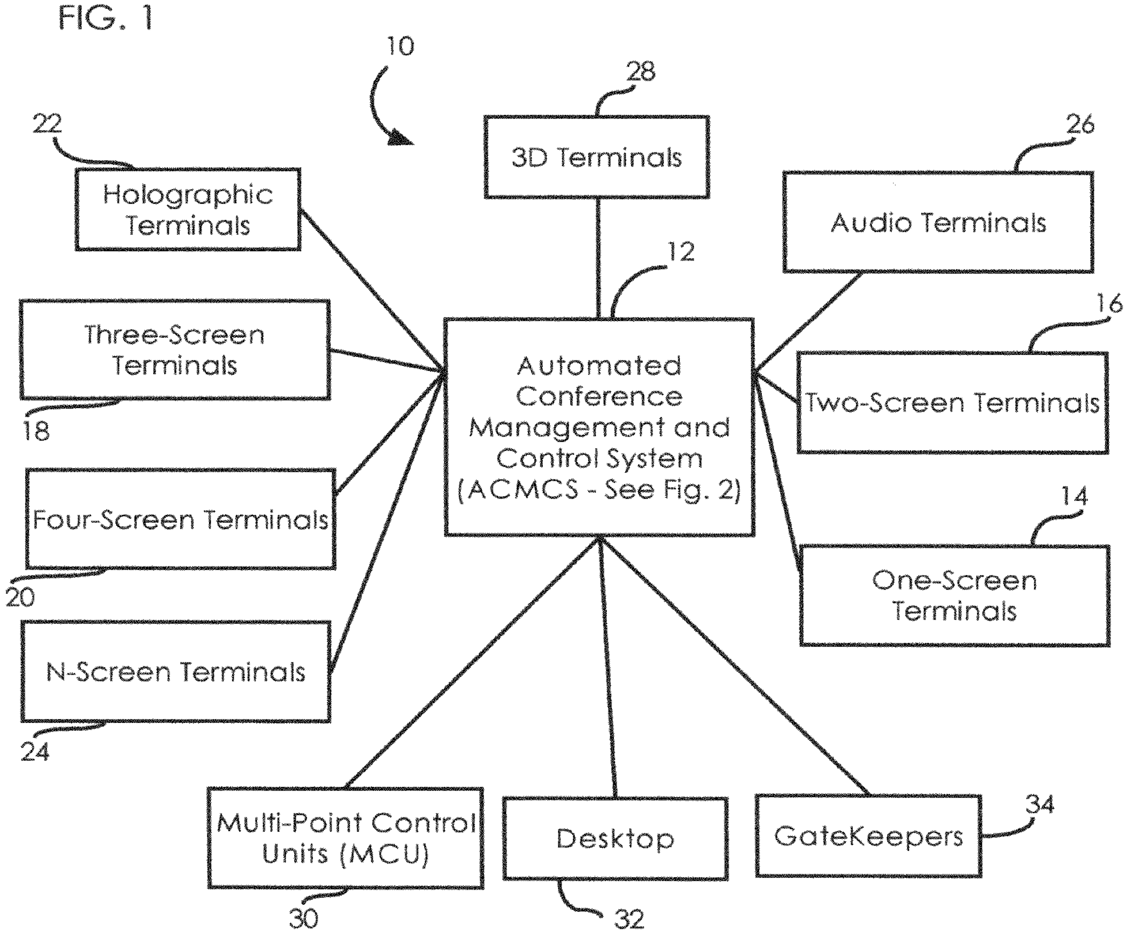
FIG. 1 is a schematic view of system in accordance with one embodiment of the invention.

Referring now to FIGS. 1-43, an automated system 10 and method for the managing, scheduling, monitoring and controlling of audio and video communication and data collaboration is shown. It should be understood that this system and method provide means for establishing various types of conferences between or among at least one or a plurality of end points or terminals described later herein. The system 10 and method provide means for automating the management, scheduling, monitoring and controlling of the audio and video communication and any collaboration, such as data collaboration, occurring during the conference.

The system 10 (FIG. 1) comprises an automated conference management and control system (ACMCS) 12 that automates audio and video communication and data collaboration services and functions described later herein. This system 10 comprises at least one or a plurality of video conferencing components or resources, such as terminals, desktops, multipoint control units (MCU) and gatekeepers that are coupled to the ACMCS 12. In the illustration being described, the terminals, desktops, MCU and gatekeepers comprise at least one or more of a one-screen terminal 14, two-screen terminal 16, three-screen terminal 18, four-screen terminal 20, holographic-terminals 22, n-screen terminal 24 (where n is an integer greater than 0 representing a number of screens), audio terminals 26, three-dimensional terminals 28, multipoint control units (MCUs) or bridges 30, desktops 32, and gatekeepers 34 that are capable or adapted to be coupled to the ACMCS system 10. Several illustrative examples of the terminals 14-28, the multipoint control unit or bridge 30 and desktop 32 are shown or described later herein.

Figure 2:
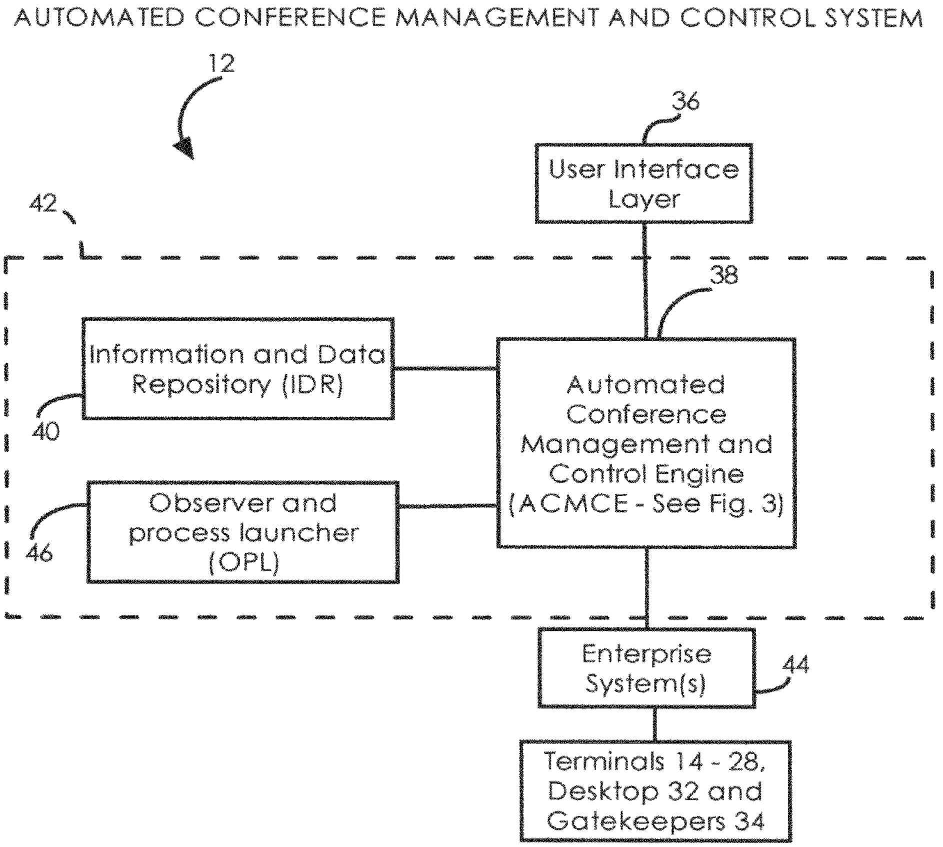
FIG. 2 is a schematic diagram of an automated conference management and control system in accordance with one embodiment of the invention.

In the illustrative embodiments of FIGS. 1 and 2, it should be understood that the terminals 14-28, the multipoint control unit or bridge 30 and desktop 32 may comprise any suitable hardware and software that is capable of participating in the conference, some of which are illustrated in FIG. 1. Thus, it should be understood that while the system 10 processes and methods being described herein refer to terminals, such term is meant to encompass at least the hardware and software items mentioned herein.

The gatekeepers 34 permit one or more networks, such as intra-networks (i.e., with a company or organization) or internetworks, to communicate via the ACMCS 12. The terminals 14-28 may further comprise the audio terminals 26, such as personal digital assistant (PDA) devices, analog or digital telephones, voice over IP (VoIP) devices, and the three-dimensional terminals 28. In one illustrative embodiment, the three-dimensional terminals 28 could comprise the TPT line of products available from TelePresence Tech of Plano Texas.

Referring now to FIG. 2, the ACMCS 12 is shown. The ACMCS 12 comprises at least one or a plurality of user interfaces 36, described later herein relative to FIGS. 29A-39B. The user interface 36 comprises at least one or a plurality of intuitive graphical user interface (GUI) that enable a user to interact and use the system 10. The user interface 36 provides the user with access to the ACMCS 12. In the illustration being described, the user's access to the user interface 36 is dependent upon and adapted to the specific mode by which the user is accessing and using the system 10. For example, if the user is accessing the system 10 using an iPhone® available from Apple, Inc. (Cupertino, Calif.), then the iPhone® is programmed with a user entry point or icon 37 (FIG. 5) that the user can select to initiate the user interface 36.

Figure 5:
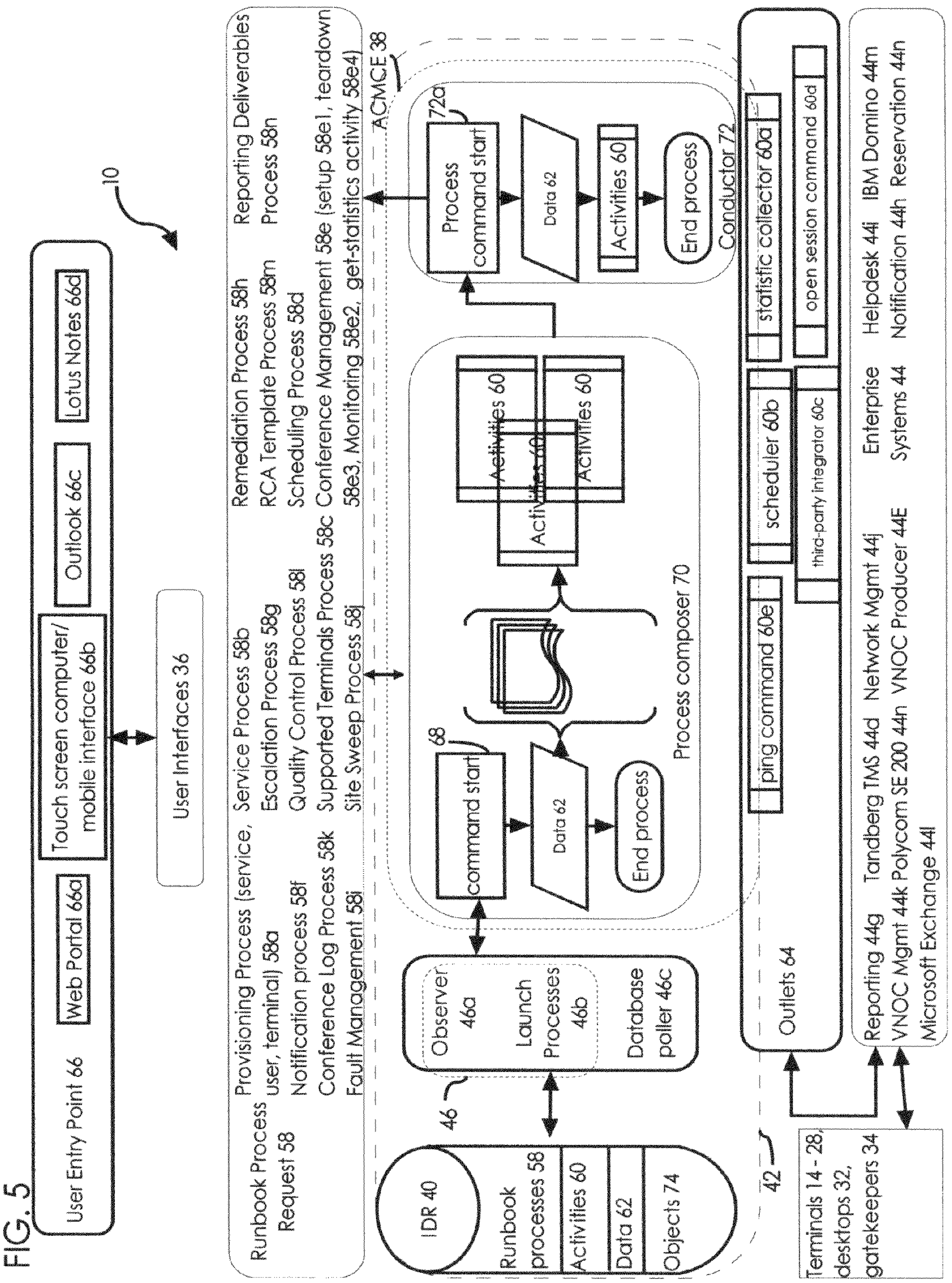
FIG. 5 is a schematic view showing further details of the system.

The ACMCS 12 (FIG. 2) further comprises an automated conference management and control engine (ACMCE) 38 that interacts with the user interface 36, an information and data repository (IDR) 40 and an IDR observer and process launcher (OPL) 46 shown and described later herein relative to FIG. 5. The ACMCE 38, the IDR 40 and the OPL 46 are inter-dependant and exist together to facilitate or enable the ACMCS 12 to automate, manage and control a plurality of runbook processes or programs 58 (FIG. 5) which are processes for automating, managing and controlling audio and video communication, such as a conference, and data collaboration. Each of the plurality of runbook processes 58 shown and described herein are comprised of at least one, a plurality or library of activities that are called upon to perform functions or processes by the ACMCE 38. The plurality of runbook processes 58 are comprised of associated activities 60 (FIG. 5). At least one or a plurality of the runbook processes 58 may be user customized or customized in response to a user's enterprise system, terminals 14-28, desktop 32 or gatekeepers 34. The runbook processes 58 and activities 60 are described later herein and are stored in the IDR 40 and are described in more detail later herein. The IDR 40 also comprises data 62 related to the plurality of runbook processes 58 and other data for automating, managing and controlling audio and video communication and data collaboration.

The ACMCE 38 is a combination of (1) a conventional business process management (BPM) system, in this illustration, a Microsoft Windows® Workflow Foundation (WF) available from Microsoft Corporation as described herein; and (2) one or a plurality of the activities 60 (FIG. 5) referred to above and described later herein or activity(s) (not shown) that may be related to a method or process not yet instituted and that has been customized based upon the user's needs.

The OPL 46 is further comprised of a process observer **46*a* and launcher 46*b* and database poller 46*c*. The OPL 46 monitors and polls the runbook processes 58 and stored data 62 resident in the IDR 40 for the purpose of initiating the aforementioned runbook processes 58 resident in the IDR 40. In the illustration being described, the OPL 46** runs as a Microsoft® Win32® service available from Microsoft Corporation.

Referring back to FIG. 2, the ACMCS 12 further comprises at least one or a plurality of enterprise systems 44 that interface with the ACMCE 38. The at least one or a plurality of enterprise systems 44 may be internal or external hardware or software components that enable human or system interaction with the ACMCE 38. In the illustration being described, the at least one or a plurality of enterprise systems 44 interacts with the ACMCE 38 using conventional application programmable interface standards or protocols. An illustrative example of the at least one or a plurality of enterprise systems 44 is described later herein relative to FIG. 5.

As illustrated in FIG. 2, the at least one or a plurality of terminals 14-28, desktops 32, and gatekeepers 34 interact with the at least one or a plurality of enterprise systems 44 via the ACMCE 38.

As illustrated in FIG. 2, the IDR 40, ACMCE 38 and OPL 46 facilitate providing an automated video network operations center (VNOC) 42. In one illustrative embodiment, the VNOC 42 and its components are located at a common geographic location, but it should be understood that they could be distributed components and processes that are geographically remote from each other.

The following Tables I and II provide illustrative examples of the terminals 14-28, the multipoint control unit or bridge 30, desktop 32 and gatekeepers 34 and their associated software. It should be understood that these are illustrative systems and components and other systems and components may be employed in the embodiments being described. Tables I and II are as follows:

TABLE I

| Examples of Terminals 14-28 and Desktops 32 | Associated Software |
|---|---|
| Immersive Video Conference Rooms such as Cisco ® TelePresence System 3000 (available from Cisco Technology, Inc., of San Jose, California); Lifesize ® Conference 200 (available from Lifesize Communications, Inc. of Austin, Texas); Polycom ® ATX 300, TPX ® 306M, RPX 204, 210, 210M, 210m+, 408, 408M, 418M, 428M (available from Polycom Inc. of Pleasanton, California); Tandberg ® T3 (available from Tandberg ASA of Lysaker, Norway); | The software and version release provided by the manufacturer of the terminals 14-28 and desktops 32. |

TABLE I-continued

| Examples of Terminals 14-28 and Desktops 32 | Associated Software |
|---|---|
| Room Based Non-Immersive Video Conference Products such as Lifesize Room; Polycom ® HDX ® 4000, 8000 and 9000 (available from Polycom Inc. of Pleasanton, California); Sony ® PCS1, PCS XG80 (all available from Sony Electronics, Inc. of Park Ridge, New Jersey); Tandberg ® T1, Tandberg 6000 MXP, Tandberg C series Codecs (all available from Tandberg ASA of Lysaker, Norway); | The software and version release provided by the manufacturer of the terminals 14-28 and desktops 32. |
| Non-Immersive Tabletop/Desktop Video Conference Units such as Lifesize ® Express and Passport; Polycom ® VSX ® 3000 and HDX ® 4000 (available from Polycom Inc. of Pleasanton, California; Tandberg 1700 MXP (available from Tandberg ASA of Lysaker, Norway); Radvision ® Scopia ® Desktop, Radvision ® Scopia ® VC240 Desktop System (both available from Radvision, LTD of Tel Aviv, Israel) | The software and version release provided by the manufacturer of the terminals 14-28 and desktops 32. |
| Other Terminals such as Polycom ® PathNavigator (available from Polycom Inc. of Pleasanton, California), Lifesize ® Gateway (available from Lifesize Communications, Inc. of Austin, Texas), Tandberg ® Codian IP GW 3500 Series, Tandberg ® Codian ISDN Gateway Series (available from Tandberg ASA of Lysaker, Norway) | |

TABLE II

Examples of MCUs 30, Gatekeepers 34 and Enterprise Systems 44

| Product Type | Version/Release |
|---|---|
| Tandberg Codian IP GW 3500 Series, ISDN Gateway Series, IP VCR, Content Server, Video Communication Server, TMS (available from Tandberg ASA of Lysaker NORWAY) | The software and version release provided by the manufacturer of the MCUs 30, gatekeepers 34 and enterprise systems 44. |
| Polycom ® RMX 4000, 2000, 1000, MGC 100, 50, 25, CMA 5000/4000, PathNavigator, Global Management System, WebCommander (all available from Polycom Inc. of Pleasanton, California) | The software and version release provided by the manufacturer of the MCUs 30, gatekeepers 34 and enterprise systems 44. |
| Lifesize ® Multipoint, Transit, Gateway, Networker, Gatekeeper (available from Lifesize Communications, Inc. of Austin, Texas); | The software and version release provided by the manufacturer of the MCUs 30, gatekeepers 34 and enterprise systems 44. |
| Radvision ® Scopia ® Elite 5000 MCU, Scopia ® MCU 100/400, Scopia ® MCU 400/100, Conference Server (all available from Radvision, LTD of Tel Aviv, Israel) | The software and version release provided by the manufacturer of the MCUs 30, gatekeepers 34 and enterprise systems 44. |
| VNOC Producer and VNOC Proxy which are both available from Iformata LLC of Dayton, OH | The software and version release provided by the manufacturer of the gatekeepers 34 and enterprise systems 44. |

Figure 3:
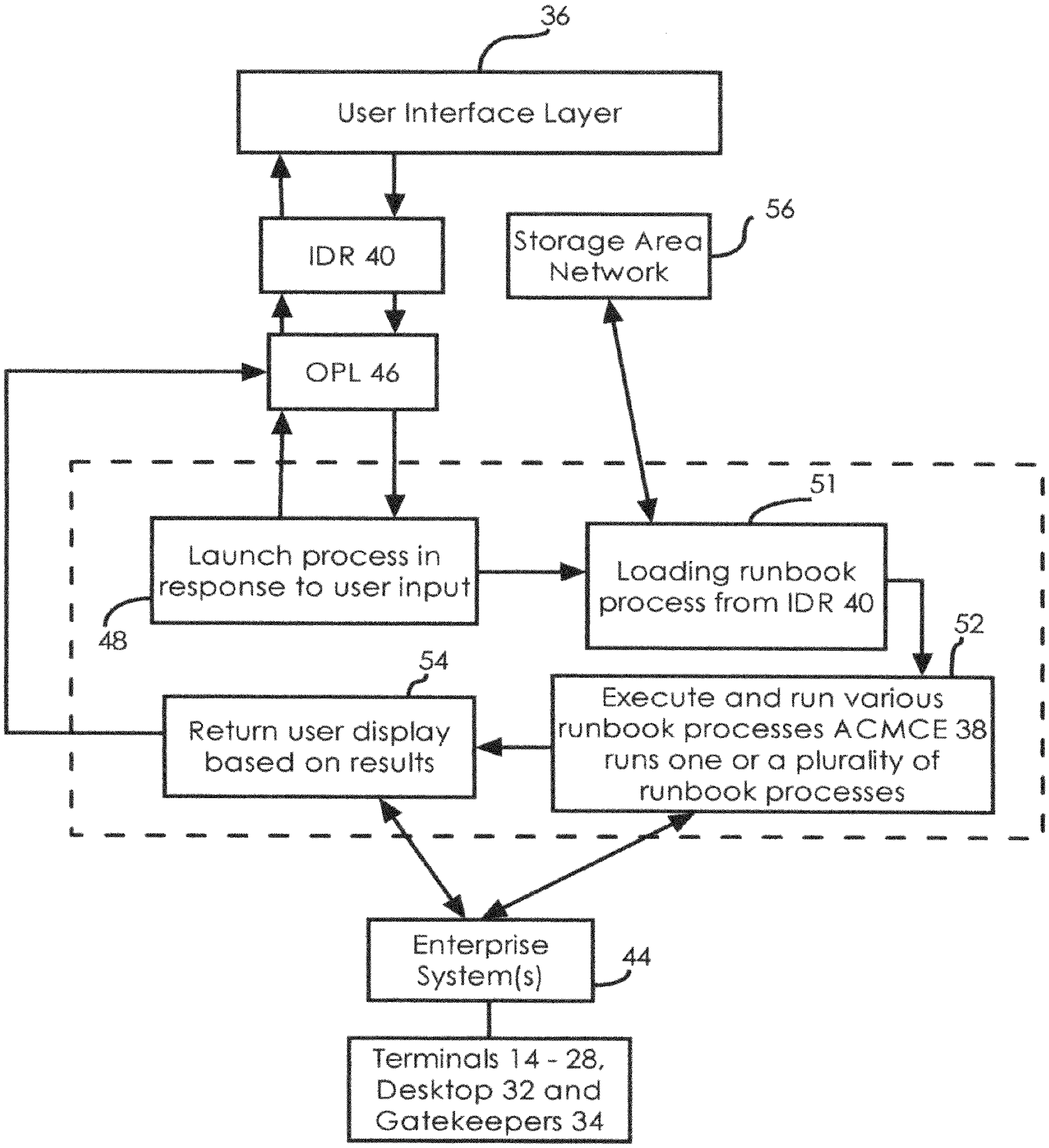
FIG. 3 is a schematic view showing more details of the system and automated conference management and control engine.
Figure 4:
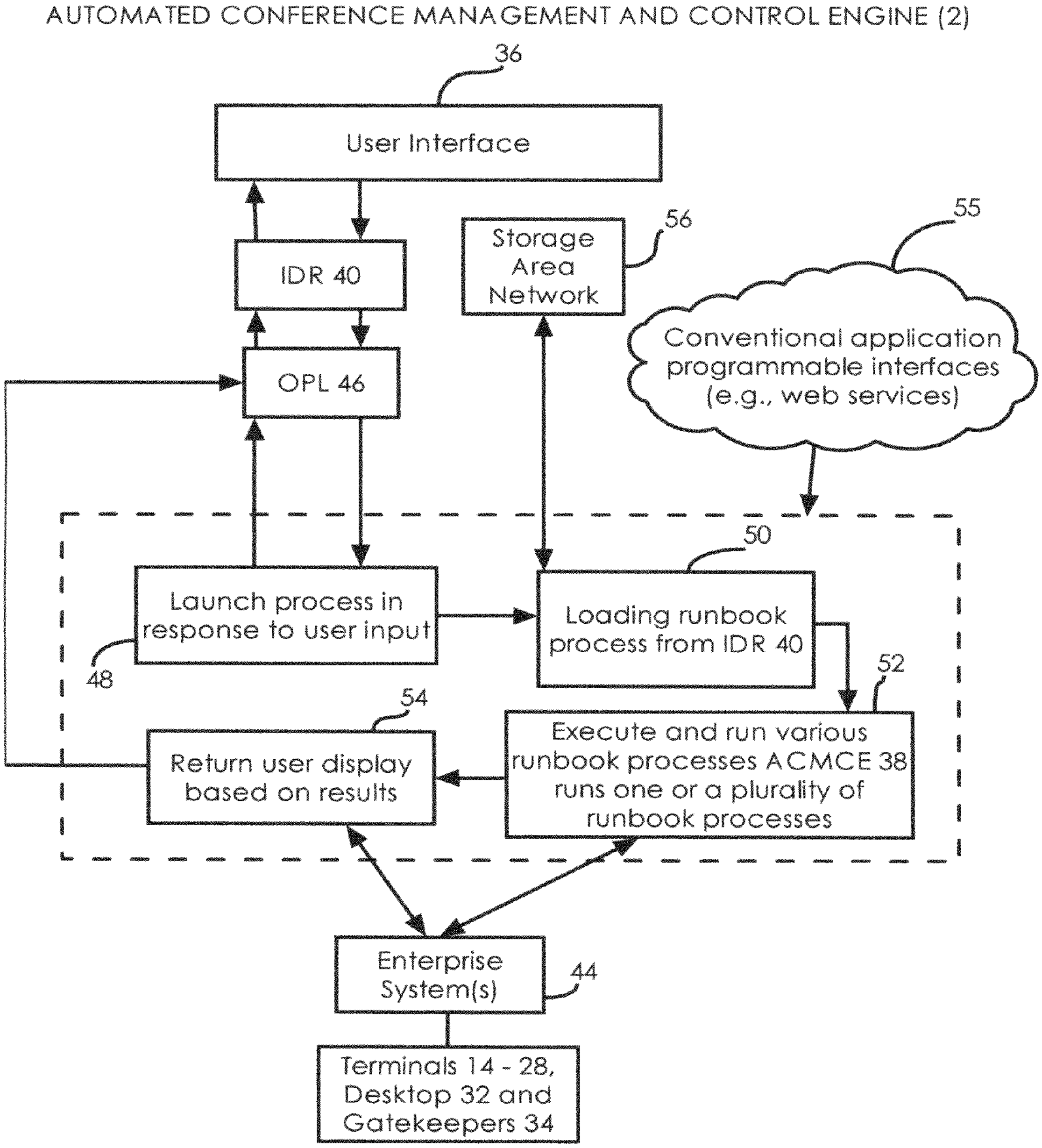
FIG. 4 is a view similar to FIG. 3 showing more details of the system and automated conference management and control engine.

FIGS. 3 and 4 illustrate one means and process by which the ACMCS 12 receives runbook process initiation information from the user through the user interface 36 and initiates the appropriate runbook process within the IDR 40, and in response, the OPL 46, using the OPL launcher 46*b* launches the desired runbook process in the ACMCE 38. The IDR 40 receives the inputted information via the user interface 36, as illustrated at block 48 in FIGS. 3 and 4. The manner by which the user launches or causes one or more of the runbook processes 58 to be initiated is described later herein. In response, the ACMCE 38 then obtains (block 50 in FIGS. 3 and 4) and loads the at least one or a plurality of runbook processes 58 from the IDR 40. The ACMCE 38 then runs the at least one or plurality of the at least one or plurality of runbook processes 58 (block 52). The ACMCE 38 displays or communicates the results (block 54) of the runbook processes 58 that were run to the user.

As illustrated in FIGS. 3 and 4, an additional storage area network 56 comprising at least one or a plurality of back-up drives (not shown) is provided for redundancy and back-up. As also illustrated in FIGS. 3 and 4, the at least one or a plurality of enterprise systems 44 may be coupled to the ACMCE 38 and may communicate and/or receive data relative to the management, scheduling, monitoring and data collaboration that may be requested, provided and/or required by the user or the system 10.

The system 10 uses conventional application programmable interface communication methods 55 (FIG. 4), such as web services, Microsoft Exchange Server® web application programmable interfaces (available from Microsoft Corporation of Redmond, Wash.) to communicate and/or receive data with the at least one or a plurality enterprise systems 44 for the communication and/or receipt of data relative to the management, scheduling, monitoring and data collaboration that may be requested, provided and/or required by the user or the system 10.

Referring now to FIG. 5, another diagrammatic and more detailed view of the system 10 is shown. As illustrated, the system 10 comprises the IDR 40 which interfaces and interacts with the ACMCE 38 via the OPL 46. In the illustration being shown, the enterprise systems 44 interact with the ACMCE 38 via at least one or a plurality of outlets 64. Notice in the illustration, the enterprise systems 44 may comprise various servers, such as Microsoft Exchange Server® 44*l* (available from Microsoft Corporation of Redmond Wash.), an IBM® Lotus® Domino® Server 44*m* (available from International Business Machines Corporation, of Armonk, N.Y.), a Polycom® SE 200 Server 44*n* (available from Polycom Inc. of Pleasanton California) a Tandberg® Management System 44*d* (available from Tandberg ASA of Lysaker Norway), a VNOC Producer 44*e* (available from Iformata LLC of Dayton, Ohio) or the like. The enterprise system 44 could also comprise a reservation management system 44*f*, a reporting system 44*g*, a notification system 44*h*, and/or a held desk system 44*i*, all of which are available from Iformata LLC. The enterprise system 44 may further comprise a network management system 44*j* or video network operation management system 44*k*. The interaction of the enterprise system 44 with the ACMCE 38 will be described later herein.

The system 10 further comprises at least one or a plurality of widgets or user entry points 66 that are adapted to enable the user to enter, access and/or use the system 10. The user entry points 66 may include a web portal 66*a*, a touch screen computer (e.g., iPad®, available from Apple, Inc.) and/or mobile interface 66*b* (e.g., iPhone®, available from Apple, Inc.). The user entry points 66 may comprise an email and personal information management software, such as Outlook® 66*c*, Lotus Notes® 66*d* or other calendar portal and the like. As mentioned previously herein, the user entry points 66 enable the user to enter, access and use the system 10 via the user interface 36 and to, for example, initiate one or more of the runbook processes 58 which will now be described.

The plurality of runbook processes 58 may be specific to the user or an organization to facilitate and/or enable the managing, scheduling, monitoring and controlling of audio and video communication and data collaboration. In the illustration shown in FIG. 5, several of the plurality of runbook processes 58 are shown. The plurality of runbook processes 58 comprise one or more of the following processes: a service process 58*b*, a supported terminals, software versions and enterprise systems process 58*c*, a notification templates and formatting process 58*f*, a reservation process, a site profile form templates process, conference management processes 58*e*, a conference maintenance process, a remediation process 58*h*, a notification process, an escalation process 58*g*, proactive daily site sweep process 58*j*, a conference log process 58*k*, a root cause analysis (RCA) template process 58*m*, a quality control process 58*l* and a reporting deliverables process 58*n*, all of which will now be described generally, but will be described in more detail later herein. As mentioned herein, each of the plurality of runbook processes 58 are stored in the IDR 40 along with the activities 60 that are called upon to carry out the runbook process being executed.

As illustrated in FIG. 5, the IDR 40 and the ACMCE 38 communicate through the OPL 46. One suitable OPL 46 is the Win32® Service product available from Microsoft Corporation of Redmond, Wash. The OPL 46 comprises the launch processor 46*b* which launches or starts the selected runbook process 58 within the ACMCE 38 when it is called upon by the user or the ACMCE 38 in response to another runbook process. As mentioned, each of the plurality of runbook processes 58 comprises at least one or a plurality of the activities 60 that are stored in the IDR 40 and defined later herein. Again, the activities 60 are functions and commands that are executed by the ACMCE 38 in order to perform and/or complete the runbook process 58 that was called upon.

Note in FIG. 5 that the OPL 46 further comprises a database poller 46*b* which polls the IDR 40 to determine when data is being stored or retrieved from the IDR 40 in response to runbook processes 58 that are being called upon or run.

In the illustration being described, the ACMCE 38 comprises a process composer 70 that receives a runbook process start command (block 68) and data 62 and loads any runbook processes 58 that are called upon by composing the activities 60 that are required by the runbook process 58 being called upon. In this example, the activities 60 comprise the activities shown in the following Table CXVIX.:

| Available Activities | Runbook Process 58 | Continued Available Activities | Continued Runbook Category |
|---|---|---|---|
| Add Ticket | Incident Management Processes | MuteConferenceParticipants Speakers | Management Processes |

-continued

| Available Activities | Runbook Process 58 | Continued Available Activities | Continued Runbook Category |
|---|---|---|---|
| Audible Alert Notice | Monitoring | PingEndpoints | Monitoring |
| Cancel Reservation | Scheduling Processes | Post Setup Conference Notification | Management Processes |
| Check Location Availability | Scheduling Processes | Post Start Conference Notification | Management Processes |
| Connect Conference Participants | Management Processes | Pre Setup Conference Notification | Management Processes |
| Delete Reservation | Scheduling Processes | Pre Start Conference Notification | Management Processes |
| Disconnect conference Participants | Management Processes | PreTearDownConferenceNotification | Management Processes |
| Email Ticket Notice | Incident Management Processes | Save Reservation | Scheduling Processes |
| Find Conference By Date Range | Scheduling Processes | Send Popup Message | Management Processes |
| Find Conference By ID | Scheduling Processes | SendSetupAlert | Management Processes |
| Find Conference Resources | Scheduling Processes | SendStartAlert | Management Processes |
| Find Conferences By Office Space | Scheduling Processes | Sleep Conference Participants | Management Processes |
| Find Conferences By Title | Scheduling Processes | StatisticsRequest | Monitoring |
| Find SLA Summary | Monitoring | UnMute Conference Participant Speakers | Management Processes |
| Find Ticket Category | Incident Management Processes | UnMute Conference Participants Microphones | Management Processes |
| Find Tickets | Incident Management Processes | UnMute Conference Participants Video | Management Processes |
| Get Meetings | Monitoring | Update Reservation | Scheduling Processes |
| GetActiveCalls | Monitoring | Wait 1 Minute | Management Processes |
| If HSS Issue | Incident Management Processes | Wait 15 Seconds | Management Processes |
| If Problem | Incident Management Processes | Wait 3 Minutes | Management Processes |
| Iformata Send Cancellation Notice | Scheduling Processes | Wait 30 Seconds | Management Processes |
| Iformata Send Modification Notice | Scheduling Processes | Wait 5 Minutes | Management Processes |
| Iformata Send Scheduled Notice | Scheduling Processes | Wait 10 Seconds | Management Processes |
| Modify Meeting | Scheduling Processes | Wait 5 Seconds | Management Processes |
| Mute Conference Participants Microphones | Management Processes | WakeConferenceParticipants | Management Processes |
| Mute Conference Participants Video | Management Processes | | |

The plurality of activities 60 shown in the above Table CXVIX are examples of some of the activities that may be called upon by the system 10, but it should be understood that more, fewer or different activities could be stored in the IDR 40 and used by the system 10.

The ACMCE 38 further comprises a conductor 72 that executes and conducts the runbook process 58 that is called upon as previously composed and as illustrated in FIG. 5. It should be understood and appreciated that the ACMCE 38, therefore, enables the user to dynamically adapt and create custom runbook processes 58 depending upon the user's needs by organizing and composing various activities 60 that the user wishes or desires to comprise the custom runbook process 58.

As illustrated in FIG. 5, the ACMCE 38 further comprises the outlets 64 that are adapted to enable the enterprise system 44 to communicate with the ACMCE 38. The runbook processes 58 and their associated activities 60 are or may be written in the outlets 64 relative to the enterprise system(s) 44 being used. Further, the activities 60 within any outlet 64, in turn, interacts with the enterprise systems 44 using conventional application programmable interface communication methods and protocols 55 mentioned earlier relative to FIG. 4. The activities 60 resident in the IDR 40 that may be called upon by the enterprise system 44 will be dependent upon and restricted by the capabilities of the specific enterprise system 44 and/or the user's entry point 66. For example, some enterprise systems 44 have specific capabilities or limitations.

In the illustration, the user accesses the system 10 through the user entry point 66 which presents the user with the user interface 36 and described in more detail later herein. The user initiates or causes at least one or a plurality of the runbook processes 58 to be initiated and such request is sent to the IDR 40 via the process start command 68 and launcher 46*b*. The OPL 46 polls the IDR 40 using the database poller 46*b* to determine when data 62 is being stored or retrieved from the IDR 40 in response to the runbook processes 58 which are being called upon by the user. The OPL 46 launches the called upon runbook processes 58 in the ACMCE 38. The process composer 70 of the ACMCE 38 composes all activities 60 that are required by the runbook process 58 being called upon. The process composer 70 generates at least one composed runbook process using the runbook process 58 being called upon and its associated activities 60. The ACMCE 38 then executes the activities 60 and conducts the runbook process 58 that is called upon as previously composed and as illustrated in FIG. 5.

The activities 60 that the process composer 70 of the ACMCE 38 may compose may be limited or restricted by the enterprise system 44 being used. In other words, one enterprise system 44 may not have the capabilities to enable and/or use all the activities available in the IDR 40. If that is the case, then the ACMCE 38 will not allow or permit that activity to be composed. Thus, the ACMCE 38 may comprise rules or at least one parameter associated with each enterprise system 44 and/or each enterprise system 44 may internally limit the activity 60 that can be used.

The system 10 further comprises the outlets 64 which are represented in FIG. 5 and which comprise a plurality of the activities 60. For example, the activities 60 may comprise a statistic collector 60*a*, a scheduler 60*b*, a third-party integrator 60*c*, an open session command 60*d*, a ping command 60*e*, a setup command 60*f*, and the like. As mentioned earlier, the plurality of activities 60 are described later herein.

It should be understood that each enterprise system 44 has an outlet 64 associated with it. The outlet 64 is resident in the IDR 40 and contains activities 60 that are matched, suited, adapted or defined by the capabilities of the enterprise system 44. The activities 60 include the activities of the outlets 64, but also comprise other activities, such as the activities required by the runbook processes 58. As mentioned earlier herein, the enterprise systems 44 may have activities that are defined by the manufacturer or the provider of the enterprise system 44.

The capabilities of each enterprise system 44 may vary depending upon the manufacturer and provider of the enterprise system 44. For example, the provider of one of the enterprise systems 44 may provide a notification function (not shown) in their enterprise system 44, while a second provider does not provide the same notification function in their enterprise system 44. It should be understood that ACMCE 38, therefore, organizes the activities in the IDR 40 to execute the runbook process 58 that are selected by the user and also executes the functions commanded and/or limited by the enterprise system 44.

The ACMCE 38 further comprises the processor composer 70 which, as alluded to earlier herein, initiates the composition of a called-upon runbook process 58 using at least one or a plurality of the activities 60 that are resident on the IDR 40. As illustrated in FIG. 5, the process composer 70 organizes at least one or a plurality of the activities 60, such as activities 60*f*, 60*g* and 60*h*, and uses the activities with the initiated runbook process 58 and data 62 being called upon. In the illustration being described, the ACMCE 38 organizes the activities into a predetermined workflow which is defined by the runbook process 58 being executed. The predetermined workflow is received by the process conductor 72 which initiates the runbook process 58 at block 72*a* whereupon the process conductor 72 executes the various activities in the predetermined workflow required by the runbook process 58 being executed (block 72*b*) after which the process ends.

It should be understood that during the execution of the runbook process 58, the results of the runbook process and/or request for input from the user may be presented to the user, as shown at block 54 in FIG. 3. For example, during the scheduling runbook process 58*d* (FIG. 5), if the user or the scheduling entity requests a resource, such as terminals 14-28, desktops 32, and/or a gatekeeper 34, that is not available, the user will be notified of such unavailability by the ACMCE 38 after the ACMCE 38 has run the scheduling runbook process 58*d*.

Figure 6:
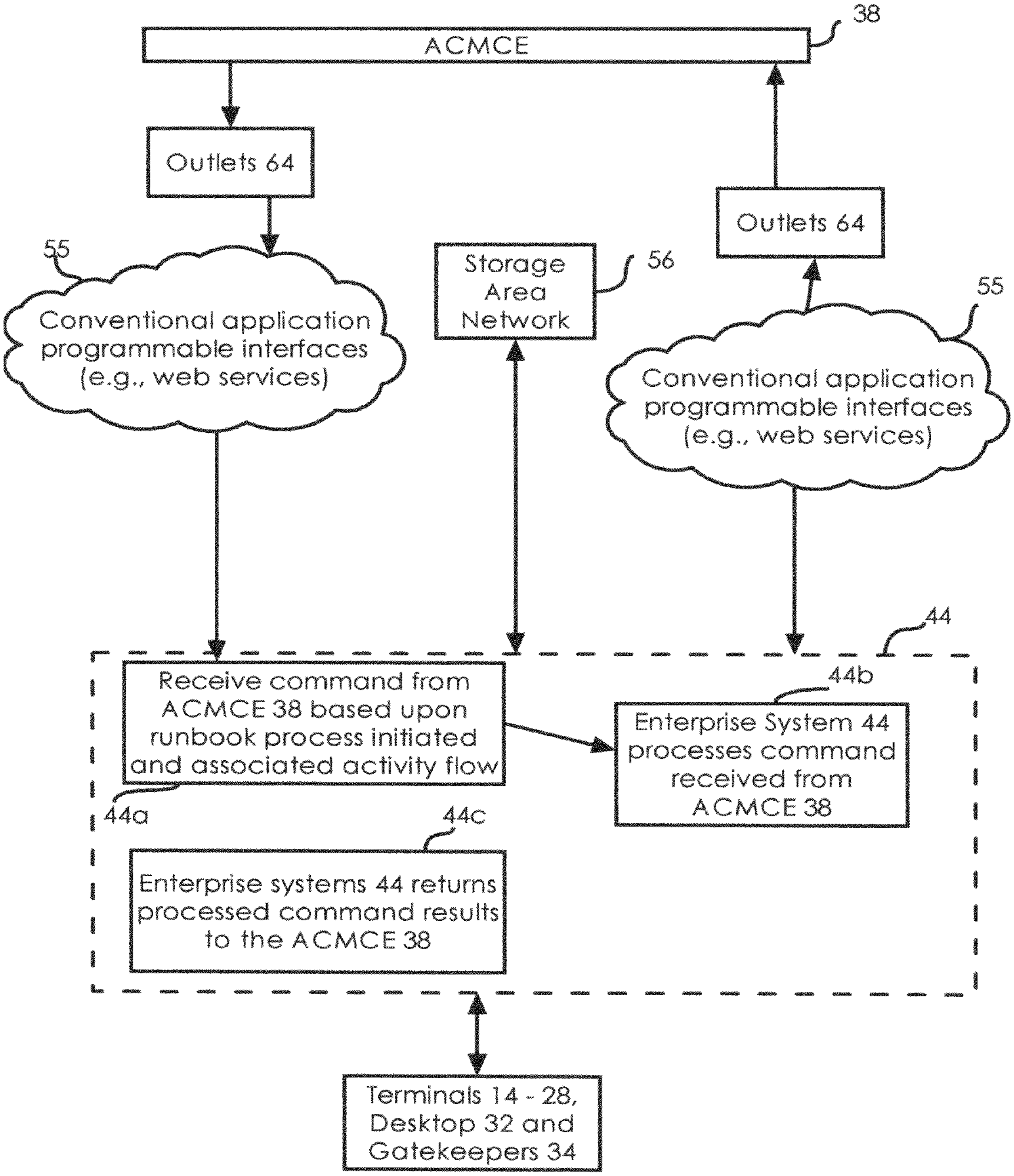
FIG. 6 is another schematic view showing the automated conference management and control engine used in association with outlets.

It should be noted that multiple third party enterprise systems 44 could be utilized during the execution of one runbook process 58. FIG. 6 is a schematic diagram illustrating the inter-relationship of the ACMCE 38 and the enterprise systems 44. Conventional applications and programmable interfaces 55 mentioned earlier herein enable and facilitate such communication. The enterprise system 44 receives a command from the ACMCE 38 via the outlet 64 (block 44*a*), which is based upon the runbook process 58 initiated and the associated activity flow. The enterprise system 44 processes the command (block 44*b*) and returns (block 44*c*) the processed command results to the ACMCE 38. As mentioned herein, the enterprise system 44 may control the terminals 14-28, desktops 32, and/or gatekeepers 34 based upon or in response to the commands received from the ACMCE 38. Advantageously, the ACMCS 12 and processes described herein facilitate real-time management, scheduling, monitoring and data collaboration of enterprise systems 44 that have different hardware, software and capabilities or that are on different or disparate system platforms.

The plurality of runbook processes 58 that were mentioned earlier herein relative to FIG. 5 are described in detail later herein and will now be summarized.

The provisioning runbook process is a method or process 58*a* by which at least one or a plurality of pre-determined usage parameters for the user are input into at least one or a plurality of the Tables resident in the IDR 40 using the user interface 36 of the ACMCS 12. The provisioning runbook process 58*a* comprising a provisioning user runbook process, a provisioning user runbook process and provisioning service runbook process. In general, the provisioning user runbook process is a method or process by which information about a single user is input into the IDR 40 and then used by the ACMCS 12. The provisioning terminals runbook process is a method or process by which information about at least one or a plurality of terminals 14-28, desktops 32 and/or gatekeepers 34 is input into the into the IDR 40 and then used by the ACMCS 12. It should be understood that the provisioning runbook process may be used by a provisioning user that is different or the same as a user, such as a scheduling user or scheduling entity, that is scheduling use of the terminals 14-28, desktops and/or gatekeepers 34. In other words, a provisioning user may provision at least one or a plurality or resources for an organization, while a scheduling user may be those individuals within the organization that are permitted to schedule the at least one or a plurality of resources.

The service runbook process 58*b* is an authentication process that is adapted to and enables the ACMCS 12 to authenticate and govern access to and use of the ACMCS 12.

The supported terminals, software versions and enterprise systems processes 58*c* is a process by which the ACMCS 12 determines and verifies the user's supported terminals 14-28, desktops 32 and/or gatekeepers 34 and the supported enterprise systems 44 any software on the user's supported terminals 14-28, desktops 32 and/or gatekeepers 34.

The scheduling runbook process 58*d* is adapted to enable or provide at least one scheduler or scheduling means for scheduling, control and management of the terminals 14-28, desktops 32 and/or gatekeepers 34 and of activities and functions, described later herein, that the user can access and execute to perform scheduling tasks using the ACMCS 12.

The notification process 58*f* is the runbook process by which the ACMCS 12 generates notification for the user relating to the services the user has access to, which may be governed by their license or contract terms or parameters under which the user is authorized to use the system 10. This process governs notifications templates and formats that the user has chosen and the methods by which the user has chosen to be notified. Notifications may be, for example, an electronic mail notification, a telephonic notification, an audible notification, an on screen pop-up notification or the like. Several examples of notifications are described and shown later herein relative to FIGS. 40A and 40B.

The conference management process 58 is the method by which the ACMCS 12, sets up, starts, monitors then disconnects conferences that are scheduled within the ACMCS 12. The ACMCS 12 uses the conference management process 58*e* and the predetermined conference information in the IDR 40 to set up 58*e*1, monitor 58*e*2 and ultimately disconnect 58*e*3 any conference or conferences that are scheduled within the ACMCS 12. The conference management process 58 is a method or process by which the ACMCS 12 establishes a connection or disconnection between or among a plurality of terminals 14-28, desktops 32 and/or gatekeepers 34. The conference management meet now or impromptu change request process is also a method or process by which the ACMCS 12 establishes data sharing between or among a plurality of the terminals 14-28, desktops 32 and/or gatekeepers 34 when requested. It is also a method or process by which the ACMCS 12 establishes the connection or disconnection between or among a plurality of terminals 14-28, desktops 32 and/or gatekeepers 34 during an existing conference, such as when an impromptu change to a scheduled conference is requested during a "live" scheduled conference. This process is described in more detail later herein relative to FIGS. 12B and 12C.

The escalation process 58*g* is a method or process by which the ACMCS 12 escalates issues and potential issues previously identified by one or a plurality of the other runbook processes 58 mentioned herein. The escalation process is described in more detail later herein relative to FIG. 20.

The remediation process 58*h* is a method or process by which the ACMCS 12 checks, troubleshoots and provides solutions when a fault occurs that impacts or interferes with a/or conference(s). The fault may occur prior to a conference, or as a conference is taking place. The remediation is described in more detail later herein.

The fault management process 58*i* is a method or process by which the ACMCS 12 communicates or notifies the user of a maintenance or trouble issue that occurs with the user's supported terminals 14-28, desktops 32 and/or gatekeepers 34, software versions and enterprise systems 44 via the notifications that the user has chosen to be notified about and the methods by which the user has chosen to be notified. The fault management process is described in more detail later herein relative to FIG. 19.

The daily site sweep process 58*j* is a method or process which performs a check or sweep of the terminals 14-28, desktops 32 and/or gatekeepers 34 and the network(s) to which they are connected and that are connected to the ACMCS 12 in order to provide preventative maintenance for the terminals 14-28, desktops 32 and/or gatekeepers 34. In one embodiment, the check or sweep is performed during off-peak hours (e.g. 1 AM to 4 AM local time).

The conference log process 58*k* is a method or process by which the details for scheduled conferences within the ACMCS 12 are recorded to the IDR 40 and viewable to the user.

The quality control process 58*l* is a method or process by which the ACMCS 12 proactively identifies and prevents potential issues from occurring such as scheduling conflicts or scheduling inaccuracies.

The root cause analysis (RCA) template process 58*m* is a method or process that utilizes a template (not shown) as provided by the ACMCS 12 that the user will follow to document questions or problems that need to be answered or solved and/or information that needs to be gathered when a root cause analysis is requested by the user.

The reporting deliverables process is a method or process by which the ACMCS 12 delivers to the user standardized reporting for the terminals 14-28, desktops 32 and/or gatekeepers 34.

The IDR 40 organizes the data 62 in accordance with a plurality of objects 74 (FIG. 5) that are referred to in Tables III through CXVII. The plurality of objects 74 are defined by the runbook process 58 and activities 60 mentioned earlier herein. The data 62 is organized in accordance with the objects 74 and stored in the IDR 40 along with the runbook processes 58. The runbook processes 58, associated activities 60 and data 62 are used by the ACMCE 38 to automate, manage and control audio and video communication and data collaboration as described earlier herein relative to FIG. 5. The IDR 40 organizes the data 62 and activities 60 required by the aforementioned runbook processes 58 in the IDR 40 database as illustrated in or required by the Tables III through CXVII and an organization schema 59. One illustrative embodiment of the organization schema 59 associated with the objects 74 is attached hereto in Appendix A.

The data 62 associated with each of the objects 74 in the Tables III through CXVII is stored in the IDR 40 and is called upon by the various runbook processes 58 described herein. The data 62 associated or corresponding with each of the objects 74 is stored in the IDR 40 in accordance with the schema 59 mentioned earlier. Further, each runbook process 58, associated activities 60 and data 62 in the tables are stored in accordance with the schema referred to in Appendix A format so that the runbook process 58 and data 62 are readily available for usage, such as in relational database table format, as shown later in Tables III through CXVII, an eXtensible Markup Language (XML) file and/or other conventional formats.

During operation, the ACMCE 38 loads at least one or a plurality of the runbook processes 58 from the IDR 40 in response to the data 62 that is input by the user into the ACMCE 38 using the user interface 36. The ACMCE 38 runs the at least one or the plurality of the runbook processes 58 using the data 62 input by the user and other data 62, such as the data 62 associated with the Tables III through CXVII below, within the IDR 40. In the embodiment being described, the ACMCE 38 executes the at least one or plurality of the runbook processes 58 using a business process management engine, such as the Microsoft® Windows Work-Flow Foundation available from Microsoft Corporation of Redmond, Wash. The Tables III through CXVII are as follows:

TABLE III

| OBJECT NAME | OBJECT TYPE | COLUMN NAME | DATA TYPE | CONSTRAINT NAME | CONSTRAINT TYPE |
|---|---|---|---|---|---|
| Accounts | Base Table | Id | uniqueidentifier | PK_Accounts | PRIMARY KEY |
| | | Name | nvarchar (255) | | |
| | | isActive | bit | | |
| | | OrganizationId | uniqueidentifier | | |
| | | AccountManagerUserId | uniqueidentifier | | NULL |
| | | ContactUserId | uniqueidentifier | | NULL |
| | | BillingContact UserId | uniqueidentifier | | NULL |
| | | HomePage | nvarchar(255) | | NULL |
| | | CreatedDate | datetime | | |
| | | ModifiedDate | datetime | | NULL |
| | | Rep_RowNo | bigint | | |

| Referenced Column Name | Referred By Table Name | Referred By Table Column Name |
|---|---|---|
| Id | Accounts_Spaces | AccountId |
| | Accounts_Users | AccountId |
| | Contracts | AccountId |

TABLE IV

| OBJECT NAME | OBJECT TYPE | COLUMN NAME | DATA TYPE | CONSTRAINT NAME | CONSTRAINT TYPE |
|---|---|---|---|---|---|
| Accounts_ Spaces | BASE TABLE | SpaceId | uniqueidentifier | FK_Accounts_ Spaces_Space | FOREIGN KEY |
| | | AccountId | uniqueidentifier | FK_Accounts_ Spaces_Accounts | FOREIGN KEY |

TABLE V

| OBJECT NAME | OBJECT TYPE | COLUMN NAME | DATA TYPE | CONSTRAINT NAME | CONSTRAINT TYPE |
|---|---|---|---|---|---|
| Accounts_ Users | BASE TABLE | AccountId | uniqueidentifier | FKAccounts_ Users_Accounts | FOREIGN KEY |
| | | UserId | uniqueidentifier | FK_Accounts_ Users_Users | FOREIGN KEY |
| | | CreatedDate | datetime | | |
| | | ModifiedDate | datetime | | NULL |
| | | Rep_RowNo | bigint | | |
| | | isVisible | bit | | NULL |

TABLE VI

| OBJECT NAME | OBJECT TYPE | COLUMN NAME | DATA TYPE | CONSTRAINT NAME | CONSTRAINT TYPE |
|---|---|---|---|---|---|
| Activities | BASE TABLE | ActivityId | int | PK_Sy_FW_Activities | PRIMARY KEY |
| | | ActivityName | varchar(255) | | |
| | | ActivityAlias | varchar(255) | | |
| | | DateCreated | datetime | | NULL |
| | | CreatedFor | varchar(255) | | NULL |
| | | Description | varchar(255) | | NULL |
| | | RunBookCategory | varchar(255) | | NULL |
| | | ModuleType | varchar(255) | | NULL |
| | | Version | varchar(50) | | NULL |
| | | ModuleId | int | | NULL |

| Referenced Column Name | Referred By Table Name | Referred By Table Column Name |
|---|---|---|
| ActivityId | ContractProcess Builder | ActivityId |
| | CustomActivityContents | ActivityId |

TABLE VII

| OBJECT NAME | OBJECT TYPE | COLUMN NAME | DATA TYPE | CONSTRAINT NAME | CONSTRAINT TYPE |
|---|---|---|---|---|---|
| ChargeCategories | BASE TABLE | ID | uniqueidentifier | PK_ChargeCategories | PRIMARY KEY |
| | | ParentCategory | uniqueidentifier | FK_ChargeCategories_ChargeCategories | FOREIGN KEY, NULL |
| | | Name | varchar(255) | | |
| | | ChargeTypeID | int | FK_ChargeCategories_ChargeTypes | FOREIGN KEY |
| | | ServiceTypeID | int | FK_ChargeCategories_ServiceTypes | FOREIGN KEY |
| | | Optional | bit | | |
| | | Chargeable | bit | | |

| Referenced Column Name | Referred By Table Name | Referred By Table Column Name |
|---|---|---|
| ID | Contract_Rates | ChargeCategoryId |
| | ChargeCategories | ParentCategory |
| | Rates | Category |

TABLE VIII

| OBJECT NAME | OBJECT TYPE | COLUMN NAME | DATA TYPE | CONSTRAINT NAME | CONSTRAINT TYPE |
|---|---|---|---|---|---|
| ChargeTypes | BASE TABLE | ID | int | PK_ChargeTypes | PRIMARY KEY |
| | | Charge | varchar(255) | | NOT NULL |

| Referenced Column Name | Referred By Table Name | Referred By Table Column Name |
|---|---|---|
| ID | ChargeCategories | ChargeTypeID |

TABLE IX

| OBJECT NAME | OBJECT TYPE | COLUMN NAME | DATA TYPE | CONSTRAINT NAME | |
|---|---|---|---|---|---|
| Component_Types | BASE TABLE | Id | int | PK_Component_Types | NOT NULL |
| | | Name | nvarchar(50) | | NOT NULL |
| | | CreatedDate | datetime | | NOT NULL |
| | | ModifiedDate | datetime | | NULL |
| | | Rep_RowNo | bigint | | NOT NULL |

| Referenced Column Name | Referred By Table Name | Referred By Table Column Name |
|---|---|---|
| Id | Environment | ComponentTypeId |

TABLE X

| OBJECT NAME | OBJECT TYPE | COLUMN NAME | DATA TYPE | CONSTRAINT NAME | CONSTRAINT TYPE |
|---|---|---|---|---|---|
| Conference | BASE TABLE | ConfirmationNumber | bigint | PK_Conference | PRIMARY KEY |
| | | StatusId | int | FK_Conference_Status_Names | FOREIGN KEY |
| | | ConferenceType | int | FK_Conference_Conference_Type | FOREIGN KEY |
| | | SetupUtc | datetime | | NOT NULL |
| | | StartUtc | datetime | | NOT NULL |
| | | EndUtc | datetime | | NOT NULL |
| | | MeetingTitle | varchar(255) | | NOT NULL |
| | | HostSpaceId | uniqueidentifier | | NULL |
| | | AccountId | uniqueidentifier | | NOT NULL |
| | | IsPrivate | bit | | NOT NULL |
| | | HostEmailAddress | nvarchar(255) | | NOT NULL |
| | | RequestorEmailAddress | nvarchar(255) | | NOT NULL |
| | | Notes | nvarchar(MAX) | | NULL |
| | | CreatedDate | datetime | | NOT NULL |
| | | ModifiedDate | datetime | | NULL |
| | | Guid | uniqueidentifier | | NULL |
| | | Timezone | nvarchar(50) | | NULL |

TABLE X-continued

| Referenced Column Name | Referred By Table Name | Referred By Table Column Name |
|---|---|---|
| Confirmation Number | Conference_Notifications | ConfirmationNumber |
| | Conference_Spaces | ConferenceId |
| | Conference_Status | ConferenceId |
| | ConferenceParticipants | ConfirmationNumber |
| | VnocSystem_Statistics | ConferenceId |

TABLE XI

| OBJECT NAME | OBJECT TYPE | COLUMN NAME | DATA TYPE | CONSTRAINT NAME | CONSTRAINT |
|---|---|---|---|---|---|
| Conference_Notifications | BASE TABLE | ConfirmationNumber | bigint | FK_Conference_Notifications_Conference | FOREIGN KEY |
| | | NotificationTypeId | int | FK_Conference_Notifications_Notification_Type | FOREIGN KEY |

TABLE XII

| OBJECT NAME | OBJECT TYPE | COLUMN NAME | DATA TYPE | CONSTRAINT NAME | CONSTRAINT TYPE |
|---|---|---|---|---|---|
| Conference_Ports | BASE TABLE | ComponentId | uniqueidentifier | FK_Conference_Ports_Vnoc System_Components | FOREIGN KEY |
| | | AudioPotsLine | nvarchar(255) | | NULL |
| | | E164Address | nvarchar(255) | | NULL |
| | | H323Name | nvarchar(255) | | NULL |
| | | IsdnNumber | nvarchar(255) | | NULL |
| | | SipAddress | nvarchar(255) | | NULL |

TABLE XIII

| OBJECT NAME | OBJECT TYPE | COLUMN NAME | DATA TYPE | CONSTRAINT NAME | CONSTRAINT TYPE |
|---|---|---|---|---|---|
| Conference_Recurrence | BASE TABLE | ConferenceId | bigint | PK_Conference_Recurrence | PRIMARY KEY |
| | | RecurrenceId | bigint | FK_Conference_Recurrence_Recurrence | FOREIGN KEY |

TABLE XIV

| OBJECT NAME | OBJECT TYPE | COLUMN NAME | DATA TYPE | CONSTRAINT NAME | CONSTRAINT TYPE |
|---|---|---|---|---|---|
| Conference_Revisions | BASE TABLE | ConfirmationNumber | bigint | | |
| | | Owner | nvarchar(255) | | |
| | | Requestor | nvarchar(255) | | |
| | | Status | nvarchar(255) | | |
| | | Title | nvarchar(255) | | |
| | | Type | nvarchar(255) | | |
| | | HostSpaceId | uniqueidentifier | | |
| | | AccountId | uniqueidentifier | | |
| | | UtcStart | datetime | | |
| | | UtcEnd | datetime | | |
| | | UtcSetup | datetime | | |
| | | ProfiledSpaces | nvarchar(500) | | |
| | | Participants | nvarchar(500) | | |
| | | Notes | nvarchar(4000) | | |
| | | Description | nvarchar(1000) | | |
| | | RegisteredUserId | uniqueidentifier | | |
| | | EmailAddress | nvarchar(255) | | |
| | | UtcTimestamp | datetime | | |
| | | CreatedDate | datetime | | NOT NULL |
| | | ModifiedDate | datetime | | |
| | | Rep_RowNo | bigint | | NOT NULL |

TABLE XV

| OBJECT NAME | OBJECT TYPE | COLUMN NAME | DATA TYPE | CONSTRAINT NAME | CONSTRAINT TYPE |
|---|---|---|---|---|---|
| Conference_Spaces | BASE TABLE | ConferenceId | bigint | FK_Conference_Spaces_Conference | FOREIGN KEY |
| | | SpaceId | uniqueidentifier | FK_Conference_Spaces_Space | FOREIGN KEY |
| | | StartUtc | datetime | | NOT NULL |
| | | EndUtc | datetime | | NOT NULL |
| | | CreatedDate | datetime | | NOT NULL |
| | | ModifiedDate | datetime | | NULL |
| | | Rep_RowNo | bigint | | NOT NULL |
| | | SetupUtc | datetime | | NULL |

TABLE XVI

| OBJECT NAME | OBJECT TYPE | COLUMN NAME | DATA TYPE | CONSTRAINT NAME | CONSTRAINT TYPE |
|---|---|---|---|---|---|
| Conference_Status | BASE TABLE | ConferenceId | bigint | FK_Conference_Status_Conference, PK_Conference_Status | FOREIGN KEY, PRIMARY KEY |
| | | Status | int | FK_Conference_Status_Schedule_Status | FOREIGN KEY |
| | | IsLocked | bit | | |

TABLE XVII

| OBJECT NAME | OBJECT TYPE | COLUMN NAME | DATA TYPE | CONSTRAINT NAME | CONSTRAINT TYPE |
|---|---|---|---|---|---|
| Conference_Type | BASE TABLE | Id | int | PK_Conference_Type | PRIMARY KEY |
| | | Name | nvarchar(255) | | NOT NULL |
| | | CreatedDate | datetime | | NOT NULL |
| | | ModifiedDate | datetime | | |
| | | Rep_RowNo | bigint | | NOT NULL |

| Referenced Column Name | Referred By Table Name | Referred By Table Column Name |
|---|---|---|
| Id | Conference | ConferenceType |

TABLE XVIII

| OBJECT NAME | OBJECT TYPE | COLUMN NAME | DATA TYPE | CONSTRAINT NAME | CONSTRAINT TYPE |
|---|---|---|---|---|---|
| ConferenceParticipants | BASE TABLE | ConfirmationNumber | bigint | FK_ConferenceParticipants_Conference | FOREIGN KEY |
| | | ParticipantEmail | nvarchar(255) | | NOT NULL |
| | | SpaceId | uniqueidentifier | | |
| | | IsProfiledSpace | bit | | |
| | | Location | nvarchar(255) | | |
| | | Name | nvarchar(255) | | |
| | | DialIn | nvarchar(255) | | |
| | | DialOut | nvarchar(255) | | |
| | | CreatedDate | datetime | | NOT NULL |
| | | ModifiedDate | datetime | | |
| | | Rep_RowNo | bigint | | NOT NULL |

TABLE XIX

| OBJECT NAME | OBJECT TYPE | COLUMN NAME | DATA TYPE | CONSTRAINT NAME | CONSTRAINT TYPE |
|---|---|---|---|---|---|
| Contract_Rates | BASE TABLE | Id | bigint | PK_Contract_Rates | PRIMARY KEY |
| | | ContractId | uniqueidentifier | FK_Contract_Rates_ Contracts | FOREIGN KEY |
| | | ChargeCategoryId | uniqueidentifier | FK_Contract_Rates_ Charge Categories | FOREIGN KEY |
| | | Rate | nvarchar(50) | | NOT NULL |

| Referenced Column Name | Referred By Table Name | Referred By Table Column Name |
|---|---|---|
| Id | VnocSystem_ContractRates | ContractRateId |

TABLE XX

| OBJECT NAME | OBJECT TYPE | COLUMN NAME | DATA TYPE | CONSTRAINT NAME | CONSTRAINT TYPE |
|---|---|---|---|---|---|
| ContractProcessBuilder | BASE TABLE | ContractProcessId | uniqueidentifier | FK_ContractProcessBuilder_ContractProcesses | FOREIGN KEY |
| | | ActivityId | int | FK_ContractProcessBuilder_Activities | FOREIGN KEY |
| | | Sequence | int | | |

TABLE XXI

| OBJECT NAME | OBJECT TYPE | COLUMN NAME | DATA TYPE | CONSTRAINT NAME | CONSTRAINT TYPE |
|---|---|---|---|---|---|
| ContractProcess-CustomActivities | BASE TABLE | ContractProcessId | uniqueidentifier | FK_ContractProcessCustomActivities_ContractProcesses | FOREIGN KEY |
| | | CustomActivityId | int | | NOT NULL |

TABLE XXII

| OBJECT NAME | OBJECT TYPE | COLUMN NAME | DATA TYPE | CONSTRAINT NAME | CONSTRAINT TYPE |
|---|---|---|---|---|---|
| ContractProcessDetails | BASE TABLE | ContractProcessId | uniqueidentifier | FK_ContractProcessDetails_ContractProcesses | FOREIGN KEY |
| | | RowIndex | int | | NULL |
| | | ColumnIndex | int | | NULL |
| | | ActivityId | int | | NULL |

TABLE XXIII

| OBJECT NAME | OBJECT TYPE | COLUMN NAME | DATA TYPE | CONSTRAINT NAME | CONSTRAINT TYPE |
|---|---|---|---|---|---|
| ContractProcesses | BASE TABLE | ContractProcessId | uniqueidentifier | PK_Sy_FW_ ContractProcesses | PRIMARY KEY |
| | | ContractId | uniqueidentifier | FK_ContractProcesses_ Contracts | FOREIGN KEY |
| | | RunBookProcessId | int | FK_ContractProcesses_ RunBookProcesses | FOREIGN KEY |

| Referenced Column Name | Referred By Table Name | Referred By Table Column Name |
|---|---|---|
| ContractProcessId | ContractProcess Builder | ContractProcessId |
| | ContractProcess CustomActivities | ContractProcessId |
| | ContractProcess Details | ContractProcessId |

TABLE XXIV

| OBJECT NAME | OBJECT TYPE | COLUMN NAME | DATA TYPE | CONSTRAINT NAME | CONSTRAINT TYPE |
|---|---|---|---|---|---|
| Contracts | BASE TABLE | ContractId | uniqueidentifier | PK_Contracts | PRIMARY KEY |
| | | AccountId | uniqueidentifier | FK_Contracts_Accounts | FOREIGN KEY |
| | | StartDate | datetime | | |
| | | EndDate | datetime | | |
| | | Description | varchar(255) | | NOT NULL |

| Referenced Column Name | Referred By Table Name | Referred By Table Column Name |
|---|---|---|
| ContractId | ContractProcesses | ContractId |
| | Contract_Rates | ContractId |
| | Rates | ContractID |
| | ModuleOutlets_Contract | ContractId |
| | FormConductor_TemplateDefaults | ContractId |

TABLE XXV

| OBJECT NAME | OBJECT TYPE | COLUMN NAME | DATA TYPE | CONSTRAINT NAME | CONSTRAINT TYPE |
|---|---|---|---|---|---|
| Countries | BASE TABLE | Id | int | PK_Countries | PRIMARY KEY |
| | | Name | nvarchar | | |
| | | Abbreviation | nvarchar | | |

| Referenced Column Name | Referred By Table Name | Referred By Table Column Name |
|---|---|---|
| Id | Office | CountryId |
| Id | Users | CountryId |

TABLE XXVI

| OBJECT NAME | OBJECT TYPE | COLUMN NAME | DATA TYPE | CONSTRAINT NAME | CONSTRAINT TYPE |
|---|---|---|---|---|---|
| CustomActivityContents | BASE TABLE | CustomActivityId | int | PK_Sy_FW_ CustomActivityContents | PRIMARY KEY |
| | | ActivityId | int | FK__ CustomActivityContents__ Activities | FOREIGN KEY |
| | | Sequence | int | | NOT NULL |

TABLE XXVII

| OBJECT NAME | OBJECT TYPE | COLUMN NAME | DATA TYPE | CONSTRAINT NAME | CONSTRAINT TYPE |
|---|---|---|---|---|---|
| Display | BASE TABLE | ResolutionHeight | int | | NOT NULL |
| | | ResolutionWidth | int | | NOT NULL |
| | | ComponentId | uniqueidentifier | FK_Display__ VnocSystem__ Components | FOREIGN KEY |

TABLE XXVIII

| OBJECT NAME | OBJECT TYPE | COLUMN NAME | DATA TYPE | CONSTRAINT NAME | CONSTRAINT TYPE |
|---|---|---|---|---|---|
| Endpoints | BASE TABLE | Id | uniqueidentifier | PK_Endpoints | PRIMARY KEY |
| | | Name | varchar(255) | | NOT NULL |
| | | City | varchar(255) | | NOT NULL |
| | | ContractID | uniqueidentifier | | NOT NULL |

TABLE XXIX

| OBJECT NAME | OBJECT TYPE | COLUMN NAME | DATA TYPE | CONSTRAINT NAME | CONSTRAINT TYPE |
|---|---|---|---|---|---|
| Environment | BASE TABLE | VnocSystemId | uniqueidentifier | FK_Environment__ VnocSystems | FOREIGN KEY |
| | | ComponentId | uniqueidentifier | FK_Environment__ VnocSystem__ Components | FOREIGN KEY |
| | | ComponentTypeId | int | FK_Environment__ Component__ Types | FOREIGN KEY |
| | | CreatedDate | datetime | | |
| | | ModifiedDate | datetime | | NOT NULL |
| | | Rep_RowNo | bigint | | |

TABLE XXX

| OBJECT NAME | OBJECT TYPE | COLUMN NAME | DATA TYPE | CONSTRAINT NAME | CONSTRAINT TYPE |
|---|---|---|---|---|---|
| ErrorCode | BASE TABLE | Id | bigint | PK_ErrorCode | PRIMARY KEY |
| | | ErrorName | nvarchar(50) | | NOT NULL |
| | | ErrorShortDescription | nvarchar(255) | | NOT NULL |

| Referenced Column Name | Referred By Table Name | Referred By Table Column Name |
|---|---|---|
| Id | VnocSystem_Statistics | ErrorCode |

TABLE XXXI

| OBJECT NAME | OBJECT TYPE | COLUMN NAME | DATA TYPE | CONSTRAINT NAME | CONSTRAINT TYPE |
|---|---|---|---|---|---|
| FormConductor__ FieldOptions | BASE TABLE | OptionId | bigint | PK_FormConductor__ FieldOptions | PRIMARY KEY |
| | | FormFieldId | uniqueidentifier | FK_FormConductor__ FieldOptions__ FormConductor__ FormFields | FOREIGN KEY |
| | | FormFieldValue | nvarchar(50) | | NOT NULL |
| | | Version | bigint | | NOT NULL |

TABLE XXXII

| OBJECT NAME | OBJECT TYPE | COLUMN NAME | DATA TYPE | CONSTRAINT NAME | CONSTRAINT TYPE |
|---|---|---|---|---|---|
| FormConductor__ FieldTypes | BASE TABLE | Id | bigint | PK_FormConductor__ FieldTypes | PRIMARY KEY |
| | | Name | nvarchar(50) | | NOT NULL |
| | | Description | nvarchar(50) | | NULL |
| | | AspType | nvarchar(50) | | NULL |

| Referenced Column Name | Referred By Table Name | Referred By Table Column Name |
|---|---|---|
| Id | FormConductor_FormFields | TypeId |

TABLE XXXIII

| OBJECT NAME | OBJECT TYPE | COLUMN NAME | DATA TYPE | CONSTRAINT NAME | CONSTRAINT TYPE |
|---|---|---|---|---|---|
| FormConductor__ FormFields | BASE TABLE | Id | uniqueidentifier | PK_FormConductor__ FormFields | PRIMARY KEY |
| | | TypeId | bigint | FK_FormConductor__ FormFields__ FormConductor__ FieldTypes | FOREIGN KEY |
| | | FormId | uniqueidentifier | FK_FormConductor__ FormFields__ FormConductor__ Forms | FOREIGN KEY |
| | | Name | nvarchar(50) | | NOT NULL |
| | | ClientFieldId | nvarchar(50) | | NULL |
| | | DefaultValue | nvarchar(50) | | NULL |
| | | FormStep | int | | NOT NULL |
| | | ReadOnly | bit | | NOT NULL |
| | | Required | bit | | NOT NULL |
| | | HelpContext | nvarchar(50) | | NULL |
| | | Description | nvarchar(50) | | NULL |
| | | FormFieldOrder | int | | NOT NULL |
| | | Version | int | | NOT NULL |

TABLE XXXIII-continued

| Referenced Column Name | Referred By Table Name | Referred By Table Column Name |
|---|---|---|
| Id | FormConductor_Response | fieldId |
| | FormConductor_FieldOptions | FormFieldId |

TABLE XXXIV

| OBJECT NAME | OBJECT TYPE | COLUMN NAME | DATA TYPE | CONSTRAINT NAME | CONSTRAINT TYPE |
|---|---|---|---|---|---|
| FormConductor__ Forms | BASE TABLE | FormId | uniqueidentifier | PK_FormConductor__ Forms | PRIMARY KEY |
| | | TemplateId | uniqueidentifier | FK_FormConductor__ Forms__ FormConductor__ Templates | FOREIGN KEY |
| | | Version | bigint | | NOT NULL |
| | | ContractId | uniqueidentifier | | NOT NULL |

| Referenced Column Name | Referred By Table Name | Referred By Table Column Name |
|---|---|---|
| FormId | FormConductor_Response | formId |
| FormId | FormConductor_FormFields | FormId |

TABLE XXXV

| OBJECT NAME | OBJECT TYPE | COLUMN NAME | DATA TYPE | CONSTRAINT NAME | CONSTRAINT TYPE |
|---|---|---|---|---|---|
| FormConductor__ Response | BASE TABLE | id | uniqueidentifier | PK_FormConductor__ Response | PRIMARY KEY |
| | | formId | uniqueidentifier | FK_FormConductor__ Response__ FormConductor__ Forms | FOREIGN KEY |
| | | fieldId | uniqueidentifier | FK_FormConductor__ Response__ FormConductor__ FormFields | FOREIGN KEY |
| | | utcdatestamp | datetime | | NOT NULL |
| | | value | nvarchar(255) | | |
| | | ConfirmationNumber | bigint | | |

TABLE XXXVI

| OBJECT NAME | OBJECT TYPE | COLUMN NAME | DATA TYPE | CONSTRAINT NAME | CONSTRAINT TYPE |
|---|---|---|---|---|---|
| FormConductor__ TemplateDefaults | BASE TABLE | TemplateFieldId | uniqueidentifier | FK_FormConductor__ TemplateDefaults__ FormConductor__ TemplateFields | FOREIGN KEY |
| | | ContractId | uniqueidentifier | FK_FormConductor__ TemplateDefaults__ Contracts | FOREIGN KEY |
| | | Version | bigint | | |
| | | DefaultValue | nvarchar(255) | | |
| | | ReadOnly | bit | | |
| | | Required | bit | | |

TABLE XXXVII

| OBJECT NAME | OBJECT TYPE | COLUMN NAME | DATA TYPE | CONSTRAINT NAME | CONSTRAINT TYPE |
|---|---|---|---|---|---|
| FormConductor__ TemplateFieldOptions | BASE TABLE | OptionId | bigint | PK_FormConductor__ TemplateFieldOptions | PRIMARY KEY |
| | | TemplateFieldId | uniqueidentifier | FK_FormConductor__ TemplateFieldOptions__ FormConductor__ TemplateFields | FOREIGN KEY |
| | | Value | nvarchar(50) | | |
| | | Version | bigint | | |

TABLE XXXVIII

| OBJECT NAME | OBJECT TYPE | COLUMN NAME | DATA TYPE | CONSTRAINT NAME | CONSTRAINT TYPE |
|---|---|---|---|---|---|
| FormConductor__ TemplateFields | BASE TABLE | Id | uniqueidentifier | PK_FormConductor__ TemplateFields | PRIMARY KEY |
| | | TypeId | bigint | | |
| | | TemplateId | uniqueidentifier | FK_FormConductor__ TemplateFields__ FormConductor__ Templates | FOREIGN KEY |
| | | Name | nvarchar(50) | | |
| | | ClientFieldId | nvarchar(50) | | |
| | | FormStep | int | | |
| | | HelpContext | nvarchar(50) | | NULL |
| | | Description | nvarchar(50) | | NULL |
| | | FormFieldOrder | int | | |

| Referenced Column Name | Referred By Table Name | Referred By Table Column Name |
|---|---|---|
| Id | FormConductor_TemplateDefaults | TemplateFieldId |
| Id | FormConductor_TemplateFieldOptions | TemplateFieldId |

TABLE XXXIX

| OBJECT NAME | OBJECT TYPE | COLUMN NAME | DATA TYPE | CONSTRAINT NAME | CONSTRAINT TYPE |
|---|---|---|---|---|---|
| FormConductor__ Templates | BASE TABLE | Id | uniqueidentifier | PK__ FormConductor__ Templates | PRIMARY KEY |
| | | Name | nvarchar(50) | | |
| | | Description | nvarchar(50) | | NULL |

| Referenced Column Name | Referred By Table Name | Referred By Table Column Name |
|---|---|---|
| Id | FormConductor__TemplateFields | TemplateId |
| Id | FormConductor__Forms | TemplateId |

TABLE XXXX

| OBJECT NAME | OBJECT TYPE | COLUMN NAME | DATA TYPE | CONSTRAINT NAME | CONSTRAINT TYPE |
|---|---|---|---|---|---|
| Helpdesk_Actions | BASE TABLE | Id | bigint | PK_Helpdesk_Actions | PRIMARY KEY |
| | | Name | nvarchar(255) | | NULL |

TABLE XXXXI

| OBJECT NAME | OBJECT TYPE | COLUMN NAME | DATA TYPE | CONSTRAINT NAME | CONSTRAINT TYPE |
|---|---|---|---|---|---|
| Helpdesk_Attachments | BASE TABLE | TicketId | bigint | | |
| | | Attachment | varbinary(MAX) | | NULL |

TABLE XXXXII

| OBJECT NAME | OBJECT TYPE | COLUMN NAME | DATA TYPE | CONSTRAINT NAME |
|---|---|---|---|---|
| Helpdesk_Event_Notes | BASE TABLE | EventId | bigint | |
| | | NotesId | bigint | |

TABLE XXXXIII

| OBJECT NAME | OBJECT TYPE | COLUMN NAME | DATA TYPE | CONSTRAINT NAME |
|---|---|---|---|---|
| Helpdesk_Event_Workers | BASE TABLE | EventId | bigint | |
| | | UserId | uniqueidentifier | |

TABLE XXXXIV

| OBJECT NAME | OBJECT TYPE | COLUMN NAME | DATA TYPE | CONSTRAINT NAME | CONSTRAINT TYPE |
|---|---|---|---|---|---|
| Helpdesk_Events | BASE TABLE | Id | bigint | PK_Helpdesk_Ticket_Events | PRIMARY KEY |
| | | TicketId | bigint | | |
| | | Name | nvarchar(255) | | NULL |
| | | TimeStamp | datetime | | NULL |
| | | ActionId | bigint | | NULL |

TABLE XXXXV

| OBJECT NAME | OBJECT TYPE | COLUMN NAME | DATA TYPE | CONSTRAINT NAME | CONSTRAINT TYPE |
|---|---|---|---|---|---|
| Helpdesk_Module_Lookup | BASE TABLE | Id | bigint | PK_Helpdesk_Module_Lookup | PRIMARY KEY |
| | | TicketId | nvarchar(50) | | |
| | | ContractId | uniqueidentifier | | |
| | | SpaceId | uniqueidentifier | | NULL |
| | | DateTimeUtcOpen | datetime | | |
| | | DateTimeUtcLastUpdate | datetime | | NULL |
| | | CreatedDate | datetime | | |
| | | ModifiedDate | datetime | | NULL |

TABLE XXXXVI

| OBJECT NAME | OBJECT TYPE | COLUMN NAME | DATA TYPE | CONSTRAINT NAME | CONSTRAINT TYPE |
|---|---|---|---|---|---|
| Helpdesk_Module_To_Conference | BASE TABLE | Id | bigint | | |
| | | ConfirmationNumber | bigint | | |
| | | DateTimeUtc | datetime | | |
| | | CreatedDate | datetime | | |
| | | ModifiedDate | datetime | | NULL |
| | | Rep_RowNo | int | | |

TABLE XXXXVII

| OBJECT NAME | OBJECT TYPE | COLUMN NAME | DATA TYPE | CONSTRAINT NAME | CONSTRAINT TYPE |
|---|---|---|---|---|---|
| Helpdesk_Notes | BASE TABLE | Id | bigint | PK_Helpdesk_Notes | PRIMARY KEY |
| | | Note | nvarchar(MAX) | | NULL |
| | | TimeStamp | datetime | | NULL |

TABLE XXXXVIII

| OBJECT NAME | OBJECT TYPE | COLUMN NAME | DATA TYPE | CONSTRAINT NAME | CONSTRAINT TYPE |
|---|---|---|---|---|---|
| Helpdesk_Priority | BASE TABLE | Id | bigint | PK_Helpdesk_Priority | PRIMARY KEY |
| | | Name | nvarchar(255) | | NULL |
| | | CreatedDate | datetime | | |
| | | ModifiedDate | datetime | | NULL |
| | | Rep_RowNo | int | | |

TABLE XXXIX

| OBJECT NAME | OBJECT TYPE | COLUMN NAME | DATA TYPE | CONSTRAINT NAME | CONSTRAINT TYPE |
|---|---|---|---|---|---|
| Helpdesk_Status | BASE TABLE | Id | bigint | PK_Helpdesk_Status | PRIMARY KEY |
| | | Name | nvarchar(255) | | NULL |

TABLE L

| OBJECT NAME | OBJECT TYPE | COLUMN NAME | DATA TYPE | CONSTRAINT NAME | CONSTRAINT TYPE |
|---|---|---|---|---|---|
| Helpdesk_StopCode | BASE TABLE | Id | bigint | PK_Helpdesk_Ticket_StopCode | PRIMARY KEY |
| | | Name | nvarchar(255) | | NULL |

TABLE LI

| OBJECT NAME | OBJECT TYPE | COLUMN NAME | DATA TYPE | CONSTRAINT NAME | CONSTRAINT TYPE |
|---|---|---|---|---|---|
| Helpdesk_Substatus | BASE TABLE | Id | bigint | PK_Helpdesk_Substatus | PRIMARY KEY |
| | | StatusId | bigint | | |
| | | Name | nvarchar(255) | | NULL |

TABLE LII

| OBJECT NAME | OBJECT TYPE | COLUMN NAME | DATA TYPE | CONSTRAINT NAME | CONSTRAINT TYPE |
|---|---|---|---|---|---|
| Helpdesk_Ticket | BASE TABLE | Id | bigint | PK_Helpdesk_Ticket | PRIMARY KEY |
| | | CustomerTicketId | nvarchar(50) | | NULL |
| | | CategoryId | bigint | | |
| | | StatusId | bigint | | |
| | | PriorityId | bigint | | |
| | | Questions | nvarchar(4000) | | NULL |
| | | Overdue | bit | | NULL |
| | | Subject | nvarchar(255) | | NULL |
| | | DateTimeUtc | datetime | | NULL |
| | | Open | | | |
| | | DateTimeUtcLastUpdate | datetime | | NULL |
| | | ContractId | uniqueidentifier | | NULL |
| | | SpaceId | uniqueidentifier | | NULL |
| | | CreatedDate | datetime | | |
| | | ModifiedDate | datetime | | NULL |
| | | Rep_RowNo | int | | |

TABLE LIII

| OBJECT NAME | OBJECT TYPE | COLUMN NAME | DATA TYPE | CONSTRAINT NAME | CONSTRAINT TYPE |
|---|---|---|---|---|---|
| Helpdesk_Ticket_Categories | BASE TABLE | Id | bigint | PK_Helpdesk_Ticket_Categories | PRIMARY KEY |
| | | Name | nvarchar(255) | | |

TABLE LIV

| OBJECT NAME | OBJECT TYPE | COLUMN NAME | DATA TYPE | CONSTRAINT NAME |
|---|---|---|---|---|
| Helpdesk_ Ticket_Notes | BASE TABLE | TicketId | bigint | |
| | | NotesId | bigint | |

TABLE LV

| OBJECT NAME | OBJECT TYPE | COLUMN NAME | DATA TYPE | CONSTRAINT NAME | CONSTRAINT TYPE |
|---|---|---|---|---|---|
| Helpdesk_Ticket_ Related Tickets | BASE TABLE | RelatedTicketId | bigint | PK_Helpdesk_ Ticket_Related Tickets_1 | PRIMARY KEY |
| | | TicketId | biginit | | |

TABLE LVI

| OBJECT NAME | OBJECT TYPE | COLUMN NAME | DATA TYPE | CONSRAINT NAME |
|---|---|---|---|---|
| Helpdesk_Ticket_ Requestors | BASE TABLE | TicketId | bigint | |
| | | EmailId | nvarchar( 255) | |

TABLE LVII

| OBJECT NAME | OBJECT TYPE | COLUMN NAME | DATA TYPE | CON-STRAINT NAME |
|---|---|---|---|---|
| Helpdesk_Ticket_ Subscribers | BASE TABLE | TicketId | bigint | |
| | | UserId | uniqueidentifier | |

TABLE LVIII

| OBJECT NAME | OBJECT TYPE | COLUMN NAME | DATA TYPE | CONSTRAINT NAME |
|---|---|---|---|---|
| Helpdesk_Ticket_ ThirdParty | BASE TABLE | Id | nvarchar( 50) | |
| | | TicketId | bigint | |
| | | Name | nvarchar( 255) | NULL |
| | | TimeStamp | datetime | |
| | | Description | nvarchar( 255) | NULL |

TABLE LIX

| OBJECT NAME | OBJECT TYPE | COLUMN NAME | DATA TYPE | CON-STRAINT NAME |
|---|---|---|---|---|
| Helpdesk_Ticket_ Workers | BASE TABLE | TicketId | bigint | |
| | | UserId | uniqueidentifier | |

TABLE LX

| OBJECT NAME | OBJECT TYPE | COLUMN NAME | DATA TYPE | CONSTRAINT NAME | CONSTRAINT TYPE |
|---|---|---|---|---|---|
| Helpdesk_Users | BASE TABLE | Id | bigint | PK_Helpdesk_ Users | PRIMARY KEY |
| | | Name | nvarchar( 255) | | NULL |
| | | Email | nvarchar( 255) | | |

TABLE LXI

| OBJECT NAME | OBJECT TYPE | COLUMN NAME | DATA TYPE | CONSTRAINT NAME | CONSTRAINT TYPE |
|---|---|---|---|---|---|
| Language | BASE TABLE | LanguageName | nvarchar( 100) | | NULL |
| | | DisplayName | nvarchar( 100) | | NULL |

TABLE LXII

| OBJECT NAME | OBJECT TYPE | COLUMN NAME | DATA TYPE | CONSTRAINT NAME | CONSTRAINT TYPE |
|---|---|---|---|---|---|
| Management_ Interfaces | BASE TABLE | ComponentId | uniqueidentifier | FK_Management_ Interfaces_ VnocSystem_ Components | FOREIGN KEY |
| | | Application | nvarchar( 50) | | |
| | | Password | nvarchar( 255) | | NULL |
| | | Port | int | | NULL |
| | | Username | nvarchar( 255) | | NULL |

TABLE LXIII

| OBJECT NAME | OBJECT TYPE | COLUMN NAME | DATA TYPE | CONSTRAINT NAME | CONSTRAINT TYPE |
|---|---|---|---|---|---|
| ModuleOutlets | BASE TABLE | ModuleId | int | PK_Sy_FW_ ModuleOutlets | PRIMARY KEY |
| | | ModuleName | varchar( 255) | | NULL |
| | | ModuleType | varchar( 255) | | NULL |
| | | CreatedOn | datetime | | NULL |

| Referenced Column Name | Referred By Table Name | Referred By Table Column Name |
|---|---|---|
| ModuleId | ModuleOutlets_ Contract | ModuleId |

TABLE LXIX

| OBJECT NAME | OBJECT TYPE | COLUMN NAME | DATA TYPE | CONSTRAINT NAME | CONSTRAINT TYPE |
|---|---|---|---|---|---|
| ModuleOutlets_ Contract | BASE TABLE | ModuleId | int | FK_ModuleOutlets_ Contract_ ModuleOutlets | FOREIGN KEY |
| | | ContractId | uniqueidentifier | FK_ModuleOutlets_ Contract_ Contracts | FOREIGN KEY |

TABLE LXX

| OBJECT NAME | OBJECT TYPE | COLUMN NAME | DATA TYPE | CON- STRAINT NAME |
|---|---|---|---|---|
| NonParentCategories | VIEW | ParentCategory | varchar | |
| | | Category | varchar | |
| | | ServiceType | varchar | |
| | | Charge | varchar | |

TABLE LXXI

| OBJECT NAME | OBJECT TYPE | COLUMN NAME | DATA TYPE | CONSTRAINT NAME | CONSTRAINT TYPE |
|---|---|---|---|---|---|
| Notification_ Type | BASE TABLE | Id | int | PK_Notification_ Type | PRIMARY KEY |
| | | Name | nvarchar( 50) | | |

| Referenced Column Name | Referred By Table Name | Referred By Table Column Name |
|---|---|---|
| Id | Conference_Notifications | NotificationTypeId |

TABLE LXXII

| OBJECT NAME | OBJECT TYPE | COLUMN NAME | DATA TYPE | CONSTRAINT NAME | CONSTRAINT TYPE |
|---|---|---|---|---|---|
| Office | BASE TABLE | Id | uniqueidentifier | PK_Office | PRIMARY KEY |
| | | OrganizationId | uniqueidentifier | FK_Office_Organizations | FOREIGN KEY |
| | | Name | nvarchar( 255) | | |
| | | TypeId | int | FK_Office_Office_ Types | FOREIGN KEY |

TABLE LXXII-continued

| | | | | | |
|---|---|---|---|---|---|
| | | StreetAddress 1 | nvarchar(255) | | NULL |
| | | StreetAddress 2 | nvarchar(255) | | NULL |
| | | PostalCode | nvarchar(255) | | NULL |
| | | State_Providence | nvarchar(255) | | NULL |
| | | City | nvarchar(255) | | NULL |
| | | CountryId | int | FK_Office_Countries | FOREIGN KEY, NULL |
| | | NetworkConnections | nvarchar(255) | | NULL |
| | | TimeZoneId | int | | NULL |
| | | Latitude | float | | NULL |
| | | Longitude | float | | NULL |
| | | CreatedDate | datetime | | |
| | | ModifiedDate | datetime | | |
| | | Rep_RowNo | bigint | | |

| Referenced Column Name | Referred By Table Name | Referred By Table Column Name |
|---|---|---|
| Id | Space | OfficeId |

TABLE LXXIII

| OBJECT NAME | OBJECT TYPE | COLUMN NAME | DATA TYPE | CONSTRAINT NAME | CONSTRAINT TYPE |
|---|---|---|---|---|---|
| Office_Types | BASE TABLE | Id | int | PK_Office_Types | PRIMARY KEY |
| | | Name | nvarchar(50) | | NULL |
| | | CreatedDate | datetime | | |
| | | ModifiedDate | datetime | | NULL |
| | | Rep_RowNo | bigint | | |

| Referenced Column Name | Referred By Table Name | Referred By Table Column Name |
|---|---|---|
| Id | Office | TypeId |

TABLE LXXIV

| OBJECT NAME | OBJECT TYPE | COLUMN NAME | DATA TYPE | CONSTRAINT NAME | CONSTRAINT TYPE |
|---|---|---|---|---|---|
| Olsen_TimeZones | BASE TABLE | olsenId | int | PK_Olsen_TimeZones | PRIMARY KEY |
| | | country_code | nvarchar(50) | | NULL |
| | | coordinates | nvarchar(50) | | NULL |
| | | TZ | nvarchar(50) | | |

TABLE LXXV

| OBJECT NAME | OBJECT TYPE | COLUMN NAME | DATA TYPE | CONSTRAINT NAME | CONSTRAINT TYPE |
|---|---|---|---|---|---|
| Organizations | BASE TABLE | Id | uniqueidentifier | PK_Organizations | PRIMARY KEY |
| | | Name | nvarchar(255) | | |
| | | Acronym | nvarchar(50) | | NULL |
| | | Active | bit | | |
| | | CreatedDate | datetime | | |

TABLE LXXV-continued

| | | | | | |
|---|---|---|---|---|---|
| | | ModifiedDate | datetime | | NULL |
| | | Rep_RowNo | bigint | | |

| Referenced Column Name | Referred By Table Name | Referred By Table Column Name |
|---|---|---|
| Id | Office | OrganizationId |

TABLE LXXVI

| OBJECT NAME | OBJECT TYPE | COLUMN NAME | DATA TYPE | CONSTRAINT NAME |
|---|---|---|---|---|
| ParentCategories | VIEW | ParentCategory | varchar | |
| | | Category | varchar | |
| | | ServiceType | varchar | |
| | | Charge | varchar | |

TABLE LXXVII

| OBJECT NAME | OBJECT TYPE | COLUMN NAME | DATA TYPE | CONSTRAINT NAME | CONSTRAINT TYPE |
|---|---|---|---|---|---|
| Product | BASE TABLE | Id | uniqueidentifier | PK_Product | PRIMARY KEY |
| | | Name | varchar(50) | | NULL |
| | | Description | varchar(255) | | NULL |
| | | ManufactureId | uniqueidentifier | FK_Product_Product_ Manufacturers | FOREIGN KEY, NULL |
| | | SnmpRules | nvarchar(255) | | NULL |
| | | CreatedDate | datetime | | |
| | | ModifiedDate | datetime | | NULL |
| | | Rep_RowNo | bigint | | |

| Referenced Column Name | Referred By Table Name | Referred By Table Column Name |
|---|---|---|
| Id | VnocSystem_Components | ProductId |

TABLE LXXVIII

| OBJECT NAME | OBJECT TYPE | COLUMN NAME | DATA TYPE | CONSTRAINT NAME | CONSTRAINT TYPE |
|---|---|---|---|---|---|
| Product_Manufacturers | BASE TABLE | ManufacturerId | uniqueidentifier | PK_Product_Manufacturers | PRIMARY KEY |
| | BASE TABLE | Manufacturer Name | varchar(50) | | |

| Referenced Column Name | Referred By Table Name | Referred By Table Column Name |
|---|---|---|
| ManufacturerId | Product | ManufactureId |

TABLE LXXIX

| OBJECT NAME | OBJECT TYPE | COLUMN NAME | DATA TYPE | CONSTRAINT NAME | CONSTRAINT TYPE |
|---|---|---|---|---|---|
| Rates | BASE TABLE | ContractID | uniqueidentifier | FK_Rates_Contracts | FOREIGN KEY |
| | | Rate | varchar(255) | | |
| | | Category | uniqueidentifier | FK_Rates_ChargeCategories | FOREIGN KEY |

TABLE LXXX

| OBJECT NAME | OBJECT TYPE | COLUMN NAME | DATA TYPE | CONSTRAINT NAME | CONSTRAINT TYPE |
|---|---|---|---|---|---|
| Recurrence | BASE TABLE | Id | bigint | PK_Recurrence | PRIMARY KEY |
| | | Every | int | | |
| | | EveryValue | binary(32) | | NULL |

TABLE LXXX-continued

| | | | | |
|---|---|---|---|---|
| | RecurrenceOnTheId | int | FK_Recurrence_Recurrence_On_The | FOREIGN KEY, NULL |
| | RecurrenceDaysId | int | FK_Recurrence_Recurrence_Days | FOREIGN KEY, NULL |
| | StartDateUtc | datetime | | |
| | EndAfterDateUtc | datetime | | NULL |
| | EndAfterInstances | int | | NULL |
| | TypeId | int | FK_Recurrence_Recurrence_Type | FOREIGN KEY |
| | IsDeleted | bit | | |

| Referenced Column Name | Referred By Table Name | Referred By Table Column Name |
|---|---|---|
| Id | Conference_Recurrence | RecurrenceId |

TABLE LXXXI

| OBJECT NAME | OBJECT TYPE | COLUMN NAME | DATA TYPE | CONSTRAINT NAME | CONSTRAINT TYPE |
|---|---|---|---|---|---|
| Recurrence_Days | BASE TABLE | Id | int | PK_Recurrence_Days | PRIMARY KEY |
| | | Day | nvarchar(25) | | NULL |

| Referenced Column Name | Referred By Table Name | Referred By Table Column Name |
|---|---|---|
| Id | Recurrence | RecurrenceDaysId |

TABLE LXXXII

| OBJECT NAME | OBJECT TYPE | COLUMN NAME | DATA TYPE | CONSTRAINT NAME | CONSTRAINT TYPE |
|---|---|---|---|---|---|
| Recurrence_On_The | BASE TABLE | id | int | PK_Recurrence_On_The | PRIMARY KEY |
| | | name | varchar(50) | | |

| Referenced Column Name | Referred By Table Name | Referred By Table Column Name |
|---|---|---|
| id | Recurrence | RecurrenceOnTheId |

TABLE LXXXIII

| OBJECT NAME | OBJECT TYPE | COLUMN NAME | DATA TYPE | CONSTRAINT NAME | CONSTRAINT TYPE |
|---|---|---|---|---|---|
| Recurrence_Type | BASE TABLE | Id | int | PK_Recurrence_Type | PRIMARY KEY |
| | | Type | varchar(250) | | |

| Referenced Column Name | Referred By Table Name | Referred By Table Column Name |
|---|---|---|
| Id | Recurrence | TypeId |

TABLE LXXXIV

| OBJECT NAME | OBJECT TYPE | COLUMN NAME | DATA TYPE | CONSTRAINT NAME | CONSTRAINT TYPE |
|---|---|---|---|---|---|
| Regions | BASE TABLE | Id | int | PK_Regions | PRIMARY KEY |
| | | Name | nvarchar(255) | | |

TABLE LXXXV

| OBJECT NAME | OBJECT TYPE | COLUMN NAME | DATA TYPE | CONSTRAINT NAME | CONSTRAINT TYPE |
|---|---|---|---|---|---|
| ReportData | BASE TABLE | Id | uniqueidentifier | PK_ReportData | PRIMARY KEY |
| | | AccountId | uniqueidentifier | | NULL |
| | | ReportName | varchar(50) | | |
| | | Format | varchar(50) | | |
| | | StartMonth | int | | NULL |
| | | StartYear | int | | NULL |
| | | EndMonth | int | | NULL |
| | | EndYear | int | | NULL |
| | | ReportData | image | | NULL |

TABLE LXXXVI

| OBJECT NAME | OBJECT TYPE | COLUMN NAME | DATA TYPE | CONSTRAINT NAME | CONSTRAINT TYPE |
|---|---|---|---|---|---|
| ReportFormat | BASE TABLE | Id | int | PK_ReportFormat | PRIMARY KEY |
| | | Format | varchar(50) | | NULL |

TABLE LXXXVII

| OBJECT NAME | OBJECT TYPE | COLUMN NAME | DATA TYPE | CONSTRAINT NAME | CONSTRAINT TYPE |
|---|---|---|---|---|---|
| RoleClaims | BASE TABLE | Id | bigint | PK_RoleClaims | PRIMARY KEY |
| | | RoleId | int | FK_RoleClaims_Roles | FOREIGN KEY |
| | | WidgetId | int | FK_RoleClaims_Widget | FOREIGN KEY |
| | | Read | bit | | |
| | | Write | bit | | |
| | | Delete | bit | | |

TABLE LXXXVIII

| OBJECT NAME | OBJECT TYPE | COLUMN NAME | DATA TYPE | CONSTRAINT NAME | CONSTRAINT TYPE |
|---|---|---|---|---|---|
| Roles | BASE TABLE | Id | int | PK_Roles | PRIMARY KEY |
| | | Name | nvarchar(255) | | |
| | | AccountID | uniqueidentifier | | NULL |

| Referenced Column Name | Referred By Table Name | Referred By Table Column Name |
|---|---|---|
| Id | RoleClaims | RoleId |
| Id | Users | RoleId |

TABLE LXXXIX

| OBJECT NAME | OBJECT TYPE | COLUMN NAME | DATA TYPE | CONSTRAINT NAME | CONSTRAINT TYPE |
|---|---|---|---|---|---|
| RunBookProcesses | BASE TABLE | RunBookProcessId | int | PK_Sy_FW_RunBookProcesses | PRIMARY KEY |
| | | RunBookProcessName | varchar(255) | | NULL |

| Referenced Column Name | Referred By Table Name | Referred By Table Column Name |
|---|---|---|
| RunBookProcessId | ContractProcesses | RunBookProcessId |

TABLE XC

| OBJECT NAME | OBJECT TYPE | COLUMN NAME | DATA TYPE | CONSTRAINT NAME | CONSTRAINT TYPE |
|---|---|---|---|---|---|
| Schedule_Status | BASE TABLE | Id | int | PK_Schedule_Status | PRIMARY KEY |
| | | Status | nvarchar(50) | | |

| Referenced Column Name | Referred By Table Name | Referred By Table Column Name |
|---|---|---|
| Id | Conference_Status | Status |

TABLE XCI

| OBJECT NAME | OBJECT TYPE | COLUMN NAME | DATA TYPE | CONSTRAINT NAME | CONSTRAINT TYPE |
|---|---|---|---|---|---|
| ServiceTypes | BASE TABLE | ID | int | PK_ServiceTypes | PRIMARY KEY |
| | | Name | varchar(255) | | |
| | | Abbreviation | varchar(50) | | |

| Referenced Column Name | Referred By Table Name | Referred By Table Column Name |
|---|---|---|
| ID | ChargeCategories | ServiceTypeID |

TABLE XCII

| OBJECT NAME | OBJECT TYPE | COLUMN NAME | DATA TYPE | CONSTRAINT NAME | CONSTRAINT TYPE |
|---|---|---|---|---|---|
| Space | BASE TABLE | Id | uniqueidentifier | PK_Space | PRIMARY KEY |
| | | OfficeId | uniqueidentifier | FK_Space_Office | FOREIGN KEY |
| | | Name | nvarchar(255) | | NULL |
| | | TypeId | int | FK_Space_Space_Types | FOREIGN KEY, NULL |
| | | Capacity | int | | NULL |
| | | NetworkConnectivity | nvarchar(255) | | NULL |
| | | Photos | image | | NULL |
| | | IsPublic | bit | | NULL |
| | | IsManaged | bit | | NULL |
| | | RelatedURl | nvarchar(1000) | | NULL |
| | | CreatedDate | datetime | | |
| | | ModifiedDate | datetime | | NULL |
| | | Rep_RowNo | bigint | | |
| | | Notes | nvarchar(1000) | | NULL |
| | | RoomNumber | nvarchar(255) | | NULL |

| Referenced Column Name | Referred By Table Name | Referred By Table Column Name |
|---|---|---|
| Id | Accounts_Spaces | SpaceId |
| Id | Conference_Spaces | SpaceId |

TABLE XCIII

| OBJECT NAME | OBJECT TYPE | COLUMN NAME | DATA TYPE | CONSTRAINT NAME | CONSTRAINT TYPE |
|---|---|---|---|---|---|
| Space_Types | BASE TABLE | Id | int | PK_Space_Types | PRIMARY KEY |
| | | Name | nvarchar(50) | | NULL |
| | | CreatedDate | datetime | | |
| | | ModifiedDate | datetime | | NULL |
| | | Rep_RowNo | bigint | | |

| Referenced Column Name | Referred By Table Name | Referred By Table Column Name |
|---|---|---|
| Id | Space | TypeId |

TABLE XCIV

| OBJECT NAME | OBJECT TYPE | COLUMN NAME | DATA TYPE | CONSTRAINT NAME | CONSTRAINT TYPE |
|---|---|---|---|---|---|
| Status_Names | BASE TABLE | id | int | PK_Status_Names | PRIMARY KEY |
| | | name | nvarchar(50) | | |

| Referenced Column Name | Referred By Table Name | Referred By Table Column Name |
|---|---|---|
| id | Conference | StatusId |

TABLE XCV

| OBJECT NAME | OBJECT TYPE | COLUMN NAME | DATA TYPE | CONSTRAINT NAME | CONSTRAINT TYPE |
|---|---|---|---|---|---|
| Symphony_Log | BASE TABLE | Id | bigint | PK_Symphony_Log | PRIMARY KEY |
| | | UtcTimeStamp | datetime | | |
| | | IpAddress | nvarchar(16) | | NULL |
| | | RegisteredUserId | uniqueidentifier | | NULL |
| | | EmailAddress | nvarchar(100) | | NULL |
| | | Event | nvarchar(255) | | |
| | | SymphonyProcess | nvarchar(255) | | |
| | | Parameters | nvarchar(MAX) | | NULL |

TABLE XCVI

| OBJECT NAME | OBJECT TYPE | COLUMN NAME | DATA TYPE | CONSTRAINT NAME | CONSTRAINT TYPE |
|---|---|---|---|---|---|
| symphony_log1 | BASE TABLE | Id | bigint | | |
| | | UtcTimeStamp | datetime | | |
| | | IpAddress | nvarchar(16) | | NULL |
| | | RegisteredUserId | uniqueidentifier | | NULL |
| | | EmailAddress | nvarchar(100) | | NULL |
| | | Event | nvarchar(255) | | |
| | | SymphonyProcess | nvarchar(255) | | |
| | | Parameters | nvarchar(MAX) | | NULL |

TABLE XCVII

| OBJECT NAME | OBJECT TYPE | COLUMN NAME | DATA TYPE | CONSTRAINT NAME | CONSTRAINT TYPE |
|---|---|---|---|---|---|
| sysdiagrams | BASE TABLE | name | nvarchar | PK_sysdiagrams_6ABAD62E | PRIMARY KEY |
| | | principal_id | int | UK_principal_name | UNIQUE |
| | | diagram_id | int | | |
| | | version | int | | |
| | | definition | varbinary | | |

TABLE XCVIII

| OBJECT NAME | OBJECT TYPE | COLUMN NAME | DATA TYPE | CONSTRAINT NAME |
|---|---|---|---|---|
| TimezoneMap | BASE TABLE | Tz_Timezone | nvarchar (255) | |
| | | olsenId | int | NULL |

TABLE XCIX

| OBJECT NAME | OBJECT TYPE | COLUMN NAME | DATA TYPE | CONSTRAINT NAME |
|---|---|---|---|---|
| User_Import_Bulk 1 | BASE TABLE | Email | varchar (255) | |

TABLE XCIX-continued

| OBJECT NAME | OBJECT TYPE | COLUMN NAME | DATA TYPE | CONSTRAINT NAME |
|---|---|---|---|---|
| | | FirstName | varchar (255) | NULL |
| | | LastName | varchar (255) | NULL |
| | | Username | varchar (255) | |
| | | password | varchar (500) | NULL |
| | | TimeZone | varchar (255) | NULL |
| | | Phone | varchar (255) | NULL |
| | | Mobile | varchar (255) | NULL |

TABLE XCIX-continued

| OBJECT NAME | OBJECT TYPE | COLUMN NAME | DATA TYPE | CONSTRAINT NAME |
|---|---|---|---|---|
| | | Fax | varchar (255) | NULL |
| | | Address1 | varchar (255) | NULL |
| | | Address2 | varchar (255) | NULL |
| | | City | varchar (255) | NULL |
| | | state | varchar (256) | NULL |
| | | Zip | varchar (255) | NULL |
| | | Country | varchar (255) | NULL |

TABLE C

| OBJECT NAME | OBJECT TYPE | COLUMN NAME | DATA TYPE | CONSTRAINT NAME |
|---|---|---|---|---|
| User_Import_Bulk 2 | BASE TABLE | Email | varchar (255) | |
| | | FirstName | varchar (255) | NULL |
| | | LastName | varchar (255) | NULL |
| | | Username | varchar (255) | |
| | | password | varchar (500) | NULL |
| | | TimeZone | varchar (255) | NULL |
| | | Phone | varchar (255) | NULL |
| | | Mobile | varchar (255) | NULL |
| | | Fax | varchar (255) | NULL |
| | | Address1 | varchar (255) | NULL |
| | | Address2 | varchar (255) | NULL |
| | | City | varchar (255) | NULL |
| | | state | varchar (256) | NULL |
| | | Zip | varchar (255) | NULL |
| | | Country | varchar (255) | NULL |

TABLE CI

| OBJECT NAME | OBJECT TYPE | COLUMN NAME | DATA TYPE | CONSTRAINT NAME |
|---|---|---|---|---|
| User_Import_Bulk 3 | BASE TABLE | Email | nvarchar (255) | NULL |
| | | FirstName | nvarchar (255) | NULL |
| | | LastName | nvarchar (255) | NULL |
| | | UserName | nvarchar (255) | NULL |
| | | PassWord | nvarchar (255) | NULL |
| | | TimeZone | nvarchar (255) | NULL |
| | | Phone | nvarchar (255) | NULL |
| | | Mobile | nvarchar (255) | NULL |
| | | Fax | nvarchar (255) | NULL |
| | | Address1 | nvarchar (255) | NULL |
| | | Address2 | nvarchar (255) | NULL |
| | | City | nvarchar (255) | NULL |
| | | State | nvarchar (255) | NULL |
| | | Zip | nvarchar (255) | NULL |
| | | Country | nvarchar (255) | NULL |

TABLE CII

| OBJECT NAME | OBJECT TYPE | COLUMN NAME | DATA TYPE | CONSTRAINT NAME | CONSTRAINT TYPE |
|---|---|---|---|---|---|
| Users | BASE TABLE | Id | uniqueidentifier | PK_Users | PRIMARY KEY |
| | | FirstName | nvarchar (255) | | NULL |
| | | LastName | nvarchar (255) | | NULL |
| | | Email | nvarchar (255) | | |
| | | Username | nvarchar (255) | | |
| | | Password | nvarchar (255) | | |
| | | RoleId | int | FK_Users_Roles | FOREIGN KEY, NULL |
| | | PrimaryAccountId | uniqueidentifier | | |
| | | Active | bit | | NULL |
| | | Notes | nvarchar (4000) | | NULL |
| | | TimeZoneId | int | | NULL |
| | | Phone | nvarchar (255) | | NULL |
| | | Mobile | nvarchar (255) | | NULL |

TABLE CII-continued

| | | | | |
|---|---|---|---|---|
| | Fax | nvarchar (255) | | NULL |
| | Address1 | nvarchar (255) | | NULL |
| | Address2 | nvarchar (255) | | NULL |
| | City | nvarchar (255) | | NULL |
| | State_Providence | nvarchar (255) | | NULL |
| | Postal_Code | nvarchar (50) | | NULL |
| | CountryId | int | FK_Users_Countries | FOREIGN KEY, NULL |
| | IsPasswordReset | bit | | NULL |
| | PreferredLanguage | nvarchar (50) | | NULL |
| | CreatedDate | datetime | | |
| | ModifiedDate | datetime | | NULL |
| | Rep_RowNo | bigint | | |

| Referenced Column Name | Referred By Table Name | Referred By Table Column Name |
|---|---|---|
| Id | Accounts_Users | UserId |

TABLE CIII

| OBJECT NAME | OBJECT TYPE | COLUMN NAME | DATA TYPE | CONSTRAINT NAME |
|---|---|---|---|---|
| View_Active Contracts | VIEW | AccountId | uniqueidentifier | |
| | | ContractId | uniqueidentifier | |
| | | StartDate | datetime | |
| | | EndDate | datetime | |

TABLE CIV

| OBJECT NAME | OBJECT TYPE | COLUMN NAME | DATA TYPE | CONSTRAINT NAME |
|---|---|---|---|---|
| View_Incorrect_VcWizard_DataMap | VIEW | Wizname | nvarchar | |
| | | OfficeName | nvarchar | |
| | | SpaceName | nvarchar | |

TABLE CV

| OBJECT NAME | OBJECT TYPE | COLUMN NAME | DATA TYPE | CONSTRAINT NAME |
|---|---|---|---|---|
| View_ManagedVnocComponents | VIEW | Id | uniqueidentifier | |
| | | ProductId | uniqueidentifier | |
| | | Category | nvarchar | |
| | | BandwidthKbps | int | |
| | | FirmwareVersion | nvarchar | |
| | | GatewayAddress | nvarchar | |
| | | IpAddress | nvarchar | |
| | | MacAddress | nvarchar | |
| | | Management Uri | nvarchar | |
| | | SerialNumber | nvarchar | |
| | | SnmpCommunity | nvarchar | |
| | | SoftwareVersion | nvarchar | |
| | | IsPingable | int | |
| | | LastUpdate | datetime | |
| | | PingLatency | bigint | |
| | | TicketId | bigint | |
| | | SystemId | uniqueidentifier | |
| | | SpaceId | uniqueidentifier | |
| | | OrganizationId | uniqueidentifier | |
| | | AccountId | uniqueidentifier | |
| | | ContractId | uniqueidentifier | |

TABLE CVI

| OBJECT NAME | OBJECT TYPE | COLUMN NAME | DATA TYPE | CONSTRAINT NAME |
|---|---|---|---|---|
| View_Space Status | VIEW | ConferenceId | bigint | |
| | | ComponentId | uniqueidentifier | |
| | | SpaceId | uniqueidentifier | |
| | | SpaceName | nvarchar | |
| | | Status | nvarchar | |
| | | ConnectedBandwidth | bigint | |
| | | AudioTxPacketsLost | bigint | |
| | | AudioRxPacketsLost | bigint | |
| | | VideoTxPacketLoss | bigint | |
| | | VideoRxPacketLoss | bigint | |
| | | CumulativeTxPacketLoss | decimal | |
| | | CumulativeRxPacketLoss | decimal | |
| | | AudioRxJitterAvg | decimal | |
| | | AudioTxJitterAvg | decimal | |
| | | VideoRxJitterAvg | decimal | |
| | | VideoTxJitterAvg | decimal | |

TABLE CVII

| OBJECT NAME | OBJECT TYPE | COLUMN NAME | DATA TYPE | CON-STRAINT NAME |
|---|---|---|---|---|
| View_Enterprise System 44_DataMap | VIEW | ES 44 name | nvarchar | |
| | | OfficeName | nvarchar | |
| | | SpaceName | nvarchar | |
| | | SpaceId | uniqueidentifier | |

TABLE CVIII

| OBJECT NAME | OBJECT TYPE | COLUMN NAME | DATA TYPE | CONSTRAINT NAME | CONSTRAINT TYPE |
|---|---|---|---|---|---|
| Vnoc_Product | BASE TABLE | Id | uniqueidentifier | | |
| | | Name | varchar(50) | | NULL |
| | | Description | varchar(255) | | NULL |
| | | ManufactureId | uniqueidentifier | | NULL |
| | | SnmpRules | nvarchar(255) | | NULL |

TABLE CIX

| OBJECT NAME | OBJECT TYPE | COLUMN NAME | DATA TYPE | CONSTRAINT NAME | CONSTRAINT TYPE |
|---|---|---|---|---|---|
| VnocSystem__ Components | BASE TABLE | Id | uniqueidentifier | PK_VnocSystem__ Components | PRIMARY KEY |
| | | ProductId | uniqueidentifier | FK_VnocSystem__ Components__ Product | FOREIGN KEY |
| | | Category | nvarchar(50) | | |
| | | BandwidthKbps | int | | NULL |
| | | FirmwareVersion | nvarchar(50) | | NULL |
| | | GatewayAddress | nvarchar(255) | | NULL |
| | | IpAddress | nvarchar(255) | | NULL |
| | | MacAddress | nvarchar(255) | | NULL |
| | | ManagementUri | nvarchar(255) | | NULL |
| | | SerialNumber | nvarchar(255) | | NULL |
| | | SnmpCommunity | nvarchar(255) | | NULL |
| | | SoftwareVersion | nvarchar(255) | | NULL |
| | | IsPingable | int | | NULL |
| | | LastUpdate | datetime | | NULL |
| | | PingLatency | bigint | | NULL |
| | | TicketId | bigint | | NULL |
| | | Position | int | | NULL |
| | | Status | int | FK_VnocSystem__ Components__ VnocSystem__ Status | FOREIGN KEY |

TABLE CIX-continued

| Referenced Column Name | Referred By Table Name | Referred By Table Column Name |
|---|---|---|
| Id | Conference_Ports | ComponentId |
| | Environment | ComponentId |
| | Display | ComponentId |
| | Management_Interfaces | ComponentId |
| | VnocSystem_Statistics | ComponentId |

TABLE CX

| OBJECT NAME | OBJECT TYPE | COLUMN NAME | DATA TYPE | CONSTRAINT NAME | CONSTRAINT TYPE |
|---|---|---|---|---|---|
| VnocSystem__ ContractRates | BASE TABLE | VnocSystemId | uniqueidentifier | FK_Contracts__ VnocSystem__ VnocSystems | FOREIGN KEY |
| | | ContractRateId | bigint | FK_Contracts__ VnocSystem__ Contract_Rates | FOREIGN KEY |
| | | UtcCoverageStart | datetime | | |
| | | UtcCoverageEnd | datetime | | |

TABLE CXI

| OBJECT NAME | OBJECT TYPE | COLUMN NAME | DATA TYPE | CONSTRAINT NAME | CONSTRAINT TYPE |
|---|---|---|---|---|---|
| VnocSystem__ | BASE TABLE | Id | bigint | PK_Conference__ Systems | PRIMARY KEY |
| | | ConferenceId | bigint | FK_VnocSystem__ Statistics__ Conference | FOREIGN KEY |
| | | ComponentId | uniqueidentifier | FK_VnocSystem__ Statistics__ SystemId | FOREIGN KEY |
| | | State | int | FK_VnocSystem__ Statistics__ State | FOREIGN KEY |
| | | ConnectedBandwidth | bigint | | |
| | | IsHost | bit | | |
| | | IsActive | bit | | |
| | | ErrorCode | bigint | FK_VnocSystem__ Statistics__ ErrorCode | FOREIGN KEY, NULL |
| | | ErrorLongDescription | nvarchar(MAX) | | NULL |
| | | LastUpdate | datetime | | NULL |
| | | UpdateCount | bigint | | NULL |
| | | AudioTxPacketsLost | bigint | | NULL |
| | | AudioTxHighPPL | decimal(5, 3) | | NULL |
| | | AudioTxHighPPLTimeStamp | datetime | | NULL |
| | | AudioTxJitterHigh | decimal(5, 3) | | NULL |
| | | AudioTxJitterHighTimeStamp | datetime | | NULL |
| | | AudioTxJitterLow | decimal(5, 3) | | NULL |
| | | AudioTxJitterLowTimeStamp | datetime | | NULL |
| | | AudioTxJitterAvg | decimal(5, 3) | | NULL |
| | | AudioRxPacketsLost | bigint | | NULL |
| | | AudioRxHighPPL | decimal(5, 3) | | NULL |
| | | AudioRxHighPPLTimeStamp | datetime | | NULL |
| | | AudioRxJitterHigh | decimal(5, 3) | | NULL |
| | | AudioRxJitterHighTimeStamp | datetime | | NULL |
| | | AudioRxJitterLow | decimal(5, 3) | | NULL |
| | | AudioRxJitterLowTimeStamp | datetime | | NULL |
| | | AudioRxJitterAvg | decimal(5, 3) | | NULL |
| | | VideoTxPacketLoss | bigint | | NULL |
| | | VideoTxHighPPL | decimal(5, 3) | | NULL |
| | | VideoTxHighPPLTimeStamp | datetime | | NULL |
| | | VideoTxJitterHigh | decimal(5, 3) | | NULL |
| | | VideoTxJitterHighTimeStamp | datetime | | NULL |
| | | VideoTxJitterLow | decimal(5, 3) | | NULL |
| | | VideoTxJitterLowTimeStamp | datetime | | NULL |
| | | VideoTxJitterAvg | decimal(5, 3) | | NULL |
| | | VideoRxPacketLoss | bigint | | NULL |
| | | VideoRxHighPPL | decimal(5, 3) | | NULL |
| | | VideoRxHighPPLTimeStamp | datetime | | NULL |
| | | VideoRxJitterHigh | decimal(5, 3) | | NULL |

TABLE CXI-continued

| OBJECT NAME | OBJECT TYPE | COLUMN NAME | DATA TYPE | CONSTRAINT NAME | CONSTRAINT TYPE |
|---|---|---|---|---|---|
| | | VideoRxJitterHighTimeStamp | datetime | | NULL |
| | | VideoRxJitterLow | decimal(5, 3) | | NULL |
| | | VideoRxJitterLowTimeStamp | datetime | | NULL |
| | | AudioTxBitRateAllocated | bigint | | NULL |
| | | AudioTxBitRateHigh | bigint | | NULL |
| | | AudioTxBitRateHighTimeStamp | datetime | | NULL |
| | | AudioTxBitRateLow | bigint | | NULL |
| | | AudioTxBitRateLowTimeStamp | datetime | | NULL |
| | | AudioTxBitRateCurrent | bigint | | NULL |
| | | AudioRxBitRateAllocated | bigint | | NULL |
| | | AudioRxBitRateHigh | bigint | | NULL |
| | | AudioRxBitRateHighTimeStamp | datetime | | NULL |
| | | AudioRxBitRateLow | bigint | | NULL |
| | | AudioRxBitRateLowTimeStamp | datetime | | NULL |
| | | AudioRxBitRateCurrent | bigint | | NULL |
| | | VideoTxBitRateAllocated | bigint | | NULL |
| | | VideoTxBitRateHigh | bigint | | NULL |
| | | VideoTxBitRateHighTimeStamp | datetime | | NULL |
| | | VideoTxBitRateLow | bigint | | NULL |
| | | VideoTxBitRateLowTimeStamp | datetime | | NULL |
| | | VideoTxBitRateCurrent | bigint | | NULL |
| | | VideoRxBitRateAllocated | bigint | | NULL |
| | | VideoRxBitRateHigh | bigint | | NULL |
| | | VideoRxBitRateHighTimeStamp | datetime | | NULL |
| | | VideoRxBitRateLow | bigint | | NULL |
| | | VideoRxBitRateLowTimeStamp | datetime | | NULL |
| | | VideoRxBitRateCurrent | bigint | | NULL |
| | | VideoRxJitterAvg | decimal(5, 3) | | NULL |
| | | FrameRateHigh | int | | NULL |
| | | FrameRateHighTimeStamp | datetime | | NULL |
| | | FrameRateLow | int | | NULL |
| | | FrameRateLowTimeStamp | datetime | | NULL |
| | | FrameRateAvg | decimal(5, 3) | | NULL |
| | | VideoProtocol | nvarchar(50) | | NULL |
| | | AudioProtocol | nvarchar(50) | | NULL |
| | | AudioTxMute | bit | | NULL |
| | | TicketOpen | bit | | NULL |
| | | TicketId | nvarchar(50) | | NULL |

TABLE CXII

| OBJECT NAME | OBJECT TYPE | COLUMN NAME | DATA TYPE | CONSTRAINT NAME | CONSTRAINT TYPE |
|---|---|---|---|---|---|
| VnocSystem_ Status | BASE TABLE | id | int | PK_VnocSystem_ Status | PRIMARY KEY |
| | | name | nvarchar(255) | | |

| Referenced Column Name | Referred By Table Name | Referred By Table Column Name |
|---|---|---|
| id | VnocSystems | StatusId |
| id | VnocSystem_Statistics | State |
| id | VnocSystem_Components | Status |

TABLE CXIII

| OBJECT NAME | OBJECT TYPE | COLUMN NAME | DATA TYPE | CONSTRAINT NAME | CONSTRAINT TYPE |
|---|---|---|---|---|---|
| VnocSystems | BASE TABLE | Id | uniqueidentifier | PK_VnocSystems | PRIMARY KEY |
| | | Name | nvarchar(255) | | |
| | | Contact | nvarchar(255) | NULL | |
| | | Description | nvarchar(255) | NULL | |
| | | SpaceId | uniqueidentifier | | |
| | | ProductId | uniqueidentifier | | |
| | | StatusId | int | FK_VnocSystems_ VnocSystem_ Status | FOREIGN KEY |
| | | CreatedDate | datetime | | |
| | | ModifiedDate | datetime | NULL | |
| | | Rep_RowNo | bigint | | |

TABLE CXIII-continued

| Referenced Column Name | Referred By Table Name | Referred By Table Column Name |
|---|---|---|
| Id | Environment | VnocSystemId |
| Id | VnocSystem_ContractRates | VnocSystemId |

TABLE CXIV

| OBJECT NAME | OBJECT TYPE | COLUMN NAME | DATA TYPE | CONSTRAINT NAME | CONSTRAINT TYPE |
|---|---|---|---|---|---|
| Widget | BASE TABLE | Id | int | PK_Widget | PRIMARY KEY |
| | | Name | nvarchar(255) | | |
| | | Description | nvarchar(255) | NULL | |
| | | RequiresWriteAccess | bit | | |

| Referenced Column Name | Referred By Table Name | Referred By Table Column Name |
|---|---|---|
| Id | RoleClaims | WidgetId |

TABLE CXV

| OBJECT NAME | OBJECT TYPE | COLUMN NAME | DATA TYPE | CON-STRAINT NAME |
|---|---|---|---|---|
| Wiz_To_Symphony | BASE TABLE | Wizname | nvarchar(255) | NULL |
| | | OfficeName | nvarchar(255) | NULL |
| | | SpaceName | nvarchar(255) | NULL |

TABLE CXVI

| OBJECT NAME | OBJECT TYPE | COLUMN NAME | DATA TYPE | CON-STRAINT NAME |
|---|---|---|---|---|
| WizToSymponyDec | BASE TABLE | WizName | nvarchar(255) | NULL |
| | | Office | nvarchar(255) | NULL |
| | | Space | nvarchar(255) | NULL |

TABLE CXVII

| OBJECT NAME | OBJECT TYPE | COLUMN NAME | DATA TYPE | CONSTRAINT NAME |
|---|---|---|---|---|
| Bulk_User_ Import 4 | BASE TABLE | Email | nvarchar(255) | NULL |
| | | FirstName | nvarchar(255) | NULL |
| | | LastName | nvarchar(255) | NULL |
| | | UserName | nvarchar(255) | NULL |
| | | PassWord | nvarchar(255) | NULL |
| | | TimeZone | nvarchar(255) | NULL |
| | | Phone | nvarchar(255) | NULL |
| | | Mobile | nvarchar(255) | NULL |
| | | Fax | nvarchar(255) | NULL |
| | | Address1 | nvarchar(255) | NULL |
| | | Address2 | nvarchar(255) | NULL |
| | | City | nvarchar(255) | NULL |
| | | State | nvarchar(255) | NULL |
| | | Zip | nvarchar(255) | NULL |
| | | Country | nvarchar(255) | NULL |

As mentioned earlier herein relative to FIG. 5, the user interfaces with the system 10 utilizing the user interface 36 and one or more of the user entry points 66 by which the user accesses, enters and uses the system 10. As the user interface 36 may comprise, for example, a graphical user interface (GUI), a mobile user interface, a remote user interface, a custom user interface, or an enterprise system 44 user interface, examples of which are shown and described later herein.

The above-referenced runbook processes 58, data 62 and objects 74 associated with or corresponding to these runbook processes 58, mentioned earlier and other information and activities that are described later herein are stored in the IDR 40. In the illustration being described, the ACMCE 38 accesses and runs the runbook processes 58 and associated or corresponding data 62 as described earlier relative to FIG. 5. It is important to note that in the illustration being described, the ACMCE 38 is a Microsoft Windows® Workflow Foundation (WF) instance, which is the programming model, engine and tools for building workflow enabled applications on Windows®. The product is available from Microsoft Corporation of Redmond Wash. It consists of a Microsoft®.NET Framework namespace, which comprises a conventional in-process workflow engine. The conventional in-process workflow engine provides one or a plurality of the intuitive user interfaces 36 for arranging the activities according to the intent of the process. The WF includes support for both system workflow and human workflow across a wide range of scenarios.

Figure 41B:
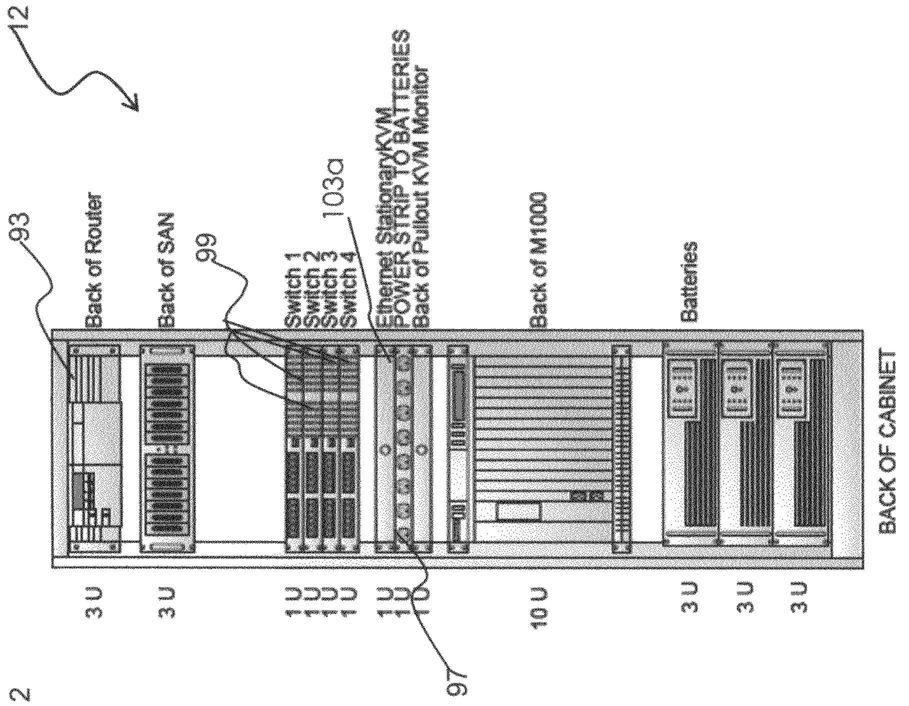
FIG. 41A-FIG. 41B illustrate various hardware and components used in the embodiment being illustrated.
Figure 41A:
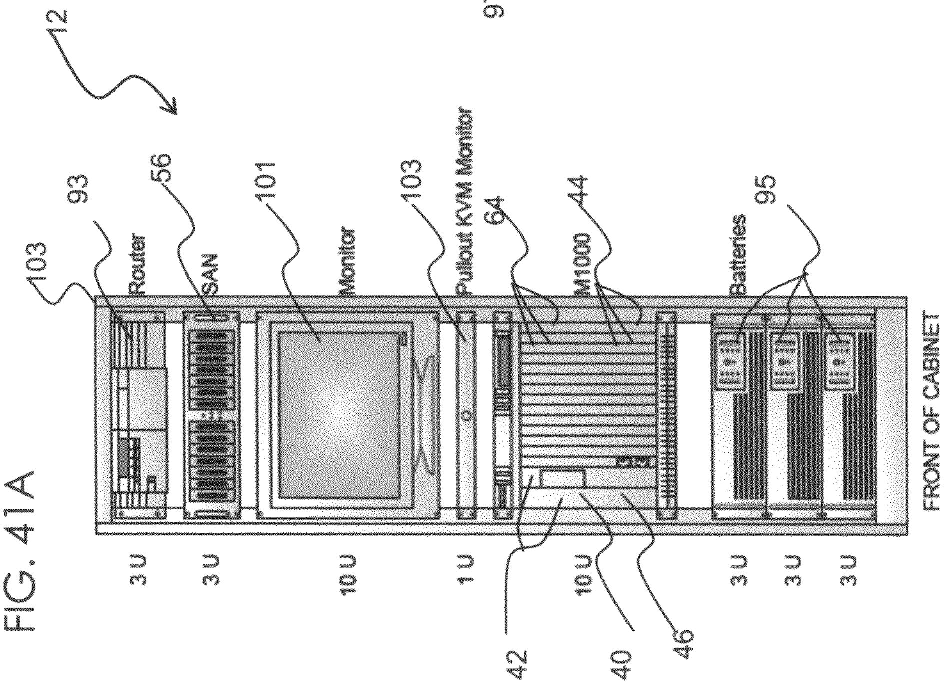

Referring now to FIGS. 41A and 41B, the various hardware components of the ACMCS 12 are shown and will now be described. In FIGS. 41A and 41B, note that a Dell 42 Unit Standard Server Rack 91 available from Dell Corporation is shown. The VNOC 42, which comprises, the IDR 40, the OPL 46, the process composer 70, process conductor 72, outlets 64 and associated enterprise systems 44 are shown. As illustrated in FIG. 5, note that the enterprise systems 44 are coupled to the terminals 14-28, desktop 32 and gatekeepers 34 via the router 93 that is shown at the top of the rack 91 in FIGS. 41A and 41B. The rack 91 further comprises back up batteries 95 and a power switch 97 (FIG. 41B) that is coupled thereto for providing back up power to the system 10.

The rack 91 and the system 10 further comprises a plurality of switches 99, at least one of which is coupled to the router 93 and through which the enterprise systems 44 are coupled to the terminals 14-28, desktop 32 and gatekeepers 34. For ease of illustration, the various cables and wiring are not shown. In the illustration being described and as illustrated in FIG. 41A, an optional monitor 101 that is mounted on the rack 91 and pull out keyboard 103 may also be provided for convenient access to the system 10 at the geographical site or location of the rack 91.

Figure 42:
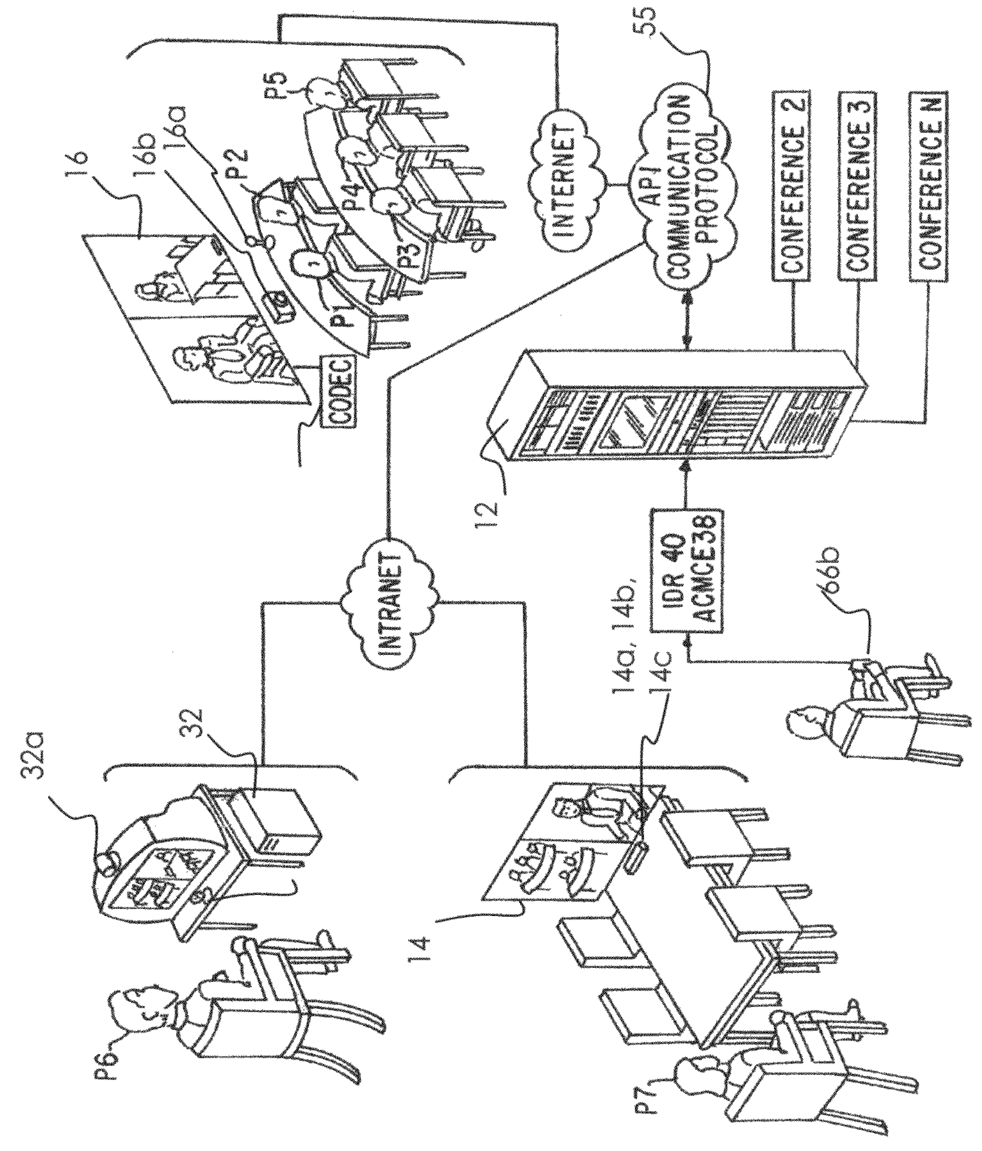
FIG. 42 is an illustrative example of the use of the system 10.

Referring now to FIG. 42, an implementation or illustrative example of the automated management, scheduling, conferencing and control of a conference will now be described. In the illustration, the user uses the touch screen computer, mobile interface 66*b*, and schedules a conference using the scheduling process 58*d* via the one or more interfaces illustrated in FIGS. 31A-31X. The conference information is stored in the IDR 40 of the system 10.

As mentioned earlier herein, the OPL 60 pulls the IDR 40 and ultimately issues a conference start command which causes the conference start process to initiate the conference that was saved in the IDR 40 by the user. The system 10 causes the enterprise systems 44 via the switches 99 and router 93 (FIGS. 41A and 41B) to connect to the terminals 14-28, desktop 32 and/or gatekeepers 34 that are scheduled. In the illustration shown in FIG. 42, note that the enterprise system 44 is coupled to the two-screen terminal 16 having a codec, camera 16*b* and microphone 16*c*, collectively referred to as CCM 16*a* in FIG. 42. Note that this terminal 16 is coupled to the system 10 via the internet.

The system 10 also couples the other participants, such as the desktop 32 in the upper left hand portion of the FIG. 42 and the single-screen terminal 14 shown in the lower left hand corner of the figure. As with the two-screen terminal 16, the single-screen terminal 14 will have an associated codec 14*a*, camera 14*b* and microphone 14*c* (shown in one unit) associated with it. Likewise, the desktop 32 will have a camera 32*a* and microphone 32*b* also associated with it, as shown. Notice that each of the participants, such as participants P1-P5 facing the two-terminal screen 16, participant P6 facing the desktop 32 and participant P7 facing the single-screen terminal 14 are connected by the system 10 in a life-size live audio and video conference. Although not shown, data collaboration or program collaboration, such as common use of a shared application program (not shown), may occur during the conference as well.

Figure 43:
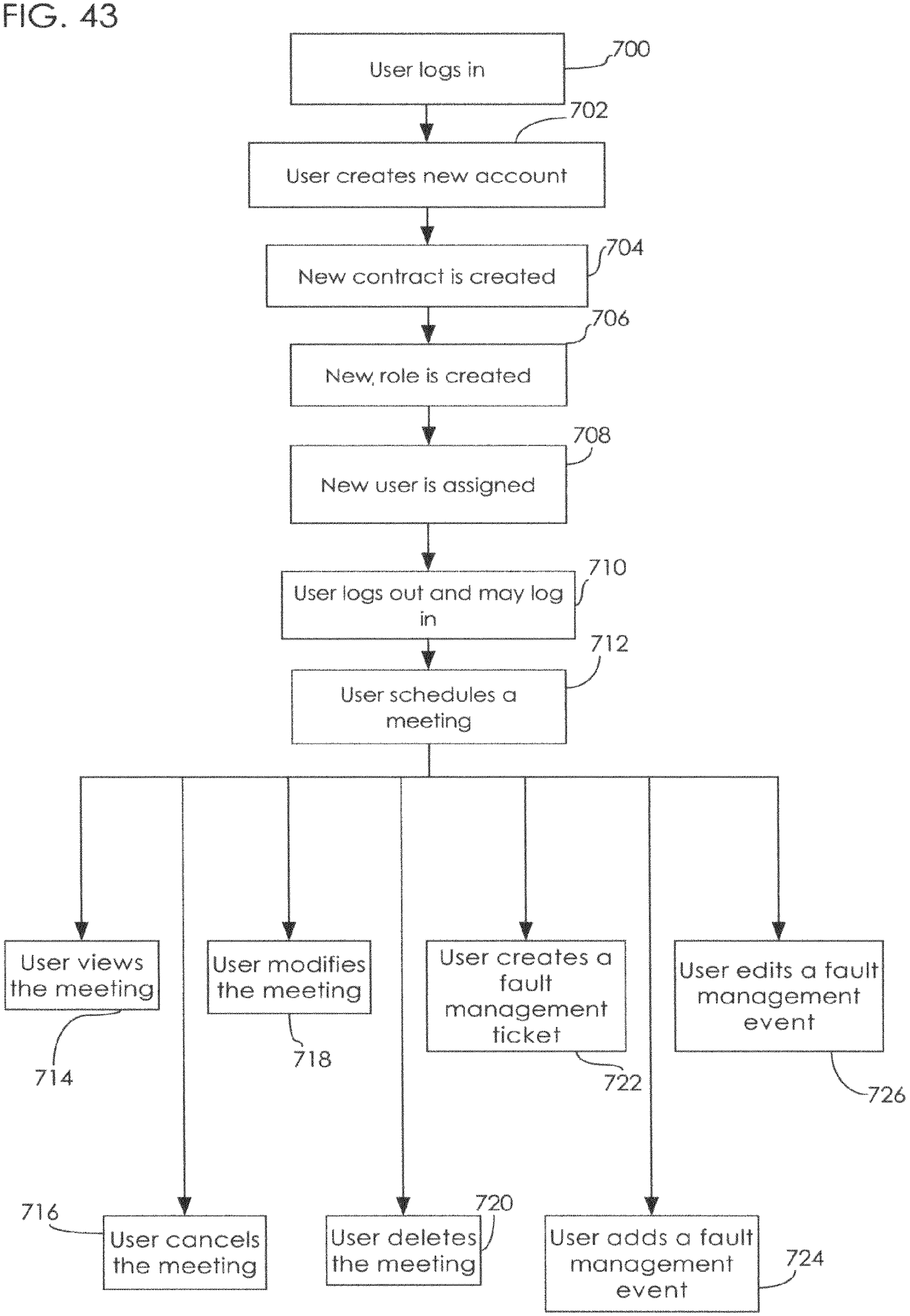
FIG. 43 is a schematic view showing one illustrative example of a sequence of execution of a plurality of runbook processes.

Once the conference is established, the system 10 follows predetermined workflows that are stored in the IDR 40 and established by the workflow foundation (WF) mentioned earlier herein. In order to automate and manage the conference while it is continuing and, for example, to gather statistics regarding the conference, one or more of the plurality of the runbook processes 58 can be run simultaneously and/or any predetermined order. In one illustrative embodiment, FIG. 43 illustrates one possible sequence of the plurality of runbook processes 58. Note in FIG. 43 that at block 700, the user logs in and creates a new account (block 702). Once the new account is created, a new contract is created for the user at block 704. During the creation of the new contract at bloc 704 a custom booking form or template with custom booking forms or templates that will be used by at least one or a plurality of runbook processes 58. The booking forms or templates are described herein relative to the provisioning runbook process 58*a*.

After block 704, a new role is created for the user at block 706, and a new user is assigned (block 708) to the role created at block 706. Thereafter the user logs out and may log in at block 710. It is important to note that after the new account, new contract, new role, new user are created and/or assigned, one or more persons or users may begin using or initiating one or more of the plurality of runbook processes 58. For example, at block 712, the user may add or schedule a meeting and thereafter view the meeting at block 714, cancel the meeting at block 716, modify the meeting (block 718), delete the meeting (block 720) create a fault management ticket (block 722), add a fault management event (block 724), edit a fault management ticket (block 726) or engage, initiate or conduct at least one or a plurality of the runbook processes 58 as described herein. Note that the add, view, cancel, modify and delete meeting features that occur at blocks 710-720 occur during the scheduling runbook process 58*d*, while the illustrative fault management steps shown in blocks 722-726 are conducted during fault management runbook process. However, it should be understood that while the illustration shown in FIG. 43 illustrates the use or initiation of features and functions of the scheduling runbook process and fault management runbook process once the user is provisioned using the provisioning runbook process 58*a*, the user has access to, may initiate or may cause to be initiated one or more of the other plurality of runbook processes 58 and any of the plurality of activities 60 associated with the plurality of runbook processes 58.

In the illustration being described, the following hardware and software components of the system 10 comprise the following Table CXVIII and shown in FIGS. 41A and 41B.

TABLE CXVIII

| Qty. | Name | Manu-facturer | Model Number | Description | Notes | Operating System | Additional Software (Licensed) | CPU/ Cores | Memory | Hard drives |
|---|---|---|---|---|---|---|---|---|---|---|
| 1x | VS-ENTERPRISE 2010 | Dell | M1000 | Blade server enclosure | | | | | | |
| 1x | VS-E2010 REPOSITORY | Dell | M710 | Blade Server (2 Slots) | Main Database Server for Symphony (Using SAN for Storage) (40) | Windows 2008 64 bit | Microsoft SQL Server 2005/2008 | X5550 Xeon/ 16x Cores/ 2.66 Ghz/ 8M Cache | 48 GB | 2x 146 GB 15K RPM SAS |
| 1x | VS-E2010 FRAMEWORK | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |
| 1x | VS-E2010 SILVERLIGHT | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |

TABLE CXVIII-continued

| Qty. | Name | Manu-facturer | Model Number | Description | Notes | Operating System | Additional Software (Licensed) | CPU/ Cores | Memory | Hard drives |
|---|---|---|---|---|---|---|---|---|---|---|
| 1x | VS-E2010 HTML | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |
| 1x | VS-E2010 REPORTING | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |
| 1x | VS-E2010 PRODUCER | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |
| 1x | VS-E2010 OBSERVER | Dell | M610 | Blade Server (1 Slot) | | Windows 2008 64 bit | | X5550 Xeon/ 16x Cores/ 2.66 Ghz/ 8M Cache | 24 GB | 2x 146 GB 15K RPM SAS |
| 1x | VS-E2010 PROXY | Dell | M610 | Blade Server (1 Slot) | Running the Iformata Proxy (Gatekeeper) (44) | Open SuSE 11.1 | | x5520 Xeon/ 2.66 Ghz/ 8M Cache | 4 GB | 2x 160 GB 7.2K RPM SATA |
| 1x | SAN | Dell | EqualLogic PS5000 XV | Storage Area Network (16x 146 GB 15K RPM SAS, Dual Controller) | Storage location for Database, used by VS-E2010 Repository (56) | | | | | 16x 146 GB 15K RPM SAS |
| 4x | Network Switches | Dell | Power Connect 6224 | 24x Port Gigabit Ethernet Switch | | | | | | |
| 1x | KVM | Avocent | DSR2030 | IP KVM | Remote Control of Servers (103a) | | | | | |
| 1x | 16000 VA Smart UPS | Tripp Lite | 16000 VA-SmartUPS | UPS | | | | | | |
| 1x | Rack | Dell | 4220 42U Rack | 42U Standard Server Rack | | | | | | |
| 1x | KMM | Dell | 310-9961 | 1U KMM Console 17" LCD | LCD, Keyboard and Mouse tray for local control (103) | | | | | |

In the illustration being described, the IDR 40 is resident on the Dell M710 blade server available from Dell Corporation, as shown in the Table CXVIII, and provides the Microsoft® structured query language (SQL) relational database. The IDR 40, the OPL 46 and the ACMCE 38 (collectively labeled 42 in FIGS. 2 and 5) are able to interact with the enterprise systems 44 to which they are connected or in communication with and, in turn, the terminals 14-28, desktops 32 and gatekeepers 34 by utilizing available application programmable interfaces (API) from within the ACMCE 38 and by using at least the one or a plurality of the available activities 60 described in detail later herein.

As mentioned earlier herein the ACMCE 38, the IDR 40 and the OPL 46 are inter-dependant and exist together to enable the system 10 to automate, manage and control various runbook processes 58. The runbook processes 58 are comprised of at least one or a plurality of activities 60 necessary to automate, manage and control audio and video communication and data collaboration. The activities 60 are listed in the following Table CXIX, but it should be understood that more or fewer activities 60 could be defined or used (e.g. activities could be adapted depending on and/or in response to the enterprise system 44 being utilized).

TABLE CXIX

| Activities 60 | Runbook Process 58 | Continued Available Activities | Continued Runbook Category |
|---|---|---|---|
| Add Ticket | Incident Management Processes | MuteConferenceParticipants Speakers | Management Processes |

TABLE CXIX-continued

| Activities 60 | Runbook Process 58 | Continued Available Activities | Continued Runbook Category |
|---|---|---|---|
| Audible Alert Notice | Monitoring | PingEndpoints | Monitoring |
| Cancel Reservation | Scheduling Processes | Post Setup Conference Notification | Management Processes |
| Check Location Availability | Scheduling Processes | Post Start Conference Notification | Management Processes |
| Connect Conference Participants | Management Processes | Pre Setup Conference Notification | Management Processes |
| Delete Reservation | Scheduling Processes | Pre Start Conference Notification | Management Processes |
| Disconnect conference Participants | Management Processes | PreTearDownConferenceNotification | Management Processes |
| Email Ticket Notice | Incident Management Processes | Save Reservation | Scheduling Processes |
| Find Conference By Date Range | Scheduling Processes | Send Popup Message | Management Processes |
| Find Conference By ID | Scheduling Processes | SendSetupAlert | Management Processes |
| Find Conference Resources | Scheduling Processes | SendStartAlert | Management Processes |
| Find Conferences By Office Space | Scheduling Processes | Sleep Conference Participants | Management Processes |
| Find Conferences By Title | Scheduling Processes | StatisticsRequest | Monitoring |
| Find SLA Summary | Monitoring | UnMute Conference Participant Speakers | Management Processes |
| Find Ticket Category | Incident Management Processes | UnMute Conference Participants Microphones | Management Processes |
| Find Tickets | Incident Management Processes | UnMute Conference Participants Video | Management Processes |
| Get Meetings | Monitoring | Update Reservation | Scheduling Processes |
| GetActiveCalls | Monitoring | Wait 1 Minute | Management Processes |
| If HSS Issue | Incident Management Processes | Wait 15 Seconds | Management Processes |
| If Problem | Incident Management Processes | Wait 3 Minutes | Management Processes |
| Iformata Send Cancellation Notice | Scheduling Processes | Wait 30 Seconds | Management Processes |
| Iformata Send Modification Notice | Scheduling Processes | Wait 5 Minutes | Management Processes |
| Iformata Send Scheduled Notice | Scheduling Processes | Wait10Seconds | Management Processes |
| Modify Meeting | Scheduling Processes | Wait5Seconds | Management Processes |
| Mute Conference Participants Microphones | Management Processes | WakeConferenceParticipants | Management Processes |
| Mute Conference Participants Video | Management Processes | | |

Each of the plurality of activities 60 (FIG. 5) has at least three functions. A first function is to identify the runbook process 58 being initiated. A second function is to gather runbook process 58 data 62 when the activity 60 is called upon or required by the runbook process 58 that was initiated. A third function that each activity performs is to carry out the runbook processes 58 stored within the IDR 40 using the gathered data 62. Each activity 60 gathers data 62 from the IDR 40 or from one of the enterprise systems 44 and associates the gathered data 62 to data types in the IDR 40. For example, if the activity 60 that is initiated is a modify meeting activity wherein a user wishes to modify a meeting as referred to in Table I, the ACMCE 38 would identify in the IDR 40 at least one or a plurality of the runbook processes 58 that need to be run in response to the modify meeting activity being initiated. The ACMCE 38 then gathers the data 62 required by the at least one or plurality of runbook processes 58 and executes or runs at least one or a plurality of the runbook processes 58 using the data 62 or in response to the data 62.

The data 62 gathered may be internal to the IDR 40 or external to the IDR 40 and received from, for example, one or more of the enterprise systems 44. The data 62 gathered from the enterprise system 44 interacts with the ACMCE 38 through conventional application programmable interface communications or protocols 55, as illustrated in FIG. 4. This enables the use of enterprise systems 44 that are internal or external to the system 10 by relating or applying the data 62 received from the enterprise system 44 to the internal IDR 40. Again, the data 62 received from the enterprise system 44 may be related or applied through the use of conventional application programmable interface communications or protocols 55 to automate the execution of the aforementioned runbook processes 58 stored within the IDR 40. Thus, the ACMCE 38 enables the user to use one or more of the terminals 14-28, desktops 32 and gatekeepers 34 and/or one or a plurality of the enterprise systems 44 and activities 60 that are internal to the system 10 or external to the system 10 to initiate or carry out the runbook processes 58 mentioned earlier herein for the automation of conference management, scheduling, monitoring, controlling and data collaboration.

Figure 7:
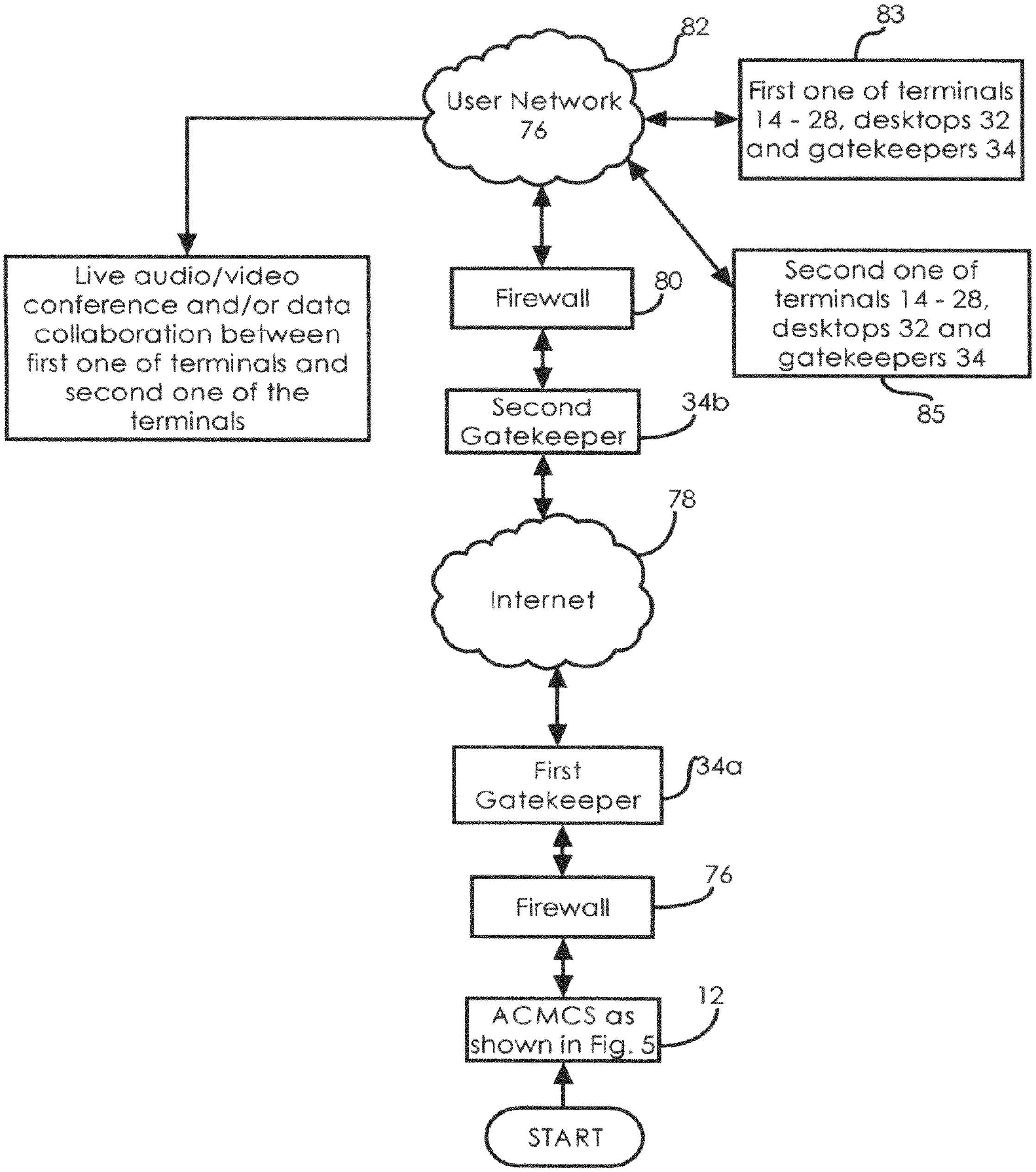
FIG. 7 is a schematic view of a point-to-point connection at a single location with no multi-point connection.

FIGS. 7-10 illustrate various embodiments of the use of the system 10 and one or more of the terminals 14-28, desktop 32 and gatekeepers 34. FIG. 7 illustrates a point-to-point live audio/video conference and/data collaboration in response to a future or impromptu conference or data collaboration scheduling request from the user who is scheduling a conference or data collaboration between a first one of the terminals 14-28, desktops 32 and gatekeepers 34 and a second one of the plurality of terminals 14-28, desktops 32 and gatekeepers 34. It should be understood that in the illustrations shown in FIGS. 7-10, the user will submit a scheduling request to the ACMCS 12 using the user entry point 66 and user interface 36. The specific data 62 and the user interface 36 associated with the request are described later herein relative to the scheduling runbook process 58*d*.

The scheduling request from the user is received and subsequently scheduled by the ACMCS 12 and stored in the IDR 40 in the manner described earlier. The ACMCS 12 automatically commences and manages the live audio/video conference and/data collaboration in response to the scheduled conference stored in the IDR 40. It is important to note the ACMCS 12 receives the scheduling request, whether impromptu or future request, from the user as described herein and automatically initiates at least one or a plurality of the runbook processes 58 to achieve the live audio/video conference and/data collaboration. The ACMCS 12 automates, manages, monitors and controls the audio/video conference and data collaboration in the manner described herein.

In the example of FIG. 7, the ACMCS 12 is coupled to the gatekeeper 34 through a conventional and optional firewall 31*a*. The first gatekeeper 34*a* is connected via the internet 78 to a second gatekeeper 34*b*, which is in turn coupled through a conventional and optional firewall 80 to a user network 82. The user network 82 is coupled to or interacts with a first one 83 of the terminals 14-28, desktops 32 and gatekeepers 34 and a second one 85 of the plurality of terminals 14-28, desktops 32 and gatekeepers 34 resulting in a live audio/video conference and/data collaboration between the first one 83 of the plurality of terminals 14-28, desktops 32 and gatekeepers 34 and second one 85 of terminals 14-28, desktops 32 and gatekeepers 34. Notice that in the illustration being described in FIG. 7, the ACMCS 12 is outside the user network 82, thereby necessitating the need for the gatekeepers 34*a* and 34*b* and firewalls 76 and 80.

Figure 8:
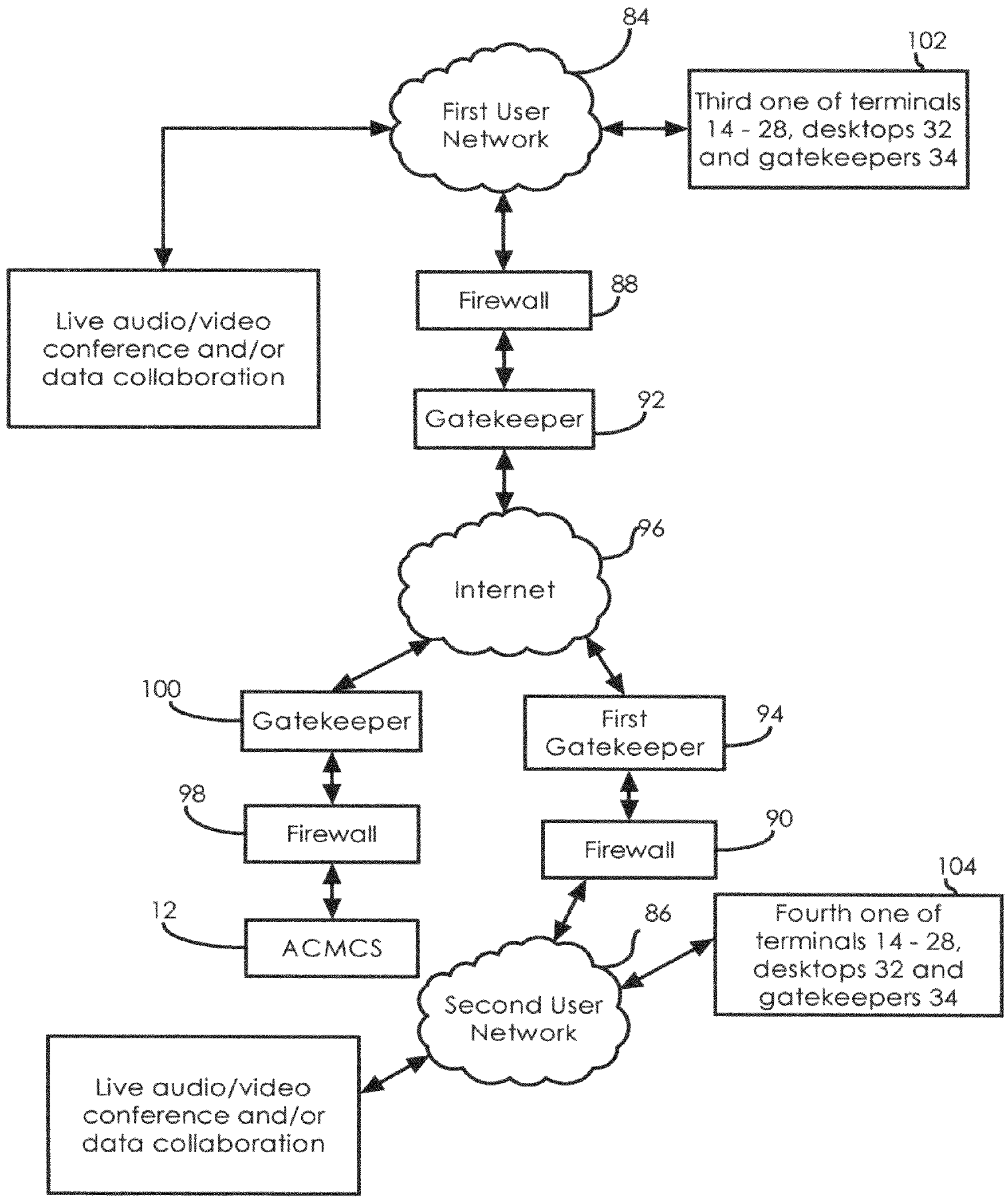
FIG. 8 is a schematic view of a multi-terminal, multi-network conference connection.
Figure 9:
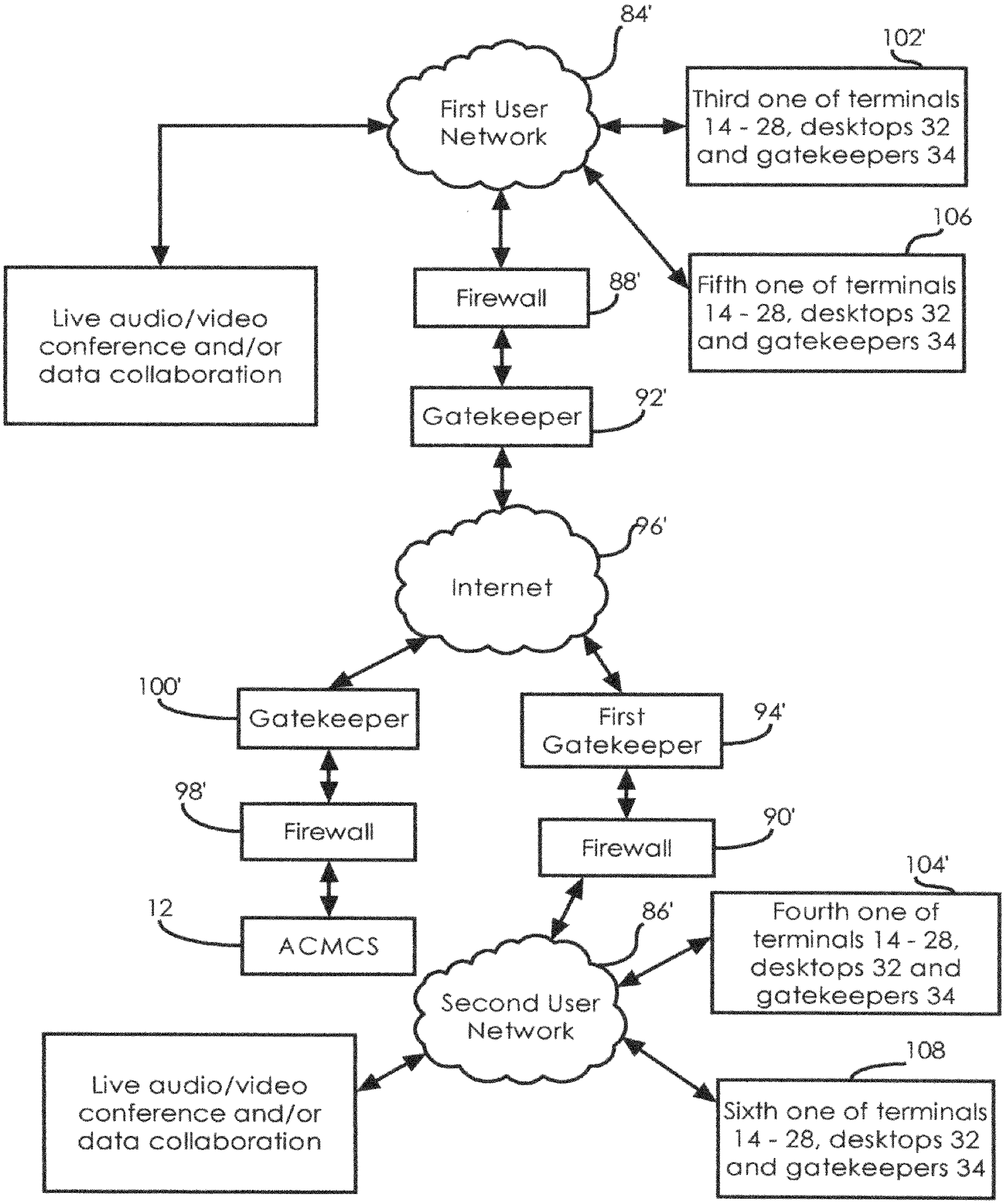
FIG. 9 is a schematic view of an illustrative embodiment showing a multi-terminal and multi-network conference connection.

Referring now to FIGS. 8 and 9, similar embodiments illustrate a multi-terminal 14-28, desktops 32 and gatekeepers 34 live audio/video conference and/data collaboration used in association with multiple networks is shown. For ease of description, it is assumed the user has initiated an impromptu or future meeting request using the scheduling runbook process described herein. In these illustrative embodiments, in response to the future or impromptu conference or data collaboration scheduling request from the user, who is scheduling a conference or data collaboration between a third one 102 of said plurality of the terminals 14-28, 32 and 34, a fourth one 104 of the plurality of terminals 14-28, desktops 32 and gatekeepers 34. The scheduling request is received and subsequently scheduled by the ACMCS 12 and stored in the IDR 40 in the manner described earlier. In this embodiment, a first user network 84 is shown coupled to a second user network 86 via a plurality of firewalls 88, 90 and gatekeeper 92 and 94 and via the internet 96. Note that the ACMCS 12 is also coupled to the first and second user networks 84, 86 via a firewall 98 and gatekeeper 100 via the internet 96. In this embodiment, a third one 102 of the at least one or a plurality of terminals 14-28, desktops 32 and gatekeepers 34 is associated with the first user network 84 is coupled to a fourth one 104 of the at least one or a plurality of terminals 14-28, desktops 32 and gatekeepers 34 associated with the second user network 86. The ACMCS 12 enables the third one 102 of the at least one or a plurality of terminals 14-28, desktops 32 and gatekeepers 34 and fourth one 104 of the at least one or a plurality of terminals 14-28, desktops 32 and gatekeepers 34 to provide a live audio/video and/or data collaboration between the third one 102 of the at least one or a plurality of terminals 14-28, desktops 32 and gatekeepers 34 and fourth one 104 of the at least one or a plurality of terminals 14-28, 32 and 34. Note that the ACMCS 12 automatically controls and monitors that conference or data collaboration being conducted in the manner described herein.

Referring now to FIG. 9, still another illustrative embodiment is shown that is similar to the embodiment shown in FIG. 8. It should be understood that like parts are identified with the same part numbers, except that the parts in the embodiment shown in FIG. 9 have a prime mark ("'") added thereto. In this embodiment, a fifth one 106 of the at least one or a plurality of terminals 14-28, desktops 32 and gatekeepers 34 is shown coupled to and associated with the first user network 84' and a sixth one 108 of the at least one or a plurality of terminals 14-28, desktops 32 and gatekeepers 34 is shown associated with the second plurality of user networks 86'. As with the embodiment shown in FIG. 8, it should be understood that the ACMCS automatically controls or monitors the conference and data collaboration being conducted between or among the third one 102, fourth one 104, fifth one 106 and sixth one 108 of the at least one or a plurality of terminals 14-28, desktops 32 and gatekeepers 34.

Figure 10:
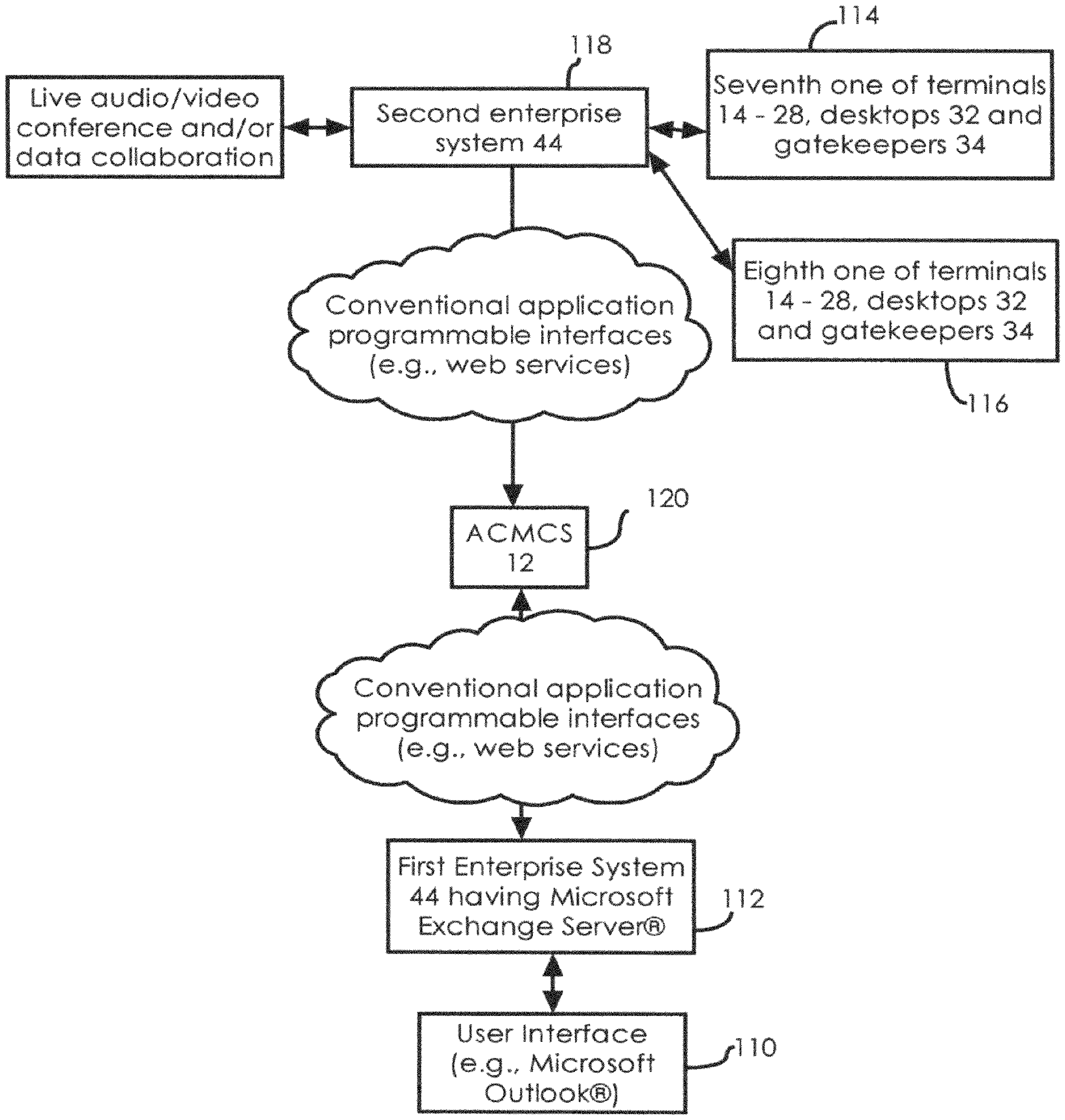
FIG. 10 is a schematic illustration of a multi-terminal connection using at least one or a plurality of enterprise systems.

Referring now to FIG. 10, an example is shown with at least one or a plurality of the enterprise systems 44 where the user accesses the system 10 using the user entry point 66*c* (Microsoft Outlook® in this illustrative embodiment) as shown at block 110. In this example, the user uses the Microsoft Outlook® user interface 36 to schedule an impromptu or future conference or data collaboration scheduling request. The user interfaces the first enterprise system 44 (block 112) which as explained earlier comprises the Microsoft Exchange Server® available from Microsoft Corporation of Redmond, Wash. For illustration, it is assumed the user has initiated the scheduling runbook process.

The first enterprise system 44 determines in response to the user scheduling request the available resources that the user has requested, in this illustration the availability of a seventh one 114 of the at least one or a plurality of terminals 14-28, desktops 32 and gatekeepers 34 and an eighth one 116 of the at least one or a plurality of terminals 14-28, desktops 32 and gatekeepers 34. The resources are scheduled in the first enterprise system 44 shown at block 112 and also in the ACMCS 12 (block 120) which stores the data 62 associated with the user request in the IDR 40. Note in this illustration that the resources, such as the at least one or a plurality of terminals 14-28, 32 and 34, are associated with the second enterprise system 44 (block 118). The second enterprise system 44 (block 118) controls and manages the resources that have been scheduled by the user.

In this illustration, the ACMCS 12 uses the activities 60 within the outlets 64 for each one of the enterprise systems 44 to execute the automated scheduling, management, monitoring and control of the seventh one 114 of the at least one or a plurality of terminals 14-28, desktops 32 and gatekeepers 34 and the eighth one 116 of the at least one or a plurality of terminals 14-28, desktops 32 and gatekeepers 34 as described earlier herein.

It should be understood that the FIGS. 7-10 are illustrative of several uses of the ACMCS 12 and the scheduling, management, monitoring and control of the resources available to the user in response to the user's request, but it should be understood that other uses and configurations are available as well and may depend, at least partly, on the user's resources. The arrangement and configuration of the ACMCS 12 is adapted to the user(s) enterprise system(s) 44, user entry points 66 and user interfaces 36. The resources available to the user for conferencing will depend upon the user's available resources. It should be noted that the arrangement, configuration and use of the resources that comprise the system 10.

The activities 60 and runbook processes 58 will now be described. It should be understood that in a preferred embodiment, several of the runbook processes 58 are required, while others are optional. Within any particular runbook process 58 there may be required activities and optional activities that may be accessed or used during the runbook process. A general runbook process will be described relative to FIG. 11 followed by the required runbook processes and then the optional runbook processes.

Figure 11:
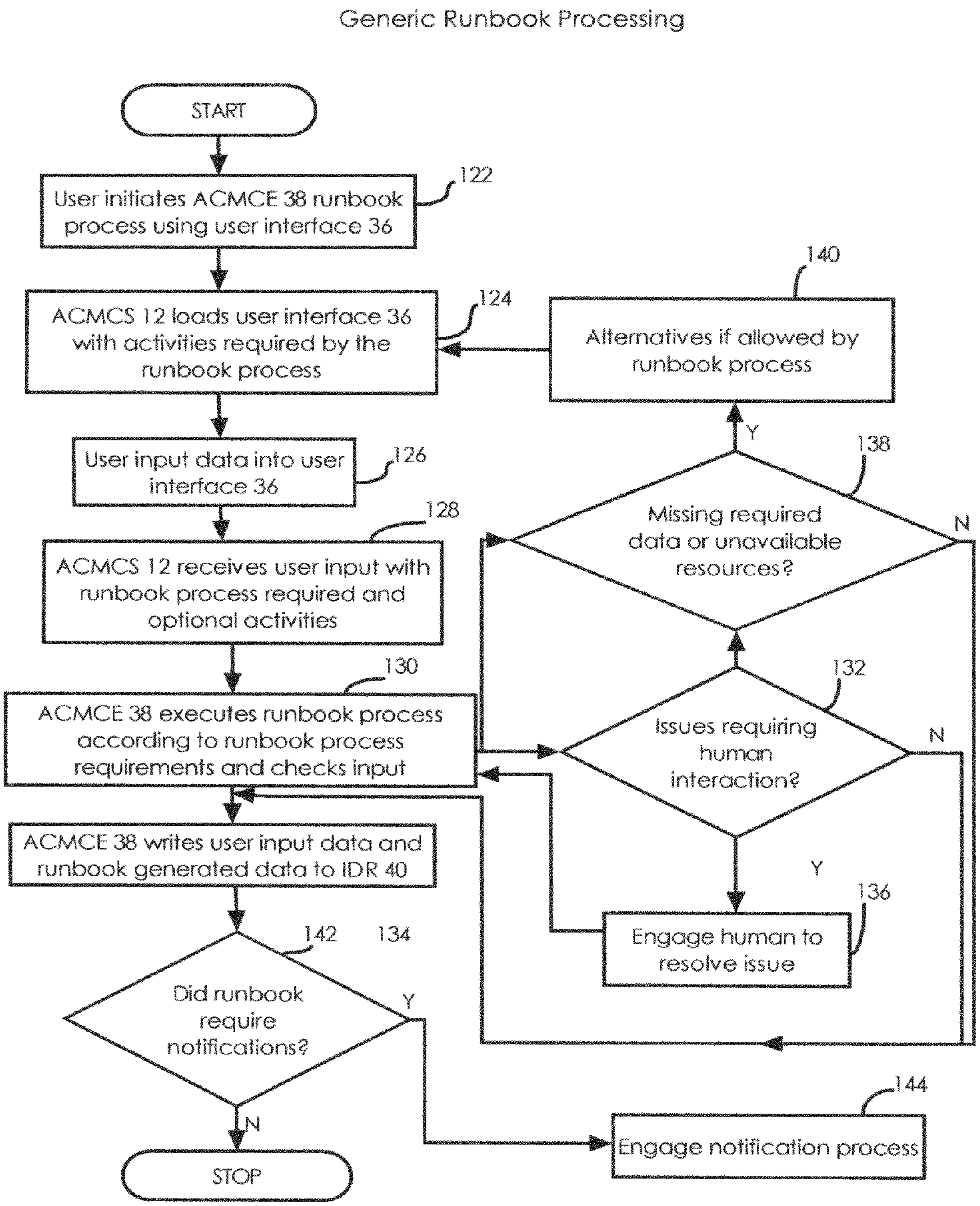
FIG. 11 is a schematic view of a general runbook process in accordance with an embodiment of the invention.

FIG. 11 is a general schematic that applies to the processing of the runbook process 58. In general, the runbook processing begins (block 122) by the user initiating at least one or a plurality of the runbook process 58 using at least one user entry point 66 via the user interface 36. The ACMCE 38 loads the user interface 36 with the predefined activities 60 required by the initiated runbook process 58 (block 124). Next, user data 62 is input into the user interface 36 by the user (block 126). At block 128, the runbook process proceeds with the ACMCE 38 receiving the user data 62 along with the runbook process 58 being executed and its associated activities 60.

At block 130, the ACMCE 38 executes the runbook process 58 and its associated activities 60 in response to the user input. It should be understood that one of the activities 60 that the ACMCE 38 may execute is quality control during which a verification or check of the data 62 that was input by the user is performed. If there are issues or errors determined as a result of the check of the input, the routine proceed to decision block 132 where it is determined if human interaction is required. If not, the routine proceeds to block 134. If there is human interaction required, then the routine proceeds to block 136 where a human is engaged to resolve the issue and after the routine proceeds to return to block 130.

If it is determined after checking the input that data 62 is missing or that the user has incorrectly input or, for example, that one or more of the terminals 14-28, desktops 32 and gatekeepers 34 that the user has requested are unavailable (decision block 138), then the routine proceeds to block 140 whereupon the ACMCE 38 may present alternatives to the user if such alternatives are defined and/or allowed by the runbook process 58 being executed.

If there is no missing input, incorrect input and all terminals 14-28, desktops 32 and gatekeepers 34 requested by the user are available, then the execution of the runbook process continues and proceeds to block 134 as shown.

At block 134 the ACMCE 38 writes the user input data and any other data that was generated during the execution of the runbook process 58 to the IDR 40. The general process continues to decision block 142 whereupon it is determined by the ACMCS 38 whether or not the runbook process 58 being executed requires one or more user notifications. In this regard, the user notification may include notification of conference details, such as date, time, participants, such as local data and start time for each participant in the conference. If notifications are required, the ACMCE 38 causes the notification process 58*f* to be initiated (block 144 in FIG. 11), which results in, for example, a notice being generated by electronic mail (email), audible alert, sms messaging. If no notification is required, the general runbook process procedure terminates. FIGS. 40A and 44B illustrate two electronic mail forms of notification. In the illustration, the email notification in FIG. 40A is a notification 41 that is generated by the scheduling runbook process and that provides a notification to the predetermined list of conference contacts. As shown, the notification can comprise a first plurality of information such as title, status, confirmation number, requestor name and email, conference notification type, terminal and the like. Appropriate contact phone numbers and the like. FIG. 40B is a notification 43 that was caused to be generated by fault management illustrating a notice of a fault, in this illustration, a critical fault. This notification may comprise a second plurality of notification information such as terminal status, identification of priority, whether a conference is affected or shut down, ticket number, required update or predetermined time period for the correction or remediation of the fault identified.

It should be understood that the description relative to FIG. 11 is a general process or routine for executing the runbook processes 58 described herein, but more, fewer or different process steps could be used. In the illustration being described, the general runbook processing routine shown in FIG. 11 is used when a runbook process 58 is called upon and executed. It should be understood that each runbook process 58 that is called upon and executed comprises one or more of the plurality of activities 60 as mentioned earlier herein relative to FIG. 5. As mentioned earlier, the activities 60 are categorized for each runbook process 58. Each runbook process 58 activity may be used by the ACMCE 38 to determine a flow of the process or how the runbook process will execute. For example, the scheduling conference runbook process 58*d* has a start time activity and an end time activity, among others. The ACMCE 38 receives the start time from the user and uses that information or data to determine, based upon the start time, whether or not the conference is ad hoc (i.e., meet now) or a conference that is scheduled for the future. Depending on the start time activity data input by the user, the ACMCE 38 will cause the scheduling conference runbook process 58*d* to flow or execute a desired set of commands or instructions. Thus, the activities 60 input into by the user determine the flow or how the runbook process 58 will run or execute. Stated another way, each runbook process is responsive to the information or data that is input by the user, and the runbook processes 58*a*-58*m* execute and flow in response to this information or data.

Figure 12A:
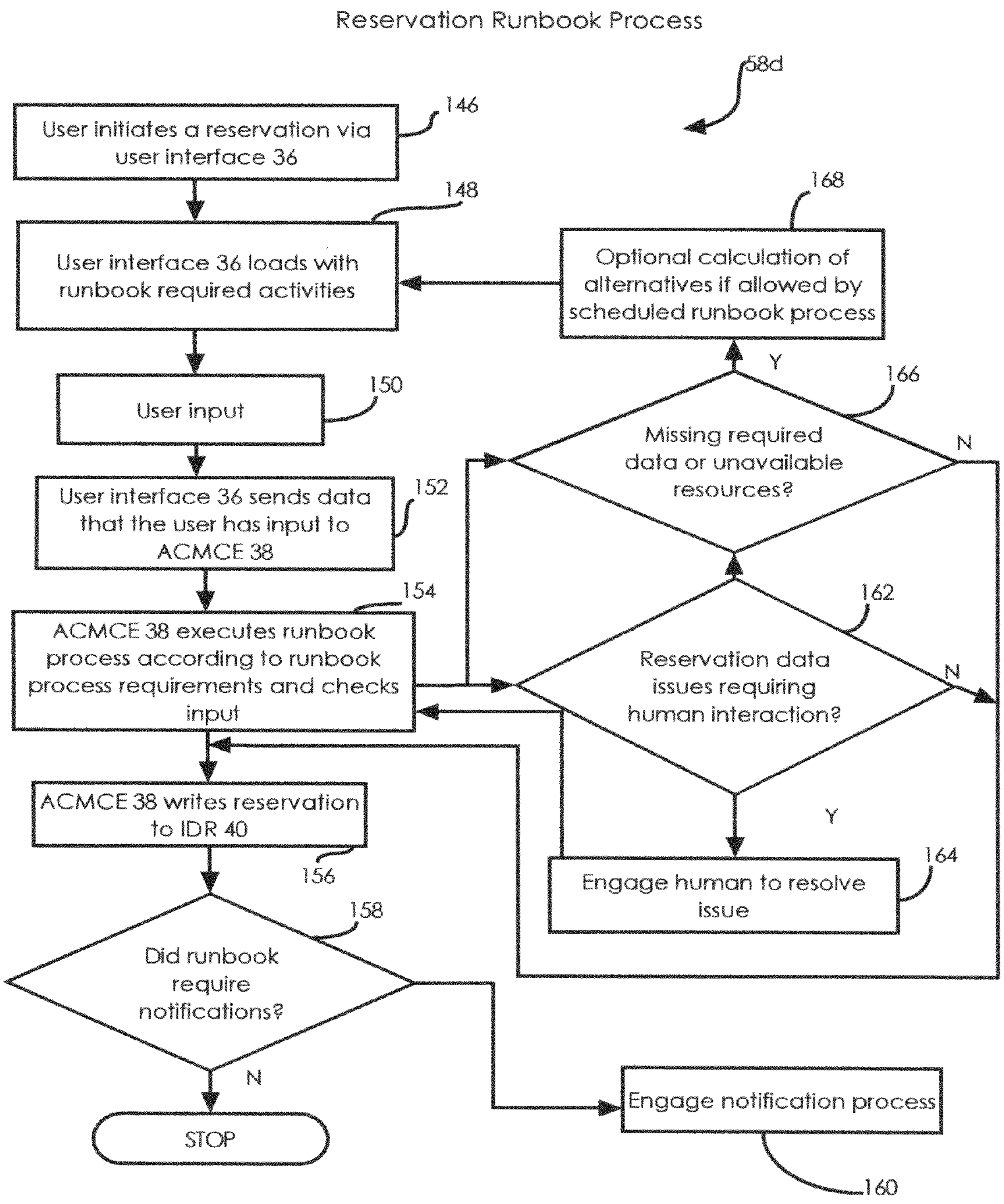
FIG. 12A is a schematic view of a reservation runbook process in accordance with one embodiment of the invention.

An example of the reservation scheduling runbook process 58*d* will now be described relative to FIG. 12A. The process is initiated by the user when the user desires to schedule a video and audio conference, with it being understood that the system 10 is not limited to this particular example and that the system 10 could be used to manage, schedule and control various types of conferences and collaboration. In this illustration, a first user at a first location desires to establish a conference with at least one or a plurality of users or terminals 14-28; desktops 32 and/or gatekeepers 34 at other locations. The other locations may be in the same geographic building or location or be geographically remote from the first user.

Figure 31A:
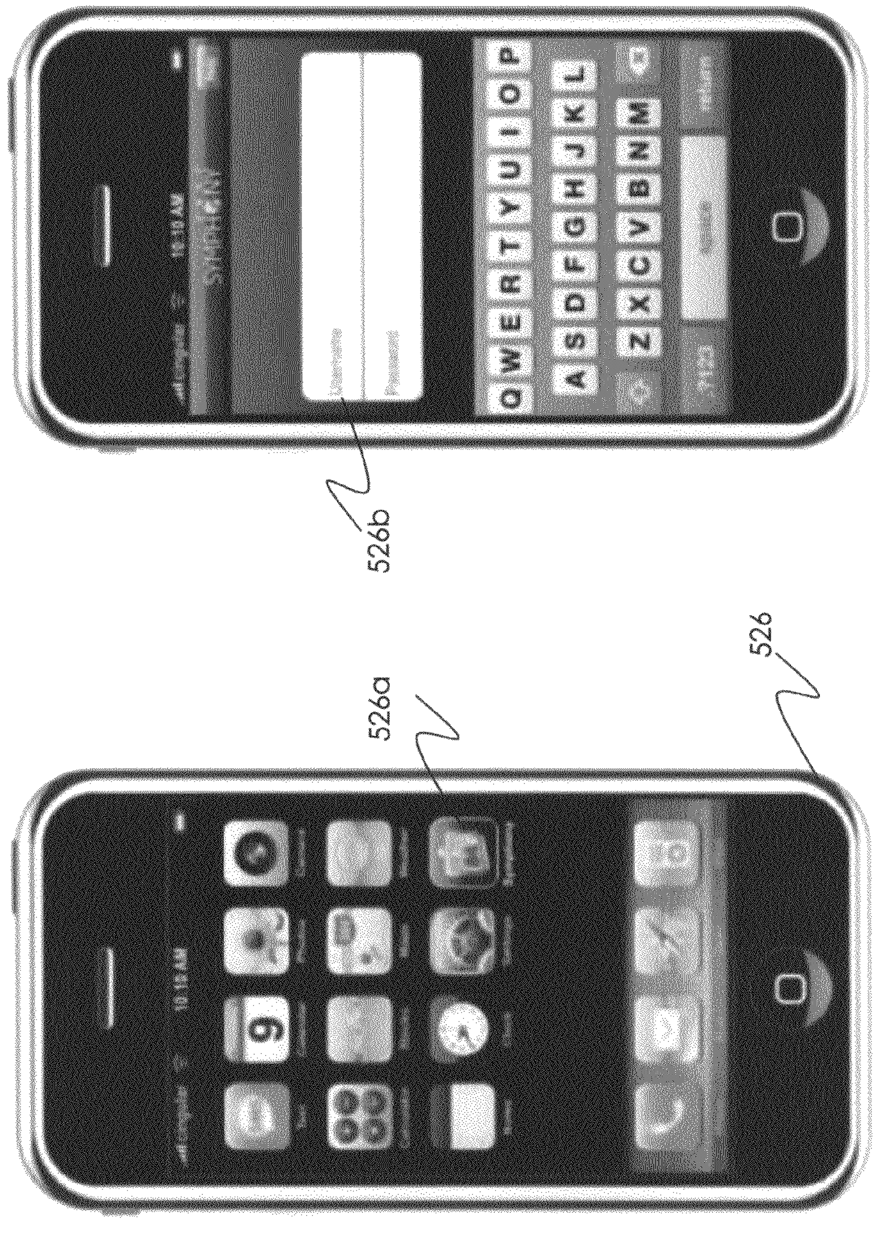
FIGS. 31A-31X illustrate a touch screen computer/mobile user interface or web portal for accessing and using the system in accordance with one embodiment of the invention.

The first user at the first location authenticates into the system 10 using the user entry point 66 to access the user interface 36 (block 146 in FIG. 12A) to schedule a reservation of conference terminals 14-28, desktops 32 and gatekeepers 34 necessary to conduct various types of conferences and data collaboration. In this regard, the user may be presented with one or more means or user entry points 66 for inputting preferences or activities regarding the conference into the system 10. For example, if the user is using a mobile interface 66*b* (FIG. 5), such as an iPhone® available from Apple, Inc. (Cupertino, California). As illustrated later relative to FIG. 31A, the user entry point 66*b* will be presented to the user as an icon 526*a* as shown in FIG. 31A. The user may initiate the scheduling of a reservation by selecting that icon 526*a*. In another example, the system 10 may be accessed via an enterprise system 44, such as Microsoft Outlook® available from Microsoft Corporation of Redmond, Wash., in which case the user would be presented with a graphical user interface 522 shown in FIG. 30I. The graphical user interface 522 comprises the button 522*a* that the user selects to initiate the scheduling of a reservation. Alternatively, the user may access the system 10 using a web interface 66*a* (FIG. 32A-32M) to initiate the scheduling of a reservation.

In response to the user's initiation, the ACMCE 38 presents (block 148 in FIG. 12A) the user with the user interface 36 for the scheduling runbook process 58*d* and the schedule activities that are associated with the scheduling runbook process 58*d*. In the illustration being described, the activities 60 associated with scheduling are shown and described later herein.

It should be understood that while these scheduling activities have been shown and described, more or fewer activities may be used or presented by the ACMCE 38. The user inputs data 62, such as start time, end time, conference duration time, participants and the like, that the user has been prompted to complete in the user interface 36 (block 150 in FIG. 12A). As described earlier herein relative to FIG. 5, the ACMCE 38 receives (block 152) the data 62 that the user has input to the user interface 36 and processes the scheduling runbook process 38*d* and data according the scheduling runbook process 38*d* requirements (block 154). The ACMCE 38 writes and stores the scheduling or reservation data 62 to the IDR 40 (block 156).

If the scheduling runbook process 58*d* required user notifications (block 158) then the notification runbook process 58*f* is initiated and notification would be sent to the user (block 160), and thereafter, the process would end. As mentioned earlier, the notifications may be made by electronic mail (email), audible alert, and/or sms messaging.

It should be understood that the ACMCE 38 checks the data 62 that was input by the user (block 166) and if the reservation data 62 requires human interaction (decision block 162), then a human is engaged to resolve the issue (block 164) and thereafter the routine returns to block 154 where the ACMCE 38 again checks that data 62. If the decision at decision block 162 is negative, then the routine proceeds to block 156 as shown. It is also determined at decision block 166 whether any of the data 62 that was input by the user is invalid or whether data 62 required by the scheduling runbook process 58*d* is missing or whether the terminals 14-28, desktops 32 and gatekeepers 34 are unavailable. If one or more of them is missing, invalid, or unavailable, then the ACMCE 38 generates alternatives for the user which are displayed by the user interface 36 if such alternatives are available and permitted by the scheduling runbook process (block 168). Thereafter, the routine proceeds to block 148 as shown. If the decision at decision block 166 is negative, then the routine proceeds to block 156. It should be understood that once the decisions at decision blocks 166 and 162 are negative, the scheduling runbook process 58*d* proceeds to block 156.

Figure 12B:
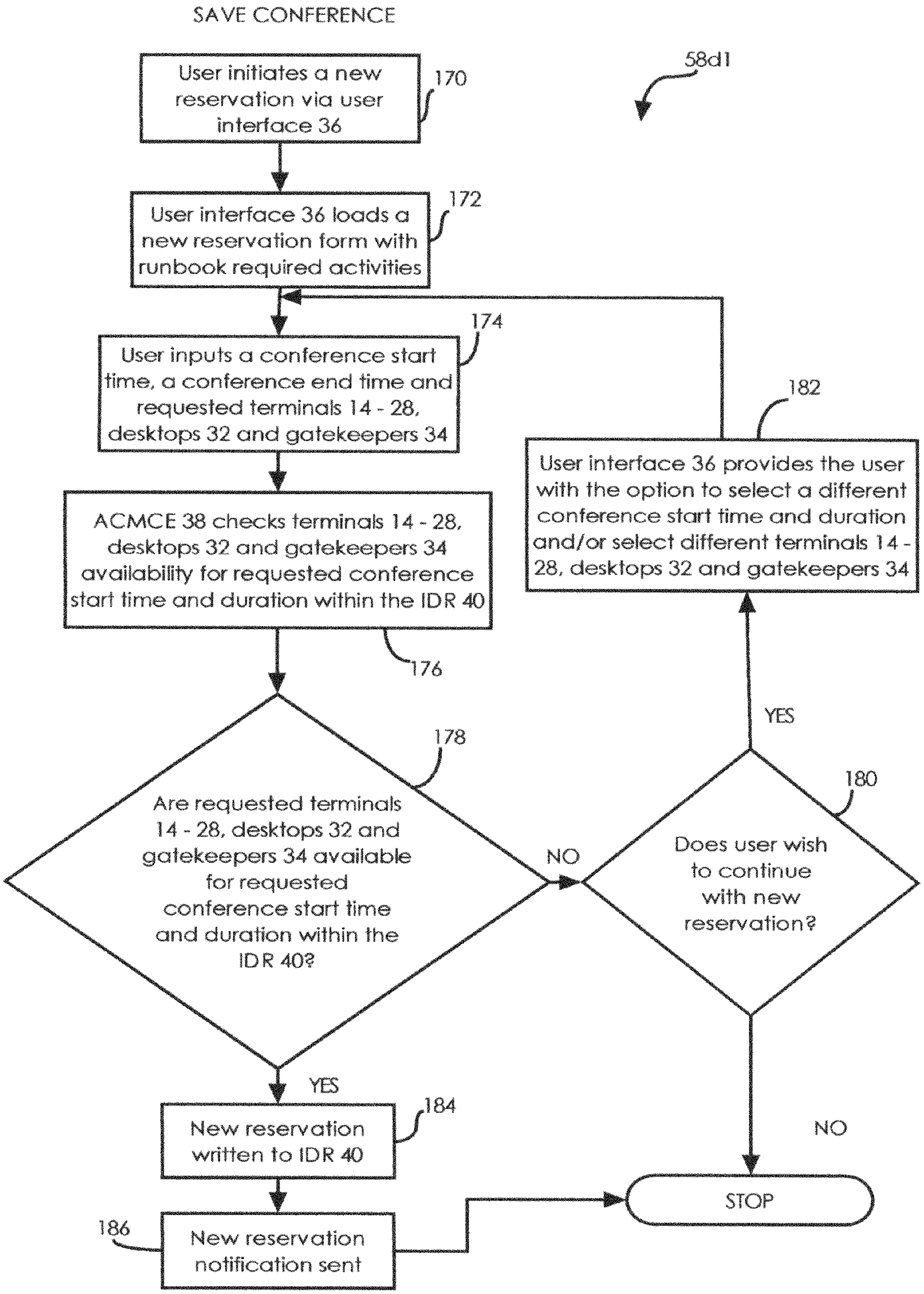
FIG. 12B is a schematic view of a save conference runbook process in accordance with one embodiment of the invention.
Figure 12C:
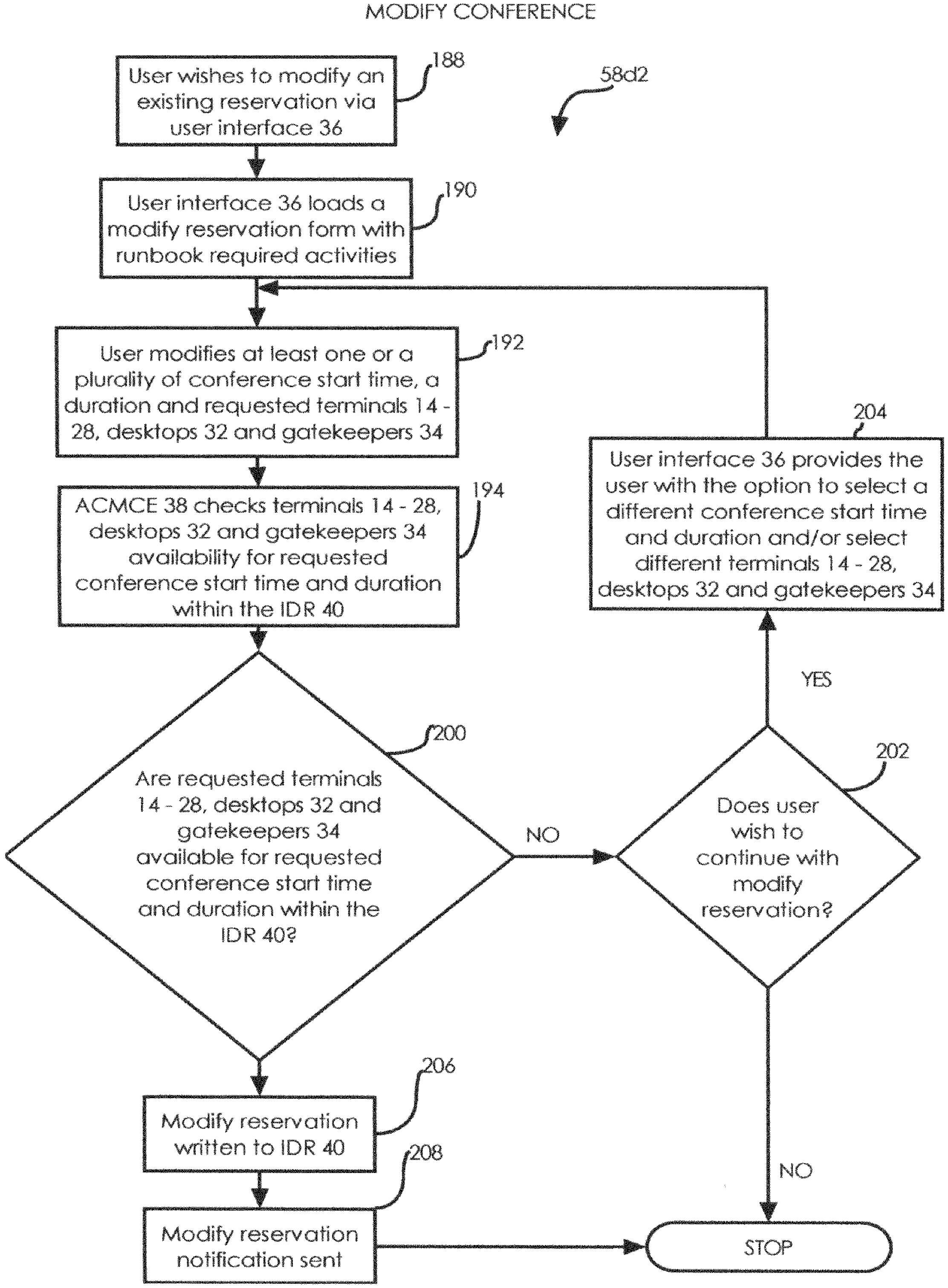
FIG. 12C is a schematic view of a modified conference runbook process in accordance with another embodiment of the invention.
Figure 12D:
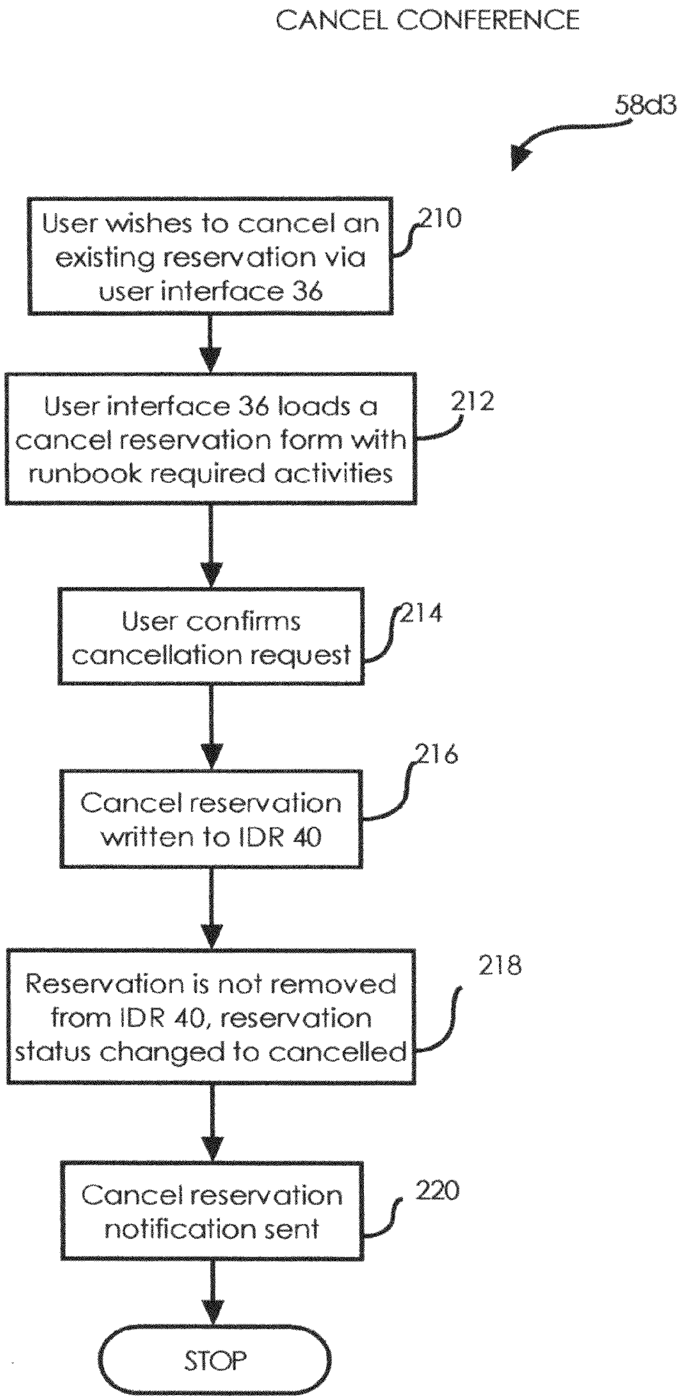
FIG. 12D is a schematic view of a cancel conference runbook process in accordance with one embodiment of the invention.
Figure 12E:
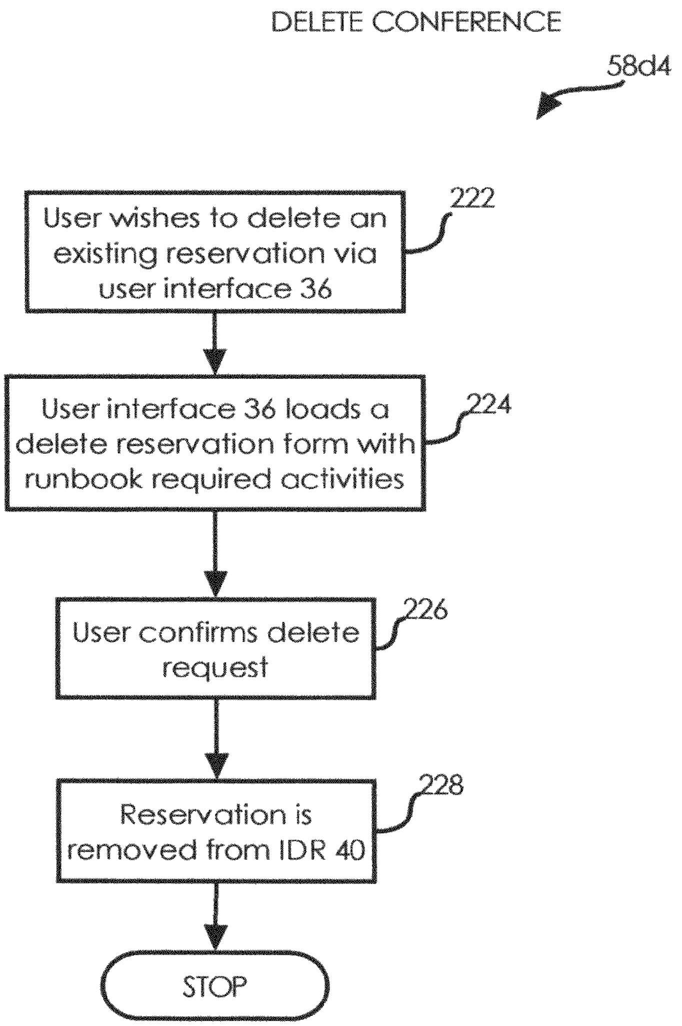
FIG. 12E is a schematic view of a delete conference runbook process in accordance with one embodiment of the invention.
Figure 12F:
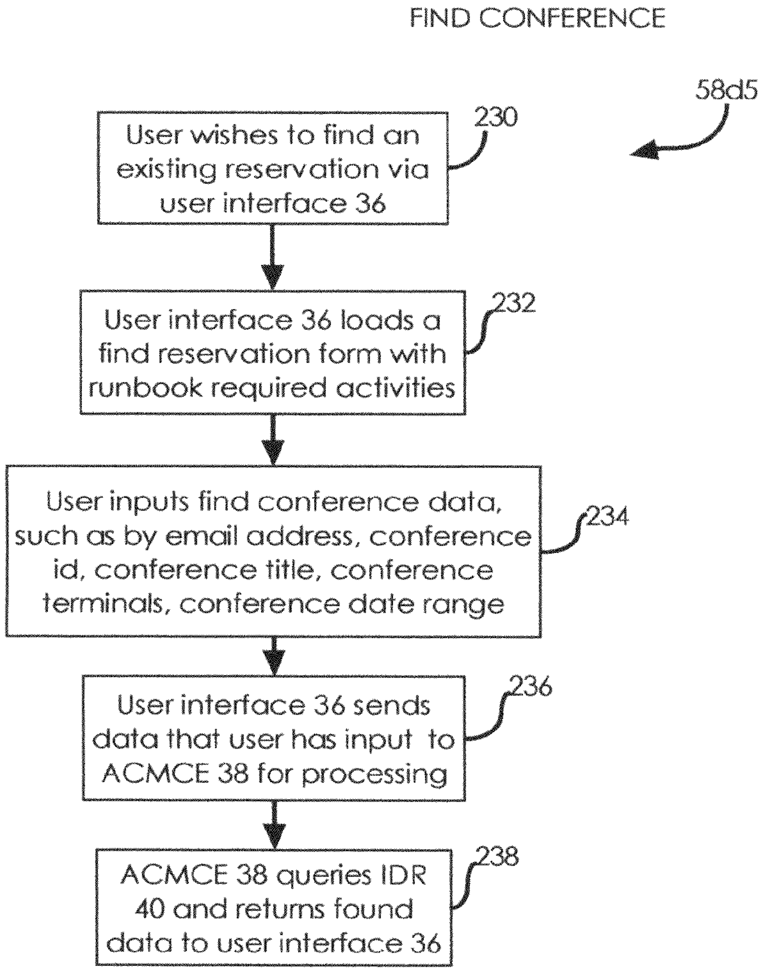
FIG. 12F is a schematic view of a find conference runbook process in accordance with one embodiment of the invention.

The scheduling runbook process 58*d* comprises several subprocesses, namely, a save conference runbook process 58*d*1 (FIG. 12B), a modify conference process 58*d*2 (FIG. 12C), a cancel process 58*d*3, a delete conference process 58*d*4 (FIG. 12E), and a find conference process 58*d*5 (FIG. 12F). Referring now to FIG. 12B, a save conference runbook process is shown. This save conference runbook process enables a user to load a new reservation conference and then save the reservation into the IDR 40 for later call up and automatic invitation by the ACMCE 38. The process begins at block 170 (FIG. 12B) by the user initiating a new reservation via user interface 36. The user interface 36 loads a new reservation form (such as a template 51*b* in FIG. 30B) at block 172 with save conference runbook activities 60. At block 174, the user inputs a conference start time, a conference end time and the requested resources, such as terminals 14-28, desktops 32 and gatekeepers 34. The process continues by ACMCE 38 checking terminals 14-28, desktops 32 and gatekeepers 34 availability for requested conference start and duration time via the IDR 40 at block 176. At decision block 178, it is determined whether terminals 14-28, desktops 32 and gatekeepers 34 are available for conference start and duration time within IDR 40. If they are not, the routine proceeds to decision block 180 where it is determined whether user wishes to continue with a new reservation. If not, the process stops. If the user wishes to continue, the process continues to block 182 where the user interface 36 provides user with the option to select a different start time, duration, terminals 14-28, desktops 32 and gatekeepers 34. Thereafter, the routine proceeds back to 174 as shown.

If decision at decision block 178 is affirmative, a new reservation with user inputted data regarding the requested start, duration and terminals 14-28, desktops 32 and gatekeepers 34 is written to the IDR 40 (block 184). At block 186 and in the illustration being described, a new reservation notification is sent to a predetermined group of contacts associated with the participants in the conference. This group of contacts may be stored in the IDR 40 and may be established based upon a user's pre-identified list of conference contacts.

Referring now to FIG. 12C, after a conference has been reserved a saved, it may be necessary to modify the saved conference. FIG. 12C illustrates one embodiment of the modify conference runbook process 58*d*2. The process begins by the user desiring to modify an existing reservation via user interface 36 (block 188). User interface 36 loads a modify reservation form, such as the form illustrated in FIG. 34A with runbook associated activities 60 (block 190) required by the modify process 58*d*2. The process continues by the user inputting at least one or a plurality of the conference start time, conference duration time and/or requested terminals 14-28, desktops 32 and gatekeepers 34 (block 192). Thereafter, the ACMCE 38 checks the availability of terminals 14-28, desktops 32 and gatekeepers 34 for the requested start time and duration with IDR 40 at block 194. At decision block 200, it is determined by the ACMCE 38 whether terminals 14-28, desktops 32 and gatekeepers 34 are available for requested start time and duration within IDR 40. If they are not, the routine continues to decision block 202 where it is determined whether the user wishes to continue with modifying the reservation. If not, the routine stops. If the user wishes to continue, the user interface 36 provides the user with option to provide a different start time, duration and/or select different terminals 14-28, desktops 32 and gatekeepers 34 (block 204). Thereafter, the routine loops back to block 192 as shown.

If the decision at decision block 200 is affirmative, the modified reservation is written to the IDR 40 (block 206) and the notification runbook process 58*f* is initiated which causes a notification of the modified reservation is sent to the pre-identified group of conference contacts (208). Thereafter, the modify conference runbook routine terminates.

There may be occasion when the user desires to cancel a reservation in the IDR 40. If this occurs, then the cancel conference runbook process 58*d*3 (FIG. 12D) is used. During this process, the user initiates the cancel conference runbook process 58*d*3 (FIG. 12D) by actuating the cancel conference runbook process 58*d*3 (FIG. 12D) by, for example, actuating an electronic button 605 (FIG. 32M) when the user has desired to cancel an existing reservation via the user interface 36 (block 210 in FIG. 12D). The ACMCE 38 causes the user interface 36 to load a cancel reservation popup 607 (FIG. 32M) at block 212. The user confirms the cancellation request at block 214 and the cancelled reservation is written to the IDR 40 at block 216. In the example being described, the reservation that is being cancelled, is not removed from the IDR 40, but the reservation status in the IDR 40 is changed to cancelled (block 218). Thereafter, the notification runbook process 58*f* is initiated and a cancel reservation notification is sent (block 220) to conference contacts, who may be pre-defined for the user, and the routine terminates.

If a user desires to completely delete and erase a conference from IDR 40, the user initiates the delete conference runbook process by actuating the delete button 601 (FIG. 32L) where the user has determined that it desires to delete a conference in the IDR 40 via the user interface 36 (block 222 in FIG. 12E). The user interface 36 loads a delete reservation popup 603 (FIG. 32L) at block 224 and the user confirms the delete reservation request at block 226. The reservation is then removed from the IDR 40 (block 228) and the process terminates.

Figure 34A:
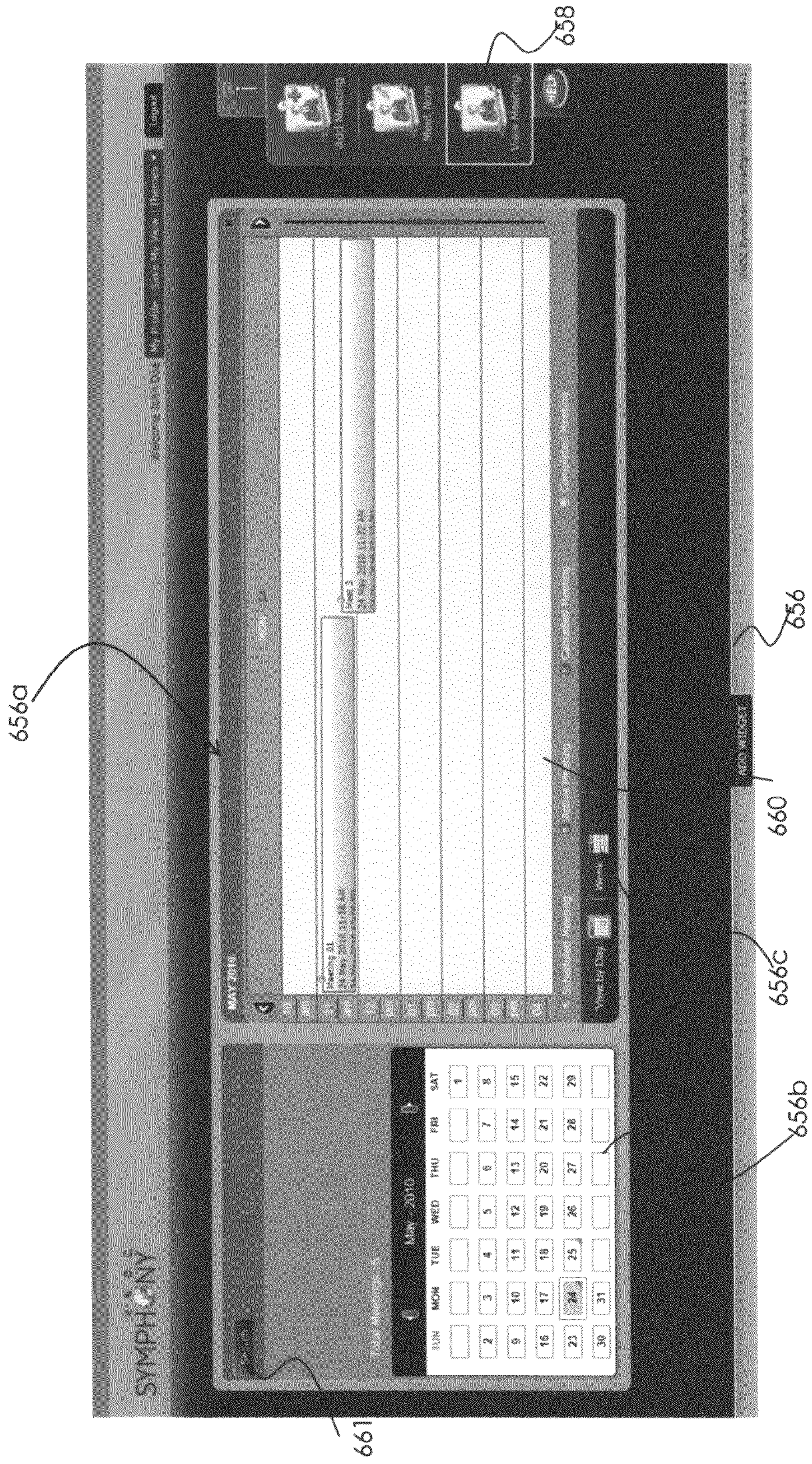
FIGS. 34A-34D illustrate still another embodiment providing web-based interfaces showing information regarding scheduled conferences.
Figure 34B:
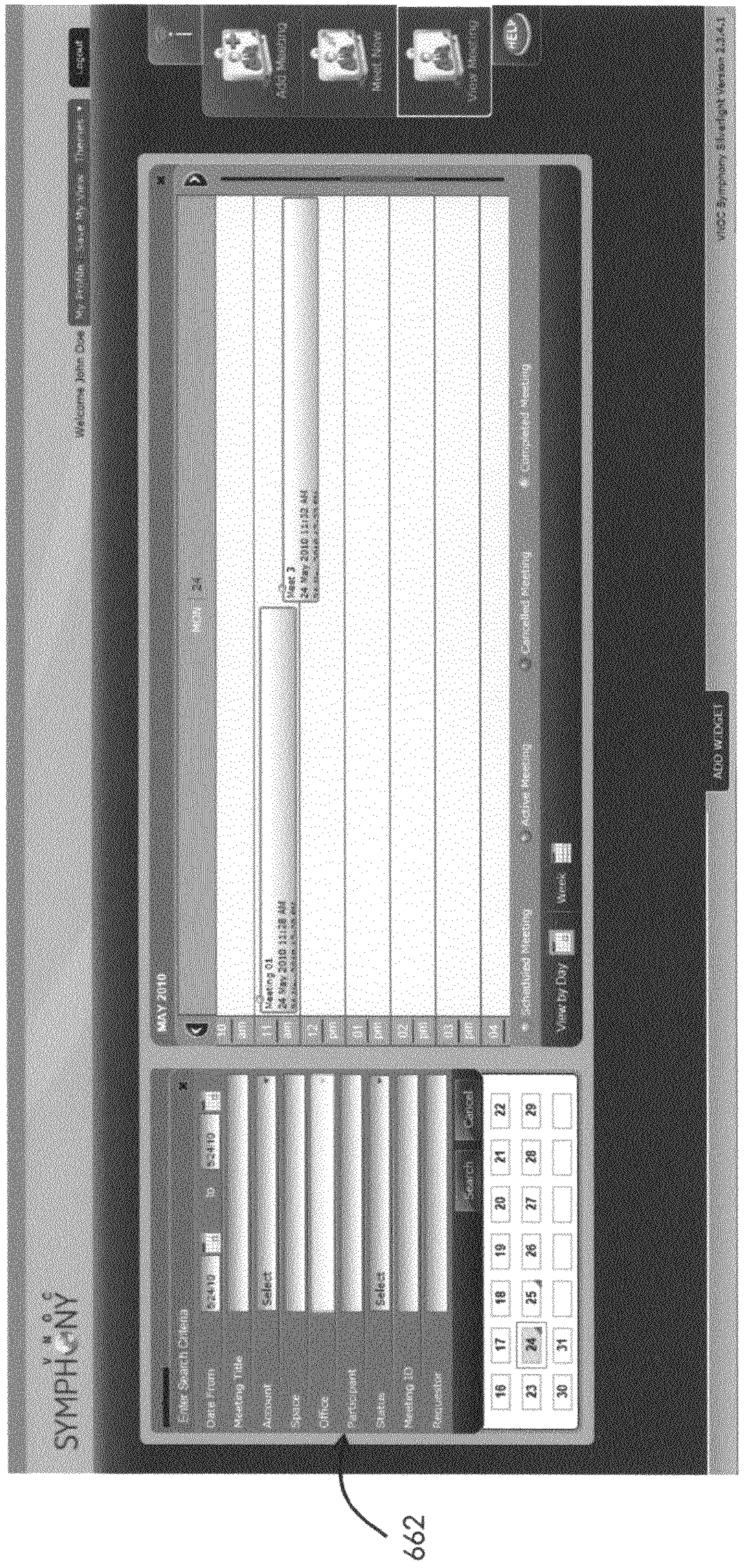

Referring now to FIG. 12F, a user may wish to find or locate a previously reserved conference in which case a find conference runbook process is initiated at block 230 where the user wishes to find an existing reservation using the user interface 36. At block 232, the user interface 36 loads a find reservation graphical user interface 656 (FIG. 34A). The user actuates an electronic view meeting button 658 whereupon the area 656*a* of the interface 656 is populated with an electronic calendar 660. It should be understood that the ACMCE 38 defaults to loading the calendar 660 with the current month and day. After the calendar 660 is loaded in area 656*a*, the user may change the graphical user interface view from, for example, a date view to a week view by actuating the week icon 656*c* (FIG. 34A) located beneath the electronic calendar 660. In the area 656*b*, note that the user can electronically select a different day or a different month for viewing the meetings scheduled for that day and month.

Figure 34C:
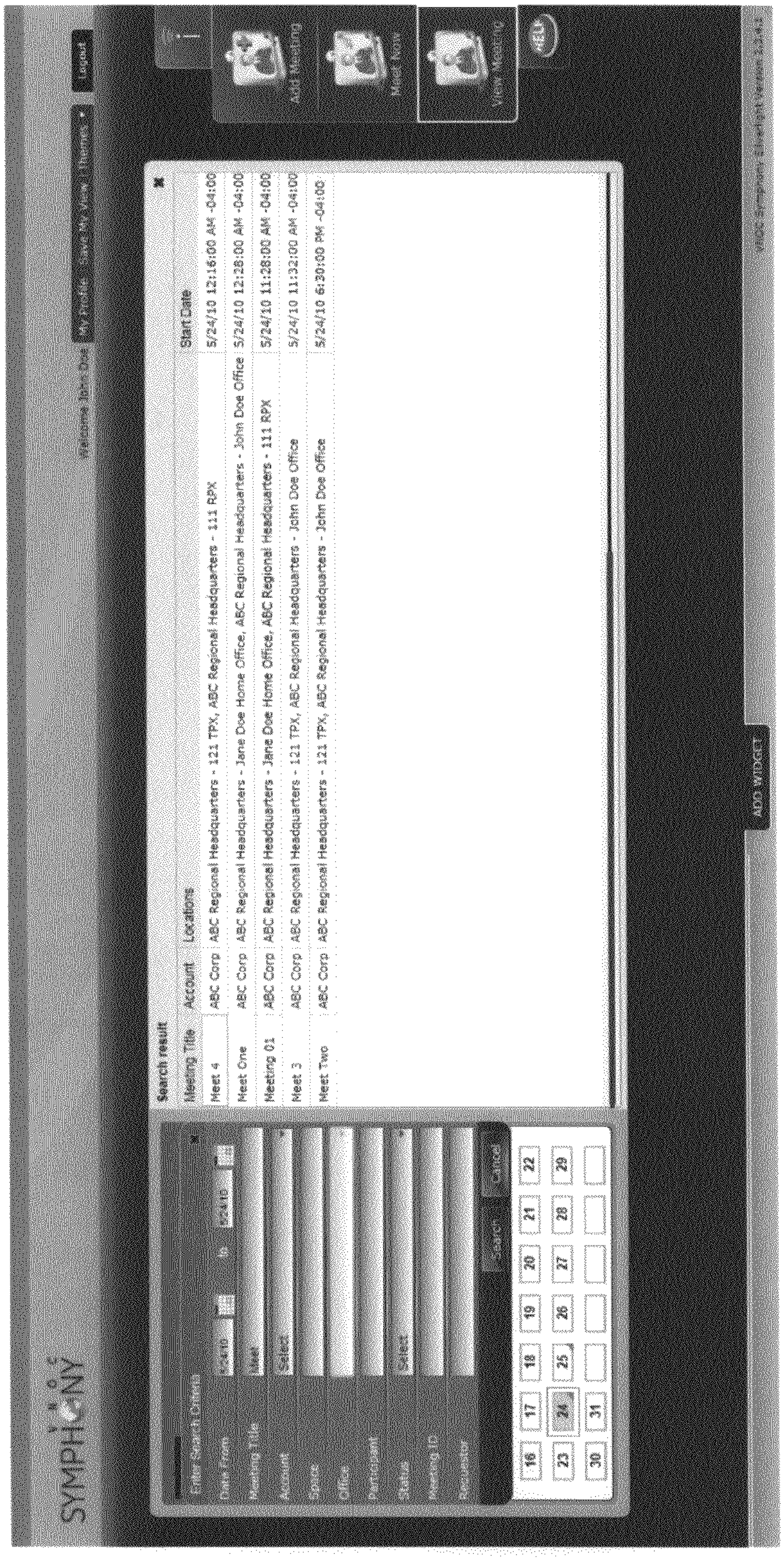
Figure 34D:
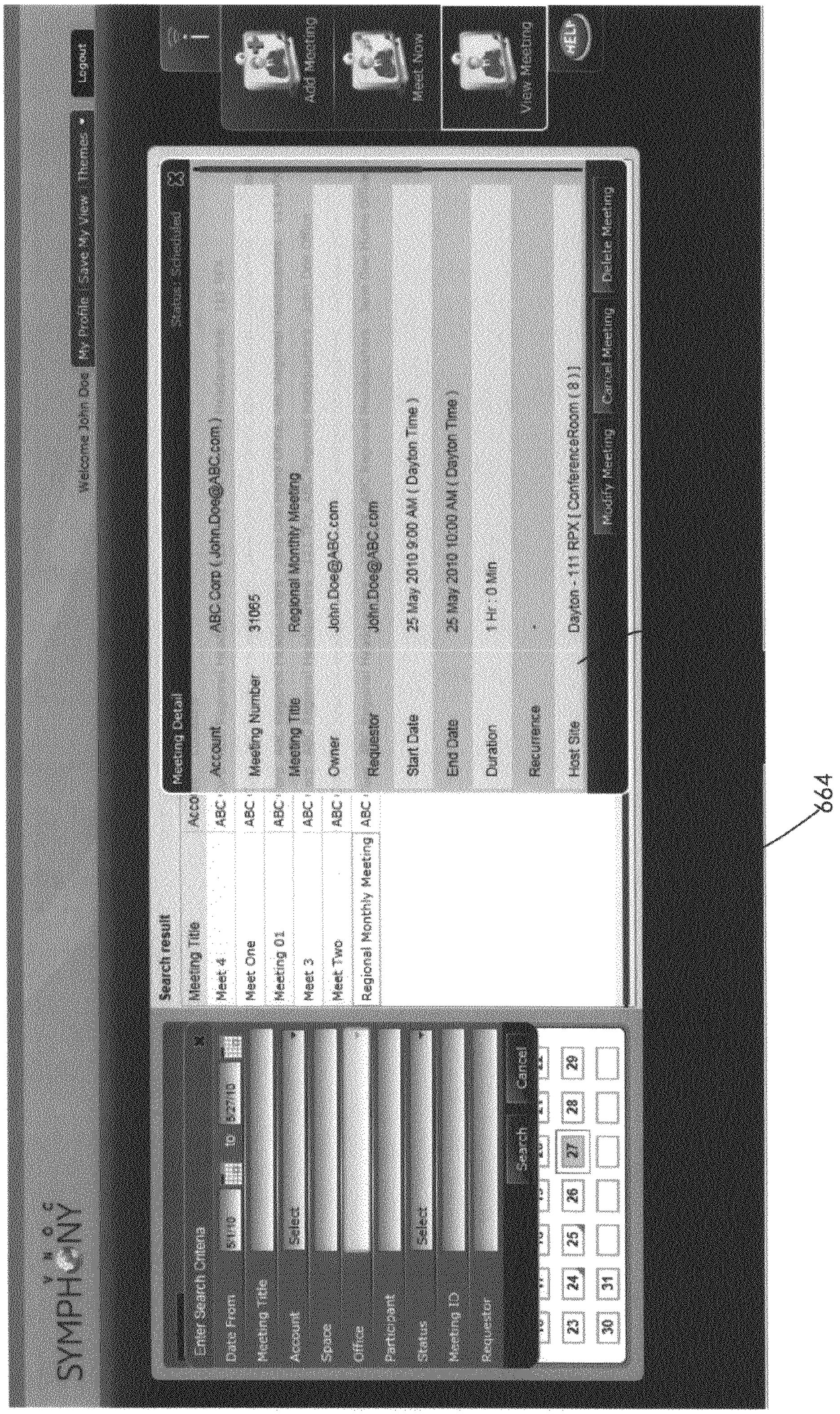

If the user wishes to find a previously reserved conference, the user may actuate a search button 661. Once actuated, a search form 662 (FIG. 34B) is presented to the user with activities 60 required to load or find a previously reserved conference. Referring back to FIG. 12F, the user inputs (block 234) the find conference data, which may include but not be limited to an email address a conference identification number, a conference title, the conference terminals 14-28, desktops 32 and gatekeepers 34 that were scheduled, conference date range, conference participants, who may be at the same location or remote, or the like. The user interface 36 sends data that the user has input via user interface 36 to the ACMCE 38 for processing by ACMCE 38 at block 236. At block 238, the ACMCE 38 queries the IDR 40, which returns data to the user interface 36 in response to the query by the ACMCE 38 as shown in FIG. 34C at area 664. This data would, in one illustration, include details regarding the conference, such as conference start time, duration, terminals 14-28, desktops 32 and gatekeepers 34, requester or initiator of the conference and the like as shown in FIG. 34C. Referring now to FIGS. 34A and 34C, after the calendar 660 is loaded in the area 656*a* shown in FIG. 34A, the user may select one or more of the meeting times by actuating one of the graphically shown meetings, whereupon the statistics associated with the meeting will be shown at area 664 in FIG. 34D. After the search criteria is loaded in the area 662 shown in FIG. 34C, the user may select one or more of the meeting times by actuating one of the graphically shown meetings, whereupon the statistics associated with the meeting will be shown at area 664 in FIG. 34D.

Figure 35A:
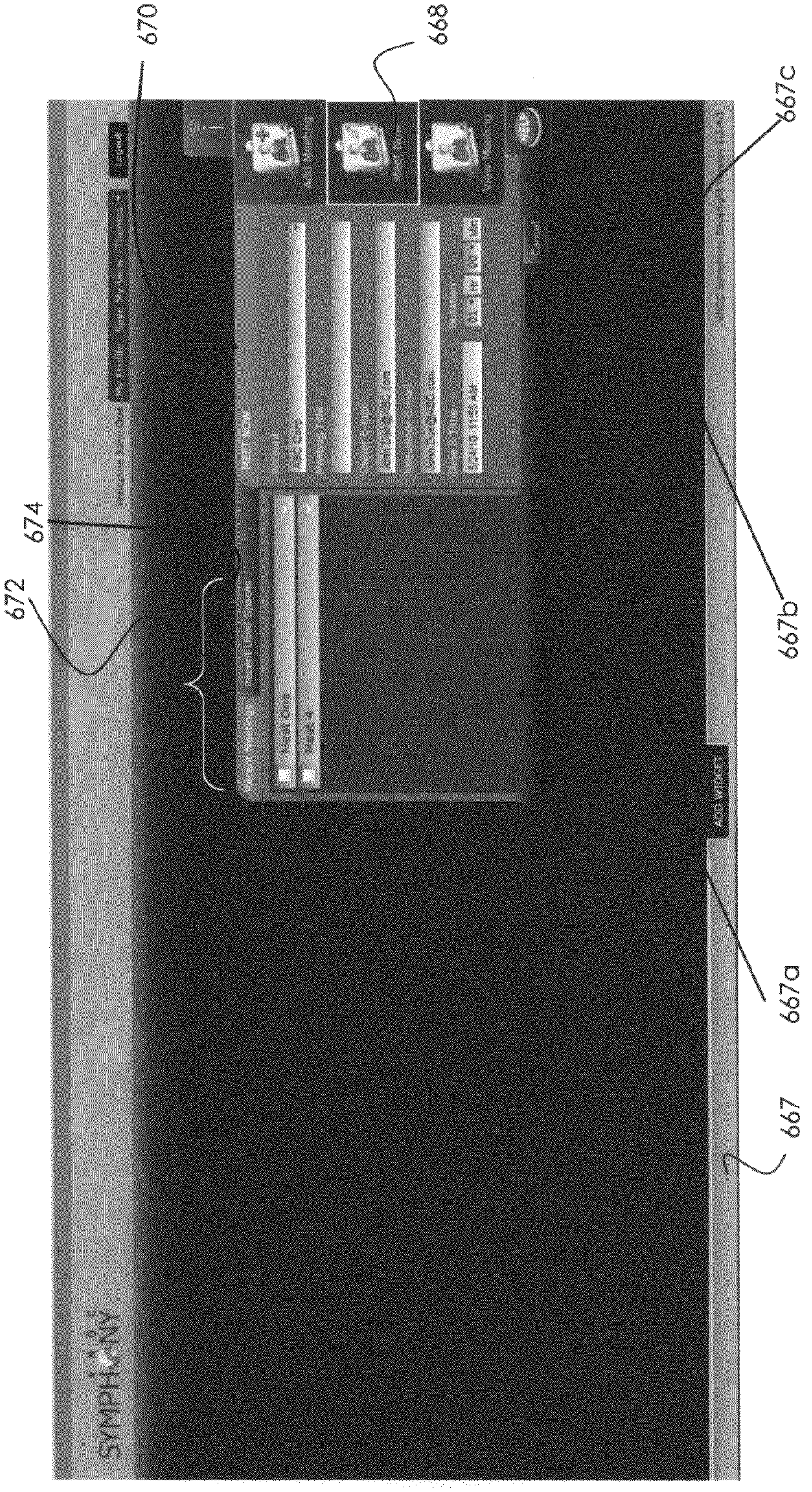
FIG. 35A and FIG. 35B illustrated further user interfaces utilized during an impromptu meeting.
Figure 35B:
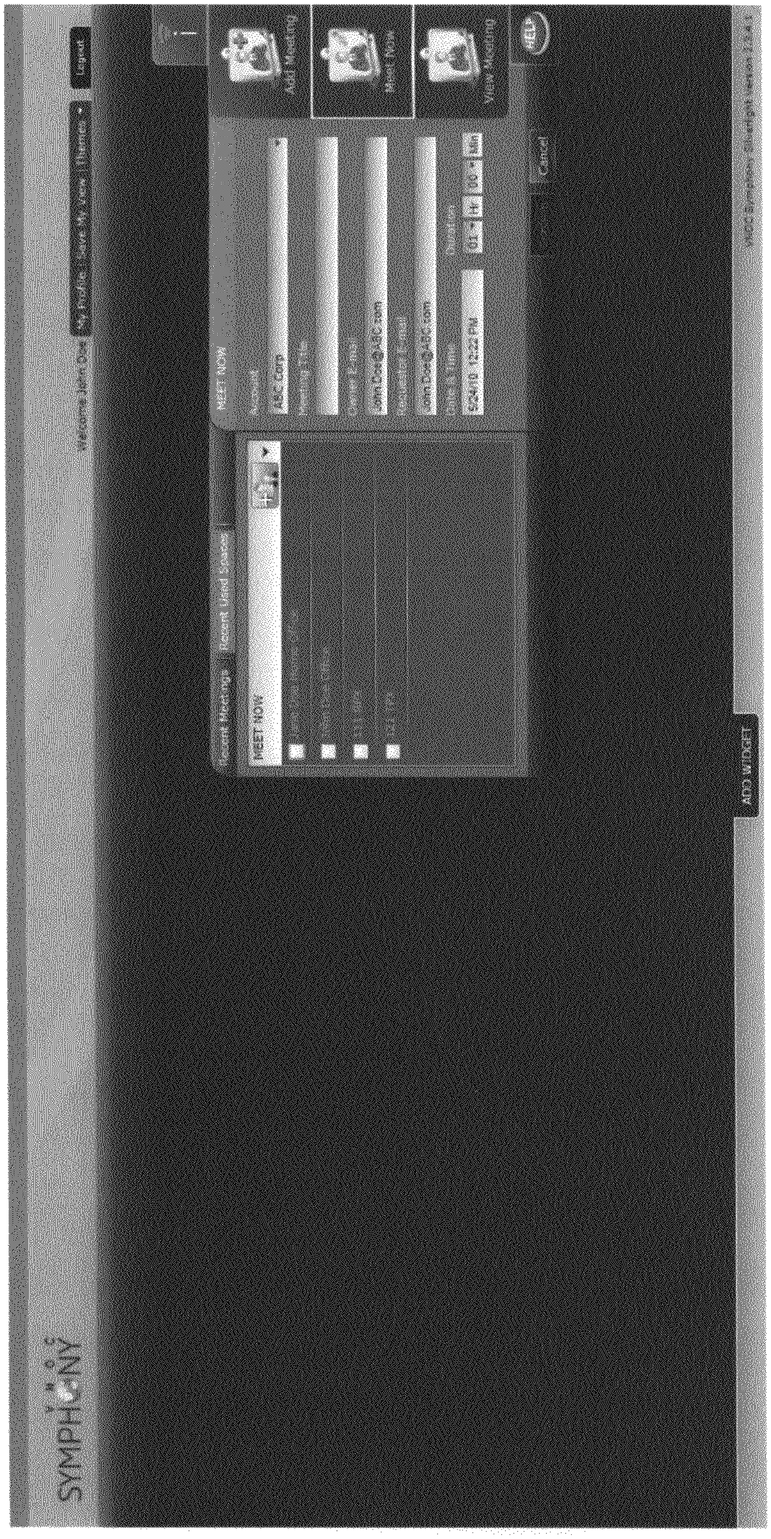

In one illustration illustrated in FIG. 35A, the user interface 36 may comprise a quick launch GUI 667. If the user actuates the meet now electronic button 668, the user will be presented with fields 670 that provides with the express scheduling form 672 whereupon the user can enter data to immediately an impromptu meeting. The user interface will also comprise history data at the area 672 that provides the user with a listing of the user's last ten meetings in IDR 40 which the user may select and which will automatically populate and replicate the information associated with that meeting into the fields 670. Note that the user may also select history information for recently used geographic areas 674, whereupon the area 667*a* of the interface 667 will be populated with information regarding the terminals and the conference participants as shown in FIG. 35B.

Once the user has entered the required information, either manually or automatically through the selecting a recent meeting or a recently used terminal or participant, the fields 670 are populated, the user may then confirm an impromptu or immediate launch of the meeting by selecting 667*b* whereupon the ACMCE 38 will immediately launch the meeting according to the conference start runbook process in the manner described herein. Of course, the user can also cancel the meeting request by actuating the cancel meeting button 667*c*.

Figure 13:
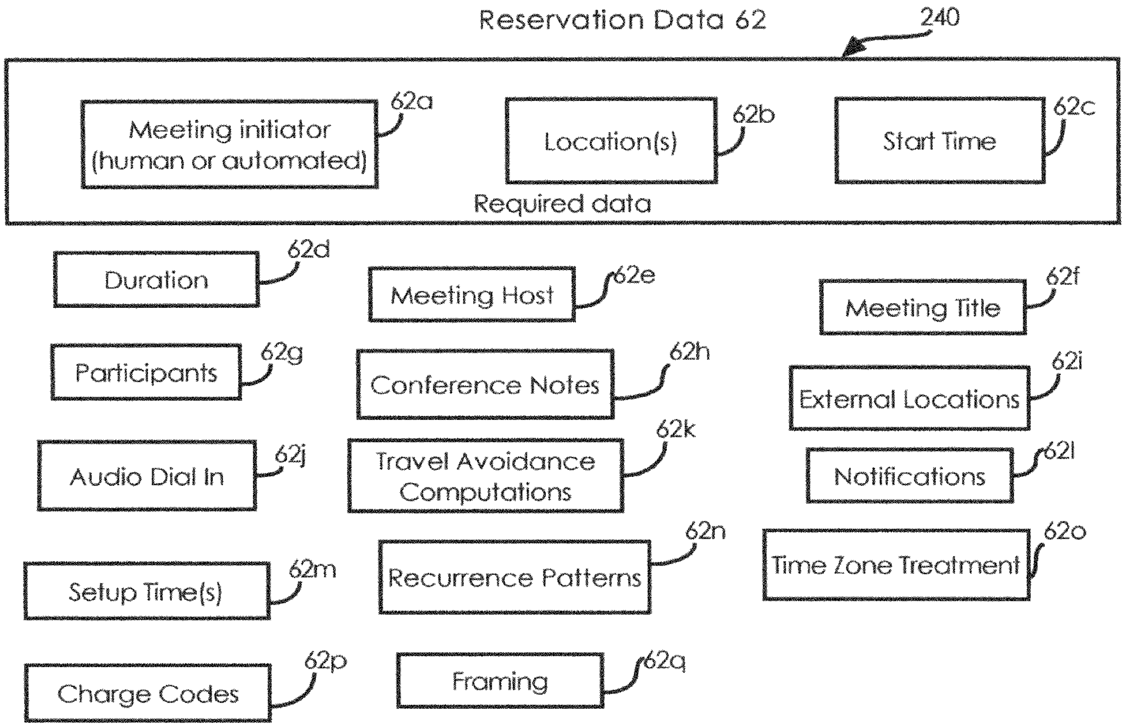
FIG. 13 is a schematic view of reservation data used in accordance with one embodiment of the invention.

Referring to FIG. 13, a schematic of a plurality of reservation or scheduling data 240 that are defined by the scheduling runbook process and presented to the user via the ACMCE 38 via user interface 36 are shown. In the illustration, the user provides data 62 for each of the required data fields 62*a*-62*c* and any of the optional data that is presented to the user as part of the scheduling runbook process 58*d*. The required scheduling runbook process data includes a meeting initiator, an identification of at least one or more of the plurality of terminals 14-28, desktops 32 and gatekeepers 34 that will be participating in the conference, and a start time. In the illustration, therefore, the scheduling runbook process 58*d* will require the user provide data 62 regarding the meeting initiator (i.e., an identification of the person or enterprise system 44 initiating the conference), the identification of at least one or a plurality of the terminals 14-28, desktops 32 and gatekeepers 34 that will be participating in the conference and a start time (e.g., an identification of the start date and start time).

FIG. 13 also illustrates a plurality of optional data 62*d*-62*q* that comprise a duration time 62*d*, a meeting host 62*e*, a meeting title 62*f*, participants 62*g*, conference notes 62*h* for providing notes about the conference, external locations 62*i* that will be included in the conference, an audio dial-in number 62*j* that presents one or a plurality of other users to join the conference telephonically, a travel avoidance computation 62*k* that provides information to the user relative to return on investments or carbon offsets to name a few, an option for notification 62*l* about the conference such as email, a setup time(s) 62*m*, a recurrence pattern 62*n*, a time zone treatment 62*o* that provides conference information relative to the time zone(s) in the conference, a charge or billing code 62*p* and/or conference framing options 62*q* which enable the user to select specific conference layout templates that will be used during the conference. It should be understood that the system and method permit automated billing to at least one billing entity which can be a different entity other than either the user who is scheduling meetings or the entity or user who set up or adapted the system 10 for use with the entity or user's organization.

Figure 14:
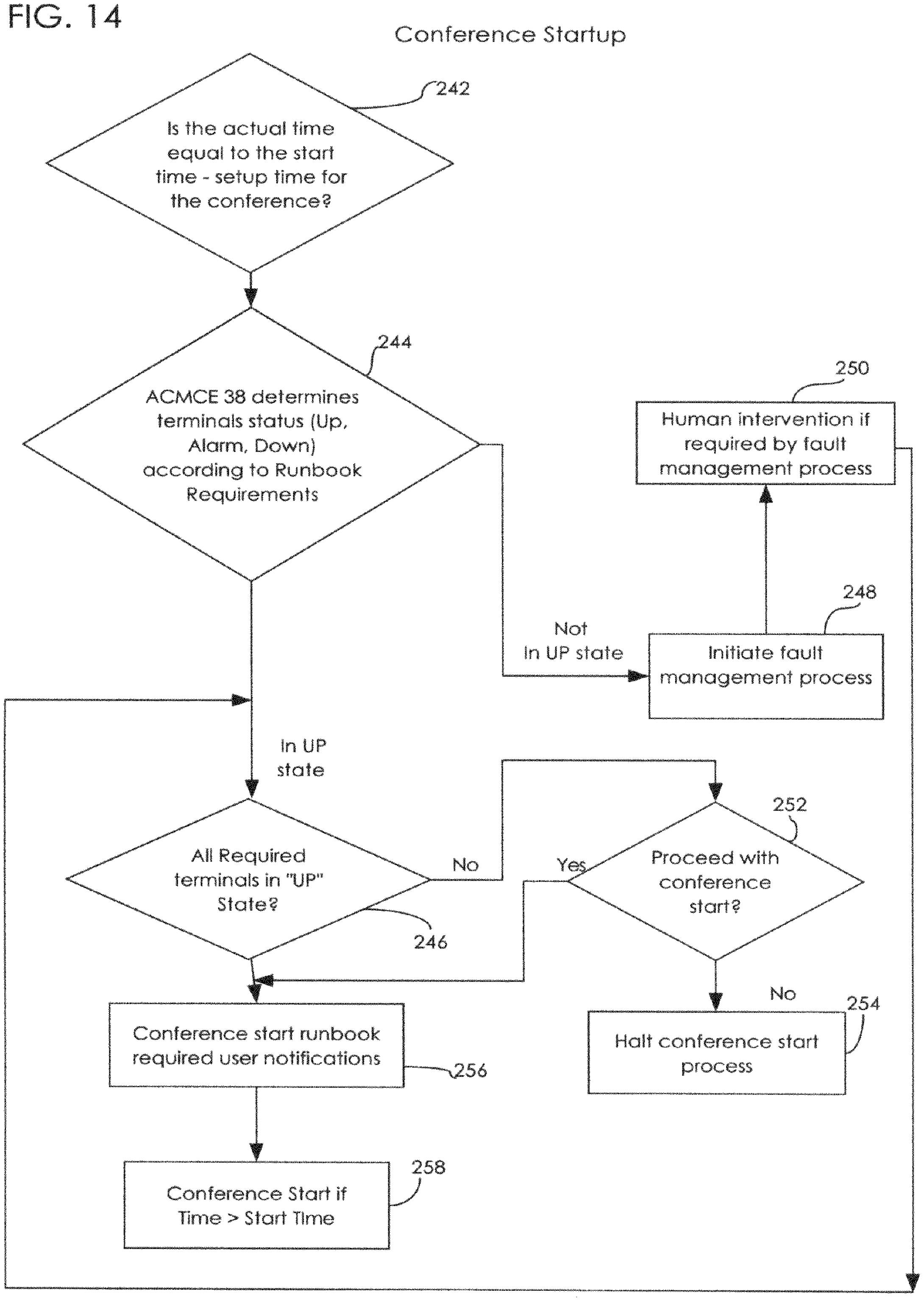
FIG. 14 is a schematic view of a conference start up runbook process in accordance with one embodiment of the invention.

Referring now to FIG. 14, a conference startup runbook process, which is part of conference management runbook process 58 is shown schematically. The OPL 46 observes the start time (block 242 in FIG. 14) and initiates or launches a conference startup process in the ACMCE 38 if the actual time is equal to the start time. At block 244, the ACMCE 38 determines the status of the required terminals 14-28, desktops 32 and gatekeepers 34. If it is determined at decision block 244 that the terminals 14-28, desktops 32 and gatekeepers 34 are operative and running or "up", then the routine proceeds to block 246 as shown. If it is determined at decision block 244 that the terminals 14-28, desktops 32 and gatekeepers 34 are not up, then the fault management process (block 248) is engaged, as shown later herein relative to FIG. 18, until an up status is obtained. If required by the fault management process, human intervention may be engaged (block 250). After block 250, the conference startup runbook process proceeds to decision block 246 where it is determined whether all the required terminals 14-28, desktops 32 and gatekeepers 34 are in the up state. If they are not, the process proceeds to block 252 whereupon the conference startup runbook determines whether or not the conference startup will proceed with terminals 14-28, desktops 32 and gatekeepers 34 that are in an up state. Otherwise, if the conference startup process is such that the conference startup process is not provisioned to continue unless all terminals 14-28, desktops 32 and gatekeepers 34 are in an up state, then the conference startup process will terminate (block 254). As illustrated in block 256, notifications about the conference may be displayed to the user dependent upon the user's runbook process for notification, such as by electronic mail (email), audible alert, sms messaging. At block 258, the terminals 14-28, desktops 32 and gatekeepers 34 are connected by the ACMCE 38 and the conference started at the designated start time.

Figure 15:
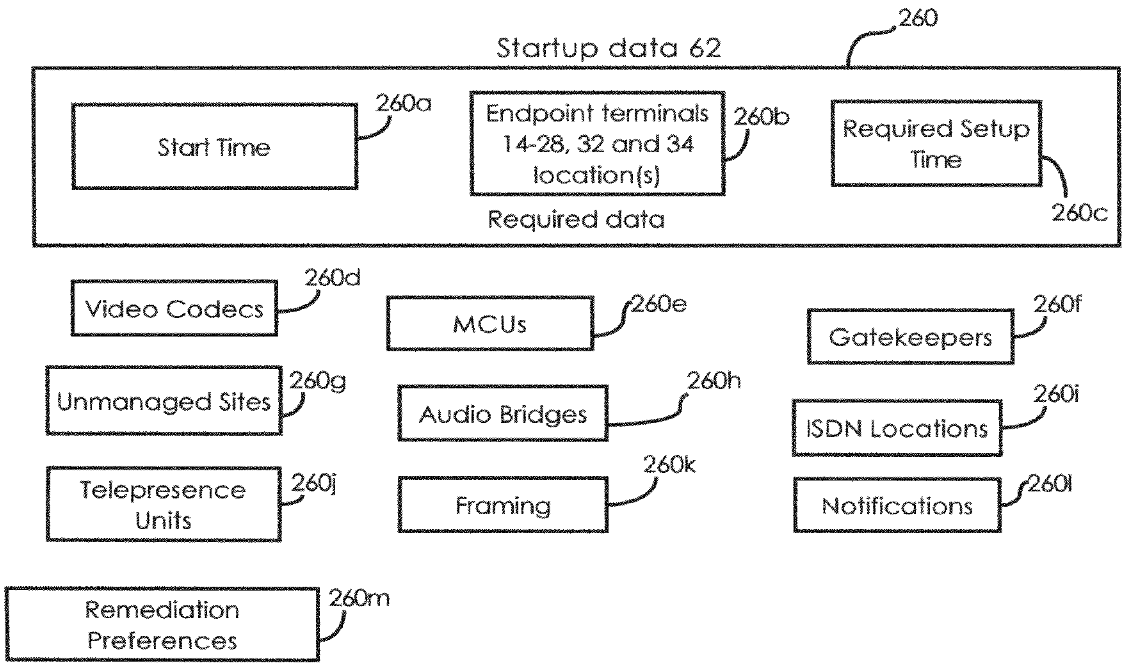
FIG. 15 is a schematic view of start up data used in accordance with one embodiment of the invention.

FIG. 15 illustrates the startup data required by or associated with the startup runbook processes. In this illustration, note the start time data 260*a*, endpoint location data 260*b* and required setup time 260*c* are required. The other activities 260*d*-260*n* shown in FIG. 15 and comprise video codecs 260*d*; MCUs 260*e*, gatekeepers 260*f*, unmanaged sites 260*g*, telepresence units 260*j*, framing 260*k*, notifications 260*l*, remediation preferences 260*m*, audio bridges 260*h*, ISDN locations 260*i*.

Figure 16:
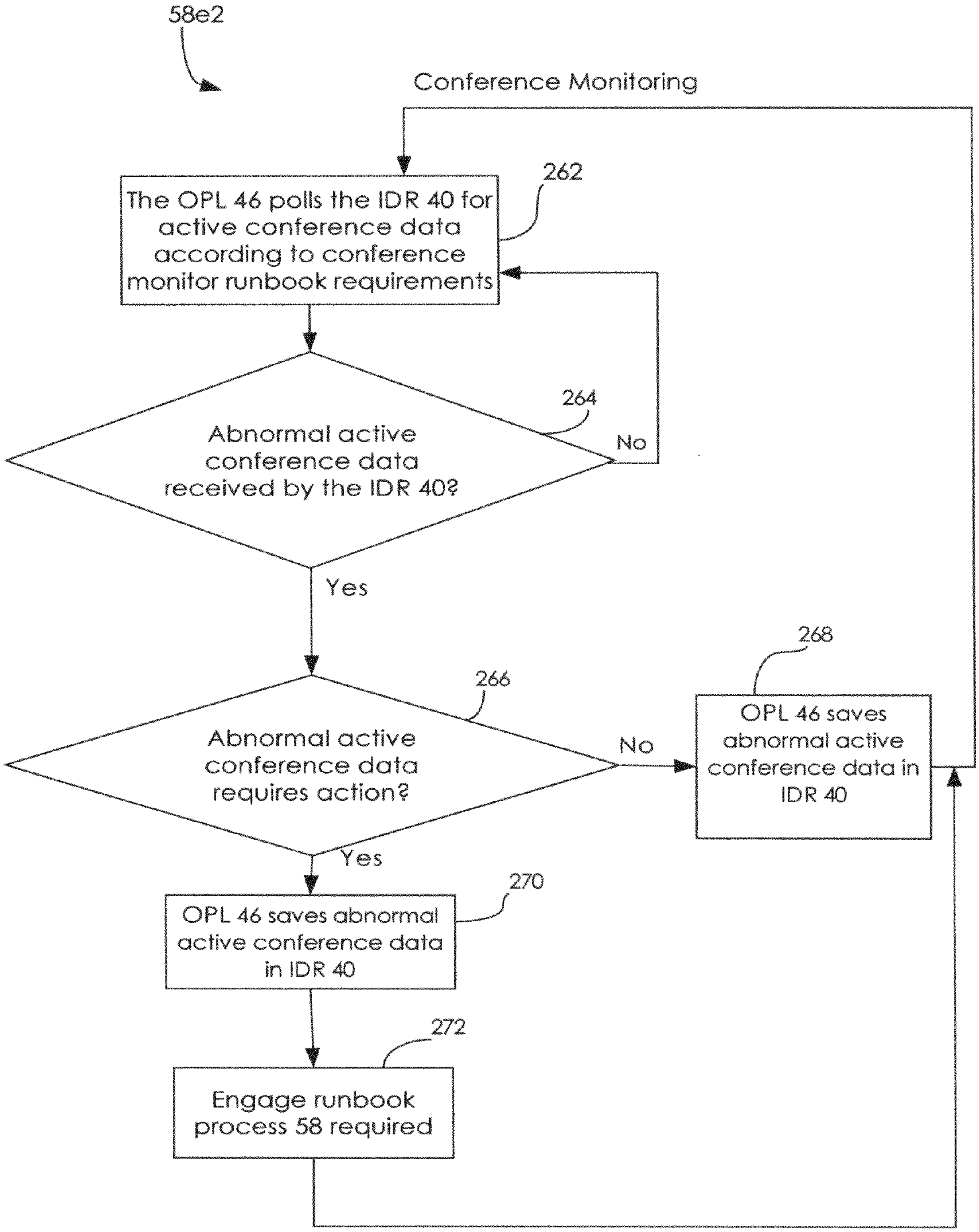
FIG. 16 is a schematic view of a conference monitoring runbook process in accordance with one embodiment of the invention.

FIG. 16 illustrates the conference monitoring runbook process 58*e*2. During conference monitoring, the enterprise system 44 sends active conference data or statistics for the terminals 14-28, desktops 32 and gatekeepers 34 to the ACMCE 38 through the outlets 64. The ACMCE 38 sends the conference data 62 to the IDR 40. Referring now to block 252, the OPL 46 polls the IDR 40 for active conference data. If abnormal active conference data is received by the IDR 40 (block 264), the routine proceeds to block 266 whereby a decision is made as to whether the abnormal active conference data requires action. If the decision at decision block 266 is negative, the OPL 46 saves the abnormal conference data in the IDR 40 and the routine returns to block 262. If the abnormal active conference data requires action, then the OPL 46 saves the abnormal conference data in the IDR 40 as shown in block 270 and engages at least one or a plurality of runbook processes 58 as shown in block 272. For example, the runbook processes 58 that could be engaged are engagement of the fault management process 58*i*, engagement of the escalation process 58*g* and/or engagement of the remediation process 58*h*. After the OPL 46 engages the required runbook process, the routine returns to block 262.

Figure 39A:
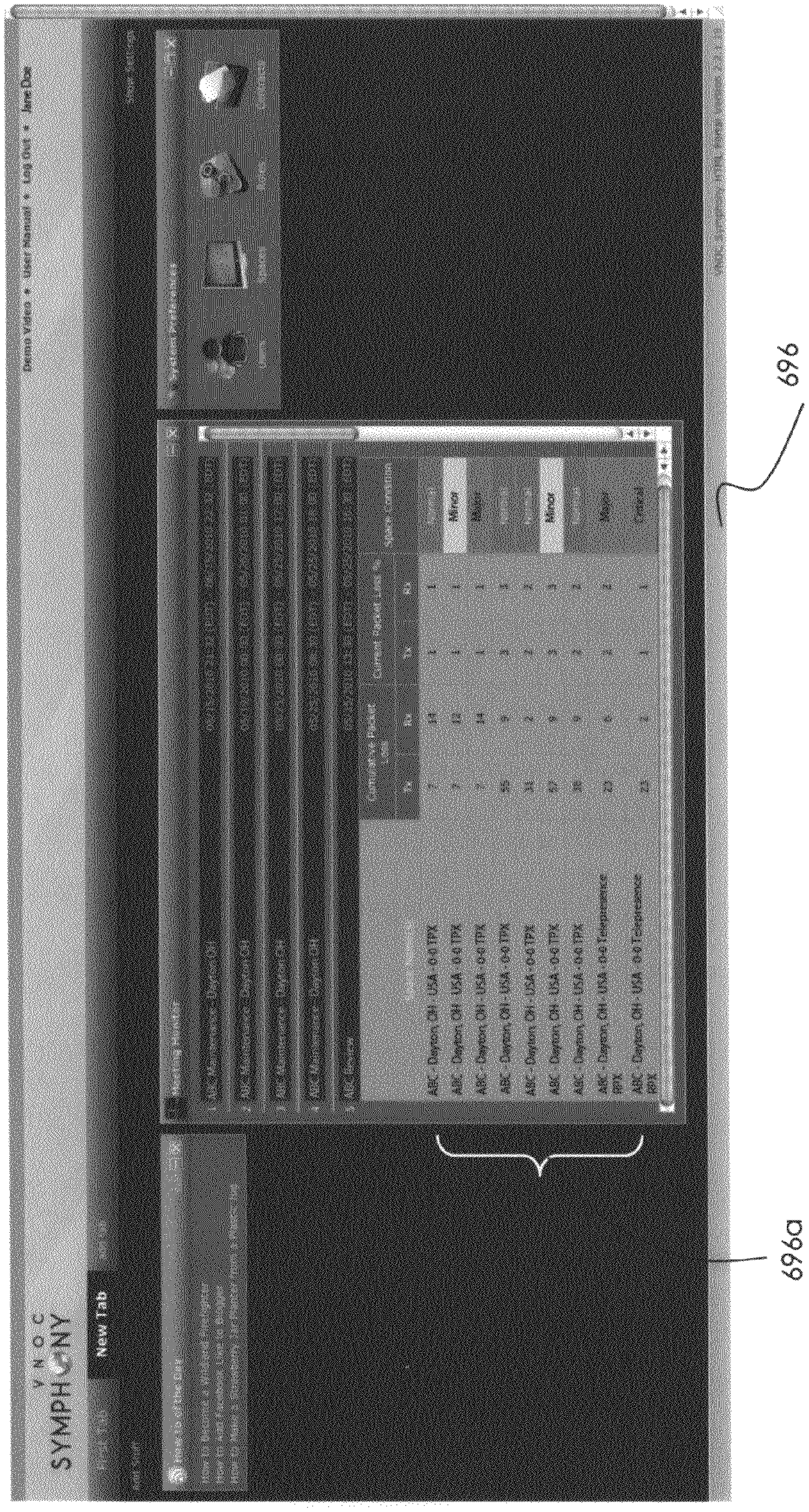
FIG. 39A-FIG. 39B are web-based, illustrative graphical user interfaces showing the monitoring of ongoing conferences and the condition of the conferences in accordance with one embodiment of the invention.

FIG. 39A illustrates a meeting monitor user interface 696 available to a user based upon the user's role or rights and used during the monitoring process 58*e*2. The meeting monitor user interface 696 may be accessed by the user via at least one or a plurality of the user entry points 66, such as a web portal user interface 66*a*, which will be used in the illustration relative to FIGS. 39A and 39B. Note that interfaces 696 and 698 in FIG. 39A-39B, respectively, illustrate the various meetings that are currently in progress and provides monitoring information 696*a* relative thereto, such as any data packet loss resulting from data exchanged between meeting participants, the current fault or no fault condition of the space, such as whether there is a critical fault, whether there is a minor fault, whether there is normal operation or the like. Of course, other types of status information may be presented to the user regarding the meeting using the interfaces 696 and 698. In response to the information, the user may investigate one or more faults, such as one or more of the faults identified as being critical, engage an immediate escalation and fault remediation process by human intervention.

Figure 39B:

It should be understood, however, that while the information provided by meeting monitor user interfaces 696 and 698 can be used by the user for fault remediation, the system 10 is also automatically engaging the fault management runbook process 58*i* as described herein relative to the fault management runbook process 58*i*. The meeting monitor user interface 698 shown in FIG. 39B shows a graphical representation of conferences that are within their scheduled set up and/or in process. It should be understood that the setup start time is predetermined time, such as immediately prior time, during which the system 10 establishes the start of the meeting between or among a plurality of the terminals 14-28, desktops 32, and gatekeepers 34 scheduled to participate in the conference. Note that the ACMCE 38 sends to the user interface 698 visual indicia, such as color coding, illustrating, for example, meetings that should be connected but that are not (shown in red in the first two lines of listing in 698 in FIG. 39B), meetings that are after the setup start time but before the start time (highlight in yellow in 698) that should be connected but are not. Normally, where proper connections have occurred, then no color indicia of any fault is indicated as illustrated by the third, fifth lines of listing in interface 698 in FIG. 39B.

Figure 17:
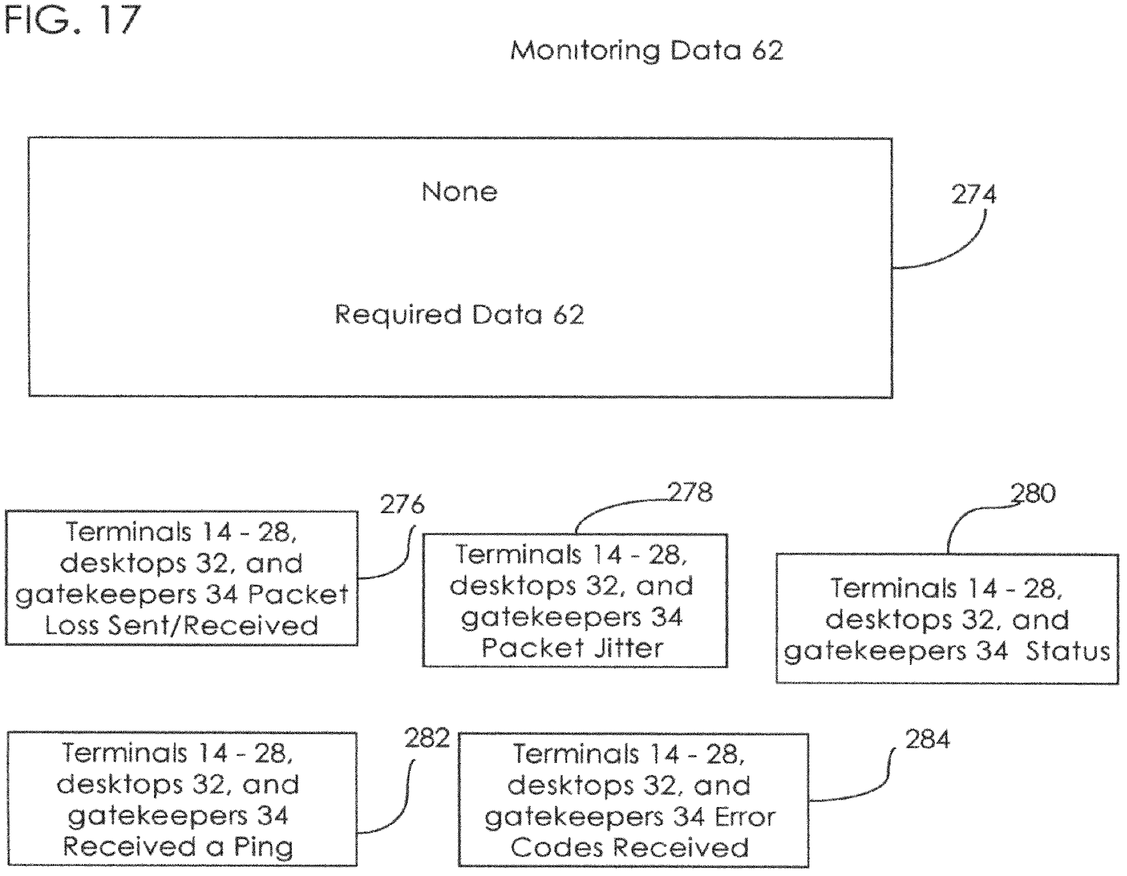
FIG. 17 is a schematic view of the monitoring data in accordance with one embodiment of the invention.

FIG. 17 schematically illustrates the monitoring data associated with the monitoring runbook process 58*e*2. As noted at block 274, there is no required data associated with the monitoring runbook process 58*e*2. However, as noted in the illustration, optional data includes terminals 14-28, desktops 32, and gatekeepers 34 packet loss sent/received 276, terminals 14-28, desktops 32, and gatekeepers 34 packet jitter 278, terminals 14-28, desktops 32, and gatekeepers 34 status 280, terminals 14-28, desktops 32, and gatekeepers 34 received a ping 282, terminals 14-28, desktops 32, and gatekeepers 34 error codes 284 received.

Figure 18:
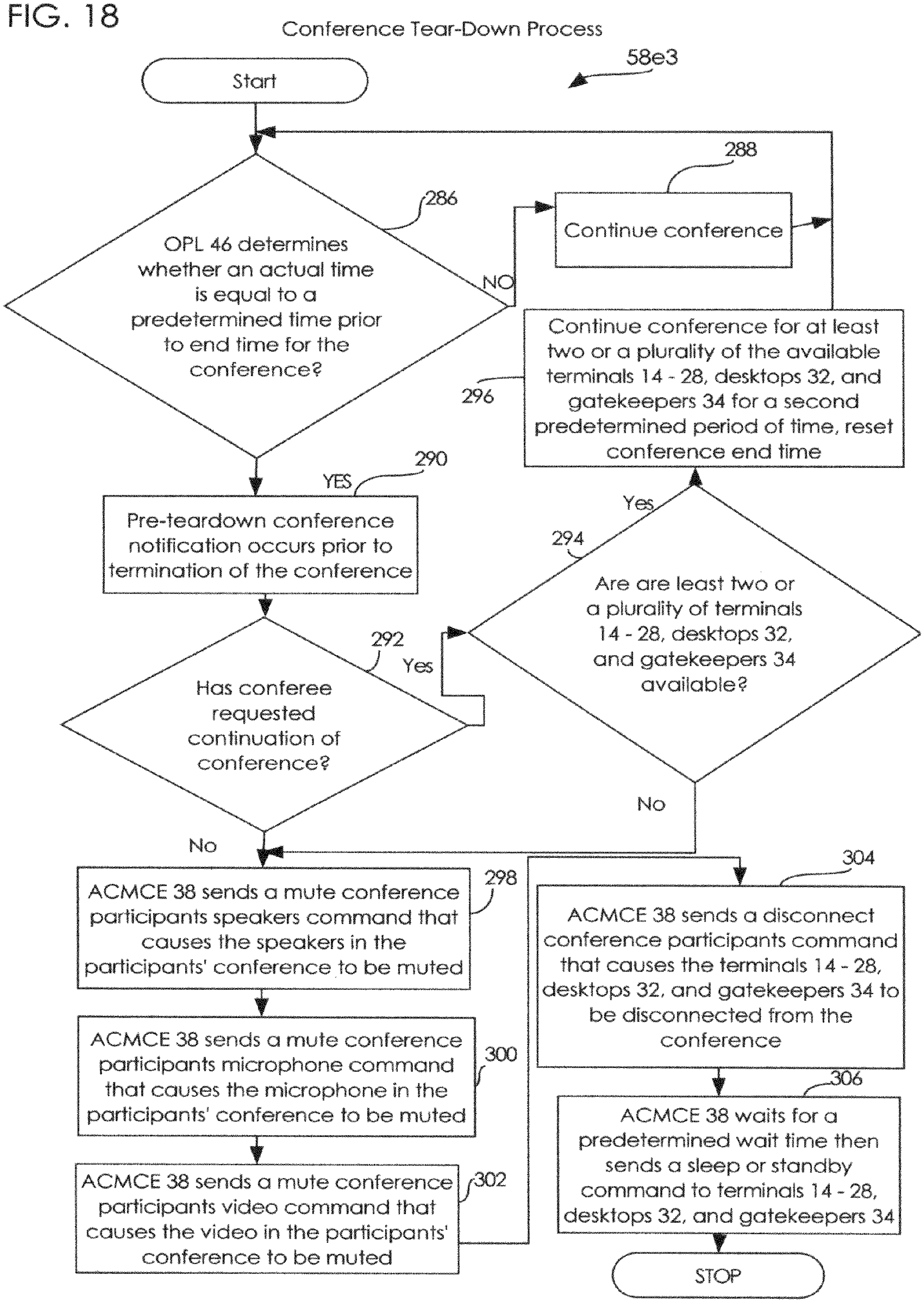
FIG. 18 is a schematic view of a tear-down runbook process in accordance with one embodiment of the invention.

FIG. 18 is an illustration of a conference tear-down runbook process 58*e*3. The process begins at decision block 286 where the OPL 46 determines whether an actual time is equal to a predetermined time for the conference. If it is not, then the termination of the conference is not required and the conference continues (block 288) and loops back to 286 as shown. If the actual time is equal to a predetermined time for the conference, then the routine proceeds to provide a pre-teardown conference notification prior to the termination of the conference at block 290. This notification may, for example, be an audible or visual notification to the conferees who are participating in the conference that the conference is about to terminate within a few minutes. The routine proceeds to decision block 292 where it is determined whether the conferee has requested continuance of the conference. If the conferee has requested continuance, then the routine proceeds to block 294 where the ACMCE 38 determines there exists at least two or a plurality of terminals 14-28, desktops 32 and gatekeepers 34 available. If such terminals are available, then the routine proceeds to block 296 where the conference is continued for a second predetermined time in which case the end time for the conference is reset and stored in the IDR 40. Thereafter, the conference continues between or among the available terminals 14-28, desktops 32 and gatekeepers 34 until the end time and the routine proceeds back to 286 as shown.

If the decisions at decision block 292 and 294 are negative, then the ACMCE 38 send (block 298) a "mute conference participants speakers" command to the terminals 14-28, desktops 32 and gatekeepers 34 that are connected in the conference, and the command causes the speakers in the participants location to be muted (block 298). The ACMCE 38 also sends (block 300) a "mute conference participants' microphone" command that causes the microphone in the participant(s) location to be muted. The ACMCE 38 also sends a "mute conference participants' video" command (block 302) which causes the video at the conferees location to be muted.

At block 304, the ACMCE 38 sends a disconnect conference participants command that causes the terminals 14-28, desktops 32, and gatekeepers 34 to be disconnected from the conference. The ACMCE 38 then waits a predetermined wait time before it sends a "sleep" or "standby" command to the terminals 14-28, desktops 32 and gatekeepers 34 that participated in the conference (block 306). The standby or wait command causes the terminals 14-28, desktops 32 and gatekeepers 34 to go into a standby or wait mode. Thereafter, the routine terminates.

Figure 19:
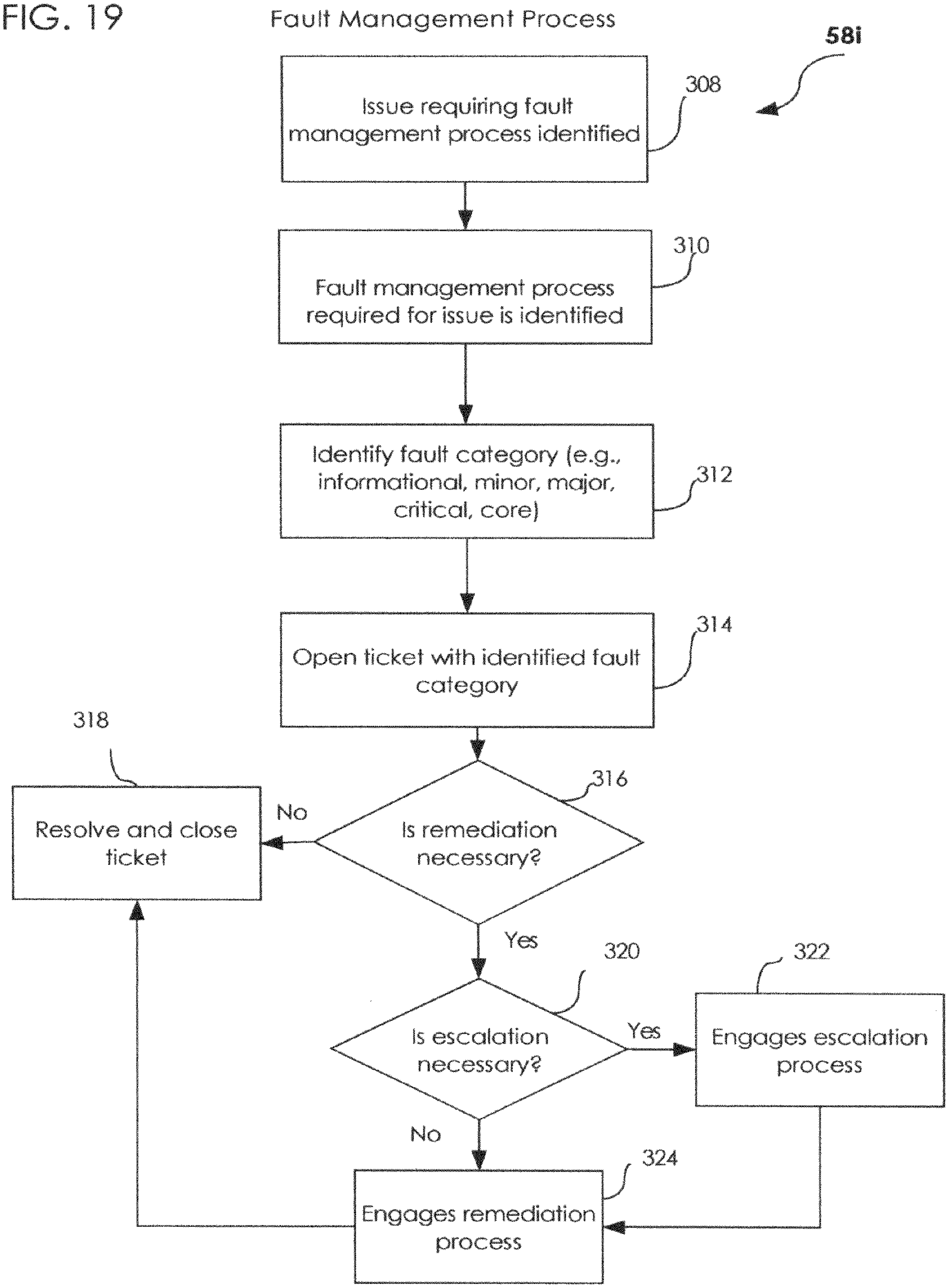
FIG. 19 is a schematic view of a fault management runbook process in accordance with one embodiment of the invention.

FIG. 19 illustrates the fault management runbook process 58*i*. The process begins where an issue or fault requiring fault management is identified (block 308) by the ACMCE 38 in response to at least one or a plurality of the runbook processes 58 identifying such issue or fault. The process identifies the issue (block 310) and then categorizes the criticality of the issue as, for example, minor, major, critical, or the like (block 312). An error or fault correction ticket (not shown) is created which is created by the fault management process so that the fault or error can be corrected. In the illustration, the ticket identifies the fault and the category and criticality of the fault (block 314). The process continues at block 316 where it is determined whether remediation of the fault is necessary. If it is not, then the fault is resolved and the ticket is closed (block 318). If remediation is necessary, then the process continues at block 320 where it is determined whether escalation is necessary and if it is then an escalation process is engaged (322). If escalation is not necessary or after engagement of the escalation process the process continues to engage the remediation process (block 324) and thereafter the issue is classified as being resolved and the ticket closed. In the illustration being described, the predetermined escalation procedure may include escalating the fault correction from, for example, a first technician level to a higher technician level, or a first correction time period to a more immediate correction time period. In any event, after the escalation process, the fault is resolved and the ticket is closed (block 318).

It should be understood that during the fault management process described relative to FIG. 19, a number of corrections may be provided to the user. These corrections may include, for example, an automatically rebooting of the terminals 14-28, desktops 32, and gatekeepers 34; rerouting or providing alternative terminals 14-28, desktops 32 and gatekeepers 34; providing an alert to the manufacturer or vendor of the terminals 14-28, desktops 32, and gatekeepers 34 that the user is using or that has the fault; providing an alert to one or more humans, such as network operation operators; or utilizing at least one or a plurality of recovery tools that are available in the enterprise system 44 for recovering from fault states, such as deleting corrupt files, reinitializing databases or storages devices and the like.

Figure 36A:
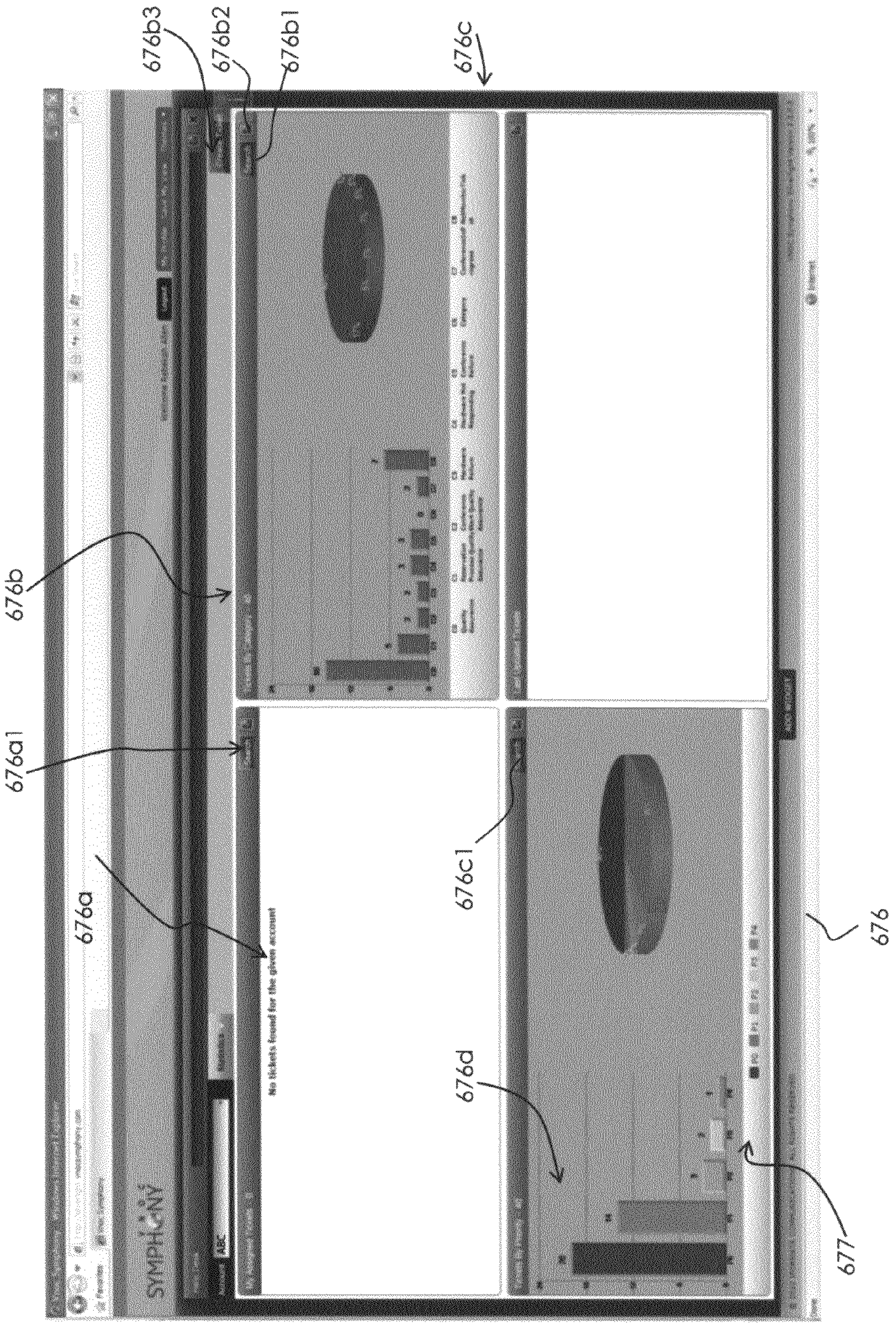
FIGS. 36A-36G illustrate various web-based fault management graphical user interfaces resulting from the use of a fault management runbook process interface for reviewing faults and error associated with the use of the system.

FIGS. 36A-36G illustrate several GUIs 676-690 that are adapted to the fault management runbook process 58*i*. In FIG. 36A, the GUI 676 comprises an area 676*a* where the user is presented with a summary of the fault tickets that have been filtered by user account (in this illustration, the user being John Doe of ABC Corp.). Note that the area 676*a*1 comprises a list of fault tickets that have been generated by the ACMCE 38. In the right hand area 676*b* of the interface 676, a graphical view or illustration of the fault tickets categorized by fault, such as conference in progress, quality assurance, as shown by the categories in the area 676*c*. Note in the lower left area 676*d* of the GUI 676 a tickets by priority is graphically shown in the area 676*d*. Note that in the area 677 the graphical views may comprise indicia, such as color codings, to indicate the severity of the fault, such as a P0, P1, P2, P3, P4 with P0 being the highest level of fault and P4 being no fault.

In the illustration shown in the areas 676*a*1 of FIG. 36A, only those fault tickets that have been updated on a particular day and by the particular person are shown; however, as indicated by the area 676*b*, a total number of fault tickets (160 in the example) have been organized by category, while the same tickets have been organized and shown in area 676*d* by priority.

Figure 36B:
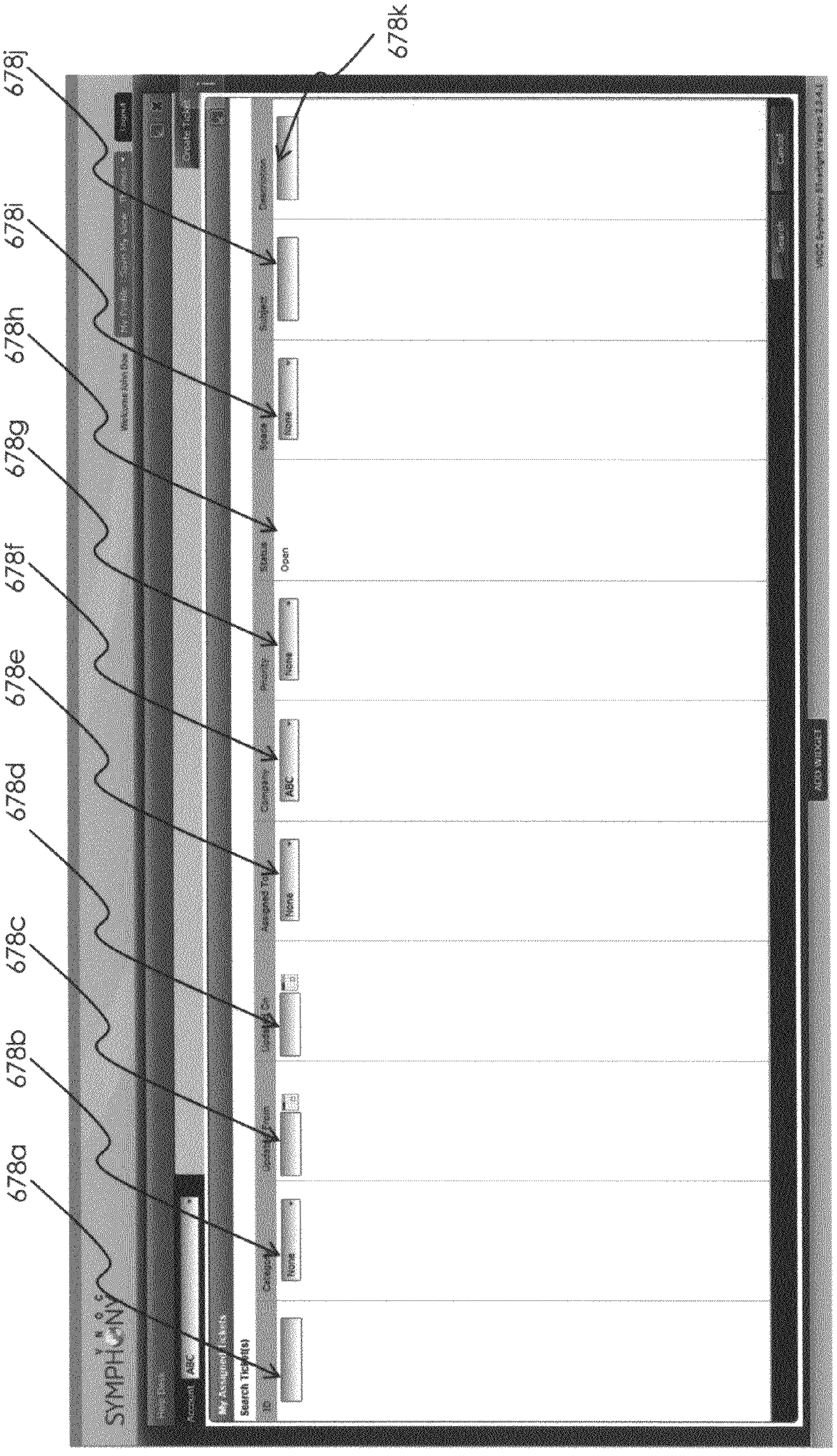

In each of areas 676*a*, 676*b*, 676*c*, an electronic search button 676*a*1, 676*b*1 and/or 676*c*1 is provided and may be actuated by the user, if the user is interested in obtaining statistics or details regarding the one hundred sixty tickets. For example, FIG. 36B illustrates a number of filters or fields that the user may use after actuating one of the search buttons to obtain information about at least one or plurality of fault tickets. In user interface of FIG. 36B, the user may actuate an "ID" button 678*a*, may select a category in field 676*b*, which categories correspond to fields in 678*b*. The user may select a date when ticket was updated 674*c*, what person the ticket is assigned to for addressing the fault 678*e* that a ticket could be correlated to 678*f*, a priority of fault 678*g*, a status of ticket 678*h*, a geographic space 678*i* where the fault occurred, a subject 678*j*, or even a description 678*k*. Thus, it should be understood that the search feature enables the user to locate and organize faults by any one or more of the fields located in 678*b*. Of course, fewer, more or other fields may be provided as well.

Figure 36C:
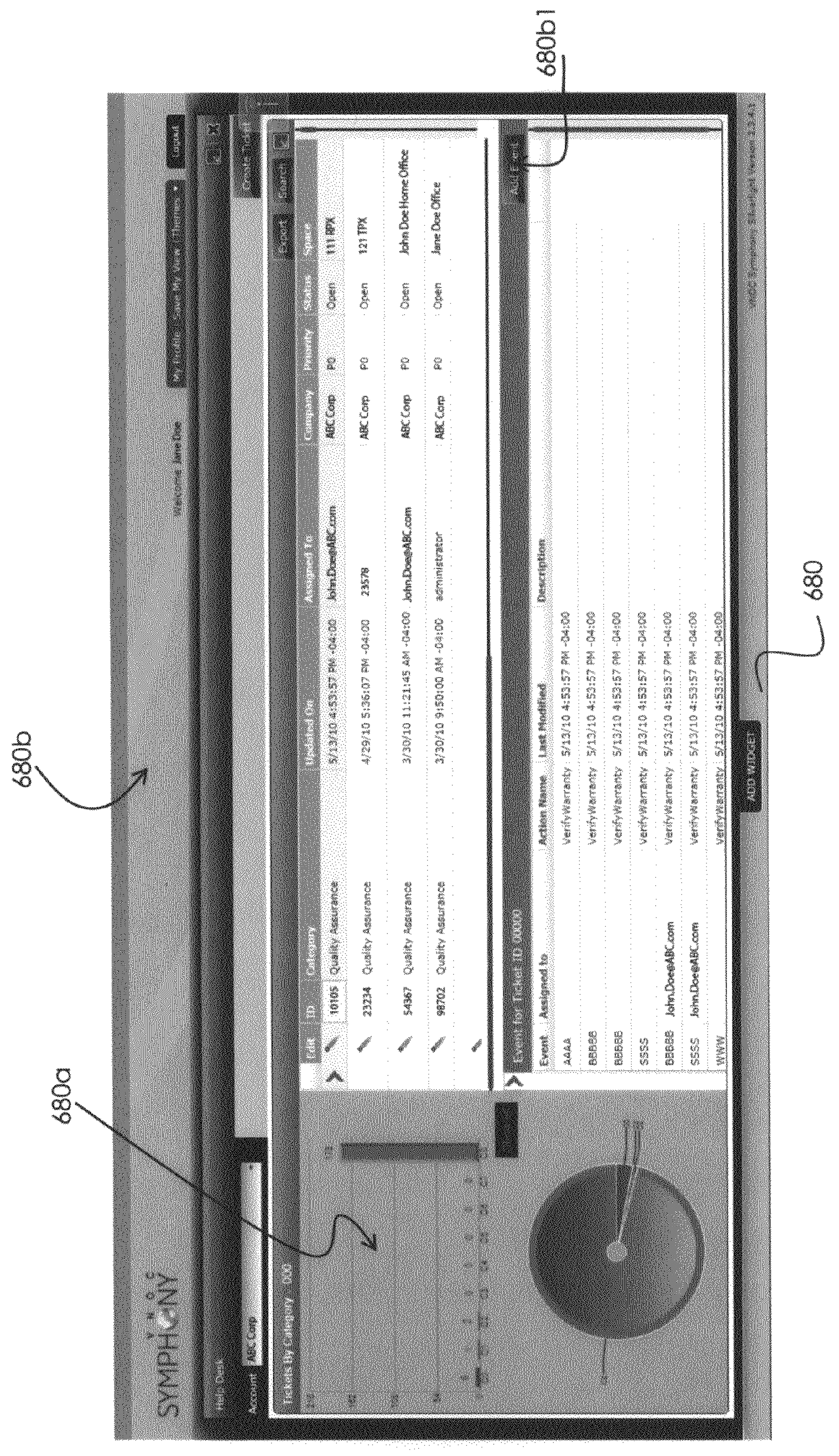

Returning now to FIG. 36A, if the user actuates one of the maximize buttons, such as button 676*b*2, the screen is maximized to the view shown in FIG. 36C. In this view, the tickets are again shown graphically as organized by category and the tickets within the categories are organized by category in left hand side in area 680*a* and organized in a spreadsheet view or format as shown in the right-hand side in 680*b*. If a user wishes to add event information or data that relates to the fault highlighted (in the illustration, the highlighted ticket number 14395), the user actuates an electronic button 680*b*1 in FIG. 36C whereupon the popup screen 682*a* (FIG. 36D) is presented to the user. Such event information may include further information or description of or about the fault. The user may complete the fields 682*a*1 and add descriptive information in 682*a*2 after which the user may save or cancel the event information by selecting one or more of buttons 682*a*3 and 682*a*4. It should be understood that the system may automatically add event or information relating to a fault in accordance with the fault management process described herein. Alternatively and as described, interfaces such as those just described relative to FIGS. 36A-36D, presented by ACMCE 38 to the user to enable the user to add event information or data regarding a fault.

Figure 36D:
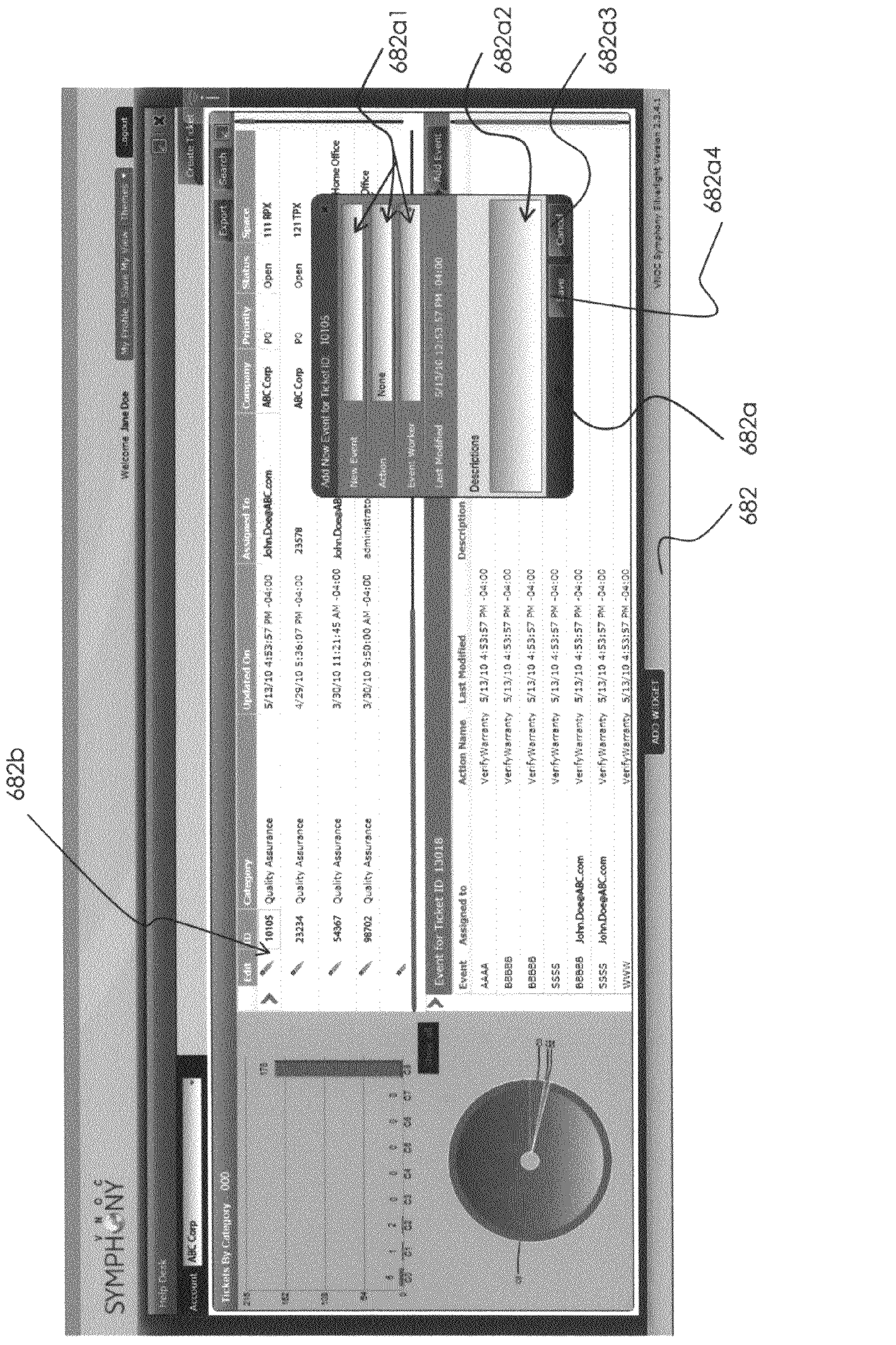
Figure 36E:
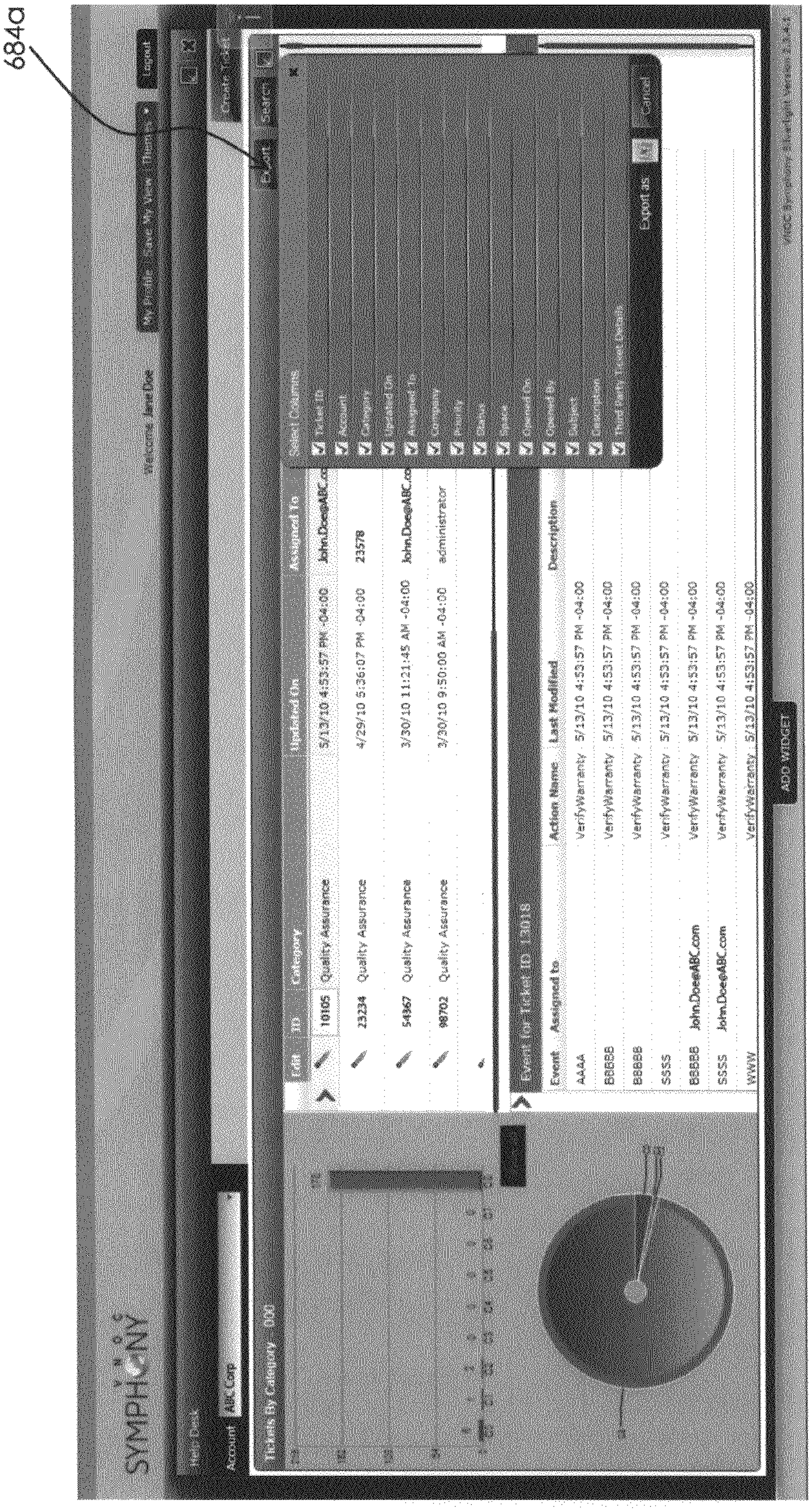

Referring now to FIG. 36E, the user may actuate the export button 684*a* in the interface 684 in order to export any of the information relating to one or more fault tickets into an exportable form, such as an excel spreadsheet.

Figure 36F:
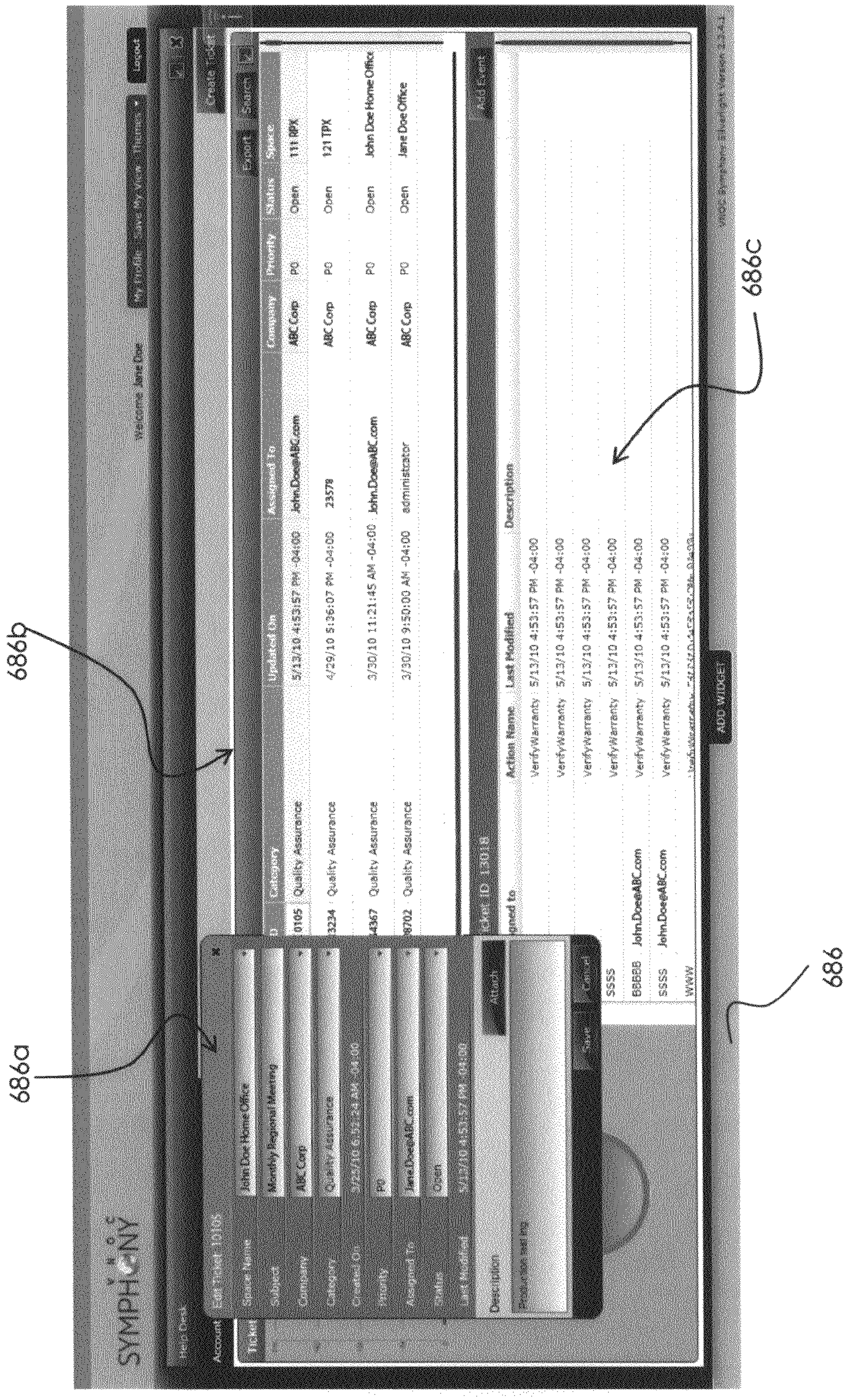

FIG. 36F illustrates another popup that is generated when the user actuates the edit button, such as the edit button 682*b* of interface 682 of FIG. 36D, whereupon the popup 686 (FIG. 36F) is presented to the user, which enables the user to edit info about a fault ticket that has been listed in the area 686*b* of the interface 686. Note in the illustration in FIG. 36F, a user interface 686 comprises the area 686*c* that lists a plurality of events for a fault ticket, which is ticket 11681 in the illustration, that is highlighted for editing.

Figure 36G:
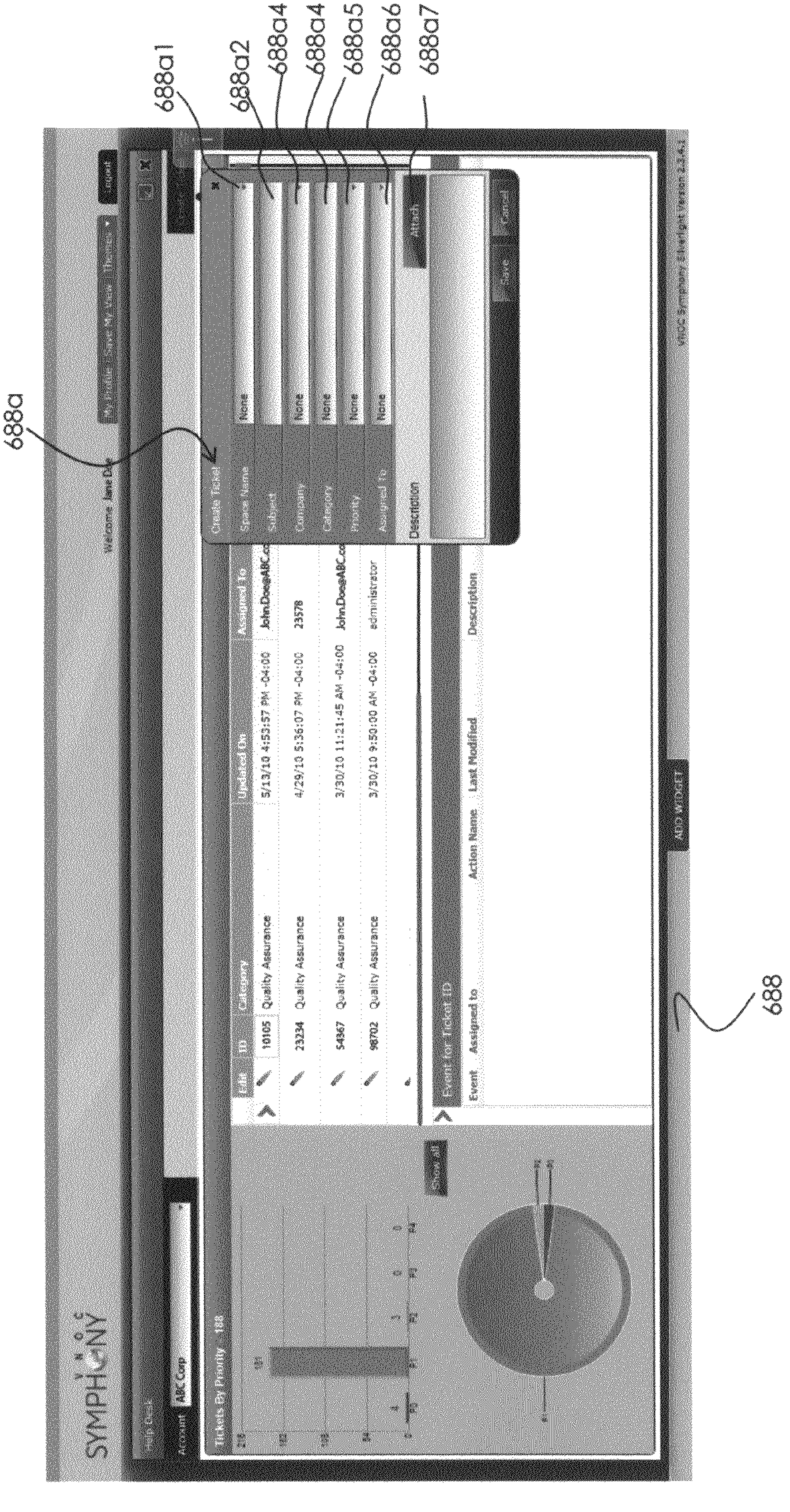

FIG. 36G illustrates a create ticket popup 688*a* that will be displayed to the user when the user actuates the create ticket button 676*b*3 (FIG. 36A). When the create ticket popup 688 appears, the user may populate fields 688*a*1, 688*a*2, 688*a*3, 688*a*4, 688*a*5, 688*a*6, 688*a*7 and create a fault ticket, which will be added to the faults being managed by the fault management runbook process.

Figure 20:
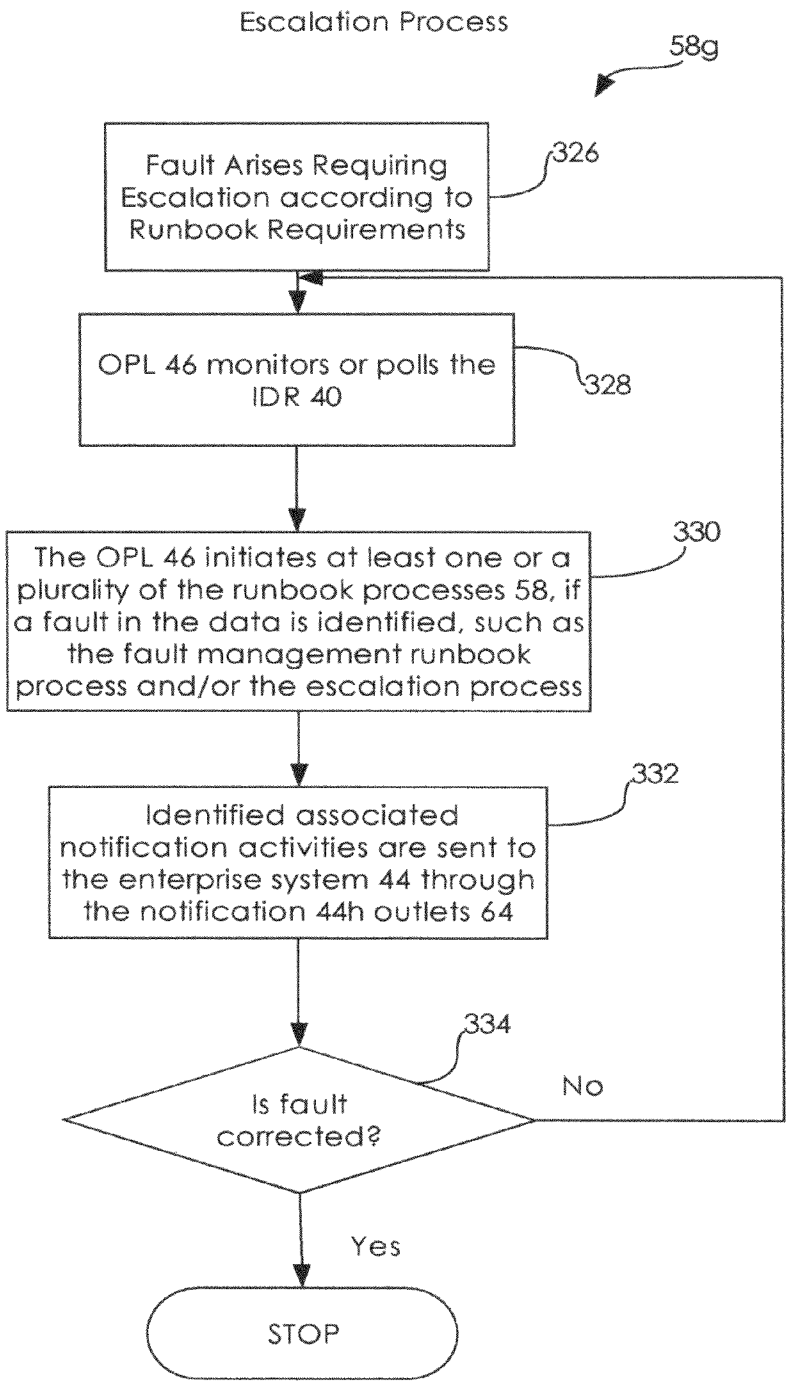
FIG. 20 is a schematic view of an escalation runbook process in accordance with one embodiment of the invention.

FIG. 20 illustrates the escalation process 58*g* mentioned herein. The escalation process 58*g* is the method or process by which the ACMCS 12 escalates issues and potential issues previously identified by one or a plurality of the other runbook processes 58 mentioned herein. When a fault arises that requires escalation according to one or more of the plurality of runbook processes 58 mentioned herein, the escalation process 58*g* is invoked (block 326). At blocks 328 and 330, the process identifies the fault and associates it with at least one or more notification activities. In this regard and as shown at block 330, the OPL 46 is monitoring or polling the IDR 40 as mentioned earlier, and if a fault in the data exists, the OPL 46 initiates at least one or a plurality of the runbook processes 58, such as the fault management runbook process and/or the escalation process. At block 332, the identified associated notification activities are sent to the enterprise system 44 associated with the fault through the notification system 44*h* (FIG. 5) outlets 64, such as email notification, audible notification, and sms notification. The notification of the fault and its criticality is communicated to the user via the enterprise system 44.

At block 334, it is determined by the ACMCE 38, in response to the OPL 46 polling the IDR 40, whether the fault being escalated has been corrected. If it has not, the escalation process loops back to block 328 as shown. It should be understood that the faults that may occur during the operation of the system 10 are identified by the IDR 40 and OPL 46 polling and examination of the data that is stored in the IDR 40. If the data falls outside predetermined parameters, which will depend on the data type, then fault notification will occur as described herein.

Figure 21:
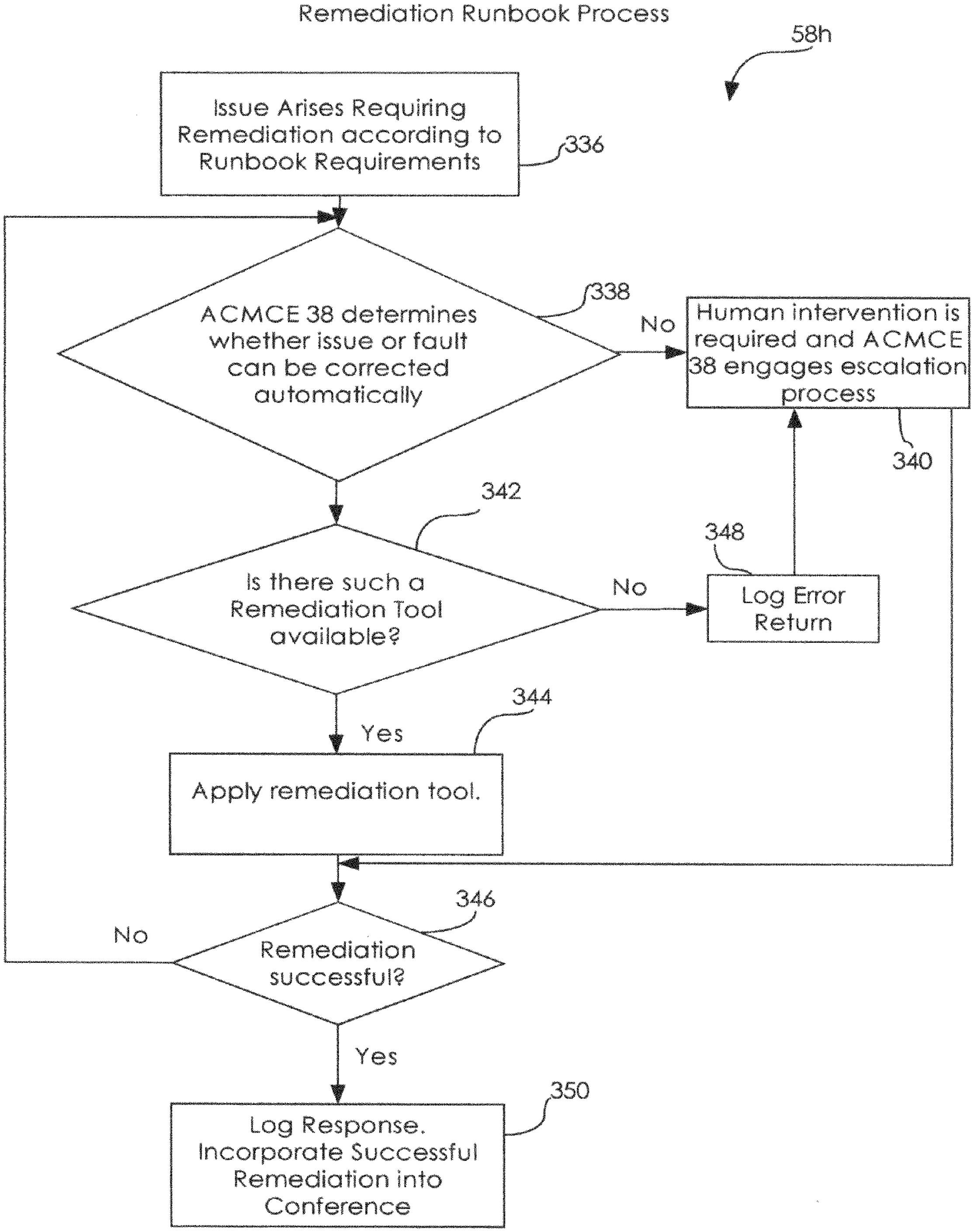
FIG. 21 is a schematic view of a remediation runbook process in accordance with one embodiment of the invention.

FIG. 21 illustrates the remediation runbook process 58*h*. The remediation runbook process 58*h* begins at block 336 where the issue or fault that requires remediation in response to the at least one or a plurality of runbook processes 58 has been identified. At decision block 338, the ACMCE 38 determines whether or not the issue or fault can be corrected automatically by the ACMCE 38. If it cannot, then the routine proceeds to block 340 where human intervention to resolve the fault is required and the ACMCE engages the escalation process described herein to notify a human of the fault and the need for its correction. The routine then proceeds to a decision block 346 described later.

If the decision at decision block 338 is affirmative, then it is determined whether at least one or a plurality of remediation tools and/or resources is available (block 342). If they are not, the fault is logged (block 348) and the routine proceeds to engage human intervention at block 340 as shown. If at least one or a plurality of remediation tools and/or resources is available, then they are applied (block 344) to remediate, correct or fix the fault. Thereafter, or after block 340, it is determined whether the remediation is successful (block 346) and, if it is, the process terminates. If it is not, the routine loops back to decision block 338 as shown. An example of a fault and remediation thereof will now be described. If the ACMCE 38 was attempting to initiate a conference using the conference startup runbook process and one or more of the plurality of terminals 14-28, desktops 32 or gatekeepers 34 was not powered on, then a fault would be identified by the fault management runbook process 58*i*. Once the fault is identified, the fault management process continues to the decision block 324 (FIG. 19) whereby it is determined that remediation is necessary. Still referring to FIG. 19, the remediation process is engaged at block 324. The ACMCE 38 determines whether or not the fault can be corrected by automated intervention. Since one of the terminals 14-28, desktops 32 and gatekeepers 34 was not powered on in the example, the ACMCE 38 would engage human interaction via the escalation process 58*g* to resolve the fault identified (in this illustration, the fault of one of the terminals 14-28, desktops 32 and gatekeepers 34 not being powered on) if the ACMCE is not capable of turning it on.

After engagement of the escalation process 58*g*, the process simultaneously continues to block 342 (FIG. 21) to determine whether or not the remediation tool or resource is available to fix the fault. In this example, the ACMCE 38 checks with the IDR 40 to determine if another terminals 14-28, desktops 32 and gatekeepers 34 is available to substitute for the terminal that is powered off. If the IDR 40 reports available terminals 14-28, desktops 32 and gatekeepers 34, the ACMCE 38 would continue by substituting the available terminal and would then continue with the conference startup process to complete conference initiation. The remediation would be considered successful and the process would terminate.

Figure 22:
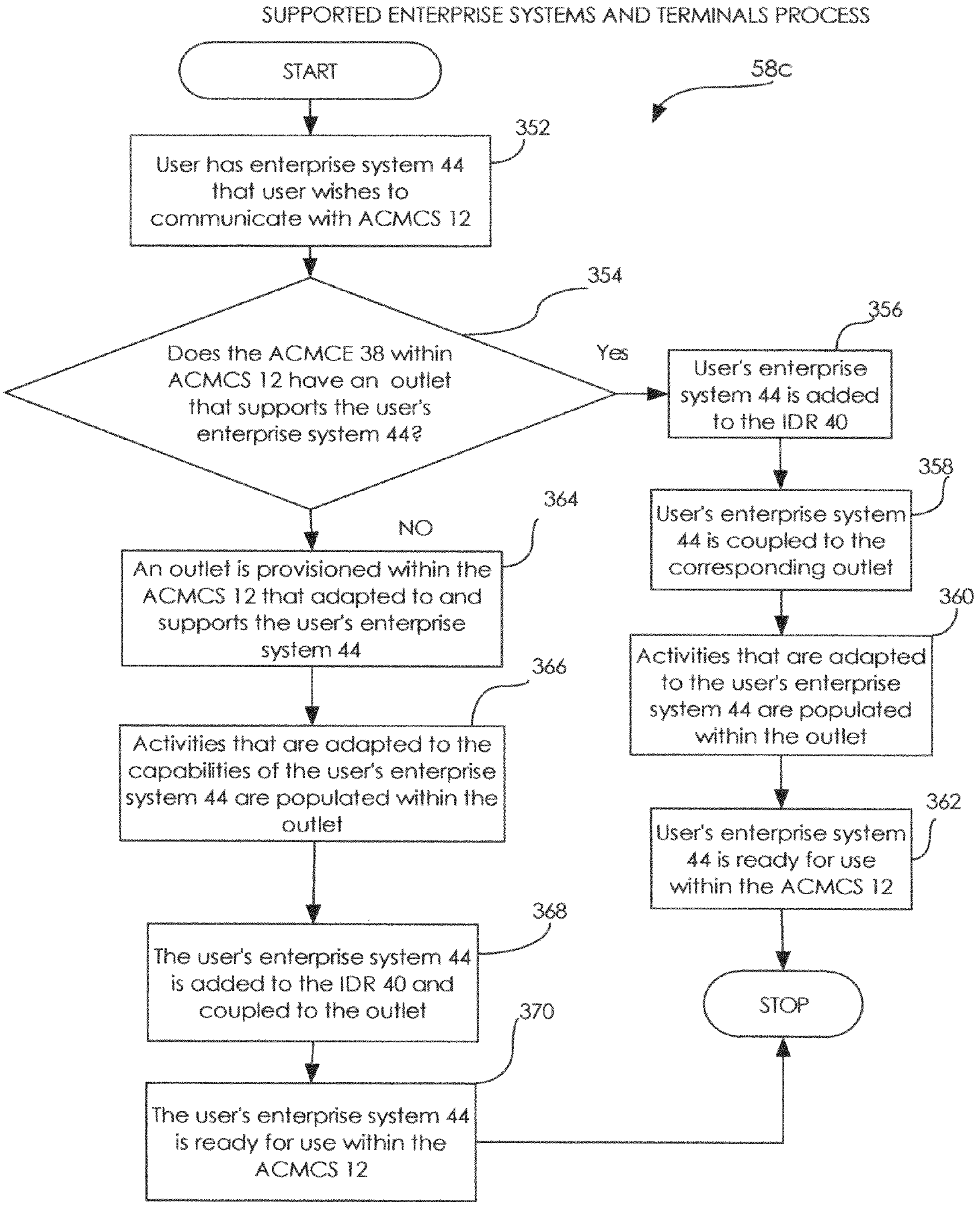
FIG. 22 is a schematic view of a supported enterprise systems and terminals runbook process in accordance with one embodiment of the invention.

Referring now to FIG. 22, the supported software servers and enterprise system process 58*c* is shown. The process begins at block 352 where the user who has an enterprise system 44 that the user wishes to communicate with the ACMCS 12. It is determined at decision block 354 whether the ACMCE 38 within ACMCS 12 has an outlet 64 that supports the user's enterprise system 44. If it does, then the user's enterprise system 44 is added to IDR 40 (block 356). The user's enterprise system 44 is then coupled to the outlet 64 (block 358), and activities 60 in the IDR 40 are adapted and available to the user's enterprise system 44 and are populated or added within the outlet 64 (block 360). Thus, it should be understood that the activities 60 are adapted to the capabilities of each user's enterprise system 44; however, the activities 60 cannot exceed the capabilities of the enterprise system 44 to which they are being adapted. At block 362, the user's enterprise system 44 is ready for use within the ACMCS 12, which means that the system is capable of being automatically managed, controlled, coupled to and participate in the conference. Thereafter the process 58*c* ends.

If the decision at block 354 is negative, then an outlet 64 must be provisioned within ACMCS 12 (block 364) in order for the enterprise system 44 to communicate with the ACMCE 38. The outlet 64 is adapted to and supports the user's enterprise system 44 so that the user's enterprise system 44 can be automatically managed, controlled, coupled to and participate in the conference. The activities 60 that are adapted to the capabilities of user's enterprise system 44 are populated or added to the outlets 64 (block 366). The user's enterprise system 44 is added to IDR 40 after the activities 60 have been adapted and added to the outlet 64, and the user's enterprise system 44 is added to the IDR 40 and coupled to the outlet 64 (Block 368). The user's enterprise system 44 is then ready for automatically managing, controlling, coupling to and participating in the conference (block 370). For example, if a user has a conference management system that was not adapted to the ACMCS 12 and there is not a like system within the ACMCS 12, then an outlet 64 would have to be provisioned within the ACMCS 12 to communicate with the user's conference management system. Once the outlet 64 is established for the conference management system, then activities that are adapted to the capabilities of the user's conference management system are populated within the outlet 64. The conference management system can then be added to the IDR 40 and coupled to the outlet 64. Once the activities 60 are populated and the user's conference management system has been added to the IDR 40, that system becomes another enterprise system 44 that is available within the ACMCS 12.

Figure 23:
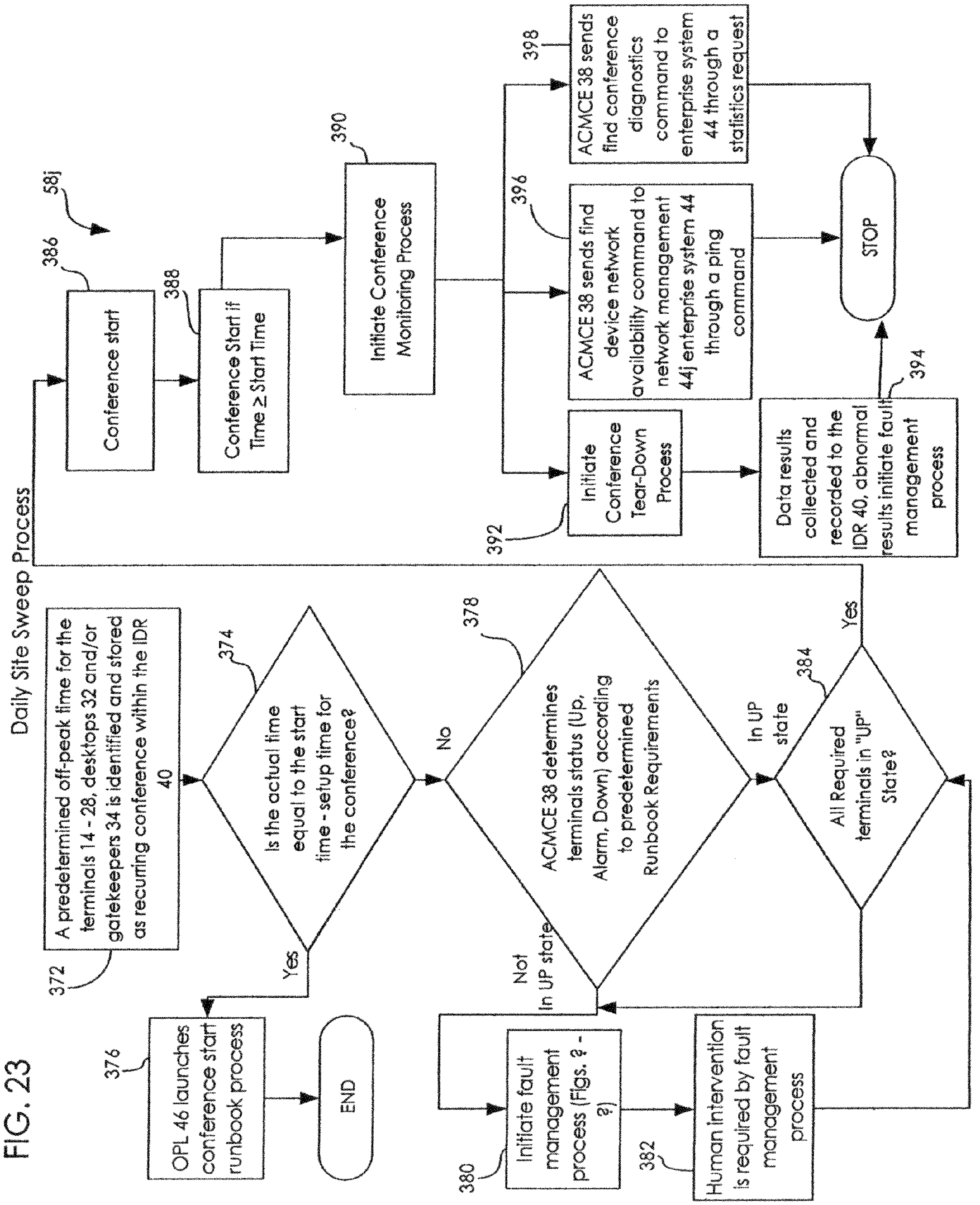
FIG. 23 is a schematic view of a daily site sweep runbook process in accordance with one embodiment of the invention.

Referring now to FIG. 23, a daily site sweep process 58*j* is shown. The daily site sweep process is a method or process which performs a check or sweep of the terminals 14-28, desktops 32 and/or gatekeepers 34 and the network(s) to which terminals 14-28, desktops 32 and/or gatekeepers 34 are connected and that are connected to the ACMCS 12 in order to provide preventative maintenance for the terminals 14-28, desktops 32 and/or gatekeepers 34. The daily site sweep is performed every 24 hours in the illustration being described. In one embodiment, the check or sweep is performed during off-peak hours (e.g. 1 AM to 4 AM local time). To complete the daily site sweep or check, the ACMCS 12 establishes a test connection with each of the one or more plurality of terminals 14-28, desktops 32 and gatekeepers 34 either directly or via the terminals 14-28, desktops 32 and/or gatekeepers 34 associated network. For example, to complete the daily sweep or check of the terminal 20, the ACMCS 12 requests network monitoring statistics associated with the terminals 14-28, desktops 32 and/or gatekeepers 34. The statistics may come from one or a plurality of network devices (not shown), such as a router or enterprise systems 44 (e.g., OpenView® available from Hewlett Packard Corporation of Palo Alto, Calif., Enterprise Class Network Management products available from SolarWinds of Austin, Tex., or other network management systems). For example, the ACMCS 12 establishes the test connection to the terminal 20 through the terminal 26. The ACMCS 12 then remotely initiates or starts the terminal 20. As mentioned earlier herein, the terminal 20 may comprise one or a plurality of projectors, codecs, cameras, in-room telephones and network devices (such as a router). Any problems or issues are recorded in the IDR 40 by the ACMCE 38 and the conference notification process is initiated. The ACMCS 12 terminates the connection to the terminal 20 from the terminal 26 and returns the components to their original state at the time the sweep began.

FIG. 23 illustrates one daily site sweep runbook process 58*j* that may be initiated automatically by ACMCE 38. At block 372, the process begins when a predetermined off peak start time for terminals 14-28, desktops 32 and/or gatekeepers 34 is observed by OPL 46. The routine continues at decision block 374 where it determined if the actual time is equal to the setup time-start time for the conference. If the decision at decision block 374 is affirmative that the actual time is equal to the startup time, then the OPL 46 launches (block 276) the conference runbook process 58 and thereafter the process ends. If decision at decision block 374 is negative, the routine proceeds to decision block 378 where the ACMCE 38 determines the status of terminals 14-28, desktops 32 and/or gatekeepers 34, namely, whether the terminals 14-28, desktops 32 and/or gatekeepers 34 are up or on, down or off, or in an alarm mode according to at least one or a plurality of predetermined monitoring definitions that define the various states of the terminals 14-28, desktops 32 and/or gatekeepers 34. If the decision at decision block 378 is negative, the routine proceeds to block 380 where the fault management process 58*i* is initiated. The routine proceeds to determine whether human intervention is required (block 382) and thereafter returns to block 384 as shown.

If the decision at decision block 378 is affirmative or at the point when the routine proceeds to decision block 384 it is determined whether all the terminals 14-28, desktops 32 and/or gatekeepers 34 that will be participating in conference are in the "up" or on state. If they are not, the routine proceeds to block 380; otherwise, the process proceeds to initiate a start of the conference (block 386). Thereafter, the conference starts (block 388) if the current time is equal to or greater than the start time.

At block 390, the conference monitoring runbook process 58*e2* is initiated. After the conference monitoring runbook process 58*e3* is initiated, the conference tear-down runbook process may be initiated by ACMCE 38 (block 392). Any data resulting from the conference tear-down runbook process are collected and recorded to IDR 40 with abnormal results causing ACMCE 38 to initiate fault management runbook process described earlier herein relative to FIG. 19 (block 394). Note that the ACMCE 38 may also send or initiate a find device network availability command to network management 44*j* enterprise system 44 through a ping command (block 396). The ping command is sent to the terminals 14-28, 34 and 34 that are part of the device network to which the ACMCS 38 sent the command. Thus, it should be understood that 38 may ping the terminals 14-28, desktops 32 and/or gatekeepers 34 to determine and confirm their "up" or on status. The ACMCE 38 may also send a conference diagnostic command to the enterprise system 44 through which the terminals 14-28, desktops 32 and/or gatekeepers 34 are connected (block 398). After block 394, 396 and/or 398, the process terminates.

Figure 24:
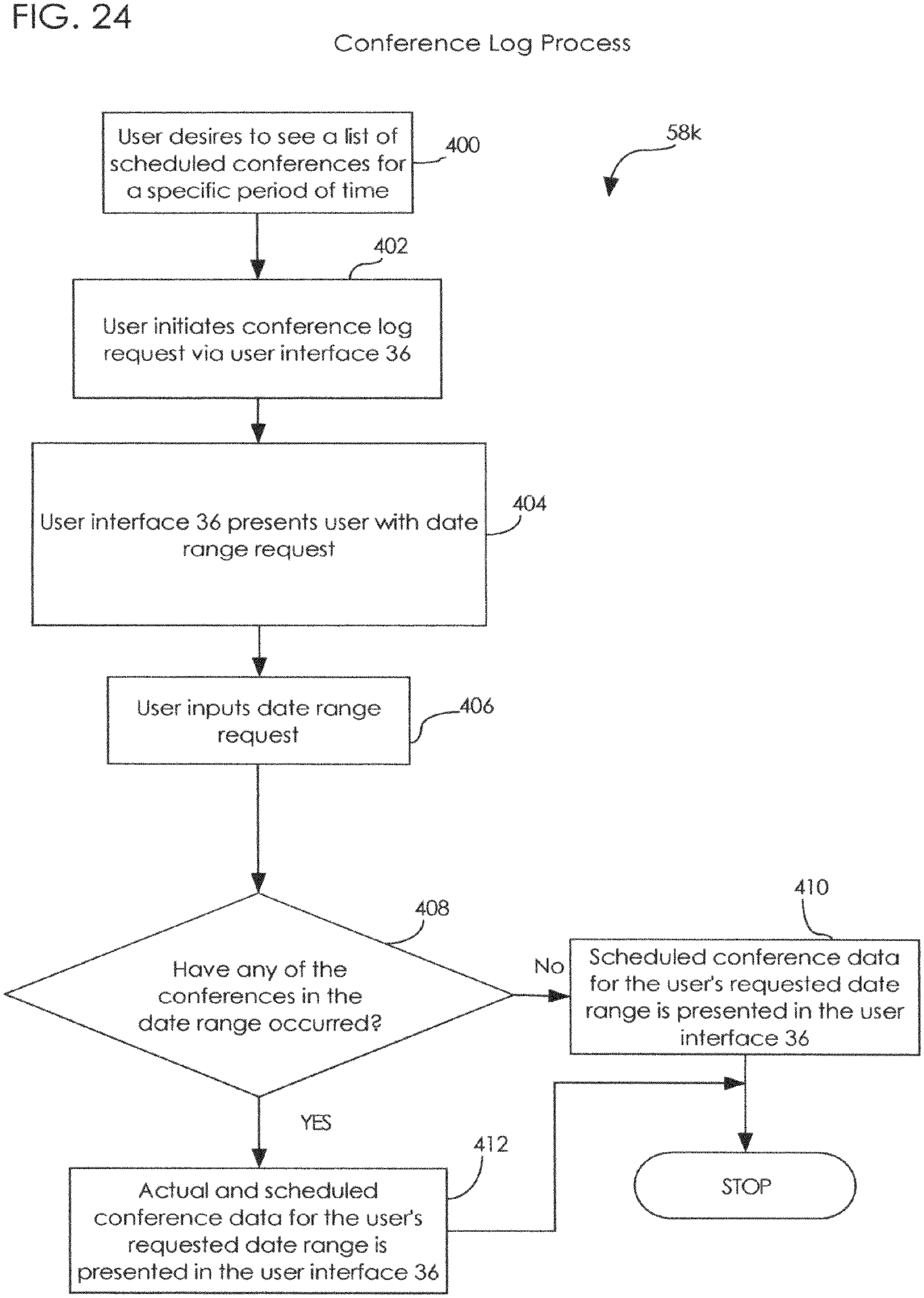
FIG. 24 is a schematic view of a conference log process in accordance with one embodiment of the invention.

Referring now to FIG. 24, a conference log runbook process 58*k* is shown. The conference log runbook process 58*k* is a method or process by which the details for scheduled conferences within the ACMCS 12 are recorded to the IDR 40 and viewable to the user. The conference log runbook process 58*k* records, for example, an actual setup time, an actual start time, a connection speed for each of the terminals 14-28, desktops 32 and/or gatekeepers 34, and a type of connection (such as a point-to-point connection or a multi-point connection), any trouble issues identified during the conference maintenance and notification process, any ISDN information for the terminals 14-28, 34 and 34 and an actual time of disconnection of the terminals 14-28, desktops 32 and/or gatekeepers 34 in the conference.

Figure 37A:
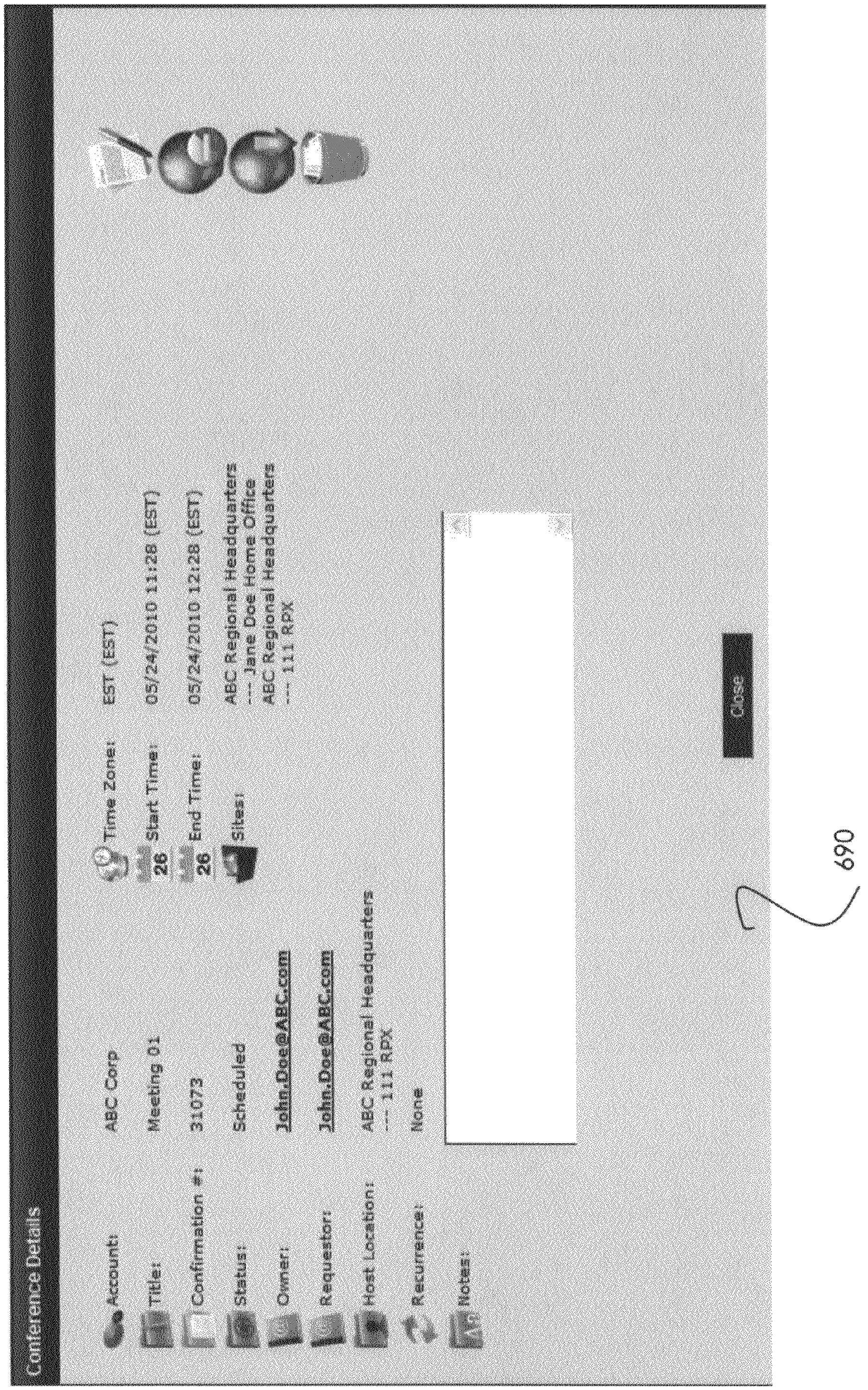
FIG. 37A and FIG. 37B illustrate further web-based graphical user interface showing conference details associated with a conference that was scheduled using the system in accordance with one embodiment of the invention.
Figure 37B:
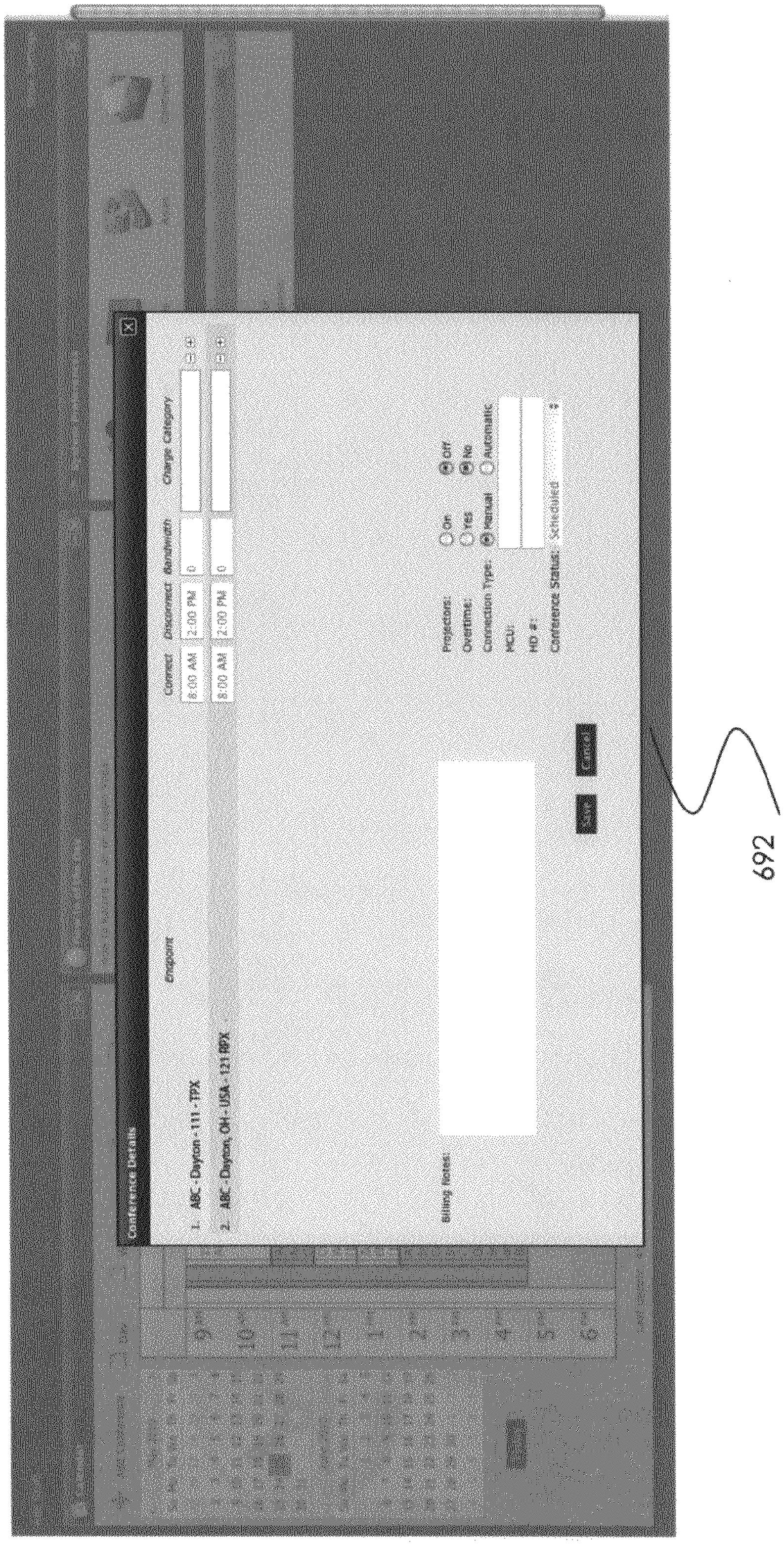

At block 400 in FIG. 24, when a user desires to see a list of scheduled conferences for a specific period of time, the user initiates a conference log request (block 402). FIGS. 37A-37B illustrate two graphical user interfaces 690 and 692, respectively. In the illustration being described the view 690 illustrates the list of scheduled conferences that would be generated in response to the user's request. The ACMCE 38 presents the conference log request interface 690 (FIG. 37A) to the user with a date range request that correlates to the specific period of time that the user desires a list of scheduled conferences as shown at block 404 (FIG. 24). At block 406, the user inputs the date range for a specific period of time and then it is determined whether any of the conferences in the date range occurred (decision block 408). If they have not, then scheduled conference data for the user's requested date range is presented to the user in the user interface 36 (block 410). If decision at decision block 408 is affirmative, then the actual and scheduled conference data associated with the user's requested date range is presented to the user via the user interface 36 (block 412).

FIG. 37B illustrates the interface 692 that is presented to the user if the user wishes to view or edit actual conference data. If a conference has a fault that requires human intervention in accordance with fault management runbook process described herein, then the interface 692 may be used to input actual (as opposed to scheduled) conference data so that conference history may be accurately captured and stored in IDR 40. After blocks 410 and 412, the process terminates.

Figure 25:
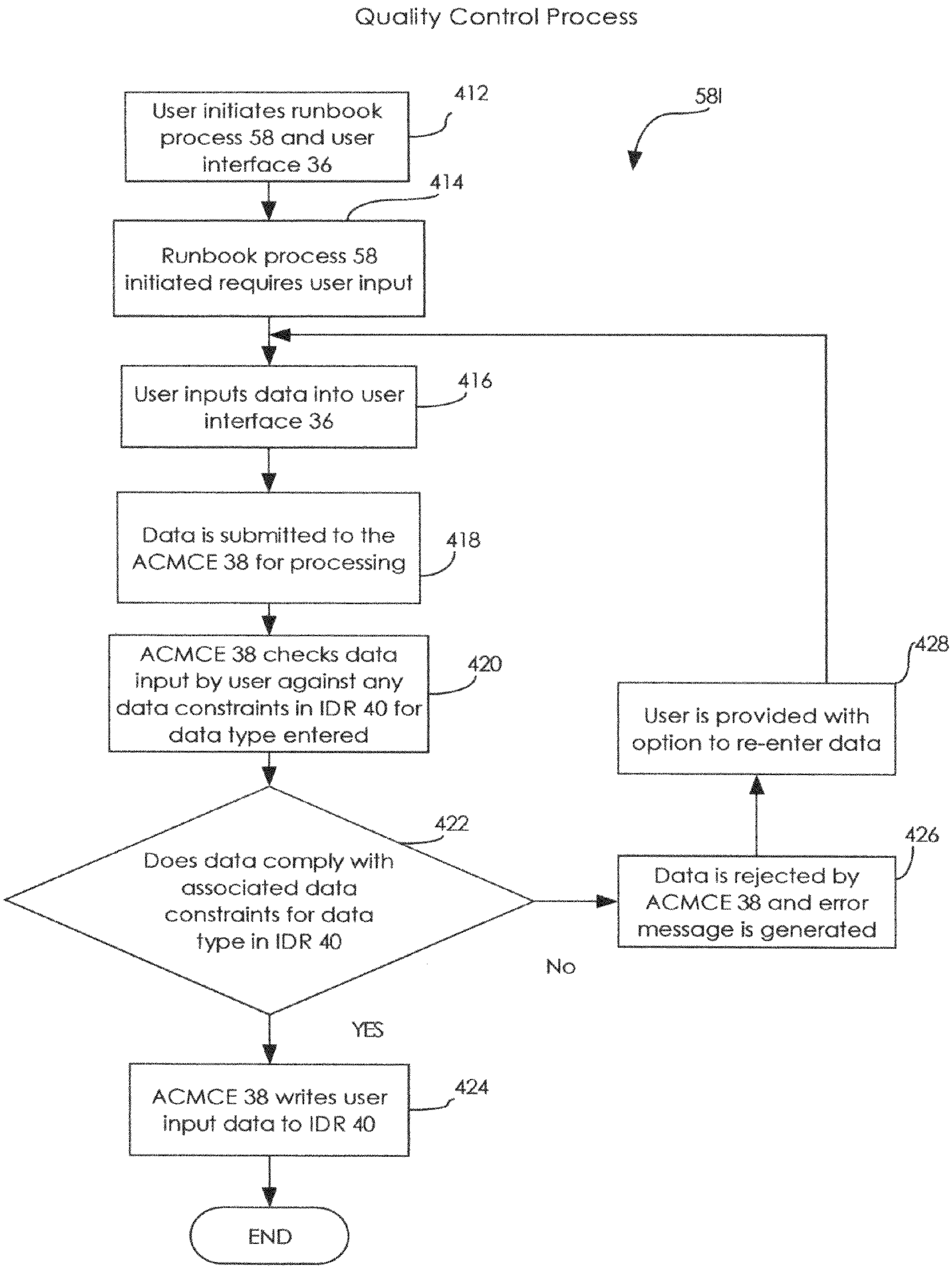
FIG. 25 is a schematic view of a quality control process in accordance with one embodiment of the invention.

Referring now to FIG. 25, a quality control process 58*l* is shown. The quality control runbook process 58*l* is a method or process by which the ACMCS 12 proactively identifies and prevents potential issues from occurring, such as incorrect data input by the user and/or data resulting in scheduling conflicts or scheduling inaccuracies. For example, the ACMCS 12 may prevent the user from scheduling one or more of the terminals 14-28, desktops 32 and/or gatekeepers 34 in different conferences during the same time slot or from allowing the user to input an invalid date or time for a requested conference during the scheduling process. The process begins by the user initiating at least one or a plurality of the runbook processes 58 via user interface 36 (block 412). The at least one or plurality of runbook processes 58 initiated in the illustration being described requires the user's input at block 414. Thereafter, the user inputs data into user interface 36 (block 416). In the illustration being described, the data is input by the user in a predetermined data input field, such as conference start time, conference duration and at least one or a plurality of terminals 14-28, desktops 32 and/or gatekeepers 34. In order to verify the quality of the data input by the user, the data is submitted to the ACMCE 38 for processing (block 418) and the ACMCE 38 checks that data input by the user against any data constraint types in the IDR 40 to verify the quality of the data type entered (block 420).

Figure 38:
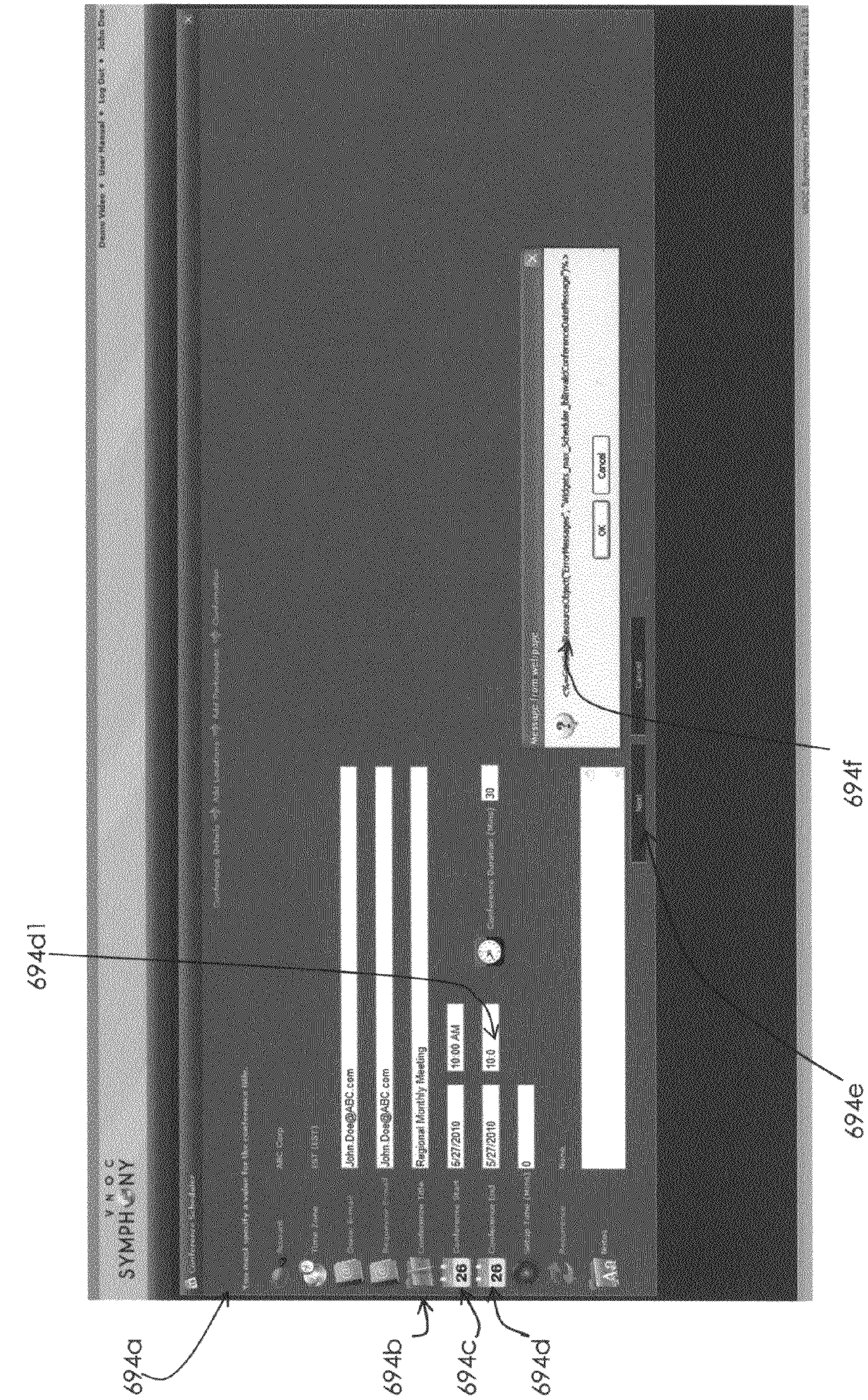
FIG. 38 is a view of an illustrative web-based interface showing a quality control feature of the system including a web-based pop-up for incorrectly inputted data.

At decision block 422, it is determined whether data complies with data constraint types for the data type that is stored in the IDR 40 and if it is the ACMCE 38 writes data to IDR 40 because it has been confirmed that data is not invalid or incorrect and thereafter the routing terminates. If is determined at decision block 422 that data is not good quality, it is rejected (block 424) by the ACMCE 38 which does not cause the data to be written to the IDR 40, and the ACMCE 38 generates an error message in response thereto (block 426). Thereafter, the user is provided with an option to reenter the data (block 428) and the routine loops back to block 416 as shown. FIG. 38 illustrates an html display interface 694 that comprises a first error message 694*a* that tells the user that the user must specify a conference title at the area 694*b* (i.e., in the field 694*b*). Note in the illustration shown in FIG. 38, that the date fields 694*c* and 694*d* have invalid information because the conference end date time in field 694*d*1 is not properly completed. When the user selects the next button 694*e*, the quality control runbook process will not allow the user to proceed and will generate the error message in 694*f* that alerts the user of the invalid conference time.

Figure 26:
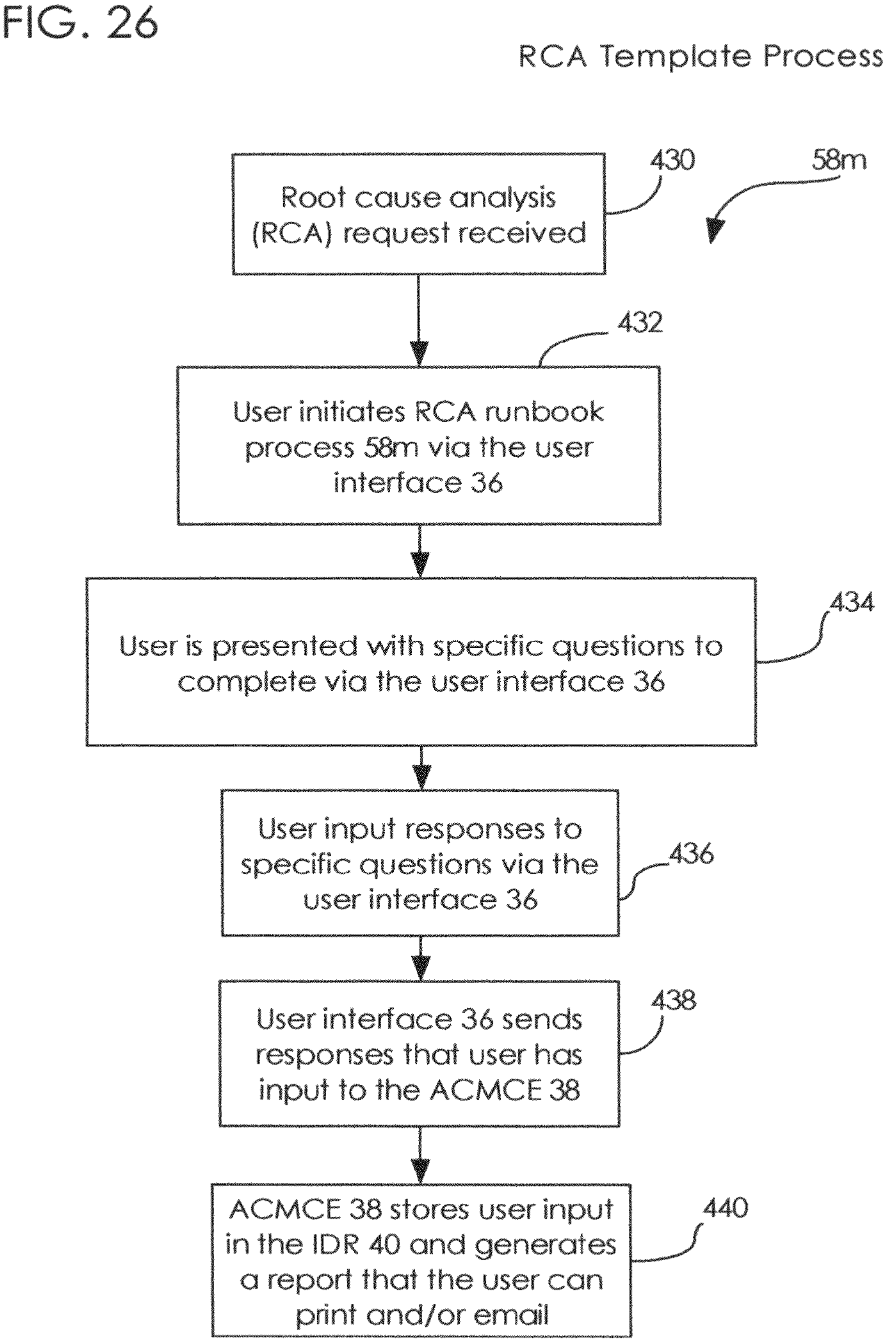
FIG. 26 is a schematic view of a root cause analysis template runbook process in accordance with one embodiment of the invention.

Referring now to FIG. 26, a root cause analysis (RCA) template runbook process 58*m* is shown. The RCA template runbook process 58*m* is a method or process that utilizes a template (not shown) as provided by the ACMCS 12 that the user will follow to document questions that need to be answered and/or information that needs to be gathered when an RCA is requested by the user. Such RCA may be requested as a result of one or a plurality of trouble issues that occurred and/or were identified during, for example, the scheduling runbook process or the conference management runbook process mentioned earlier herein.

The RCA template runbook process 58*m* begins when an RCA request is received by the ACMCE 38 (block 430). The user initiates the RCA runbook process 58*m* via user interface (block 432). In response to such initiation, the user is presented with specific question to complete via user interface 36 (block 434). The user inputs answers to specific questions at block 436. In the illustration being described, the specific questions may, for example, include or comprise asking the user to input an executive summary of the incident, problem or fault that occurred, the root cause identified and an action plan for mitigating the root cause; input correspondence (emails, phone logs, and the like) that relates to the RCA. In response, the user interface 36 sends (block 438) the responses that user has input into user interface 36 to the ACMCE 38. At block 440, the ACMCE 38 stores the user input into the IDR 40 and generates a report that the user can communicate print and/or communicate to others, such as by email or the like. Thereafter, the routine ends.

Figure 27:
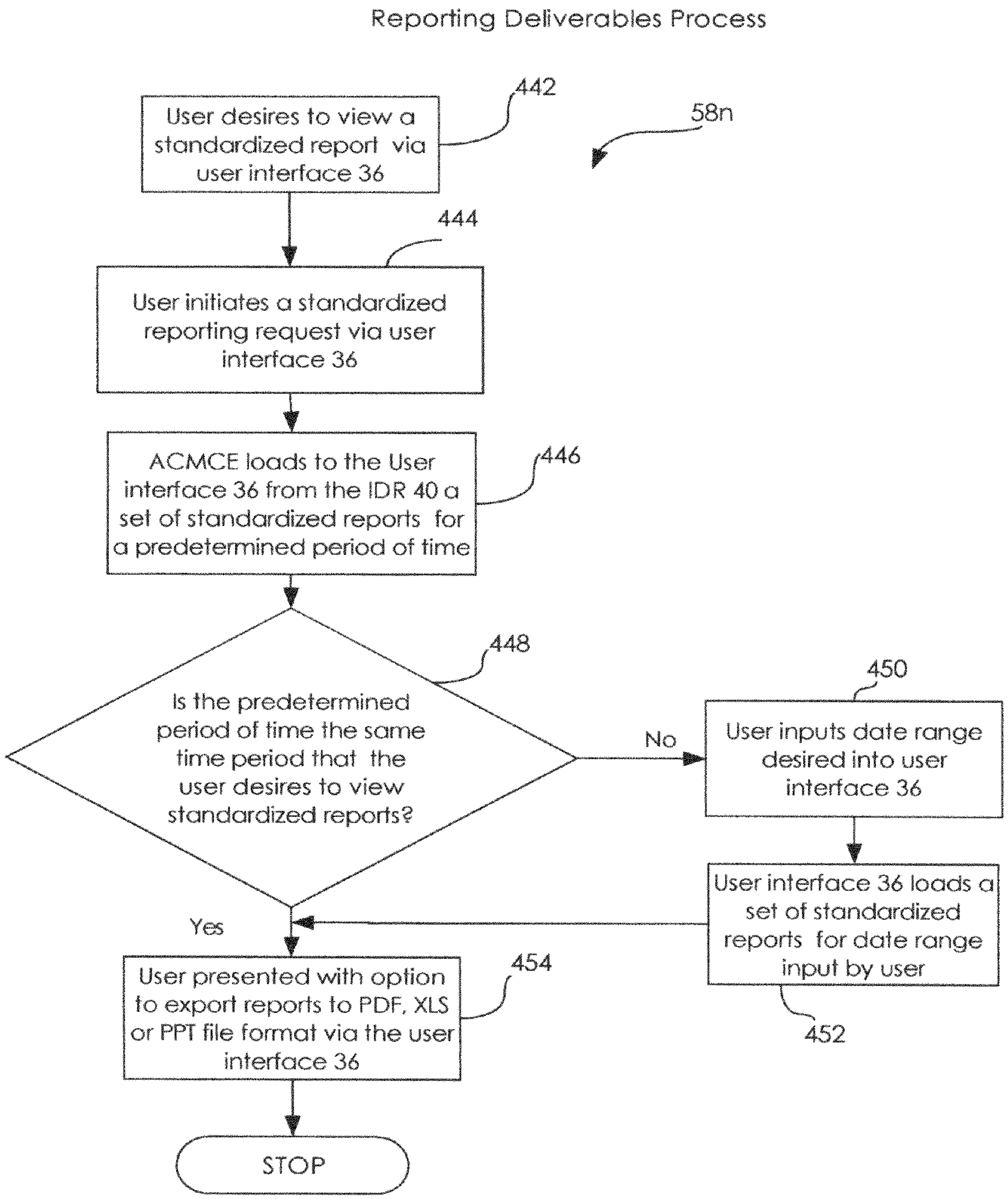
FIG. 27 is a schematic view of a reporting deliverables runbook process in accordance with one embodiment of the invention.

FIG. 27 illustrates a reporting deliverables process 58*h* which is a method or process by which the ACMCS 12 delivers to the user standardized reporting for the terminals 14-28, desktops 32 and/or gatekeepers 34. For example, the standardized reporting for the terminals 14-28, desktops 32 and/or gatekeepers 34 may comprise one or a plurality of the following kinds of reports: a utilization report for terminals 14-28, desktops 32 and/or gatekeepers 34 for reporting the total hours of use of the terminals 14-28, desktops 32 and/or gatekeepers 34; a trended utilization report showing a trend of utilization of the terminals 14-28, desktops 32 and/or gatekeepers 34 over a predetermined period of time; an utilization of terminals 14-28, desktops 32 and/or gatekeepers 34 report showing the terminals 14-28, desktops 32 and/or gatekeepers 34 that are not within the service process described earlier herein; an available hours of terminals 14-28, desktops 32 and/or gatekeepers 34 report showing the total hours of availability of the terminals 14-28, desktops 32 and/or gatekeepers 34; a maintenance hours report showing a total number of maintenance hours for the terminals 14-28, desktops 32 and/or gatekeepers 34; a daily schedule for terminals 14-28, desktops 32 and/or gatekeepers 34 report showing a total number of scheduled conferences utilizing the terminals 14-28, desktops 32 and/or gatekeepers 34 over a predetermined period of time (such as 24 hours); a number of new reservations report showing a total number of new reservations for utilizing the terminals 14-28, desktops 32 and/or gatekeepers 34; a cancelled reservations report showing a total number of cancelled reservations for a predetermined period; an average conference duration report showing an average of the duration of conferences over a predetermined period of time; a number of conferences hosted report showing a total number of conferences hosted by each of the terminals 14-28, desktops 32 and/or gatekeepers 34 over a predetermined period of time; a number of conferences attended report showing the number of conferences the user scheduled or was scheduled as a participant in over a predetermined period of time; a number of conferences that failed to connect report showing the number of conferences that the ACMCS 12 was not able to connect over a predetermined period of time; and/or a percentage of conferences that connected and were carried out successfully over a predetermined period of time.

The process 58*n* begins when a user desires to view a standardized report via user interface 36 (block 442). The user initiates (block 444) a standardized reporting request. The process continues at block 446 where the ACMCE loads to the user interface 36 a set of reports for a predetermined period of time. The process then continues to decision block 448 where it is determined whether the predetermined period of time for which the user desires to view of time the same time period that the user desires to view standardized reports. If it is not, the user inputs the desired date range into the user interface (block 450). The ACMCE 38 then loads a set of standardized reports for the date range that was input by the user (block 452). The user is presented with the option to export the reports to a file format via the user interface 36 (block 454). Thereafter, the process ends.

FIGS. 33A-33G illustrate one form of the user interface 36 that is used with the web portal 669 (FIG. 5) entry point during the reporting runbook process 58*n*. For ease of illustration, a worldwide web portal or interface is shown, but it should be understood that at least one or a plurality of the other user entry points 66 will have access to and could comprise or be adapted to provide or display similar reports.

Figure 33A:
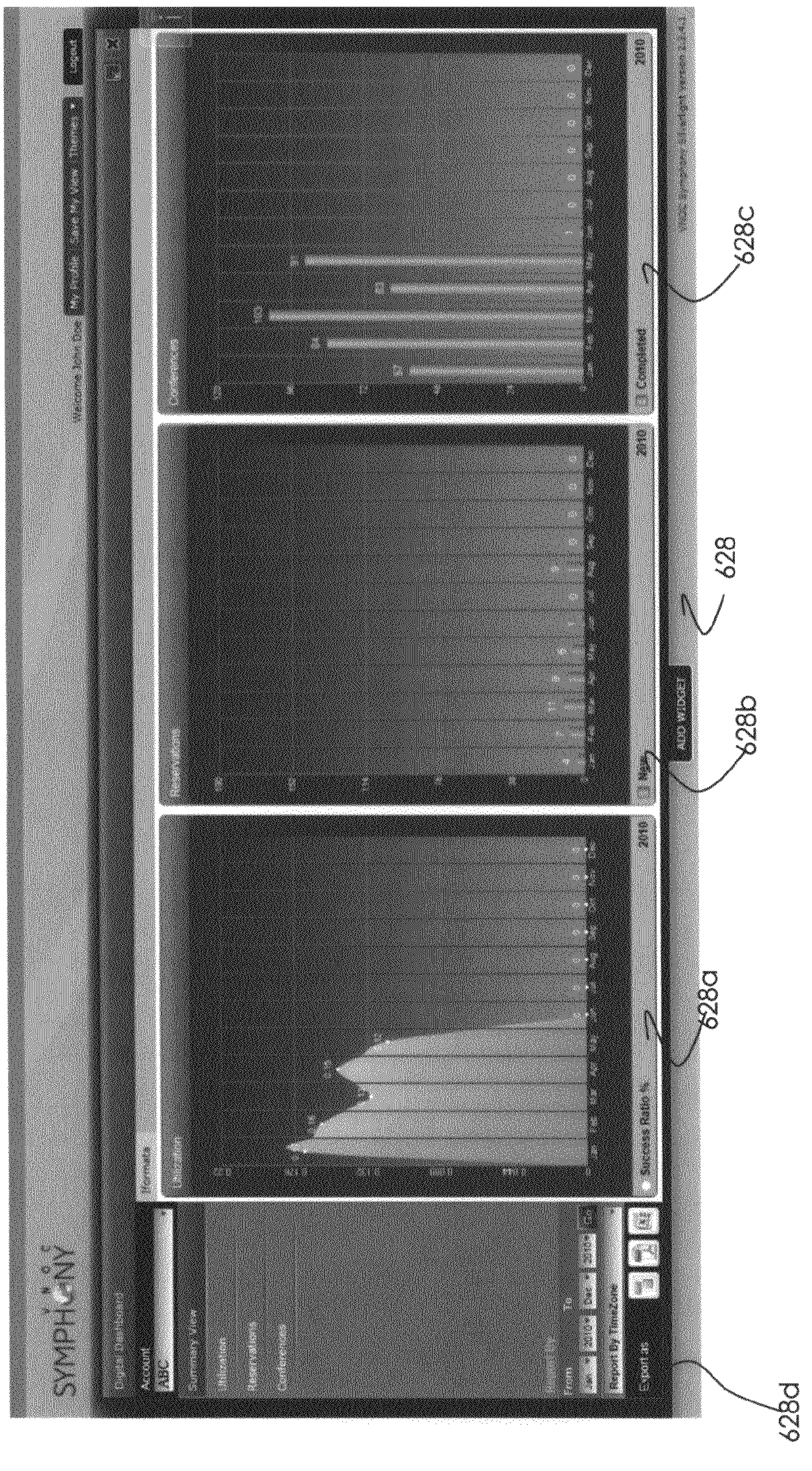
FIGS. 33A-33G illustrate web-based user interfaces for providing and reviewing statistics regarding the use of the system 10.

Referring to FIG. 33A, a first graphical user interface (GUI) 628 is shown. The GUI 628 comprises a plurality of utilization graphs 628*a*, 628*b* and 628*c* associated with one particular user (e.g. ABC Corp.). In this illustration, the graphs comprise the graph 628*a* that shows the utilization of ABC Corp.'s terminals 14-28, desktops 32 and/or gatekeepers 34, number of reservations by month and year in the report 628*b*, and number of conferences by month and year report 628*c*. Note that the reports can be exported into different formats using the conventional tools, such as a picture display format or pdf, excel spreadsheet form, Microsoft's power point and the like, at 628*d*.

Figure 33B:
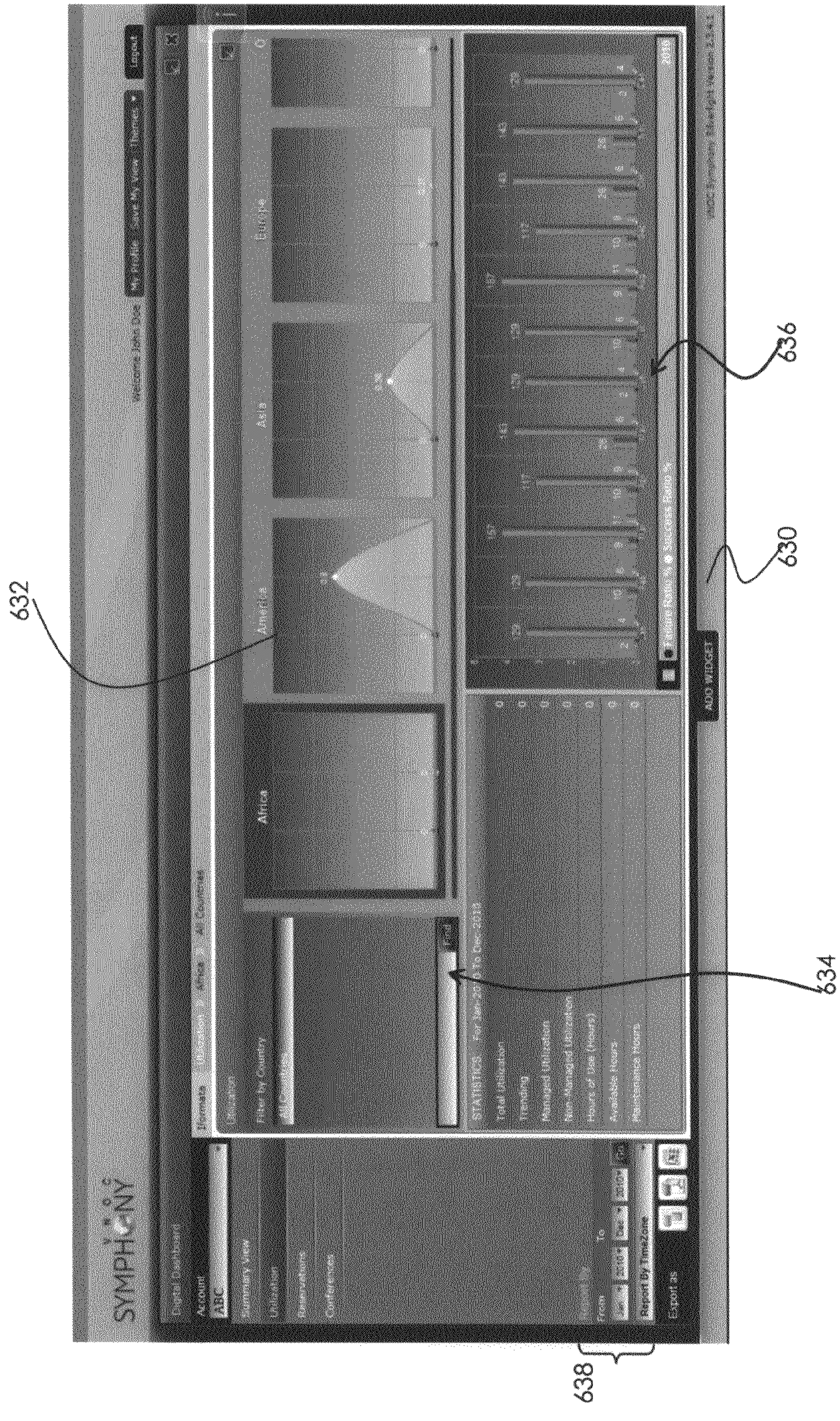

Referring now to FIG. 33B, a breakdown report 632 of the utilization report 628*a* shown in FIG. 33A is illustrated in which the report is accessed by the user actuating or "clicking on" the utilization report 628*a* shown in FIG. 33A. In the left-hand column at 638, the utilization report 632 filters the data associated with the utilization of terminals 14-28, desktops 32 and/or gatekeepers 34 by country. To the right of the column 638 is a list of all countries or continents (with only Americas-Africa being shown), but it should be that the countries may be scrolled from A-Z. If, for example, the user wanted to see a breakdown of the utilization for the Americas shown in interface 630, the user would actuate the Americas graph at 632 whereupon statistics for that graphic region and for the predetermined period will be displayed at column 634 and in graphical form in 636 in FIG. 33B. In those areas that are identified by a continent, the user can click on that graphical representation, such as the Americas 632 graph, whereupon the ACMCE 38 will organize the data by each country that is part of that geographic region. Note at the fields 638, the user may change a predetermined period of time to the desired utilization period and breakdown. In column 634 of the GUI 630, the user can organize the statistics by various fields, such as by country, total utilization, hours of use, available hours and maintenance hours and the like, whereupon the associated graphs will appear in the graphical area 636 in FIG. 33B.

Figure 33C:
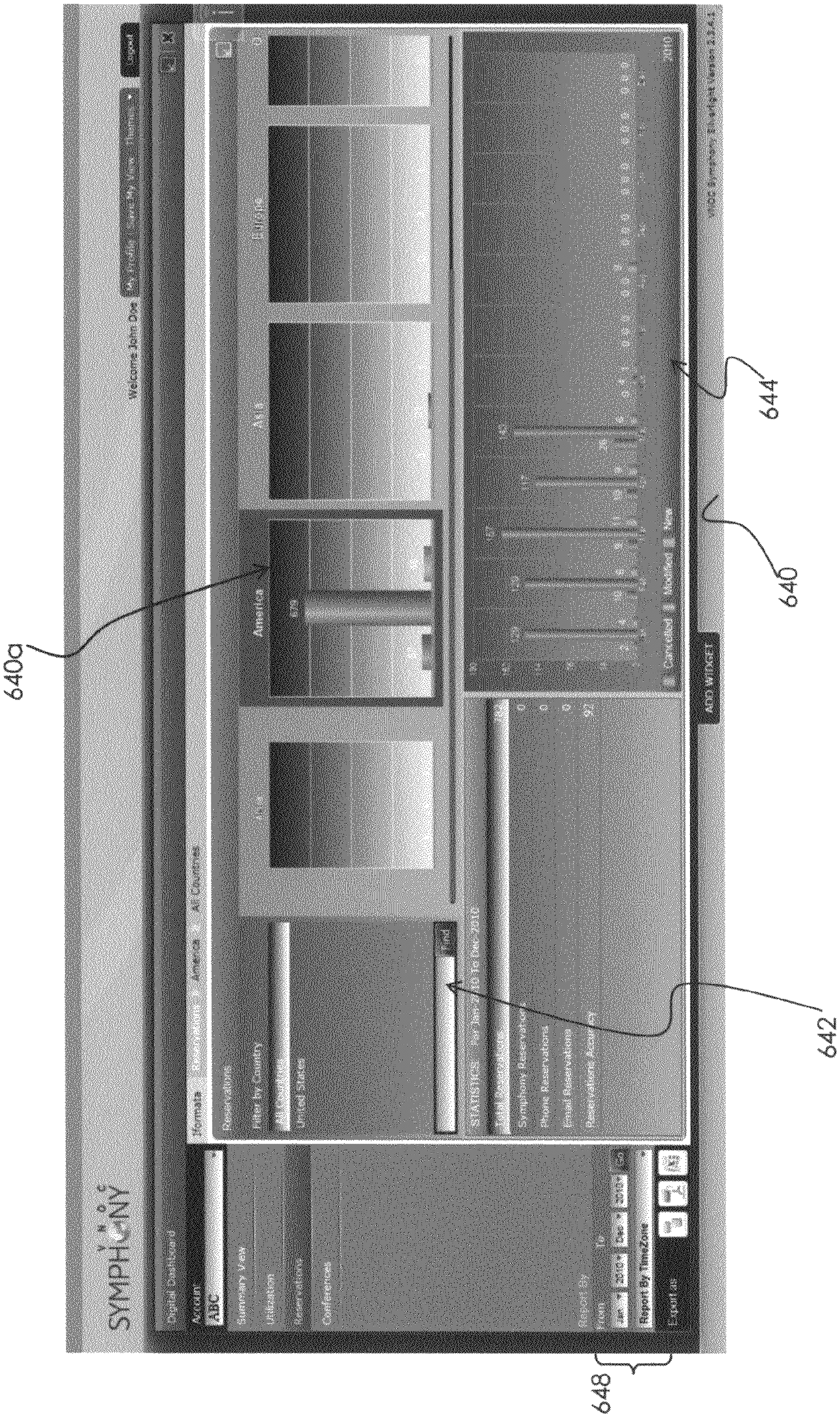
Figure 33D:
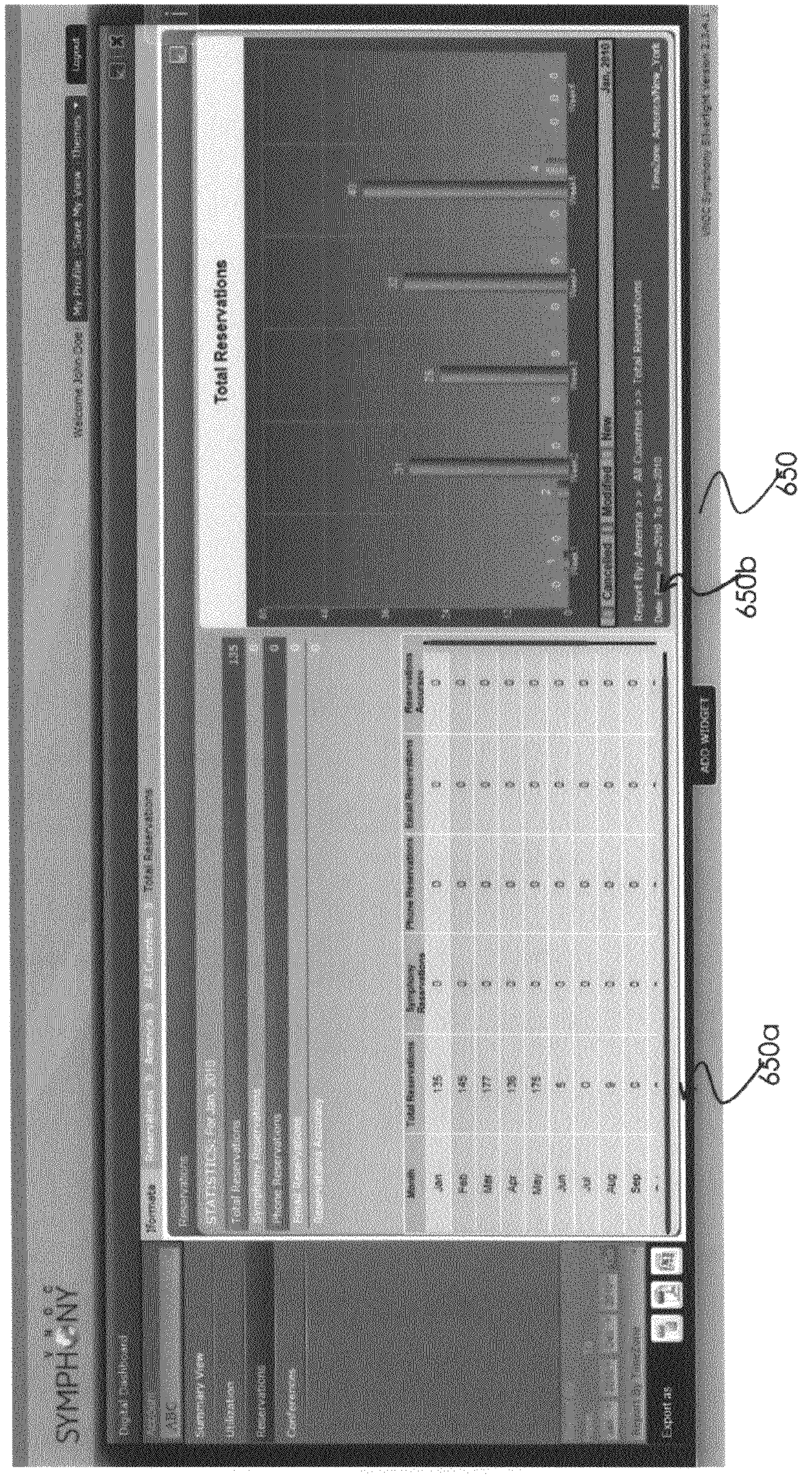
Figure 33E:
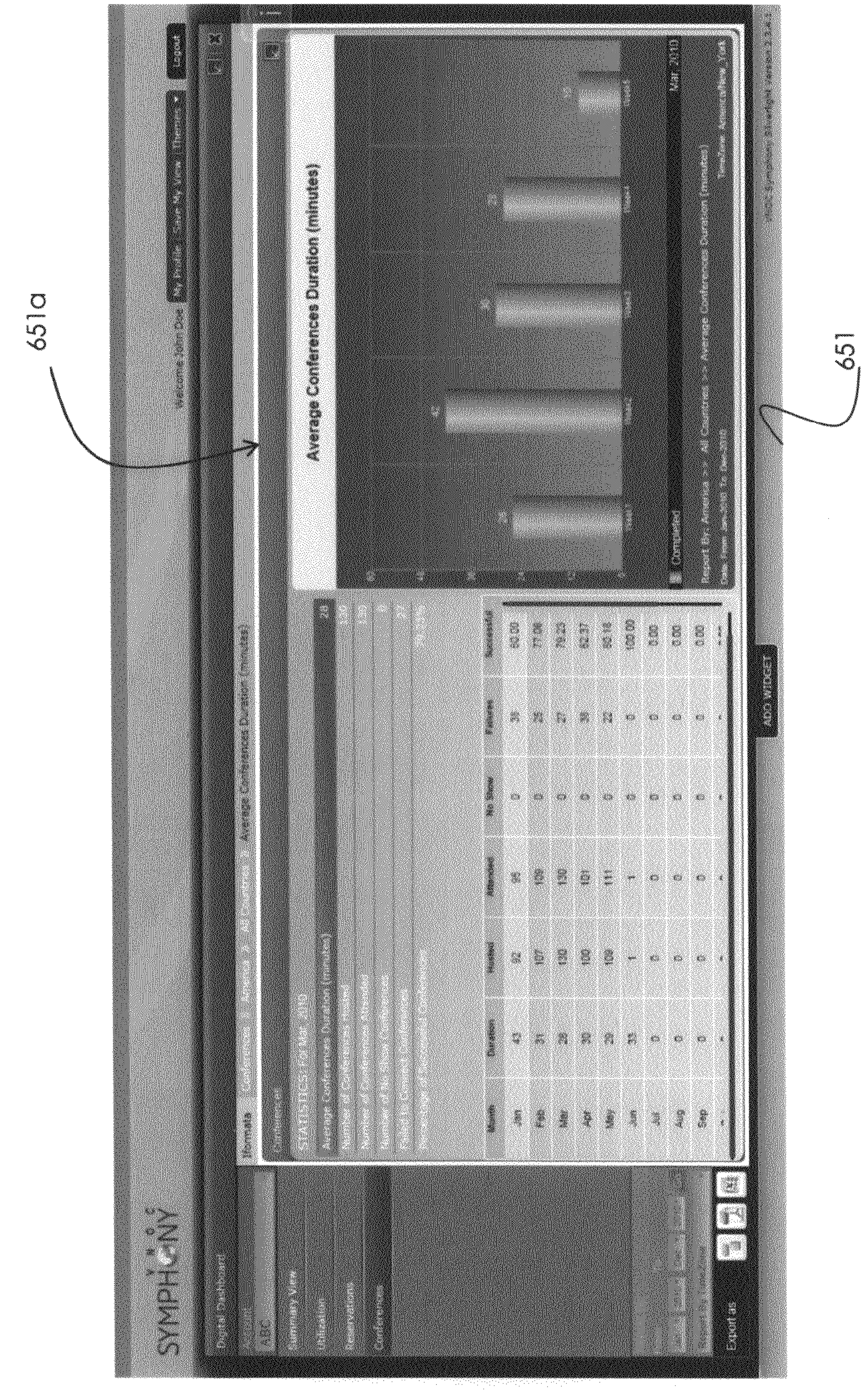

Referring back to FIG. 33A, if the user actuates the reservation report at 628*b*, the user will be presented with the graphical user interface 640 (FIG. 33C), which provides statistics relating to the reservation organized by geographic areas, countries or the like. As with the user interface 630 shown in FIG. 33B, note that the user may actuate, for example, the Americas graphs 640*a*, whereupon the statistics associated with all countries associated with the Americas will be displayed below it in area 642 in user interface 640 and in graphical form at 644 as with the prior user interface 630. In FIG. 33C, note that this interface 640 also enables the user to export the data in pdf, Powerpoint, Excel format by actuating the buttons at 646. The user may also change the report by changing one or more of the field data in the fields 648, such as the date at the area 648 in the form 640 shown in FIG. 33C.

Referring back to FIG. 33A, if the user actuates the conference screen 628*c* by clicking anywhere within the boundaries of screen 628*c*, then the user will be presented with the report 650 (FIG. 33D) which provides statistics again by country or geographic region of the number of conferences that occurred. Note that the statistics may include the number of conferences hosted, the number of conferences attended, the number of conferences with no-show, and the number of conferences that failed to connect in an area 650*a* of the screen 650 with an area 650*b* illustrating graphs associated with the statistics in the area 650*a* on the left. In the illustration, note that the graphs on the right at area 650*b* are associated with the number of reflects the number of conferences with the status completed. A user may be able to highlight, for example, the month of May, in which case further statistics, shown in the GUI 651 in FIG. 33E, will be provided regarding the statistics for the month selected. Note that in the area 651*a* of FIG. 33E, average conference duration is shown and the user may obtain further statistics about one or more of the weeks, such as week 3, by clicking on the week selected, in which case the interface or GUI 652 in FIG. 33F will appear.

Thus, it should be understood that the reporting runbook process 58*n* and associated interfaces in FIGS. 33A-33G enables the user to generate and receive a plurality of intuitive reports regarding the various statistics or information relating to the user's use of the system 10 and use of terminals 14-28, desktops 32 and/or gatekeepers 34. While the reports have been shown as illustrated in FIGS. 33A-33E, it should be understood that more reports with different statistics or further breakdown of statistics may be provided, fewer reports with different statistics or more reports with different statistics.

Figure 33F:
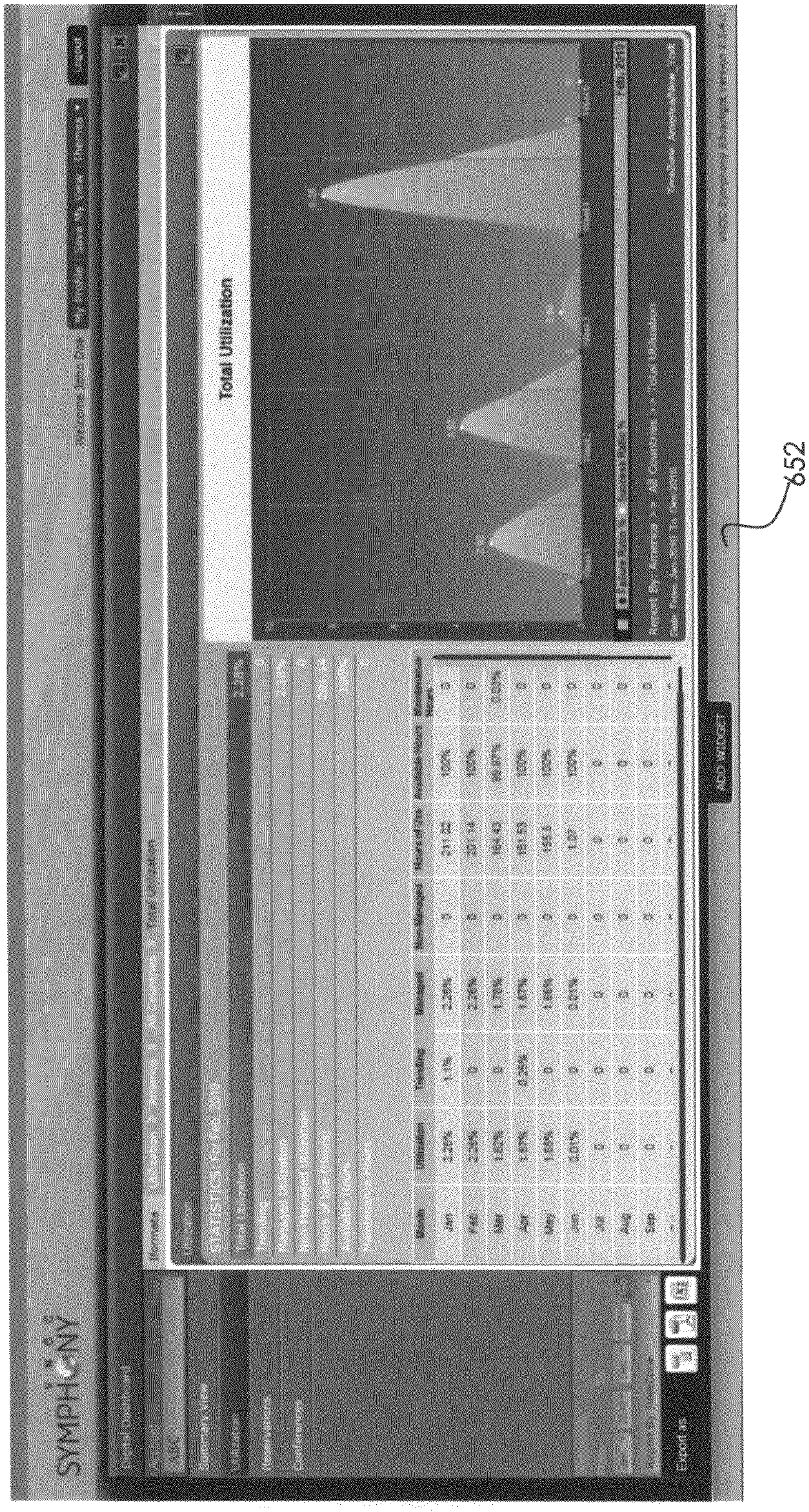
Figure 33G:
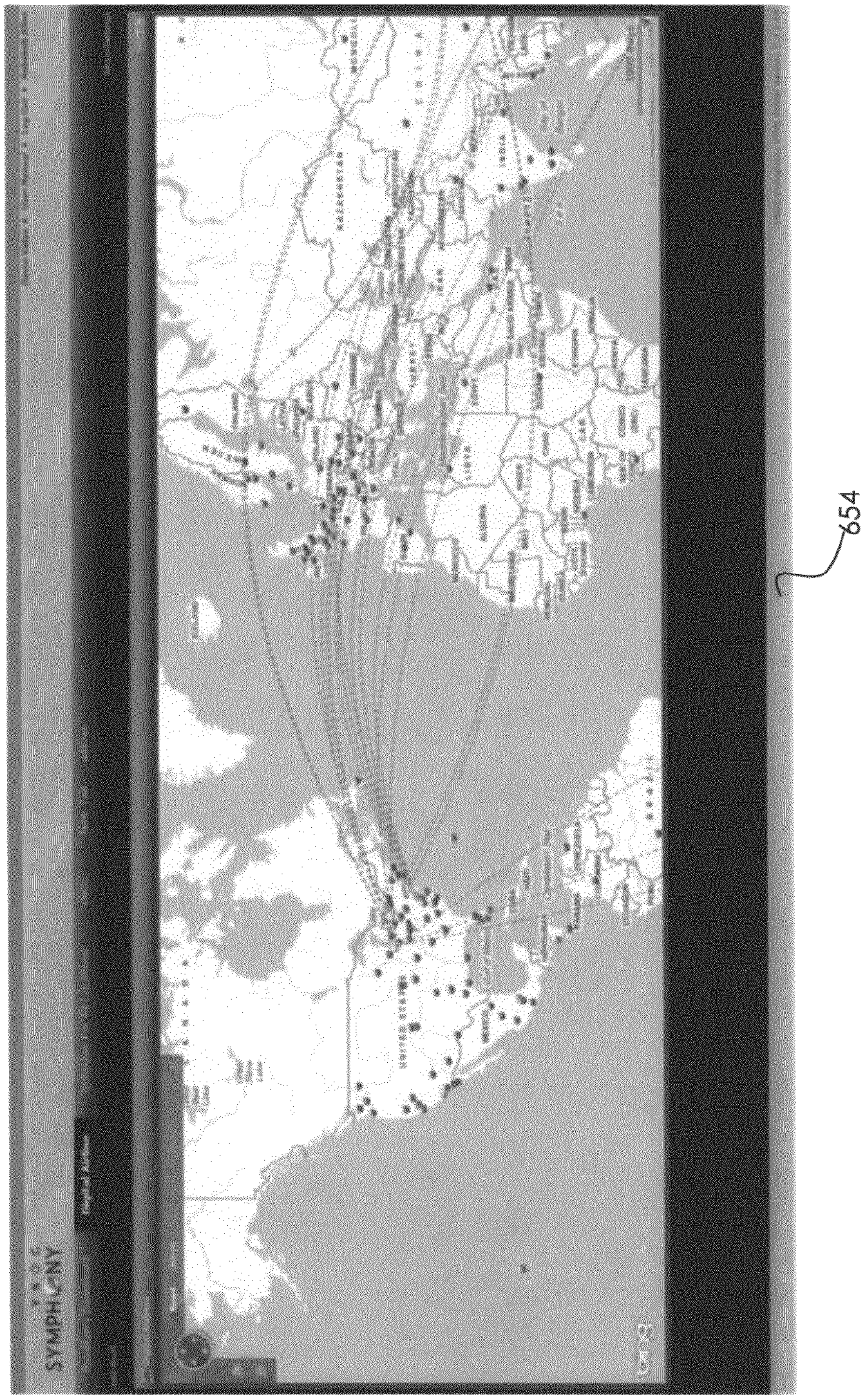

Moreover, while the reports have been shown to provide a listing of statistics, the reports could be provided in other visual forms, such as the graphical color illustrations shown in FIG. 33F, pie charts, bar charts, or other common graphical represented form or other forms. The graphical reports and statistic representations could be provided in a mapped form so that the user may select areas of the geographic globe for statistical breakdown. For example, the user may actuate a geospatial interactive map 654 as illustrated in FIG. 33G, may actuate a country, such as U.S. in a geospatial interactive map and system 10 will show statistics relative to terminals 14-28, desktops 32 and/or gatekeepers 34 located in the geographic region. FIG. 33G illustrates an enlargement of the map 654, with color coded fields that provide the user with statistics or a visual representation of data, such as the active terminals 14-28, desktops 32 and/or gatekeepers 34, active conference sessions, pending conference sessions. Note that the data could be color coded, such as green for an active terminal, blue for a provisioned, but not active, terminals 14-28, desktops 32 and/or gatekeepers 34, and red for inactive terminals 14-28, desktops 32 and/or gatekeepers 34 or, perhaps, terminals 14-28, desktops 32 and/or gatekeepers 34 with a fault. Advantageously, the system 10 enables enlargement and magnification associated with the interactive geospatial map so that the user may zoom in and out of particular areas associated with the geographic areas of the world. Note that active conferences terminals 14-28, desktops 32 and/or gatekeepers 34 are displayed on the map by indicia. In the illustration being described, the map is a Microsoft® Bing map, but it should be understood that any publicly available geospatial map or map data could be used.

The system 10 further comprises the provisioning runbook process 58*a* which enables the user to provision and store in the IDR 40 data and information about the user, contract or license agreements or restrictions under which the user is entitled to use the system 10, terminals, that are associated with the user the system 10 resources that the user is entitled to use such as the runbook processes that the user will have access to and data associated with the user and the terminals 14-28, desktops 32 and/or gatekeepers 34, such as the geographic location of the user and the terminals associated with the user and the enterprises system. The provisioning runbook process 58*a* also enables the user to associate and provision various conference information or attributes associated with a user and its terminals 14-28, desktops 32 and/or gatekeepers 34. Such attributes may comprise a seating capacity associated with a conference area, a maximum number of participants that a conference area holds, whether the location is a public space or private space, establish access hierarchies for each location or terminal, amenities (for example, whether catering, whiteboards, smartboards, or in-room electronics are available), time zone, latitude and longitude, country, address, network connection, office type (such as a home office, organization headquarters, mobile office, portable audio/video conference terminal, officer's office, conference room, the user's role or right and the like). It is also important to note that during the provisioning runbook process, the user provisions or assigns various network connection data associated with each terminals 14-28 and each geographic location. For example, a user may provision an office location that has an IP connection with a maximum bandwidth of a T1 (1.544 Mbps) connection. For ease of illustration, the provisioning by the user of an attribute associated with a user's location will be illustrated, but it should be understood that the same provisioning runbook process will be used to provision the terminals 14-28, desktops 32 and gatekeepers 34 and the associated conference information or attributes for a particular user.

Figure 28:
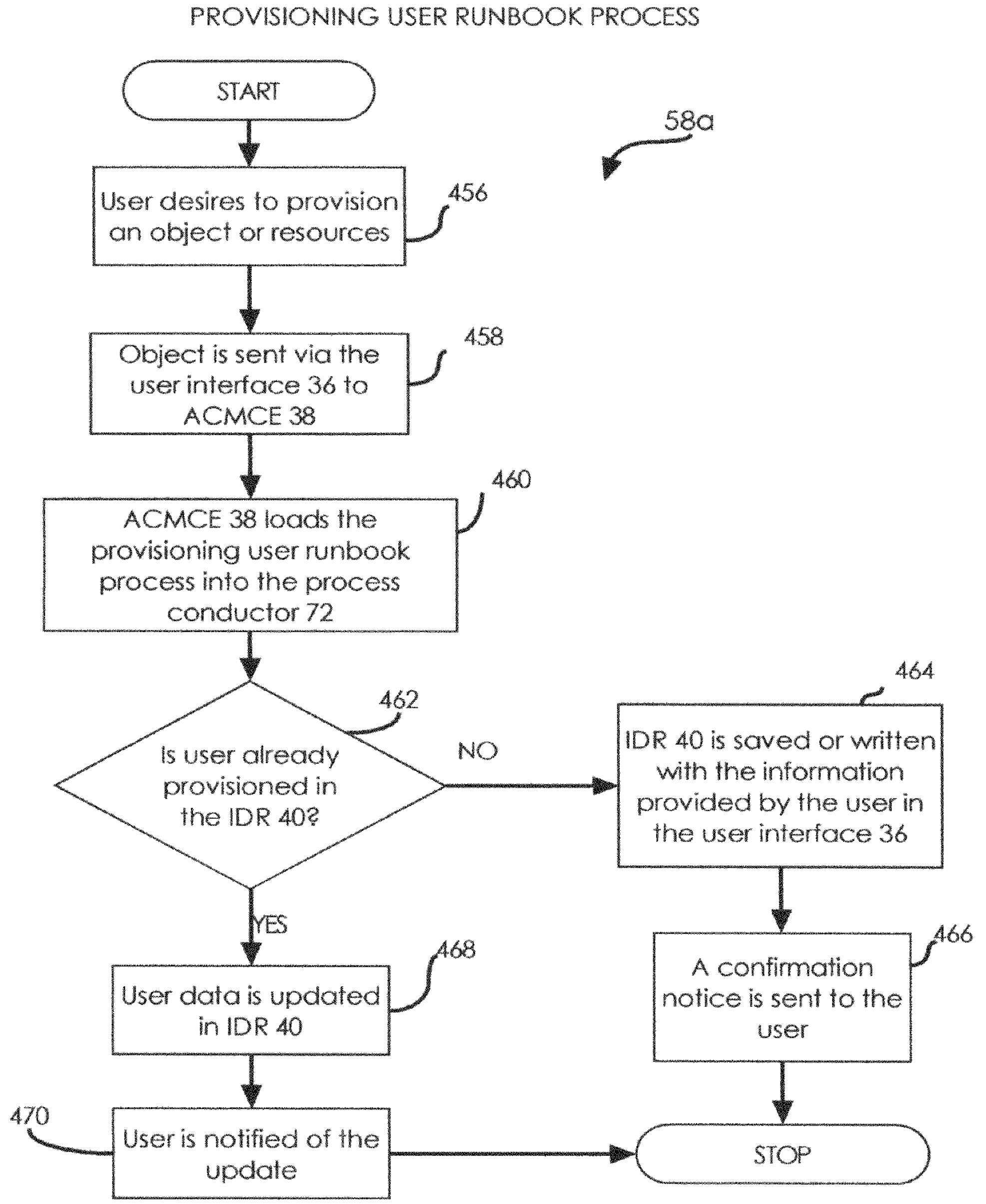
FIG. 28 is a schematic view of a provisioning runbook process in accordance with one embodiment of the invention.

In the illustration shown in FIG. 28, the process begins by the user creating an object for the user that conforms to the predefined schema. The object is comprised of data, such as the information mentioned earlier about the user. In this illustration, the object associated with provisioning a user in general will be shown.

When a user desires to provision resources associated with the system 10 (block 455), the object is sent via user interface 36 to the ACMCE 38 (block 457). The ACMCE 38 loads the provision user runbook process 58*a* into the process conductor 72 (FIG. 5) at block 460 in FIG. 28. At decision block 462, the ACMCE 38 determines whether the user is already provisioned in the IDR 40. If the user is not, then the IDR 40 is stored or written with information that is provided by the user via the user interface 36 (block 464). A confirmation is sent to the user (block 466) that notifies the user that the resources have been provisioned. Such notification may be, for example, an electronic mail to the user.

If the decision at decision block 462 is affirmative, then the user's data in the IDR 40 is updated (block 468) with the information that the user has input into the user interface 36. The user is notified, for example, by electronic mail that the user data in the IDR 40 has been updated (block 470). After block 466 and 470, the provisioning runbook process ends.

In the illustration being described, there are various required provisioning runbook processes and some that are not required. One required provisioning runbook process is the provisioning service process 58*b* (FIG. 5) which is a method or process by which information is stored about the user(s), the user's service rights, restrictions and predetermined usage parameters, which are established by, for example, the user's license or contract terms that govern the user's use of the ACMCS 12, the user's terminal(s) are input into the ACMCS 12.

The pre-determined usage parameters for the user are input into at least one or a plurality of the Tables referred to herein and resident in the IDR 40 using the user interface 36 of the ACMCS 12. The user interface 36 comprises the plurality of graphical user interfaces (GUIs) 456-514 shown in FIGS. 29A-29L, respectively. These GUIs are one illustration of the interface that can be used, but it should be understood that other interfaces can be used. During the provisioning runbook processes 58*a* and 58*b*, the GUI 456 is presented to the user whereupon the user selects a button 456*a* to add an object, organization or user to the system 10. In response, a modal pop-up 456*b* is presented to the user.

The user interface 36 comprises a plurality of graphical user interfaces 456-514 that are shown in FIGS. 29A-29M, respectively. The ACMCE 38 presents the graphical user interface 456 (FIG. 29A) to the user when the provisioning process is being accessed by the user. This would, for example, enable the user to add the user or organization to the IDR 40 so that the user or organization may use the system 10. Note that the user enters the name of the organization and an acronym for the organization and selects whether or not the organization is an active organization. Next the user selects the save button 456*a* to write the information to the IDR 40. This archived data is associated in the IDR 40 with a location and an organization, as illustrated in the graphical user interface 456 as shown in the FIG. 29A. Once the data is entered and stored in the IDR 40, the data is available for this runbook process or other runbook processes to access and use the data.

Next, the GUI 458 (FIG. 29B) is presented to the user whereupon the user selects the add account button 458*a* and an add account pop-up 458*b* is presented to the user. After completing the field pop-ups 456*b* and 458*b*, an organization and an associated account has been added to the IDR 40.

Figure 29A:
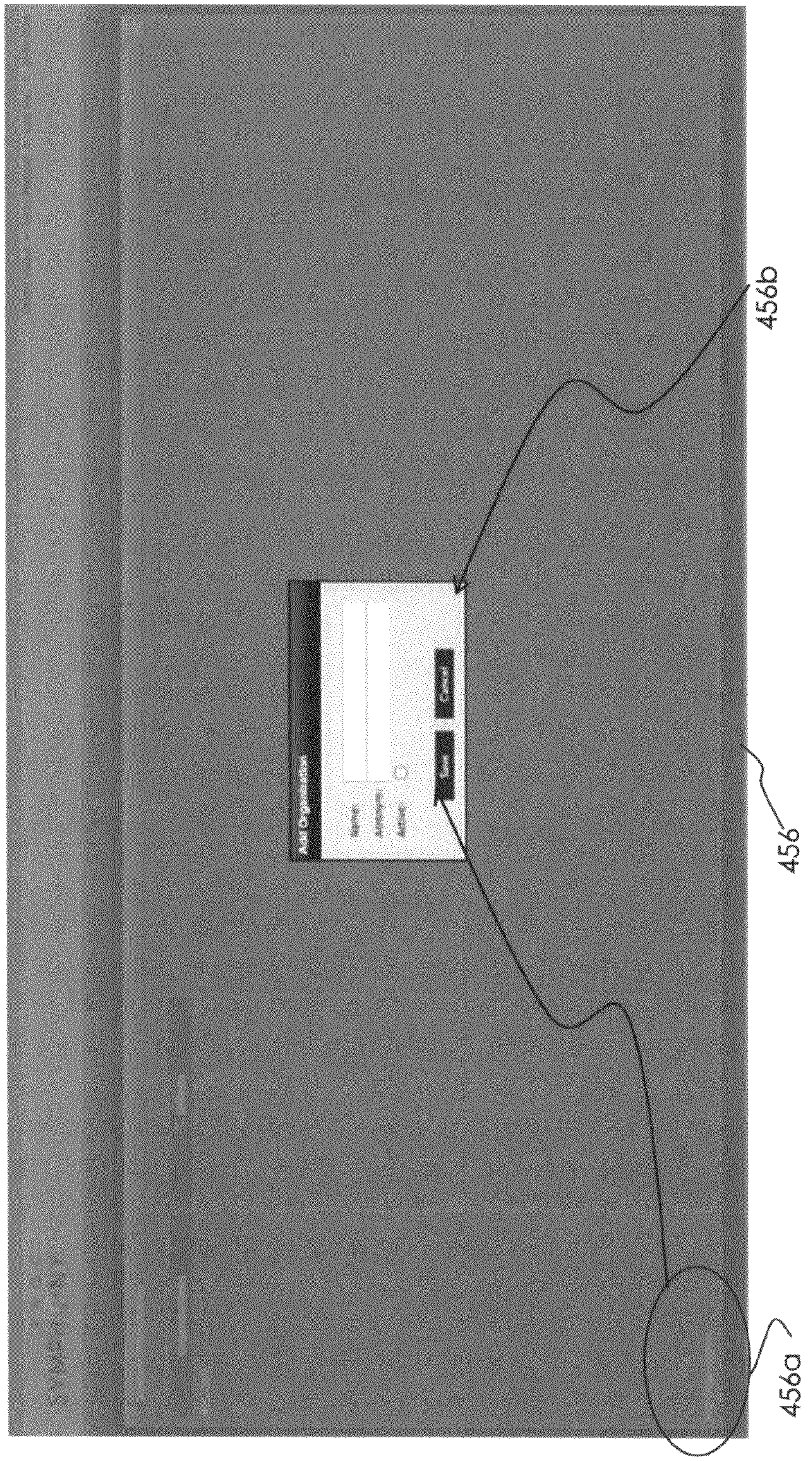
FIGS. 29A-29M are illustrative of interfaces or graphical user interfaces illustrating a web portal user entry point for performing multiple functions, such as scheduling a conference.
Figure 29B:
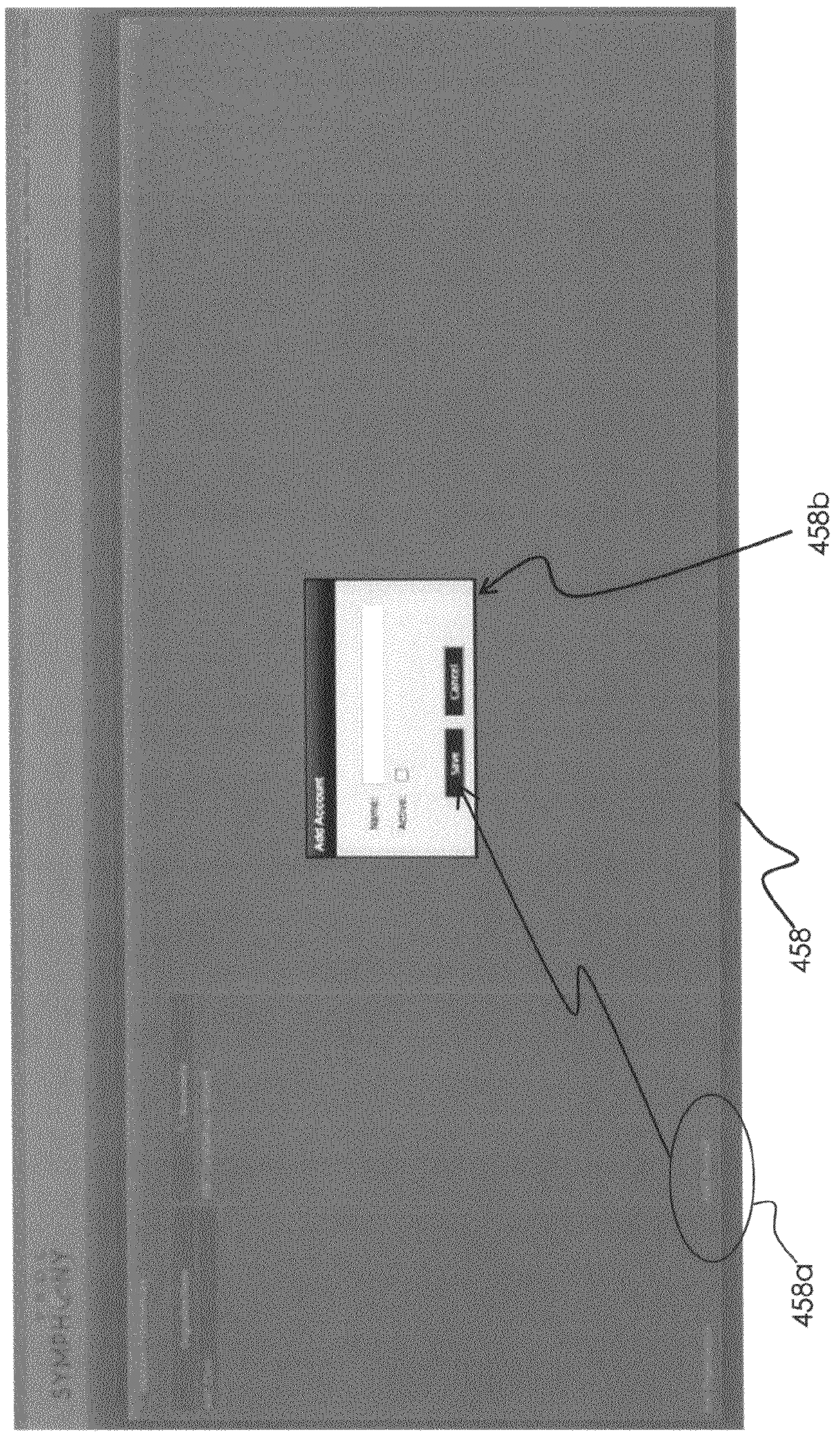
Figure 29C:
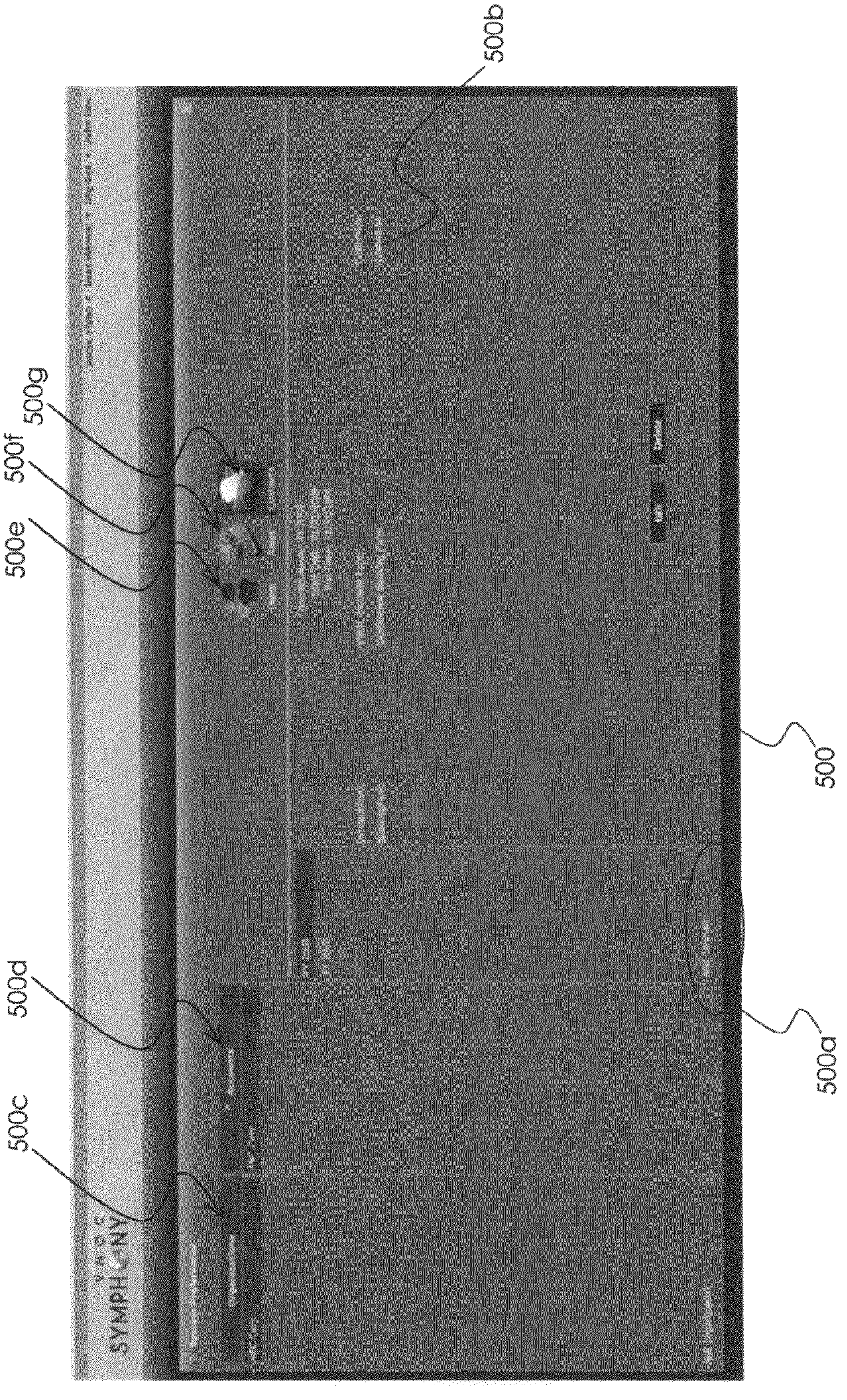

Once the account has been added for the organization, the user can add contract or licensing information by selecting the button 500*a* in the GUI 500 in FIG. 29C. Notice in FIG. 29D that the ACMCE 38 populates the user interface 36 with the GUI 502 that provides a plurality of contract or service features that the user can select to have associated with its account. In the fields 502*a*, the user inputs the contract name and the start date and end date for the contract term which corresponds to the term that the user will be entitled and authorized to use the system 10. Note the various fields 502*b* enable the user to select various service features and functions. For example, one of the features that the user may associate with its contract is the feature that they will have unlimited scheduling in which case the Standard Definition (SD) connect and High Definition (HD) connect (fields 502*a*1 and 502*a*2), respectively, which enables the user to select whether or not they will have the option during their contract period to select Standard Definition or High Definition for conferencing. Once the user has completed the fields 502*b* selecting the various services using the GUI 502, he may select the save button 502*c* (FIG. 29D), whereupon the user's data is saved to the IDR 40 and the ACMCE 38 causes the GUI 500 (FIG. 29C) to again be displayed.

Figure 29D:
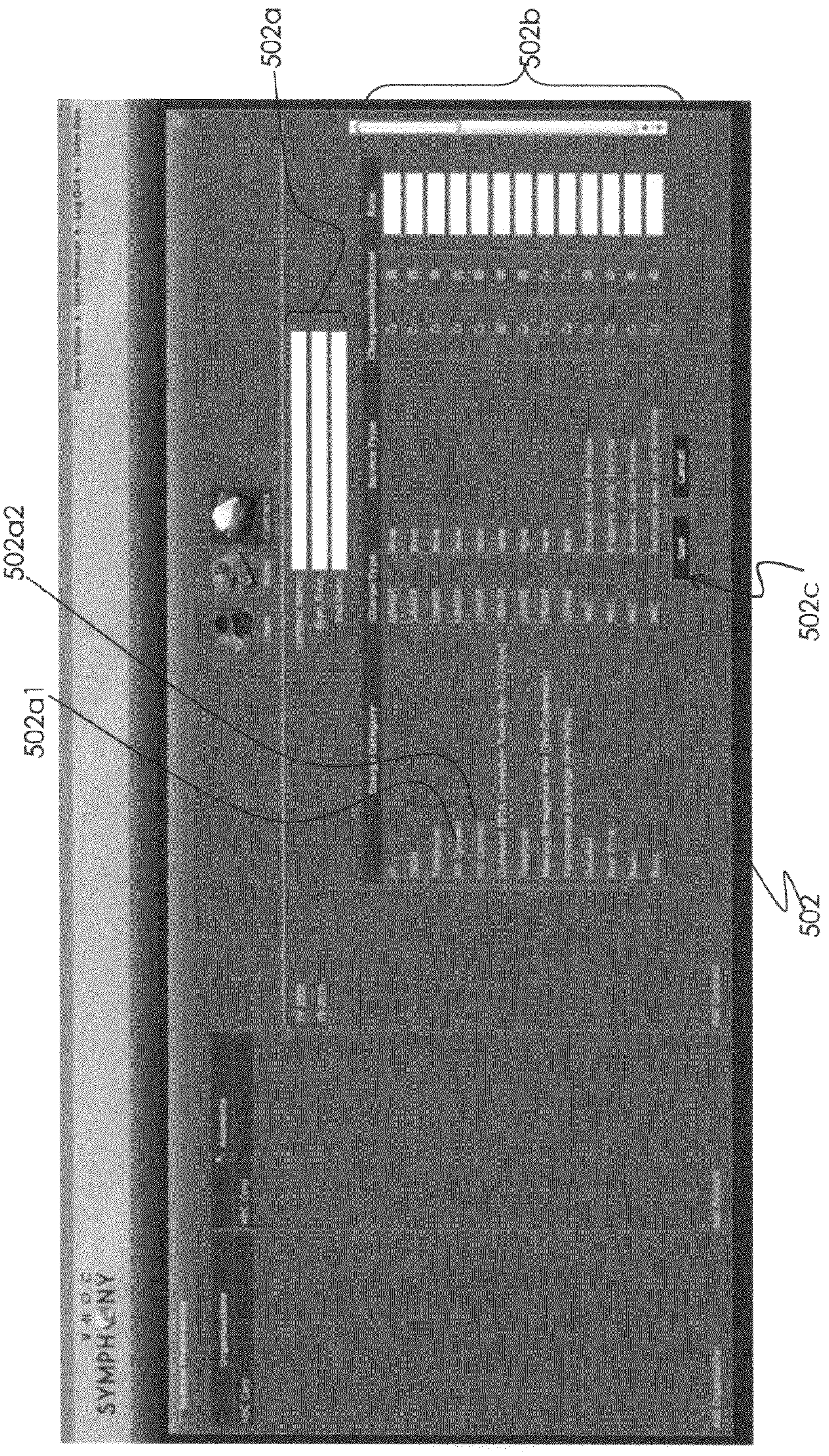
Figure 29E:
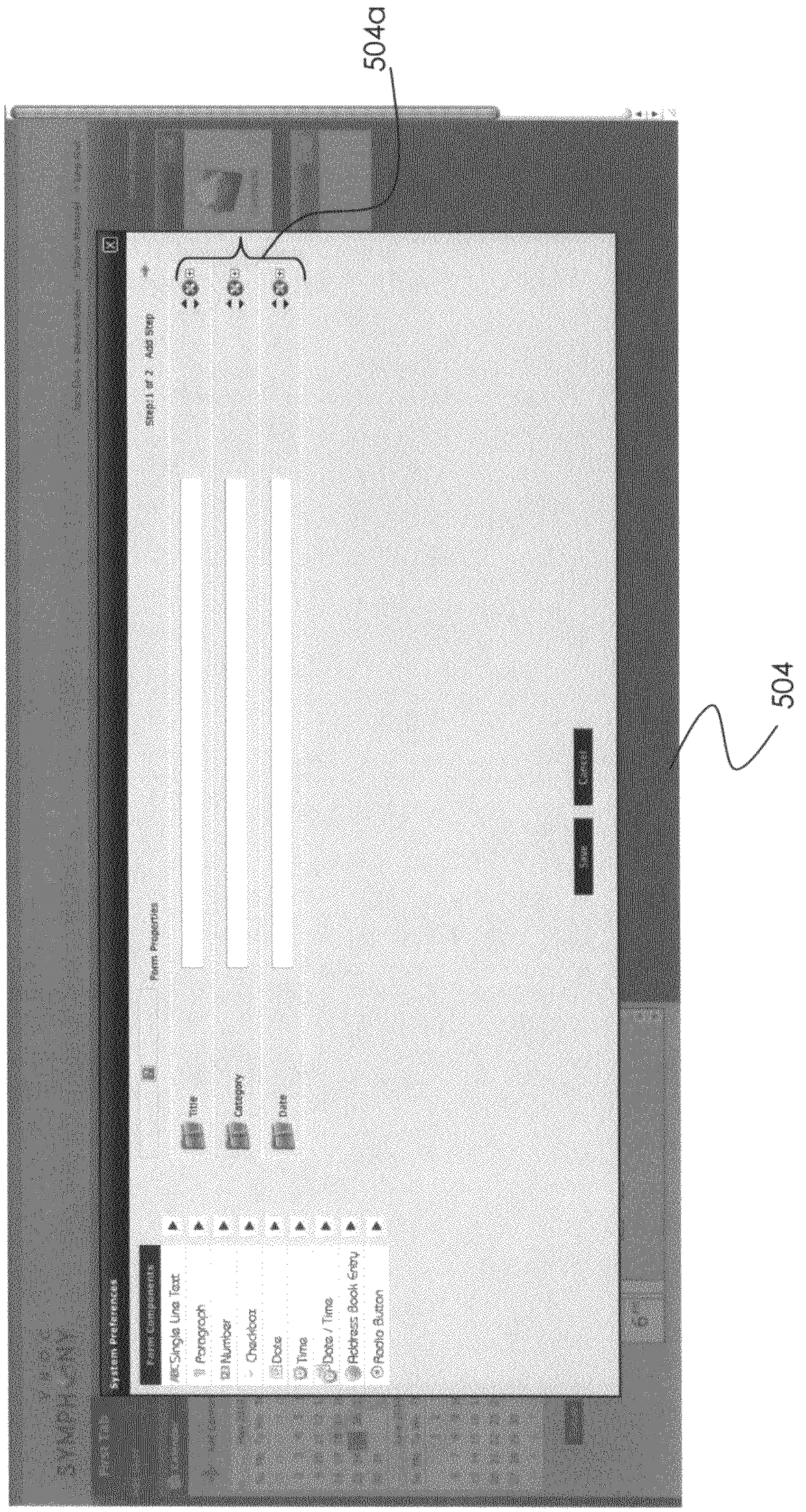

As part of the provisioning runbook process, the user may customize various forms or interfaces that the user will input data into, such as a scheduling interface referred to earlier as well as selecting the required and optional data input fields and the order that they will be presented to the user when a runbook process is being performed. For example, if the user selects the button 500*b* in FIG. 29C the user is presented with the GUI 504 (FIG. 29E) whereupon the user can customize, add or remove data input fields that will be displayed during the execution of one or more of the plurality of runbook processes 58. For example, fields 504*a* in FIG. 29E are default fields for identifying a title, category and date for creating the fault ticket within the fault management process 58*i* described earlier. Other fields (not shown) may also be added dependent upon the required and optional fields identified in the user's fault management process.

Figure 29F:
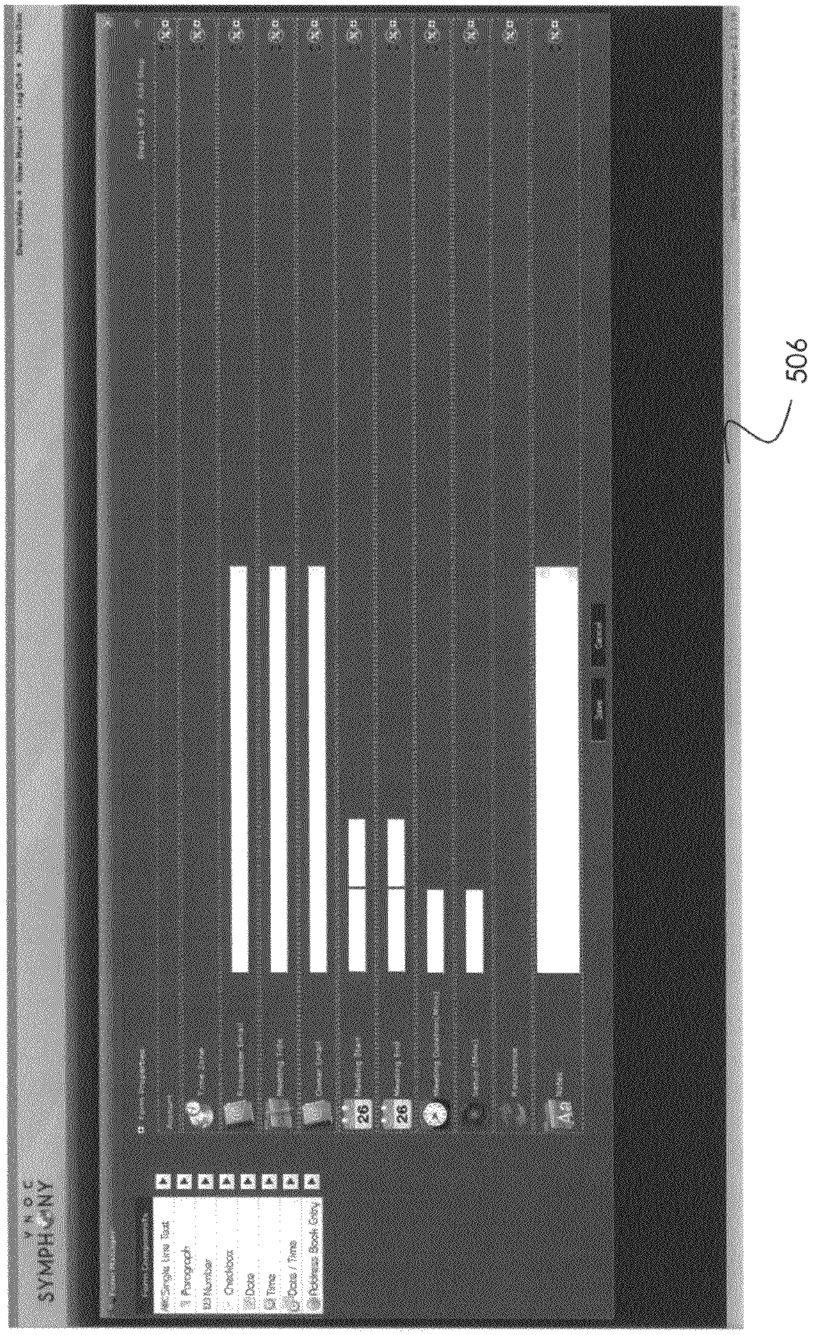

As part of the provisioning runbook process 58*a*1, the user will create a customized scheduling form that is used by the scheduling runbook process 58*d*. FIG. 29F is an illustration of the customized scheduling form 506.

Figure 29G:
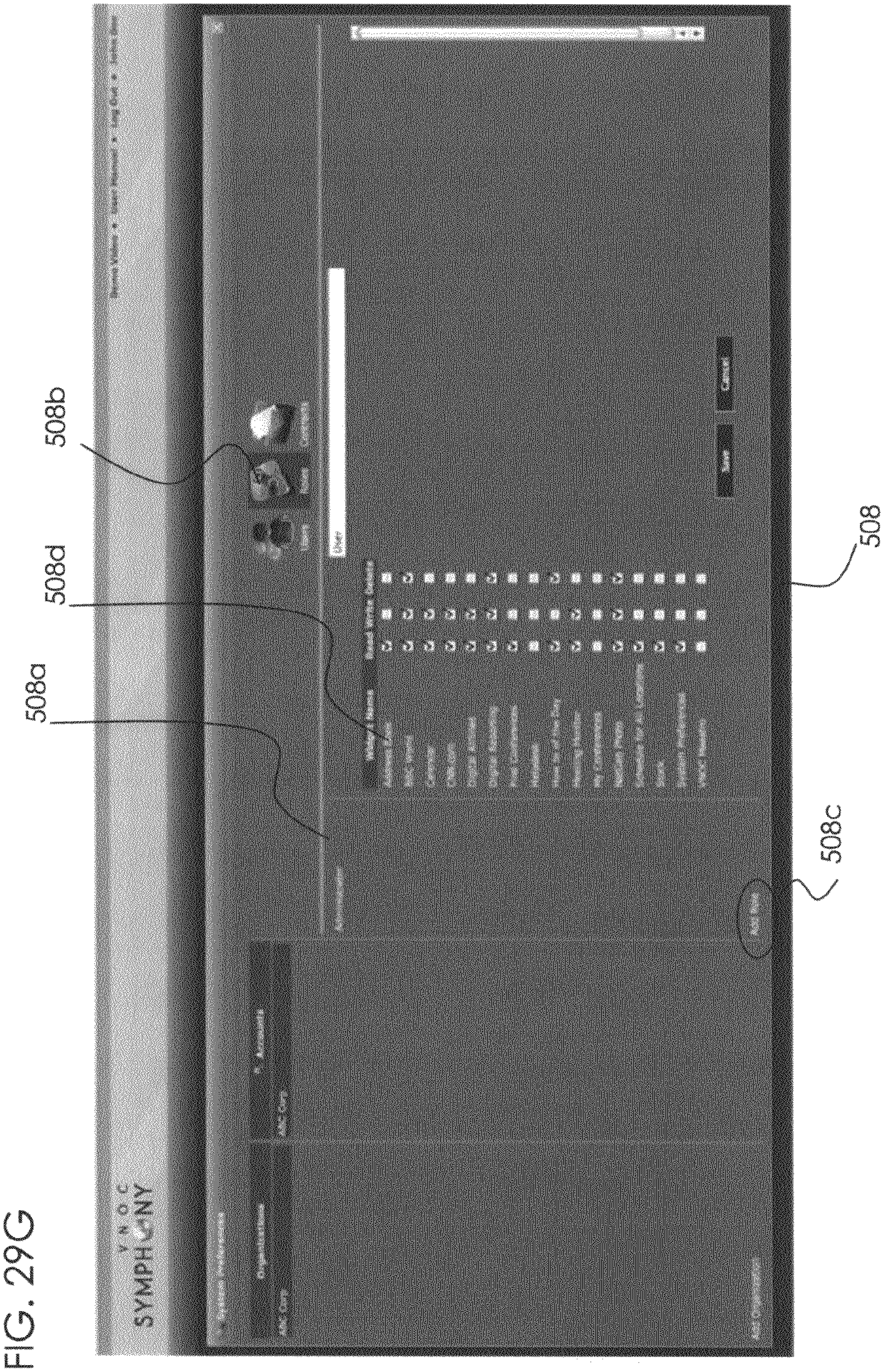

In FIG. 29G, a GUI 508 is shown for provisioning roles and rights of the user's use of the system 10. Notice that in FIG. 29G that an account is established for each organization (ABC Demo in the illustration) and at least one or a plurality of roles is associated with the account. In the illustration, the roles are identified at fields 508*a*. A user can select a button 508*b* or 508*c* to add or remove roles. When a role 508*a* is selected, the functionalities within the system 10 are shown for the user to select at least one or more rights associated with each of those functionalities. For example, if the ABC Corp. user selects the read and write fields associated with the address book field 508*d*, then the system will enable the ABC Corp. user to see and edit the contact information for at least one or a plurality of the users associated with the ABC Corp. user account. The other functionalities may be selected or deleted as shown. Thus, it should be understood that the user interface 36 and various graphical user interfaces that permit or enable the user to input information and data into the IDR 40 and that information and data is used by the ACMCE 38 to automate, manage and control audio and video communication and data collaboration.

Referring back to FIG. 29C, note that the user is identified in the left hand column 500*c* and that the ACMCE 38 associates an account 500*d* with that user. The user may also add or associate an account by actuating the button 500*a*. In this illustration, for each of the accounts listed, the user may establish the user rights by actuating the button 500*e*, role rights by actuating the button 500*f* and contract or service rights or restrictions by actuating the button 500*g*. For example, FIG. 29D illustrates the graphical user interface after the contract button 500*g* was selected, which caused the ACMCE 38 to display the fields 502*a* and 502*b*. Note that these fields 502*a* and 502*b* enable the user to enter various data mentioned herein regarding the contract or license rights that the user has to use the system 10. For example, the user can enter the contract start date, expiration date and select various features and associated rates, monetary cost or cost allocator that will be charged for using such features.

The provisioning runbook process 58*a* also provide means, method or provisioning user process by which information about the single user is input into the IDR 40 and then used by the ACMCS 12. Information about a single user is comprised of at least one or a plurality of the following: first name, last name, e-mail address, time zone, phone number, mobile number, fax number, address, country, user role, username, notes and preferred language. In one illustrative environment, the system 10 comprises the user interface 36 in the form of GUIs shown in FIGS. 29A and 29G-29H.

Figure 29H:
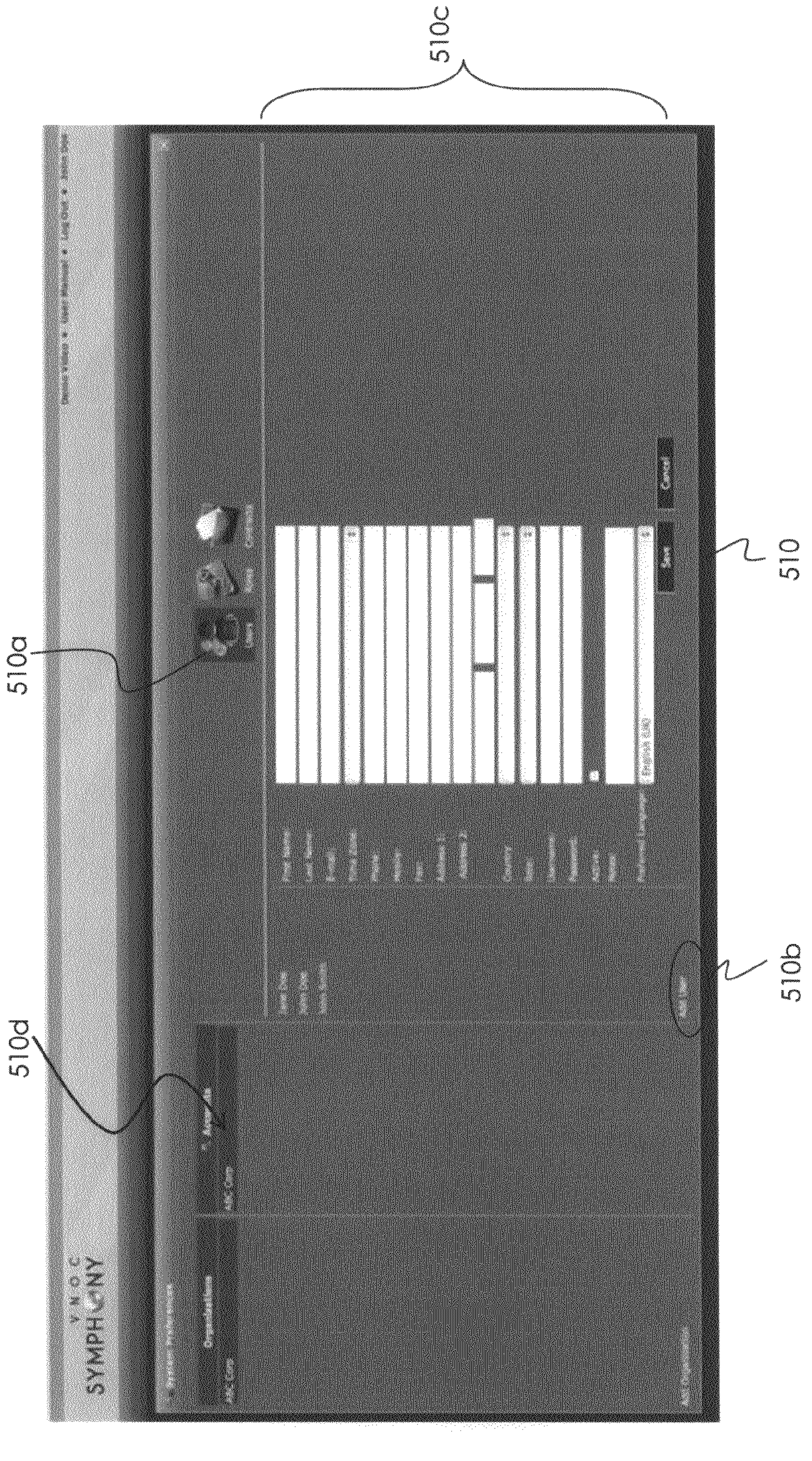

Referring to FIG. 29H, the user interface 36 includes GUI 510 which enables the user, such as ABC Corp. in the illustration, to provision the ABC Corp. users who will be recognized and authorized to use the system 10. The user may actuate the button 510*a* or 510*b* to add a user. Once at least one of these buttons is actuated, the fields 510*c* are shown and may be populated by the user, and the new user will be added to the list of users as shown at 510*d*. It should be understood that the information that the user has populated in the fields 510*c* will be added to and stored in the IDR 40.

The interfaces shown in FIGS. 29A-29H are illustrative of the graphical user interfaces (GUIs) 456-510 that can be used to provision services in the manner described earlier herein, but it should be understood that different interfaces or means for provisioning resources within the system 10 could be used such as user specific enterprise system 44 interfaces.

It should be understood that the ACMCS 12 enables conference initiation using data associated with the user and its associated terminals 14-28, desktops 32 and/or gatekeepers 34 or, alternatively, using data associated with the individual persons who will be participating in the conference. In this regard, the IDR 40 contains predetermined conference information about the terminals 14-28, desktops 32 and/or gatekeepers 34 or by the individual participants. The OPL 46 polls the IDR 40 and then launches at least one or a plurality of the runbook processes 58 based upon the information observed within the IDR 40. For example, when the user has saved a meeting using the conference management runbook process 58*e* through the user interface 36, the meeting details are written to the database IDR 40. The OPL 46 polls the information written to the IDR 40 for the user's conference, and when the conference setup time and start time are observed by the OPL 46, then the OPL 46 will launch the conference setup runbook processes 58*e* described earlier.

The provisioning runbook process 58*a* also includes a means, method or provisioning terminals process by which information about a plurality of the terminals 14-28, desktops 32 and/or gatekeepers 34 is input into the into the IDR 40 and then used by the system 10. (Information about a bulk set of terminals is comprised of one or a plurality of the following: terminals name, terminals type, terminals capacity (relative to available seating), network connectivity, managed terminals, public terminals, photos, Uniform Resource Identifier (URI), the generic term for all types of names and addresses that refer to objection on the world wide web. A URL is a type of URI.

Figure 29I:
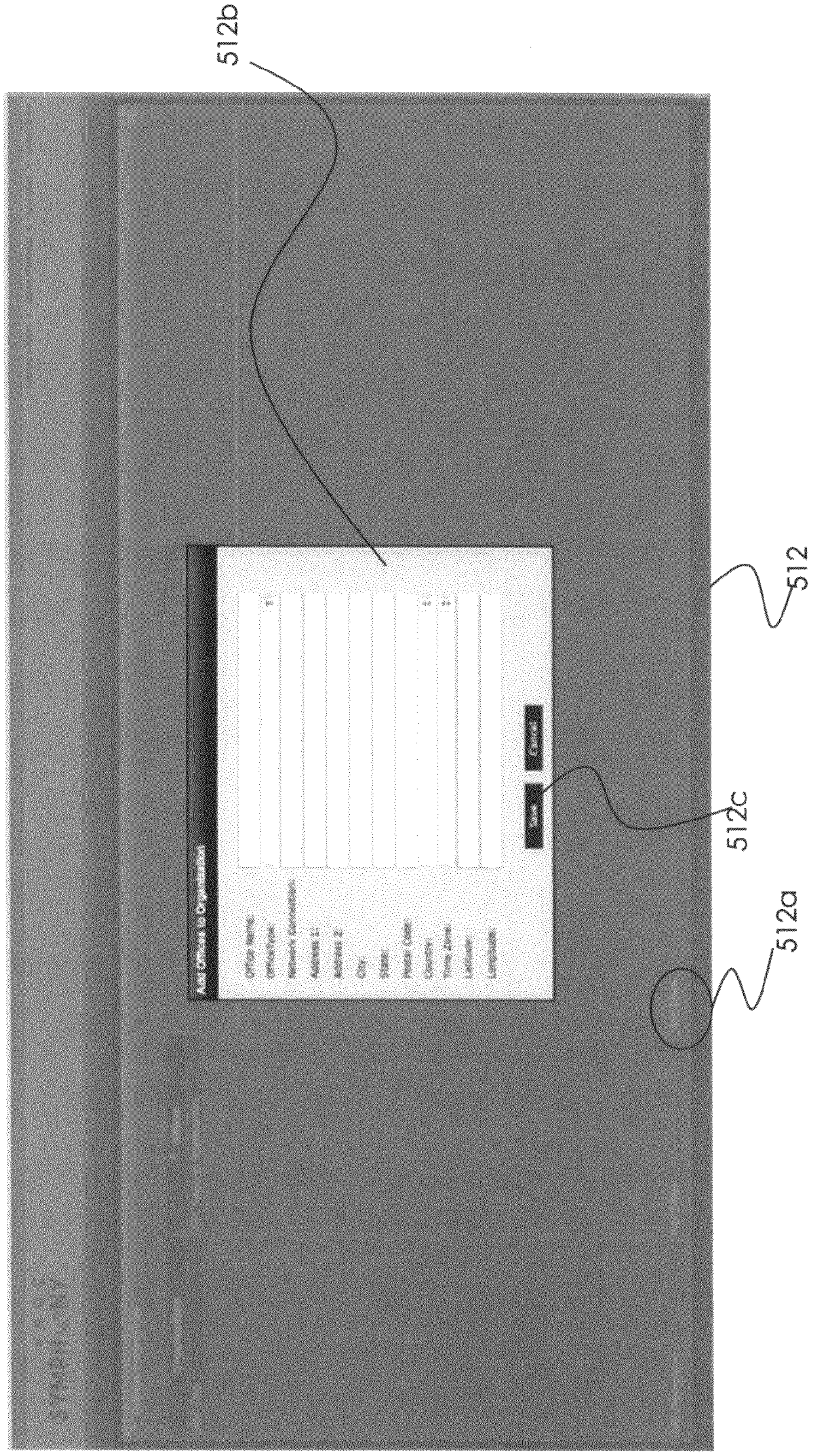

As shown in FIG. 29I-29M, the user interface may also include a plurality of GUIs 512-514 that enables the user to provision or assign the terminals 14-28, desktops 32 and/or gatekeepers 34 geographic location to a particular office or environment at their geographic location. In FIG. 29I, the user, after deciding to add or associate an office or geographic location by selecting the button 512*a*, is presented with a popup 512*b*, which the user populates. The user saves the data by selecting button 512*b* and that location is added to the IDR 40 and the list of offices associated with an organization is updated.

Figure 29J:
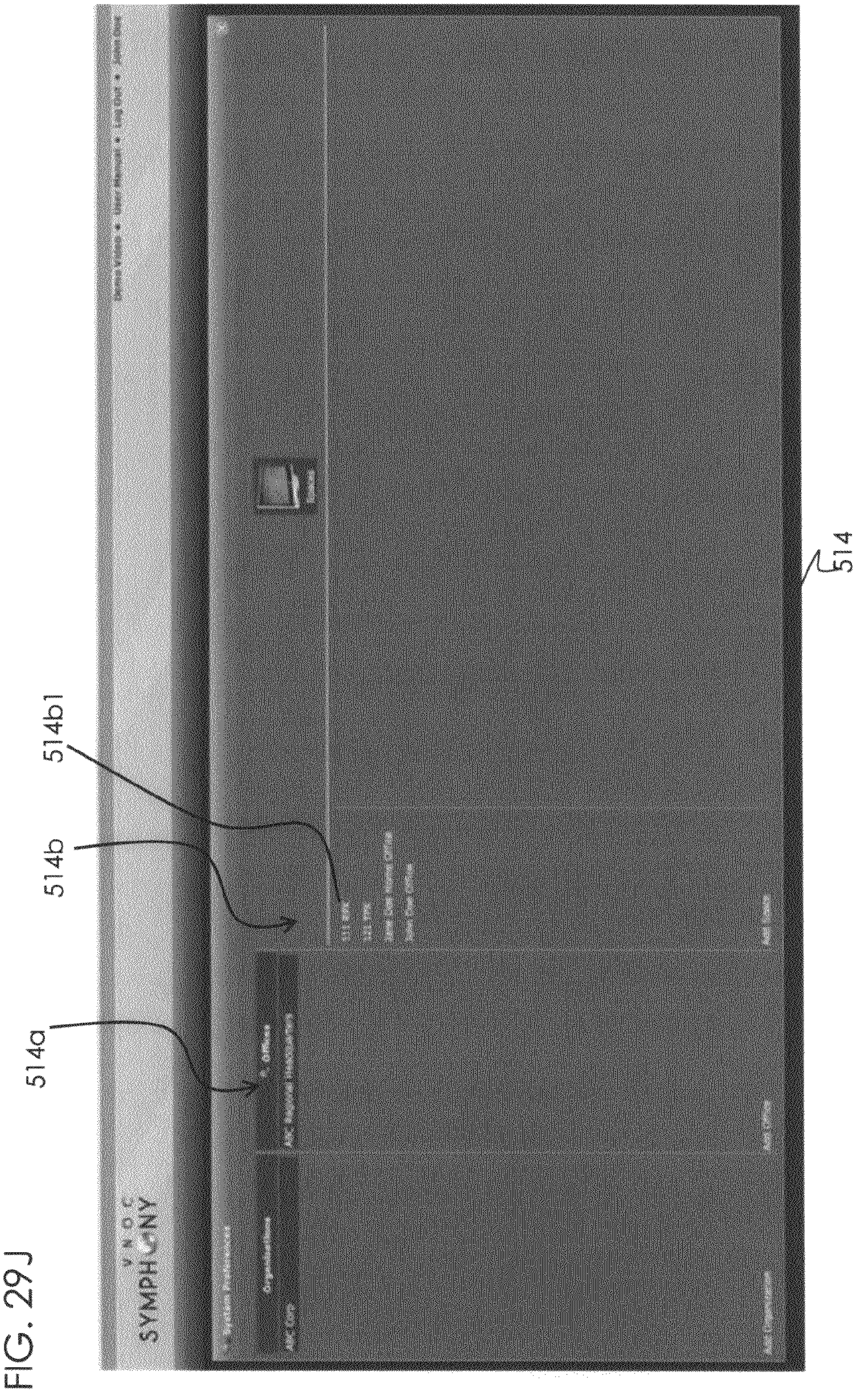
Figure 29K:
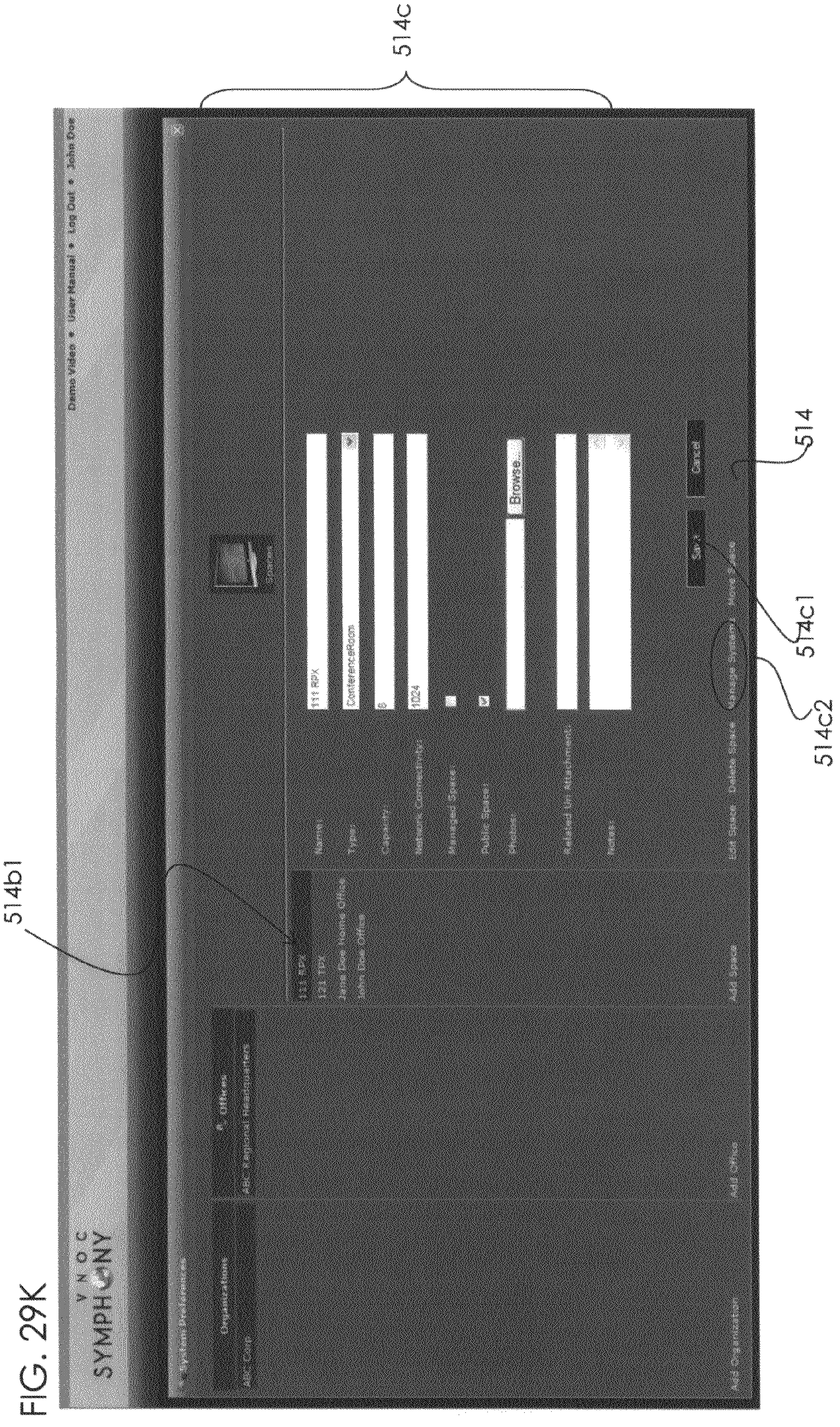
Figure 29L:
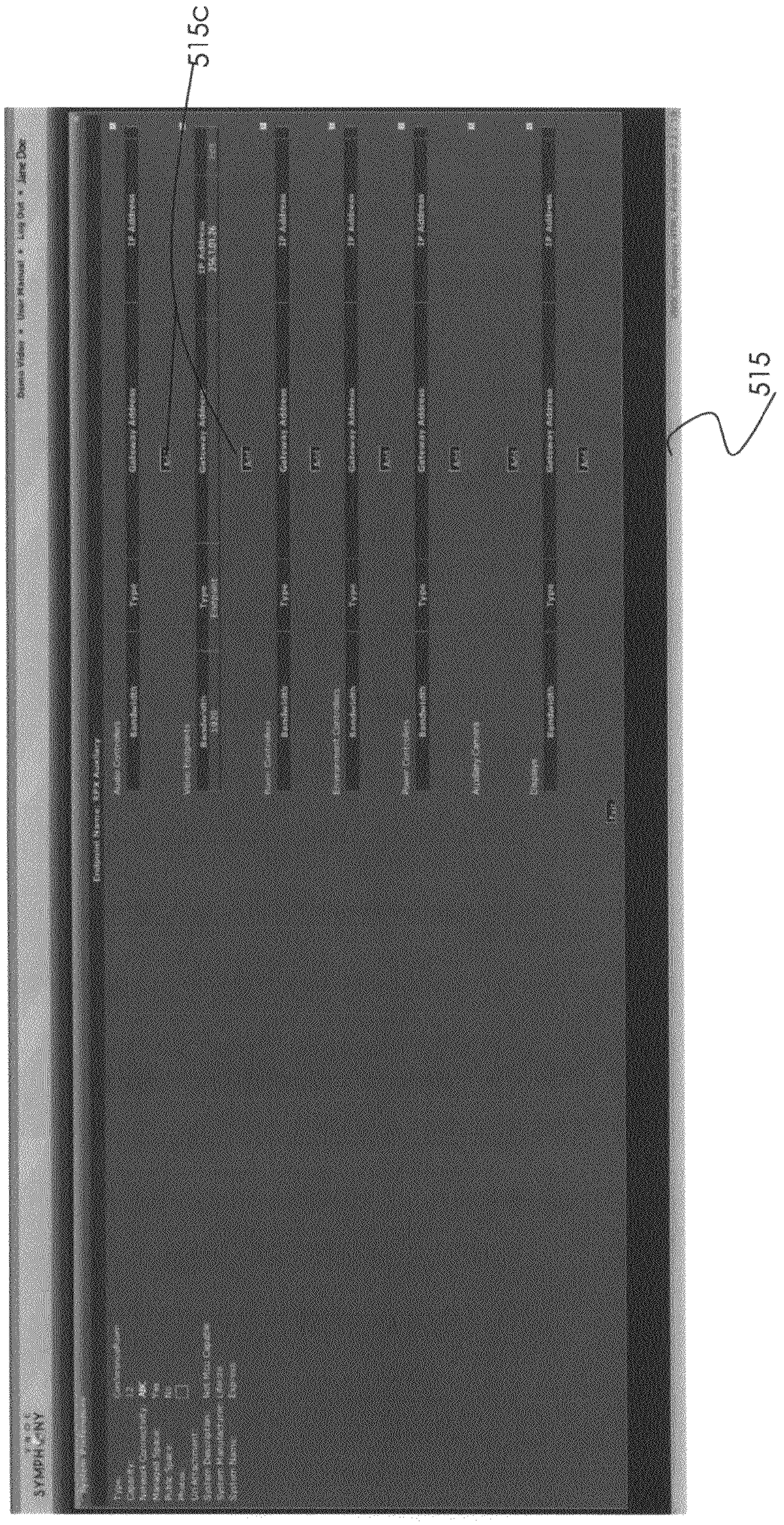
Figure 29M:
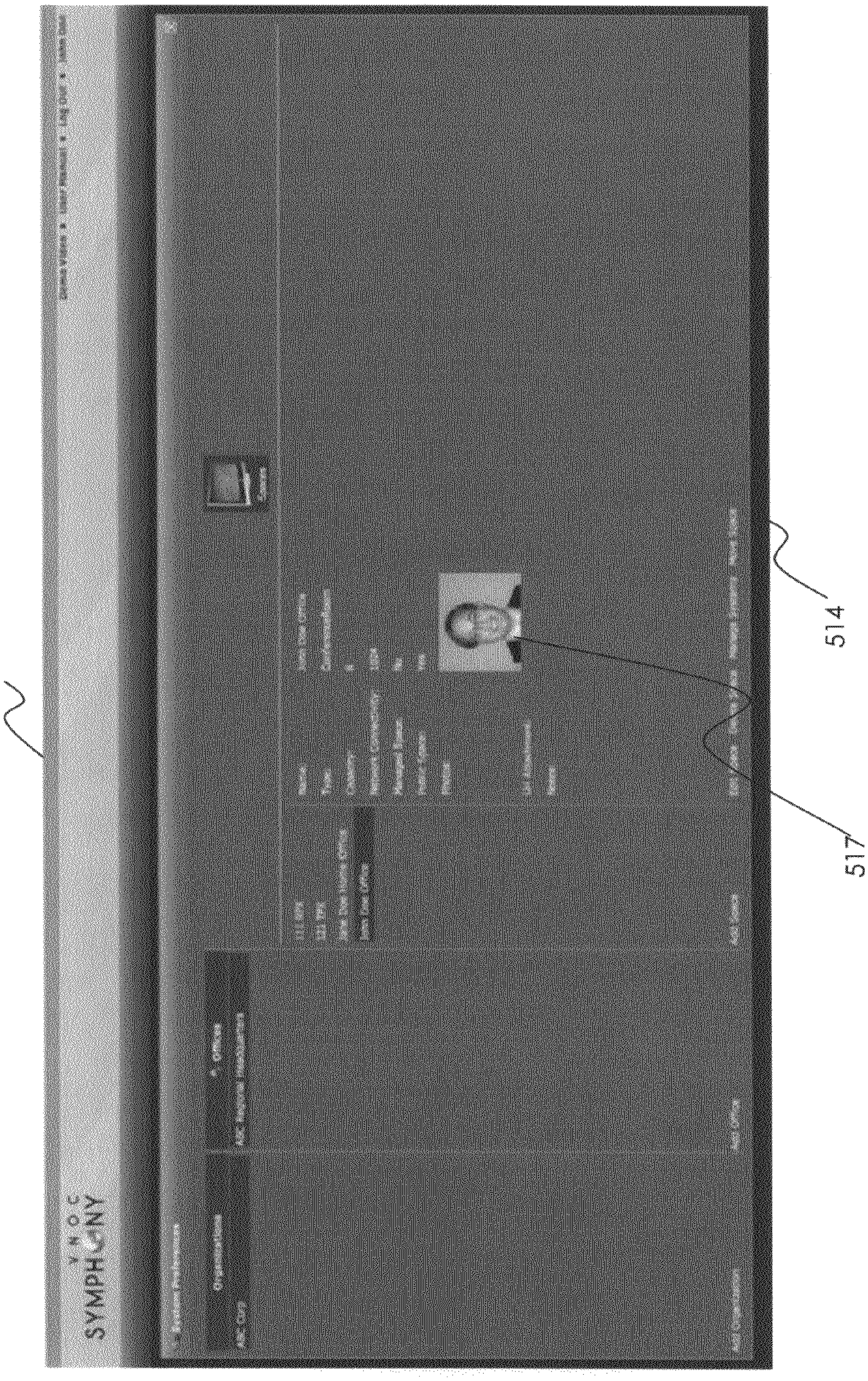

In FIG. 29J, another GUI 514 is shown, illustrating in column 514*a* the various offices associated with the ABC Regional Headquarters office. Note that in column 514*b* of FIG. 29J, the user can select the conference room button 514*b*1 in which case another interface or popup screen 514*c* (FIG. 29K). Note that if the user actuates the button 514*c*2, the user is directed to the screen 515 in FIG. 29L whereupon the user can input additional information regarding the terminals 14-28, desktops 32 and/or gatekeepers 34 being provisioned. In this regard, when the user actuates one or more of the add buttons 515*a*, the user can complete the associated fields, such as audio controller, video inputs and the like. The user populates the fields in 514*c* and after selecting the save button 514*c*1, the information is stored in the IDR 40. Note that once it is saved, the user may view the terminals 14-28, desktops 32 and/or gatekeepers 34 that is associated with the conference room in the illustration. This is shown in FIG. 29M. Note that a photo or picture 517 of the conference area or room may be associated with the provisioned conference room in the illustration so that when the scheduling runbook process 58*d* described earlier is being used by the user, the user can visually see the environment that it is selecting to be included in the conference.

It should be understood that while FIGS. 29I-29M reference organizations, offices, conference rooms and the like, and it is intended to comprise the provisioning of the terminals 14-28, desktops 32 and/or gatekeepers 34, so that while the illustration described relative to FIGS. 29I-29M refers to, for example, the conference room, the term "conference room" as used herein refers to the type of physical space the terminals 14-28, desktops 32 and/or gatekeepers 34 are provisioned in.

As mentioned earlier, the service runbook process 58*b* is an authentication process that is adapted to and enables the ACMCS 12 to authenticate and govern access to and use of the ACMCS 12. The authentication parameters may be defined, by way of example, by license or contract rights or restrictions that govern the user's use of the ACMCS 12 or a role/right associated to the user. For example, a user of the ACMCS 12 may enter into a license or contract that governs their use of the ACMCS 12, and such license or contract may limit the user's use of the ACMCS 12 to a specific or limited service term, such as a 12 month service term, a 24 month service term or a 36 month service term or the like. In another example, the role/right of the user may limit the user's access and use to various features and/or functions of the ACMCS 12 as shown. The service process 58*b* provides the individual service descriptions for each managed service covered in the user's license or contract. The service process 58*b* further defines the services and conditions of use set forth in the user's license or contract. For example, it defines the kinds of reports that will be generated or provided to the user by the ACMCS 12, such as usage reports, fault management reports and network performance reports, a format of the reports that will be generated or provided to the user, a timeline for when the reports will be delivered to the user and the like. The service process defines the means and process that the user uses to schedule terminals 14-28, desktops 32 and/or gatekeepers 34.

The user may have access to one or more of the following services or features of the ACMCS 12, which will, in one illustrative embodiment, depend upon the terms and conditions of their rights, restrictions or authorization as defined by their license or contract. The functions or services that are available to the user and provided by the ACMCS 12 comprise one or a plurality of the following: notifications, scheduling, site profiles, conference management which could include (setup, start, monitoring and tear down), remediation, escalation, proactive daily site sweeps, root cause analysis (RCA), quality control and reporting packages. Other functions or services may include, but are not limited to, a branding or the private labeling service under which the ACMCS 12 provides or generates user interface layers 36 with a desired brand name or private label, such as a company name or logo (not shown) or other indicia as described and shown later herein. The functions or services are generally described in the following Table I.

| SERVICE | DEFINITION |
|---|---|
| Notifications | The notification function or service is adapted to provide a process or method by which the user notified by the ACMCS 12 of information relating to the services the user has access to as governed by their license or contract term. This notification may be an electronic mail notification, a telephonic notification, an audible notification, an on screen pop-up notification or the like. For example, if the user's services include notifications regarding scheduling, then the user may be notified regarding scheduling activities. Further, if the user's services include notifications regarding monitoring, the user may be notified of terminal 14-28, desktop 32 and/or gatekeeper 34 status changes, such as terminal up or terminal down. Also the user may be notified audibly if an audible alert system is enabled in the user's/organization's environment. The notifications process is described in more detail later herein. |
| Scheduling | The methods, by which the user can schedule, modify and cancel terminals 14-28, desktops 32 and/or gatekeepers 34 in the ACMCS 12 and view scheduled, modified and cancelled conferences and also the availability of terminals 14-28, desktops 32 and/or gatekeepers 34 relating to the services the user has access to. The scheduling process is adapted to enable the scheduling, control and management of the terminals 14-28, desktops 32 and/or gatekeepers 34 and of activities and functions, described later herein, that the user can access and execute within the ACMCS 12. The scheduling process is described in more detail later herein |
| Site Profiling | The method by which the ACMCS 12 receives information from the user regarding the user's terminals 14-28, desktops 32 and/or gatekeepers 34, software versions and other enterprise systems 44. |

-continued

| SERVICE | DEFINITION |
|---|---|
| Conference Management | The method by which the ACMCS 12, sets up, starts, monitors then disconnects conferences that are scheduled within the ACMCS 12. |
| Remediation | The method or process by which the ACMCS 12 checks, troubleshoots and provides solutions when a fault occurs that impacts or interferes with a/or conference(s). |
| Escalation | The method or process by which the ACMCS 12 escalates issues and potential issues previously identified by one or a plurality of the other runbook processes mentioned herein. |
| Proactive Daily Site Sweeps | The method or process which performs a check or sweep of the terminals 14-28, desktops 32 and/or gatekeepers 34 and the network(s) to which they are connected and that are connected to the ACMCS 12 in order to provide preventative maintenance for the terminals 14-28, desktops 32 and/or gatekeepers 34. |
| RCA | The method by which the user receives a root cause analysis for events impacting the user's service relating to the services the user has access to. |
| Quality Control | The method or process by which the ACMCS 12 proactively identifies and prevents potential issues from occurring such as scheduling conflicts or scheduling inaccuracies. |
| Reporting | The method or process by which the ACMCS 12 delivers to the user standardized reporting for the terminals 14-28, desktops 32 and/or gatekeepers 34 |
| Private Label | The method or process by which the ACMCS 12 provides or generates user interface layers 36 with a desired brand name or private label, such as a company name or logo (not shown) or other indicia as described and shown later herein. |

After an organization is established as a user and the terminals 14-28, desktops 32 and gatekeepers 34 are provisioned, the system 10 is ready for use and for automatically making, controlling and managing one or a plurality of conferences. The scheduling runbook process 58*d* mentioned earlier is adapted to enable the scheduling, control and management of the terminals 14-28, desktops 32 and/or gatekeepers 34 and of activities and functions, described later herein, that the user can access and execute within the ACMCS 12. The scheduling process enables the user to save, modify, cancel, delete and find a conference. At a minimum, the scheduling process 58*d* permits the user to save predetermined conference information, such as conference start time, conference duration or conference end time, conference terminals 14-28, desktops 32 and/or gatekeepers 34, to the IDR 40 for automation by the ACMCS 12 in the manner described earlier herein relative to FIGS. 30A-30M. It should be noted that in one embodiment, the predetermined conference information may be established for one or more of the plurality of terminals 14-28, desktops 32 and/or gatekeepers 34 or conference participants, or the user may establish different conference start times and end times for the plurality of terminals 14-28, desktops 32 and/or gatekeepers 34. In another illustration, individual start and end times may be established for each individual person that is participating in the conference. Thus, the ACMCS 12 permits scheduling of conference participants, instead of terminals, individual start and end times may be established for each individual conference participant.

In the illustration, other predetermined conference information can be input by the user, but is not required. This other predetermined conference information comprises a conference requestor, a conference host, a conference participant, host terminal 14-28, desktop 32 and/or gatekeeper 34 location, conference title, external terminal 14-28, desktop 32 and/or gatekeeper 34 locations (if any), audio terminals 26, type of meeting (video or non-video) and charge code when the conference is scheduled by the user to the IDR 40. The scheduling process 58*d* further governs what users are authorized to perform scheduling activities, such as the ability to save, modify, cancel, delete and find conferences, as well as authorization rights specific to certain terminals 14-28, desktops 32 and/or gatekeepers 34.

Figure 30A:
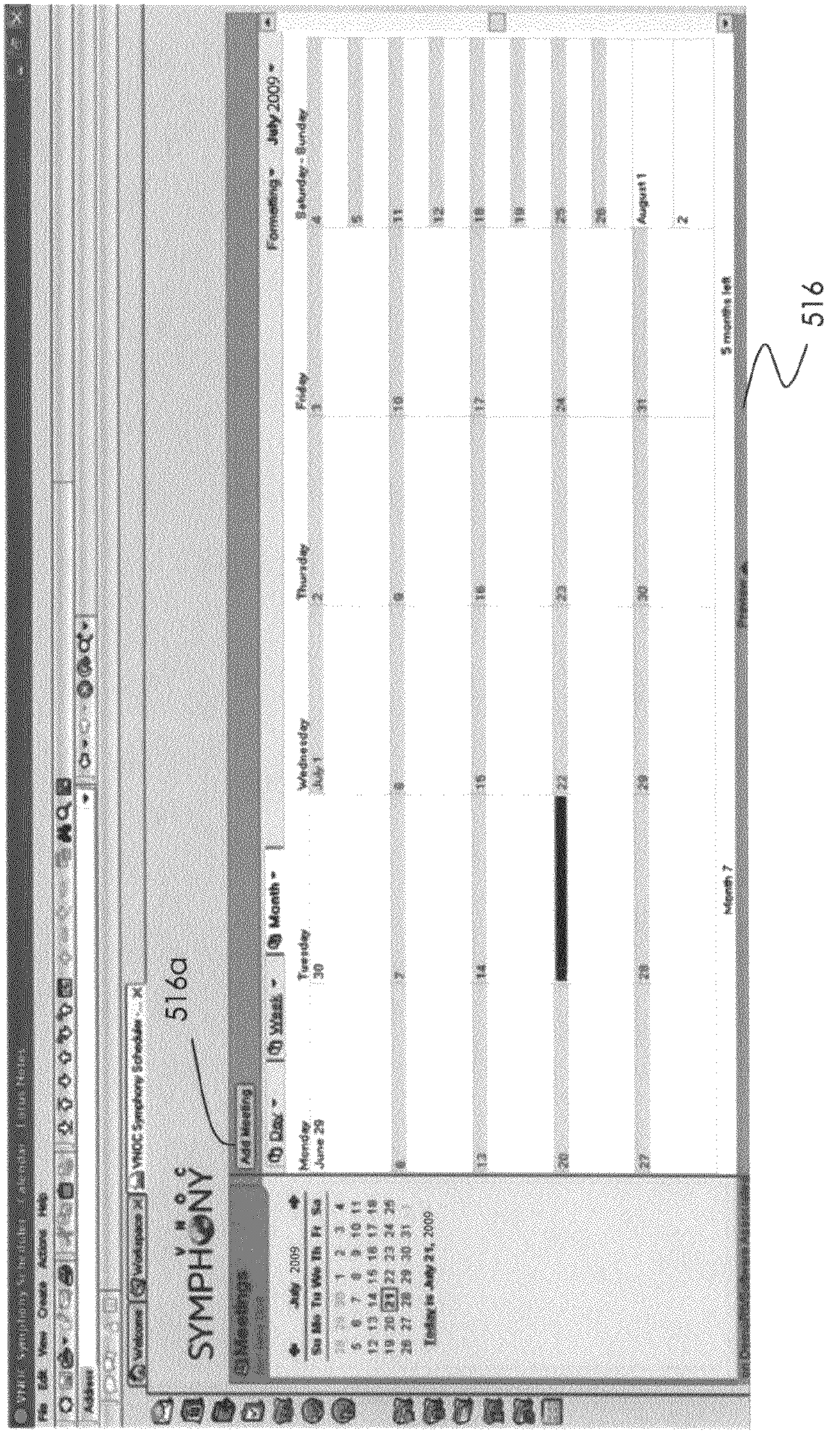
FIGS. 30A-30P illustrate another user entry point in accordance with one embodiment of the invention that utilizes Lotus Notes.
Figure 30B:
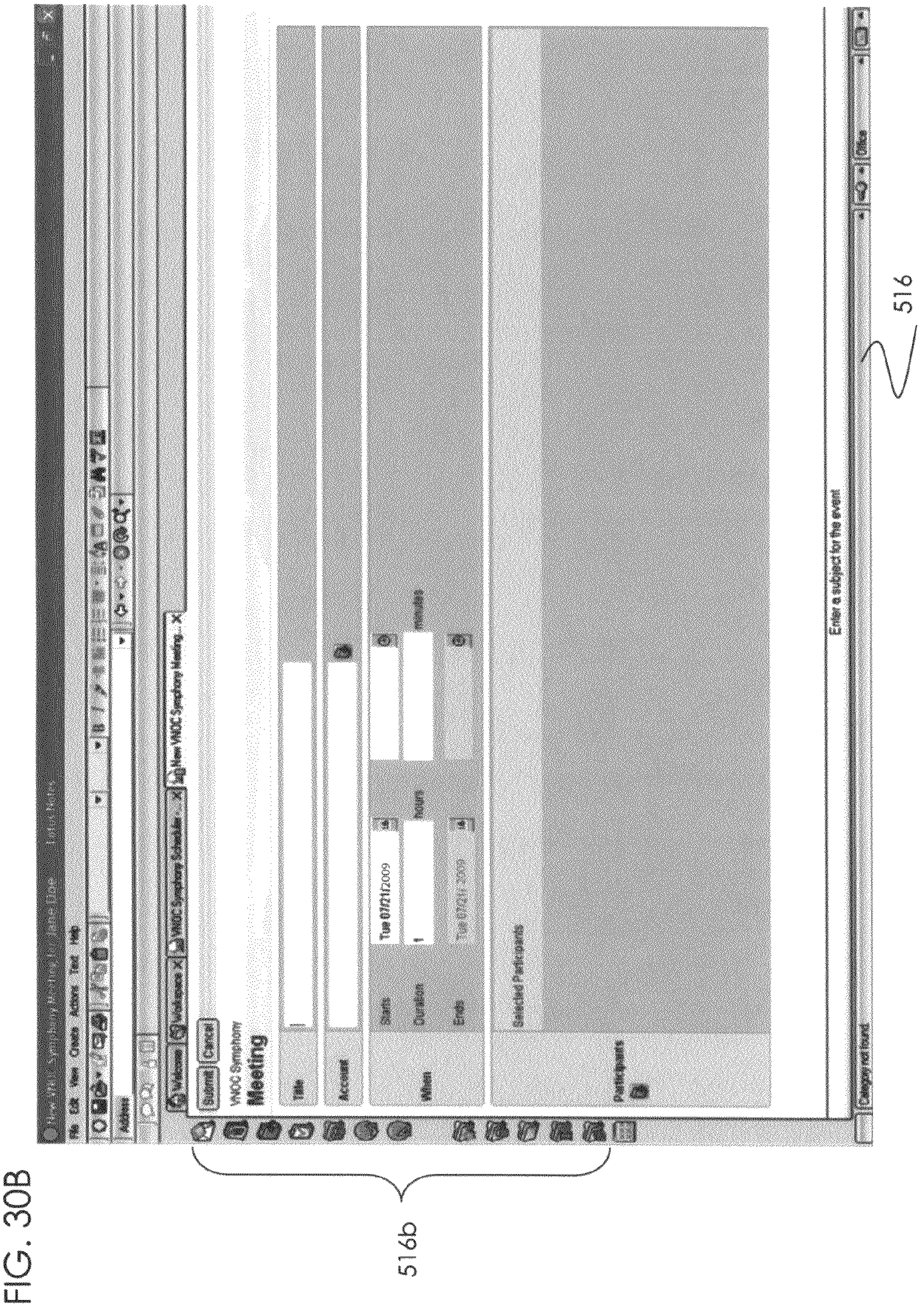
Figure 30C:
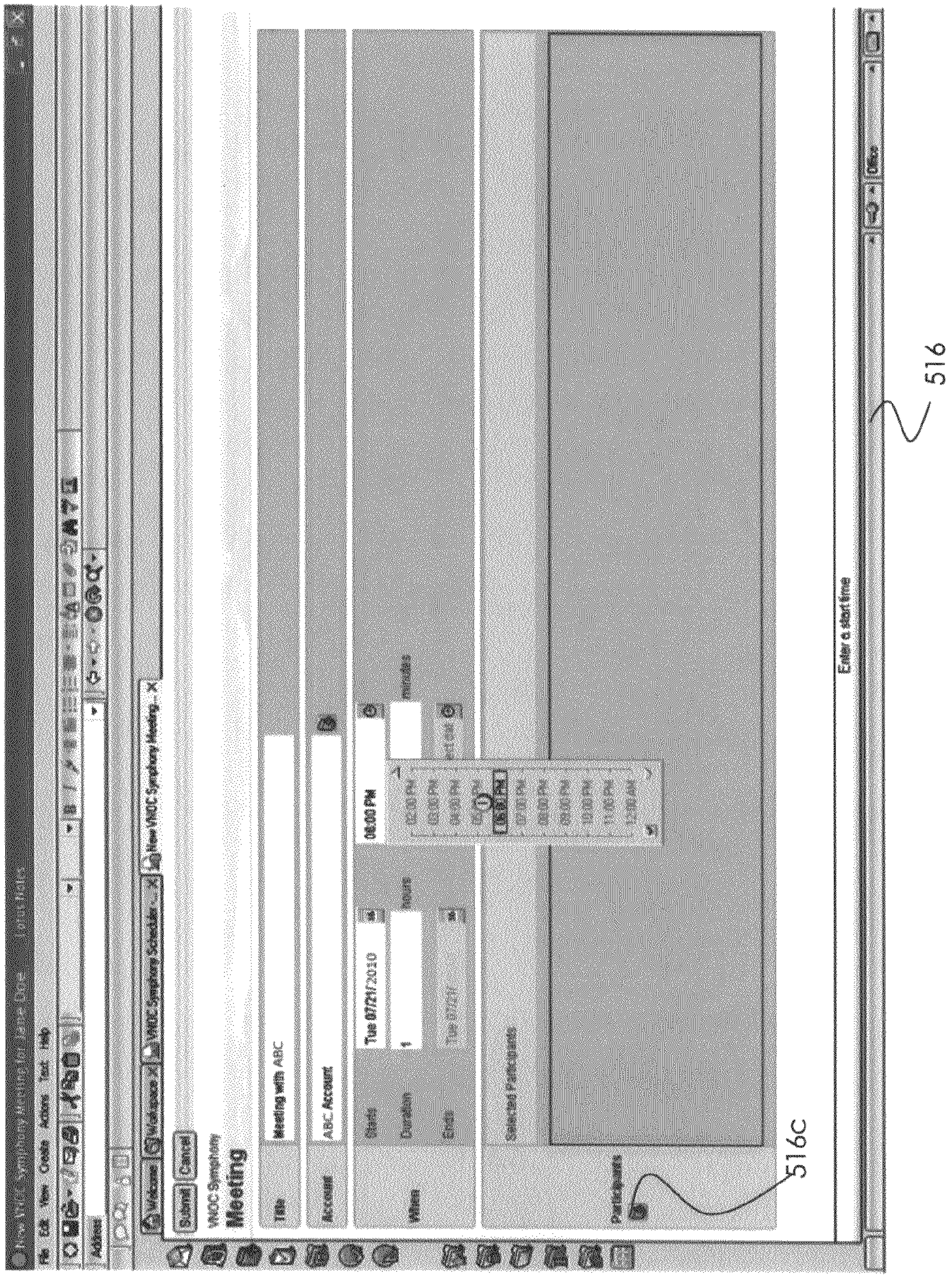
Figure 30D:
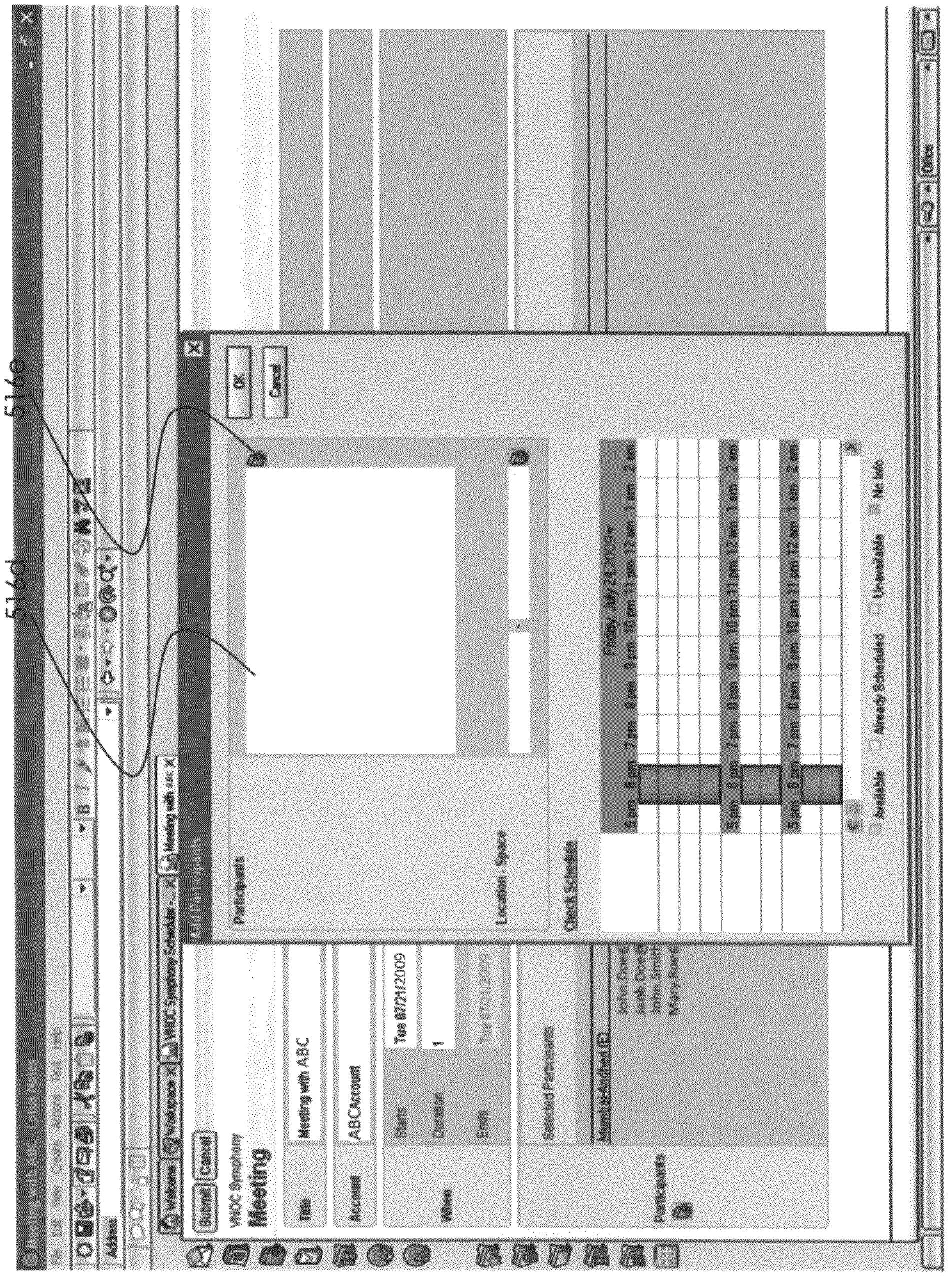
Figure 30E:
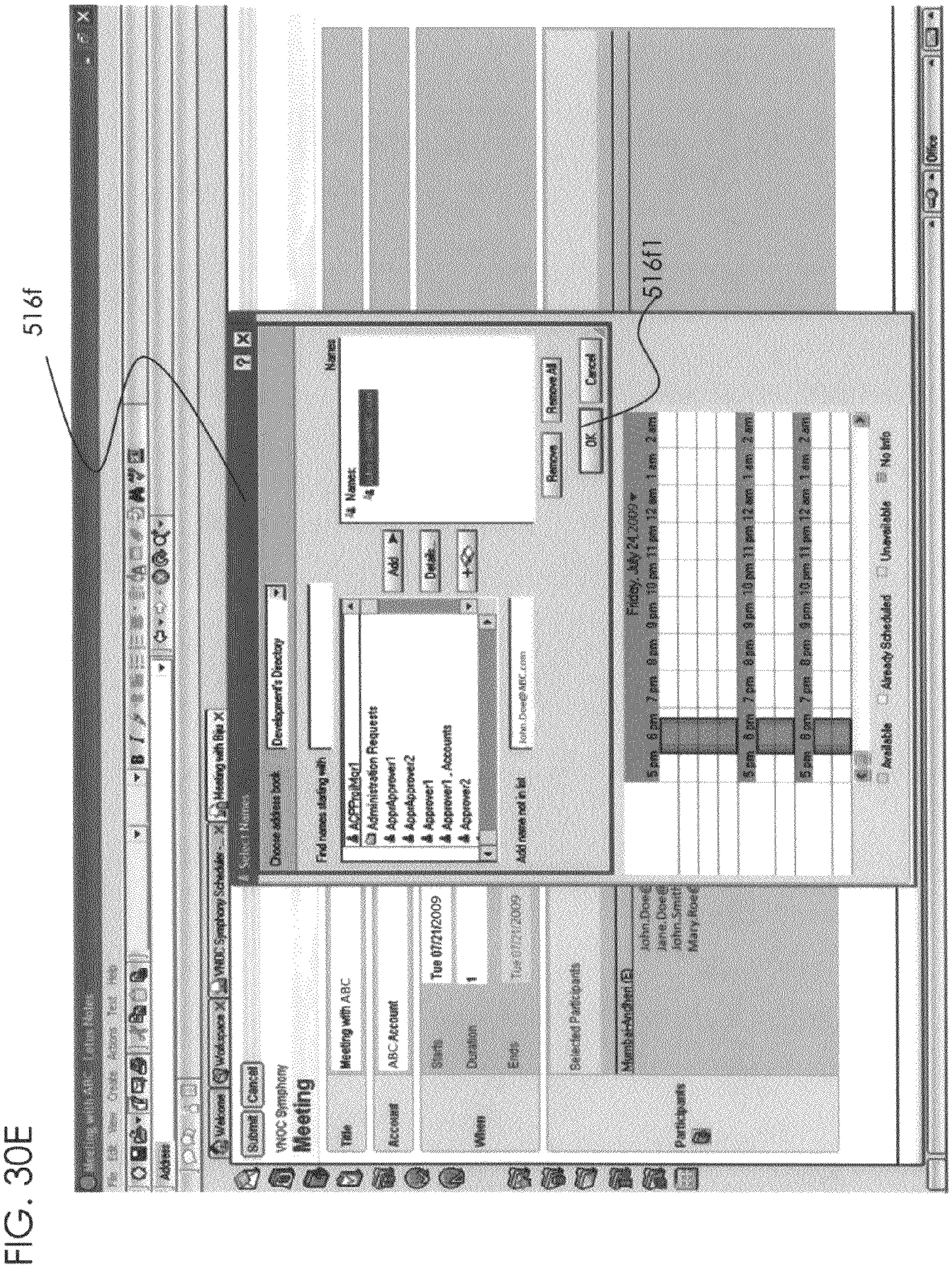
Figure 30F:
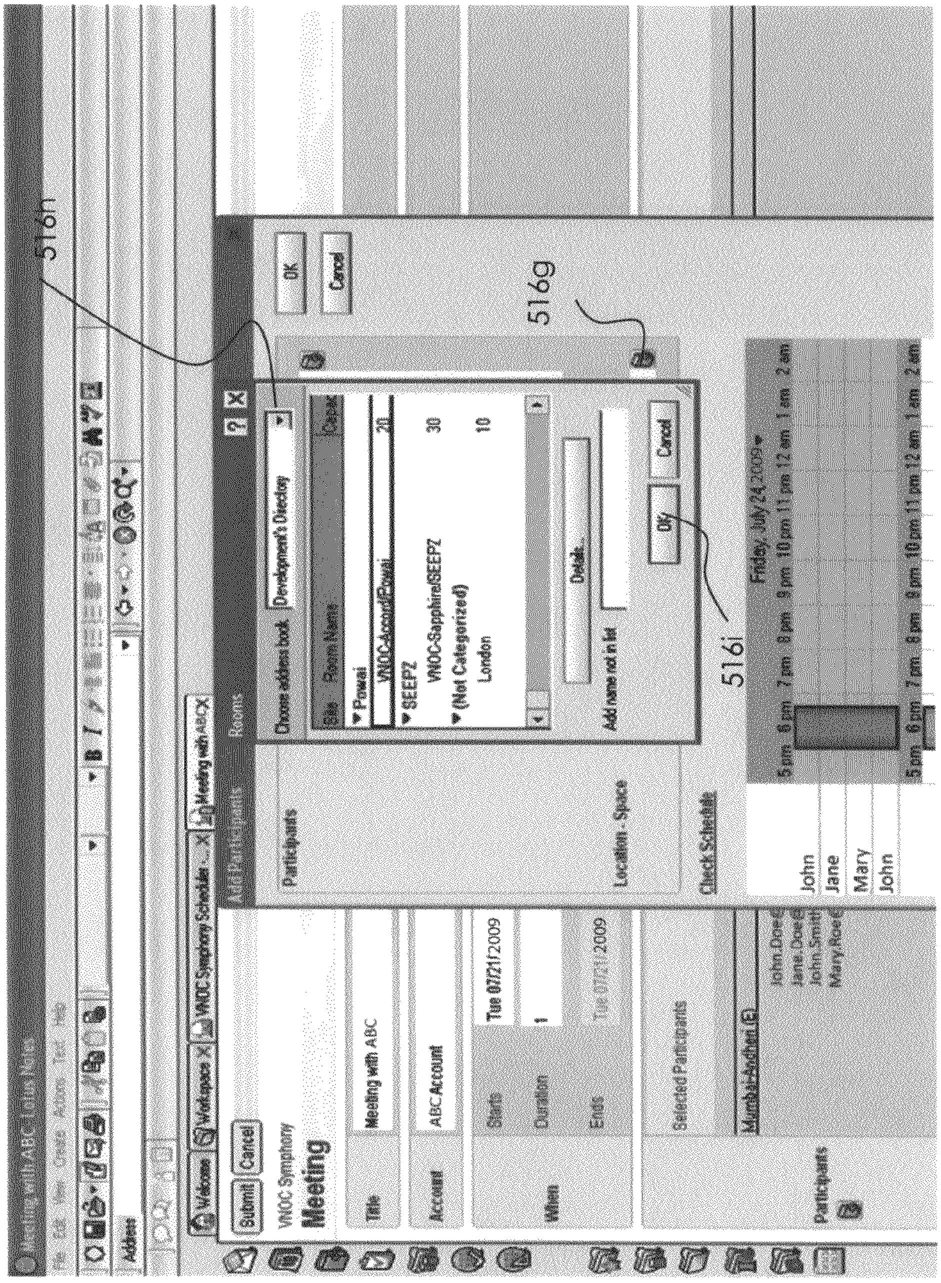
Figure 30G:
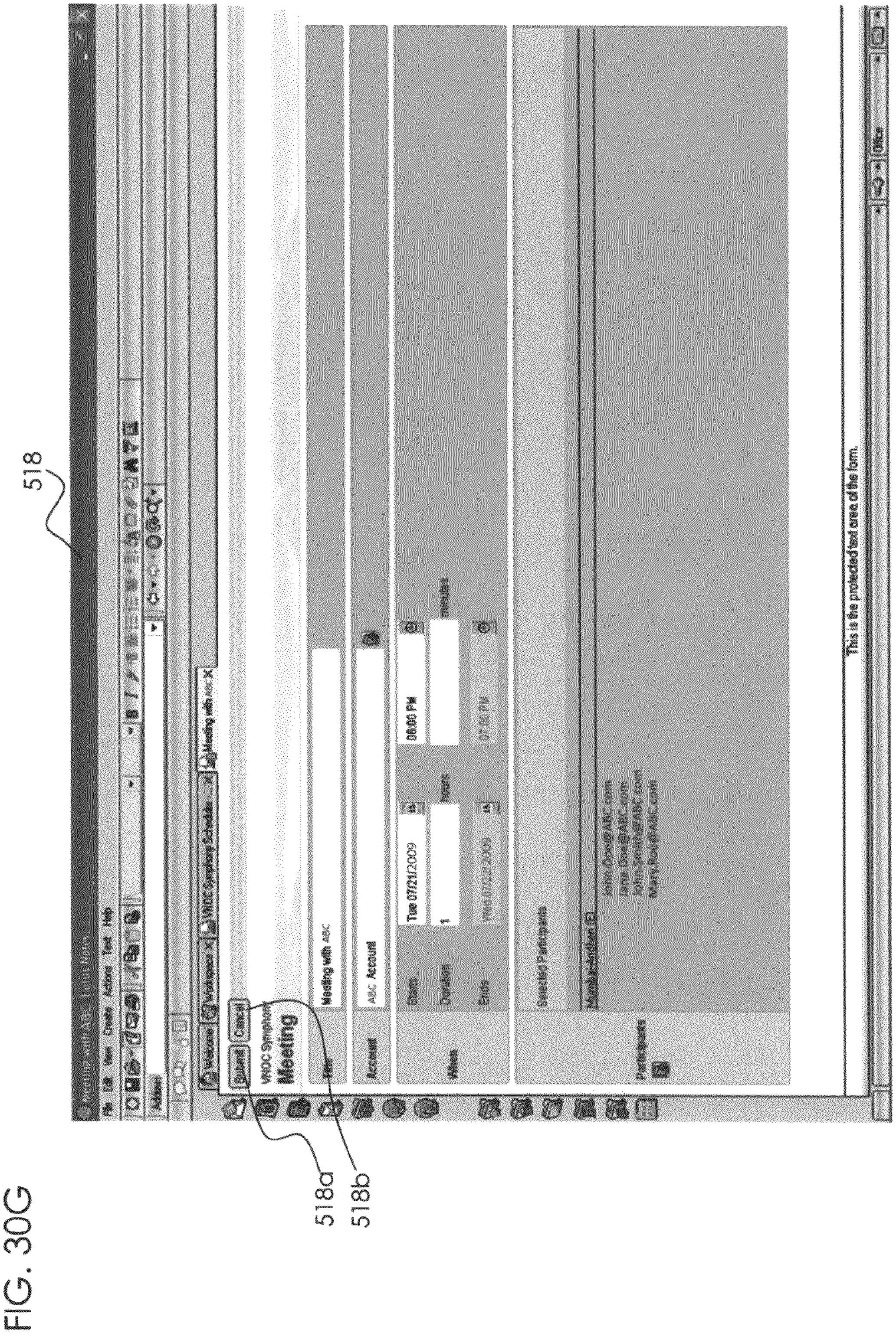
Figure 30H:
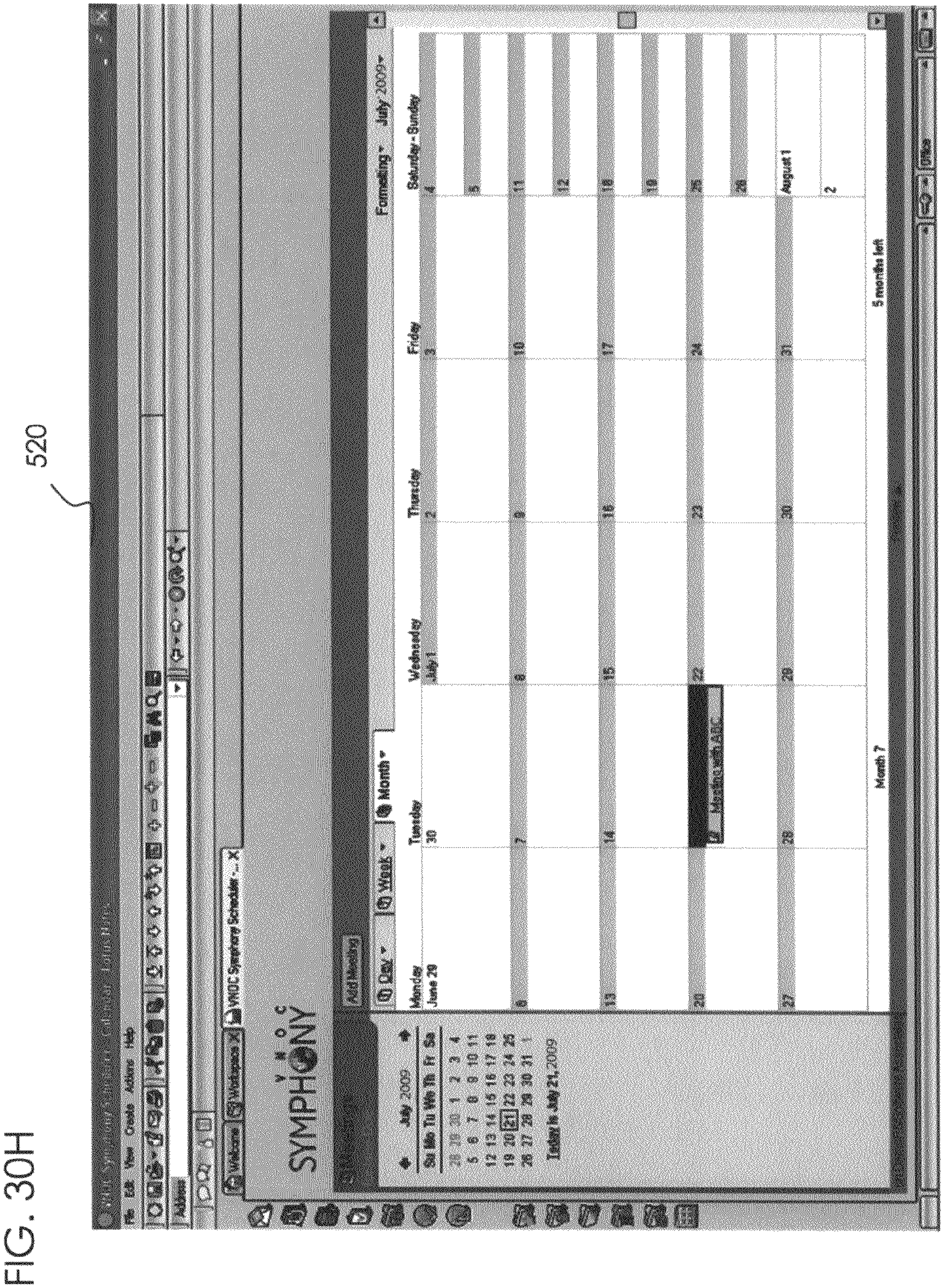
Figure 30I:
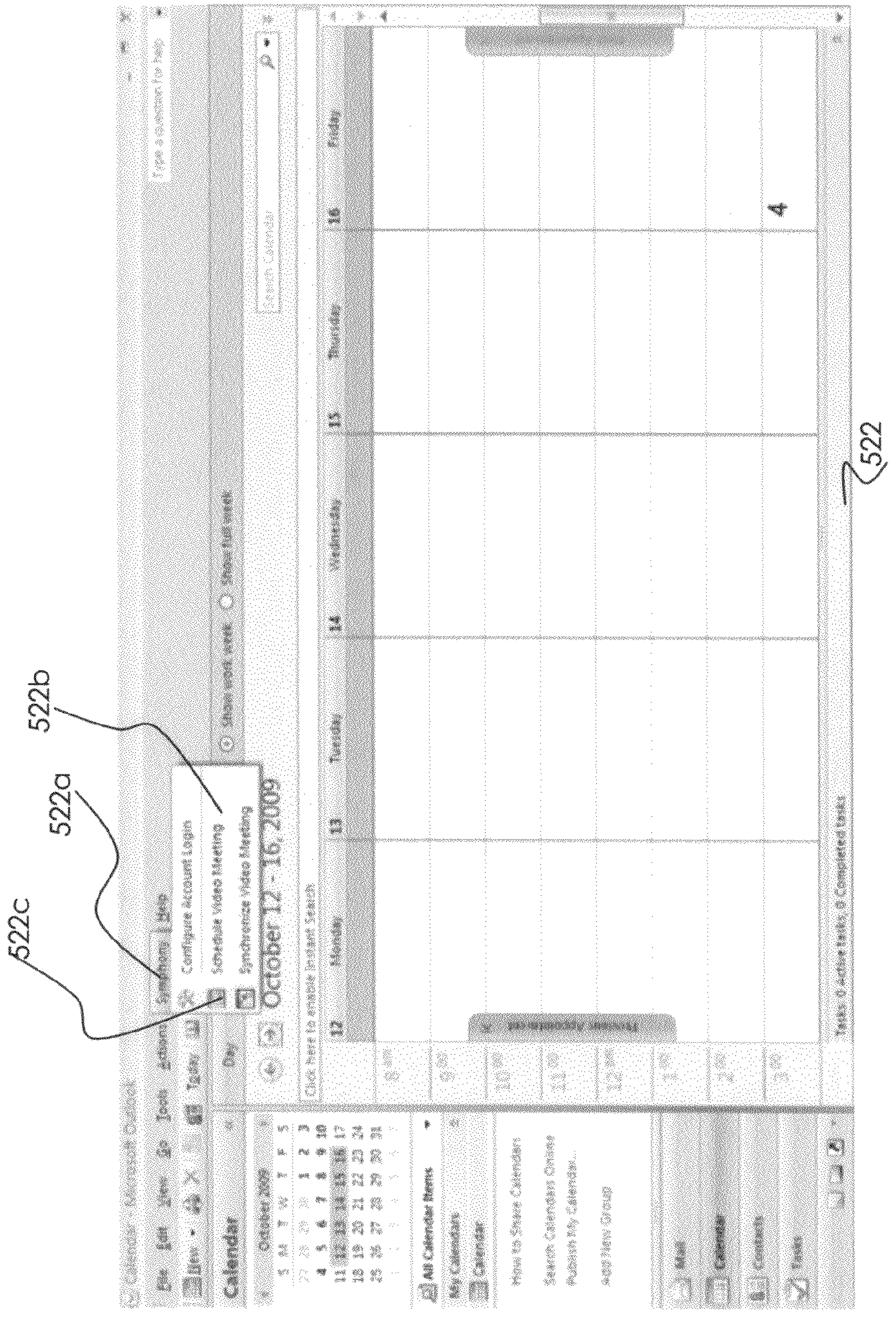
Figure 30J:
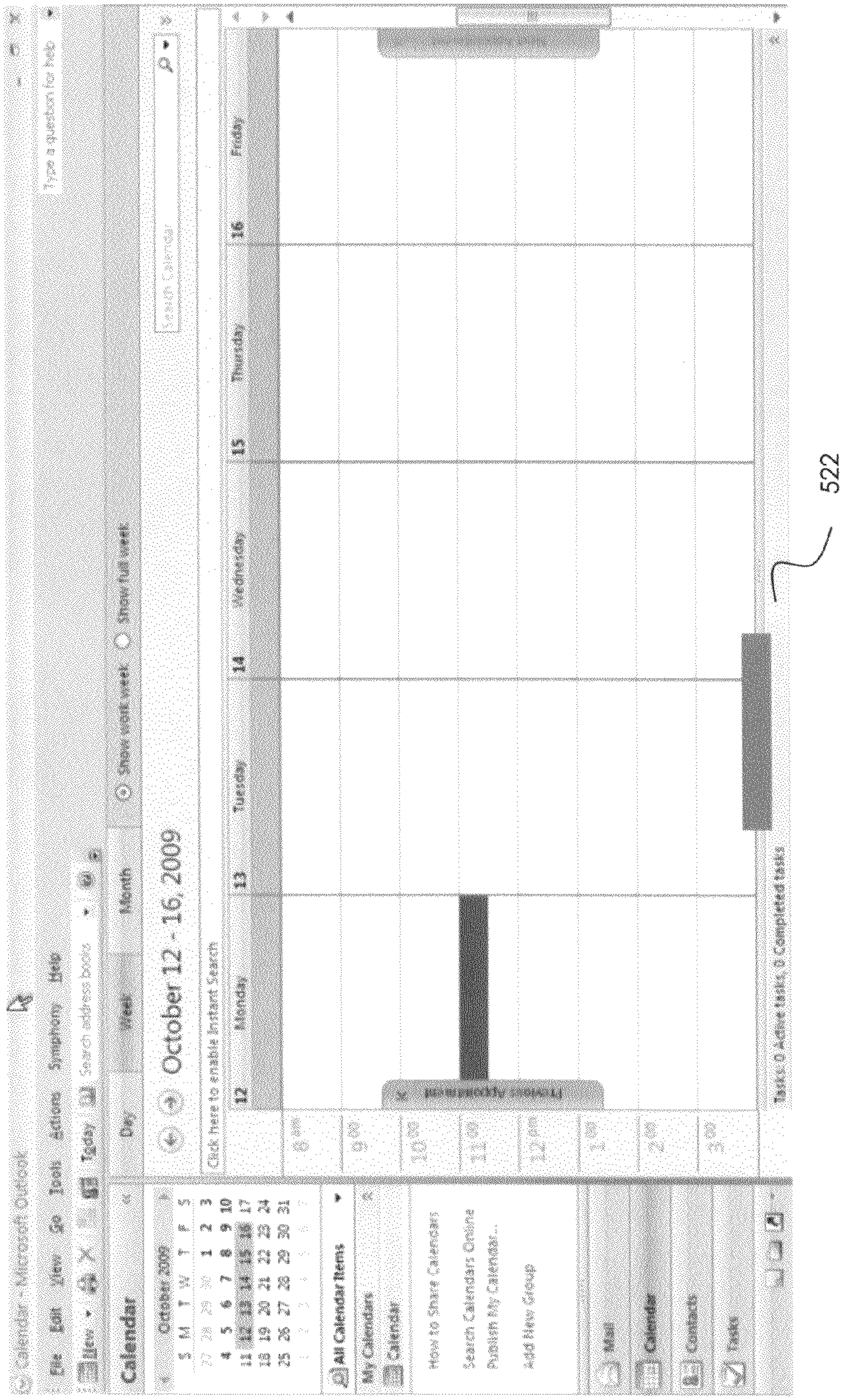
Figure 30K:
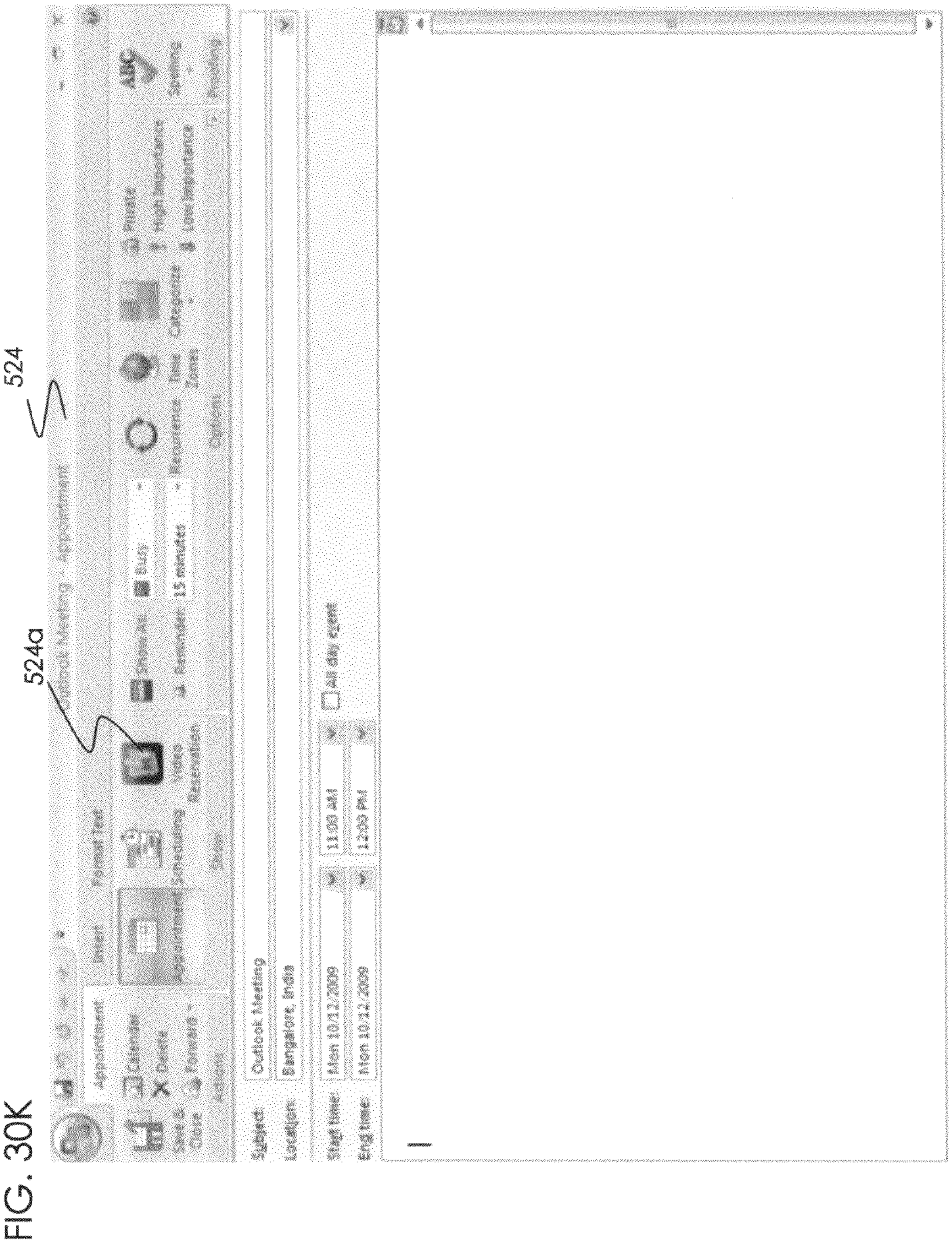
Figure 30L:
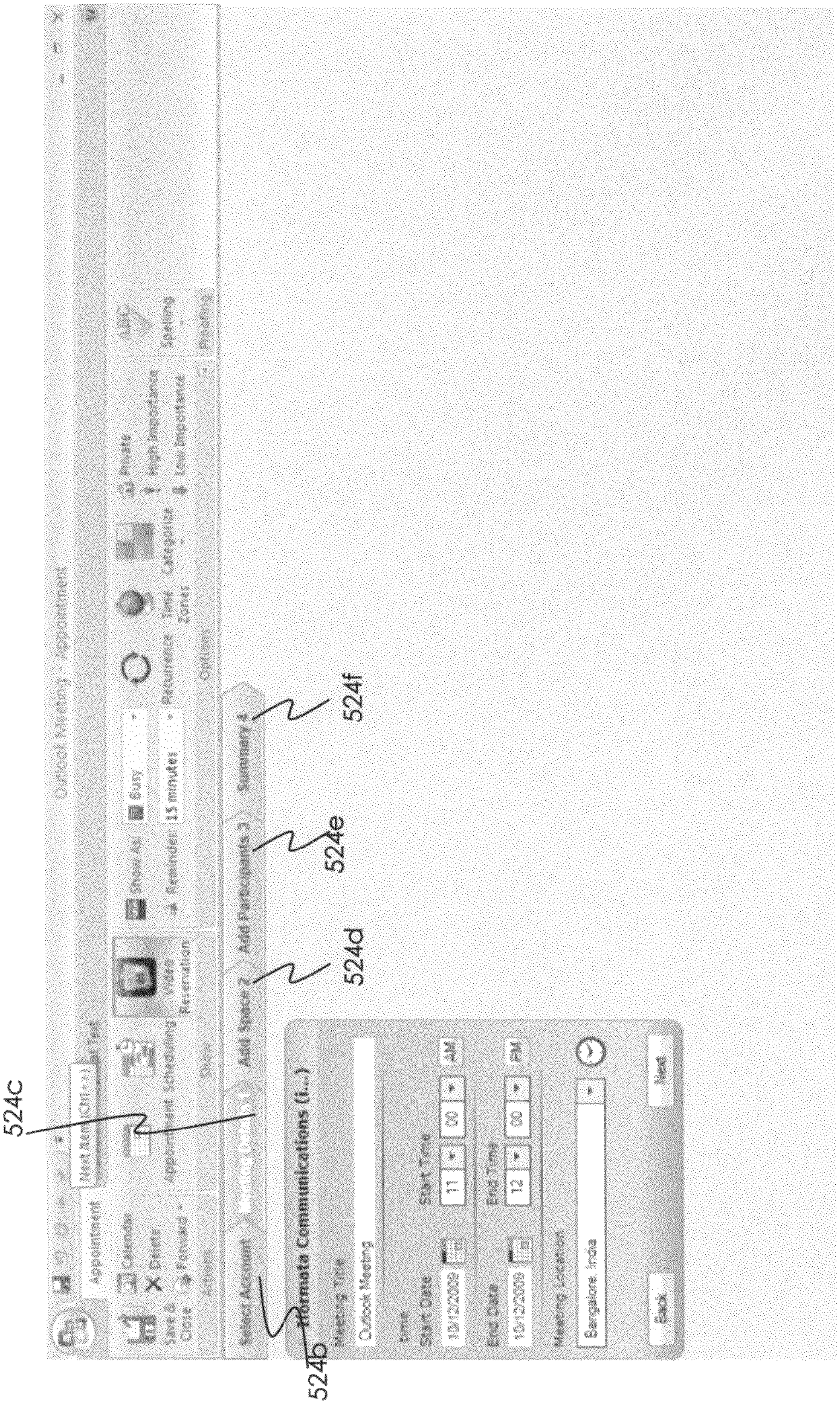
Figure 30M:
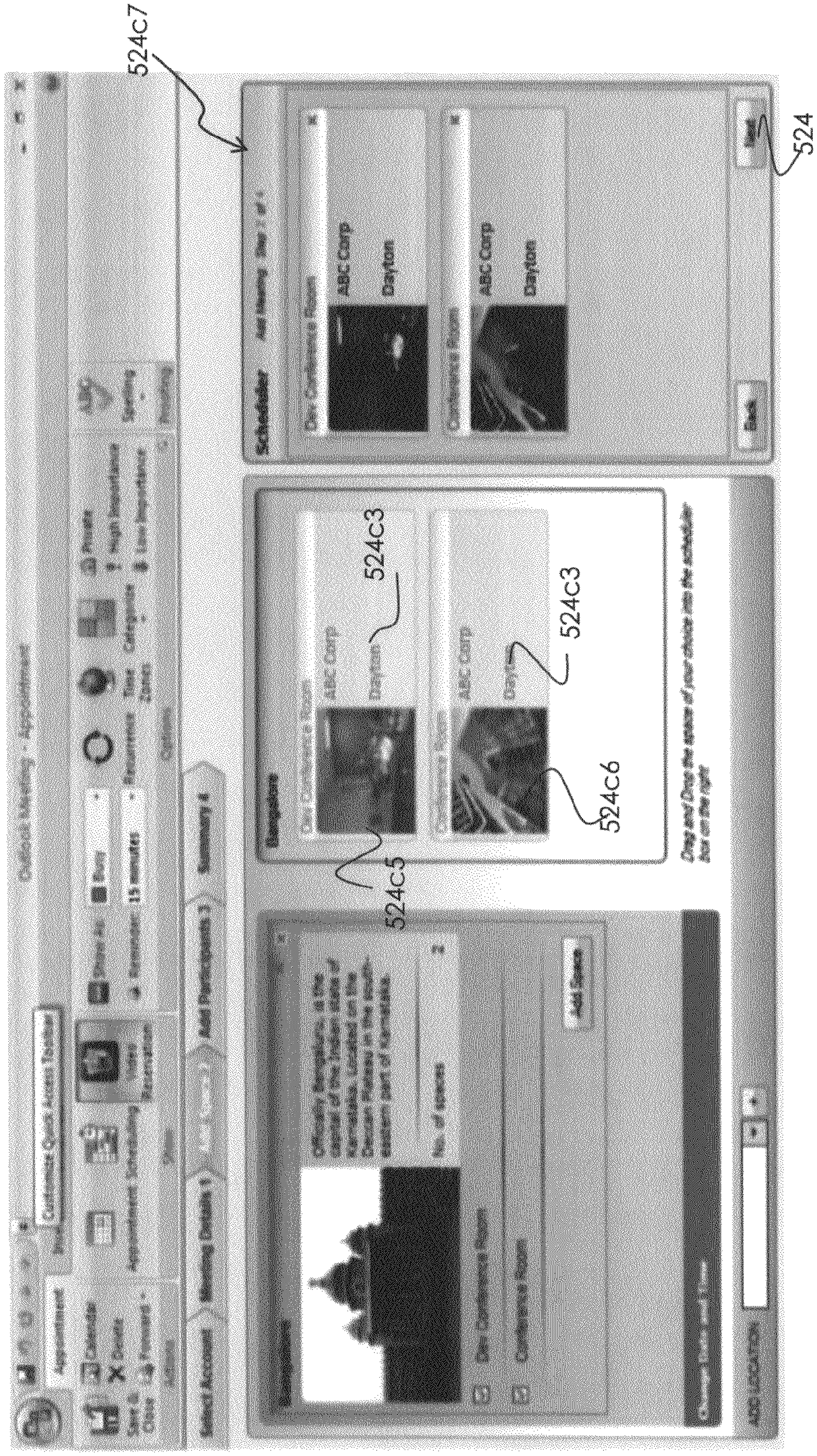
Figure 30N:
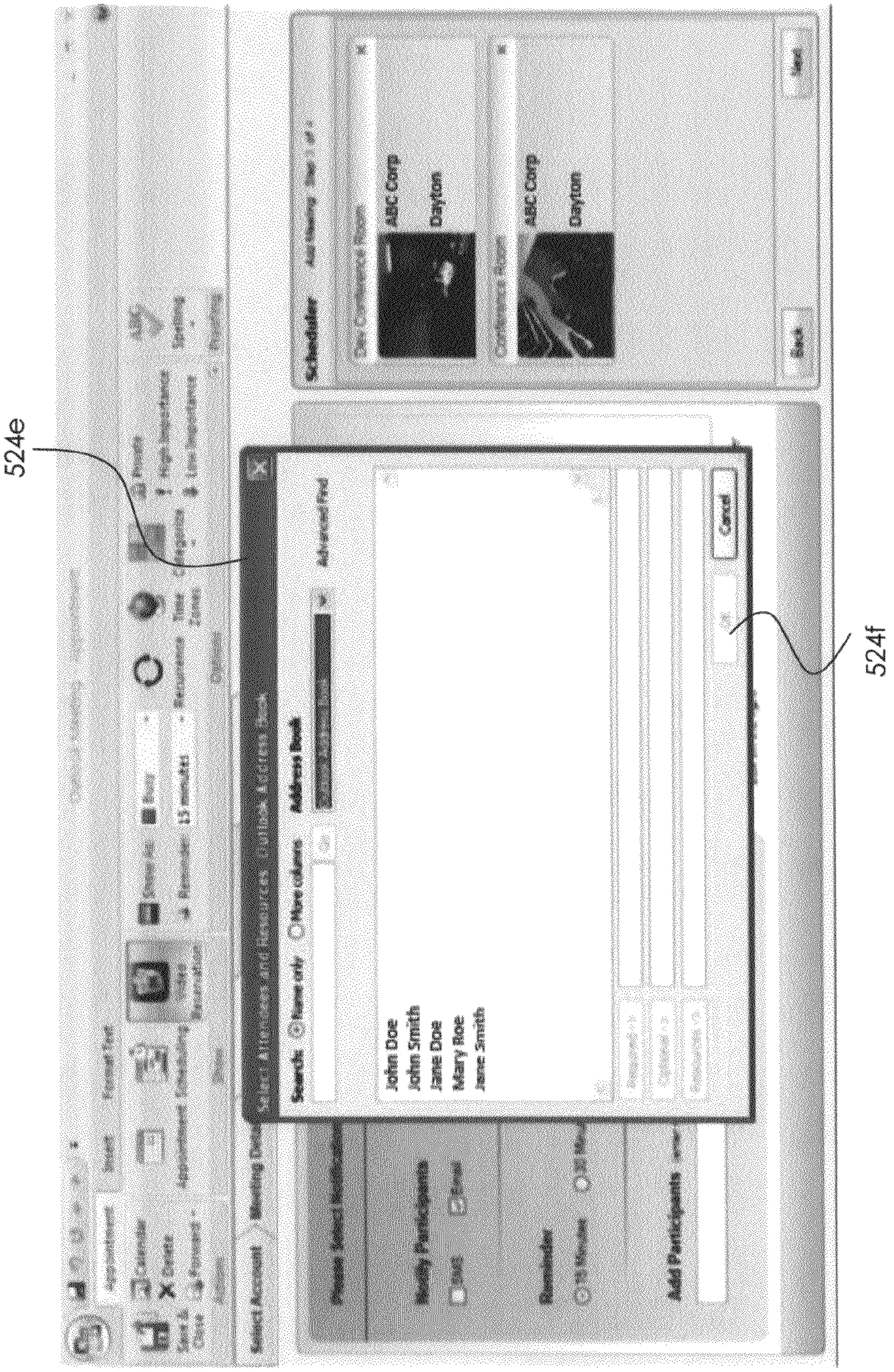
Figure 30O:
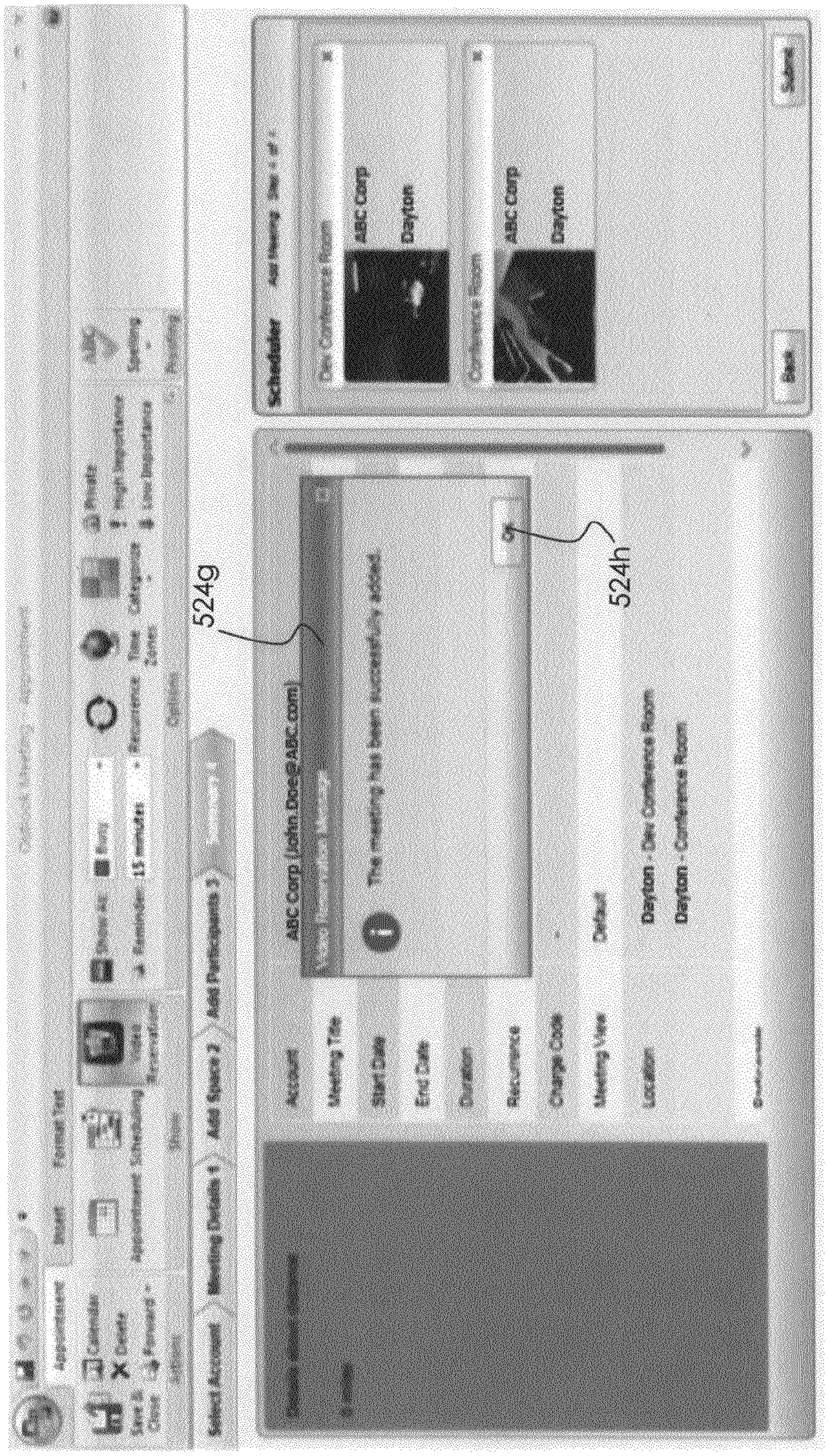
Figure 30P:
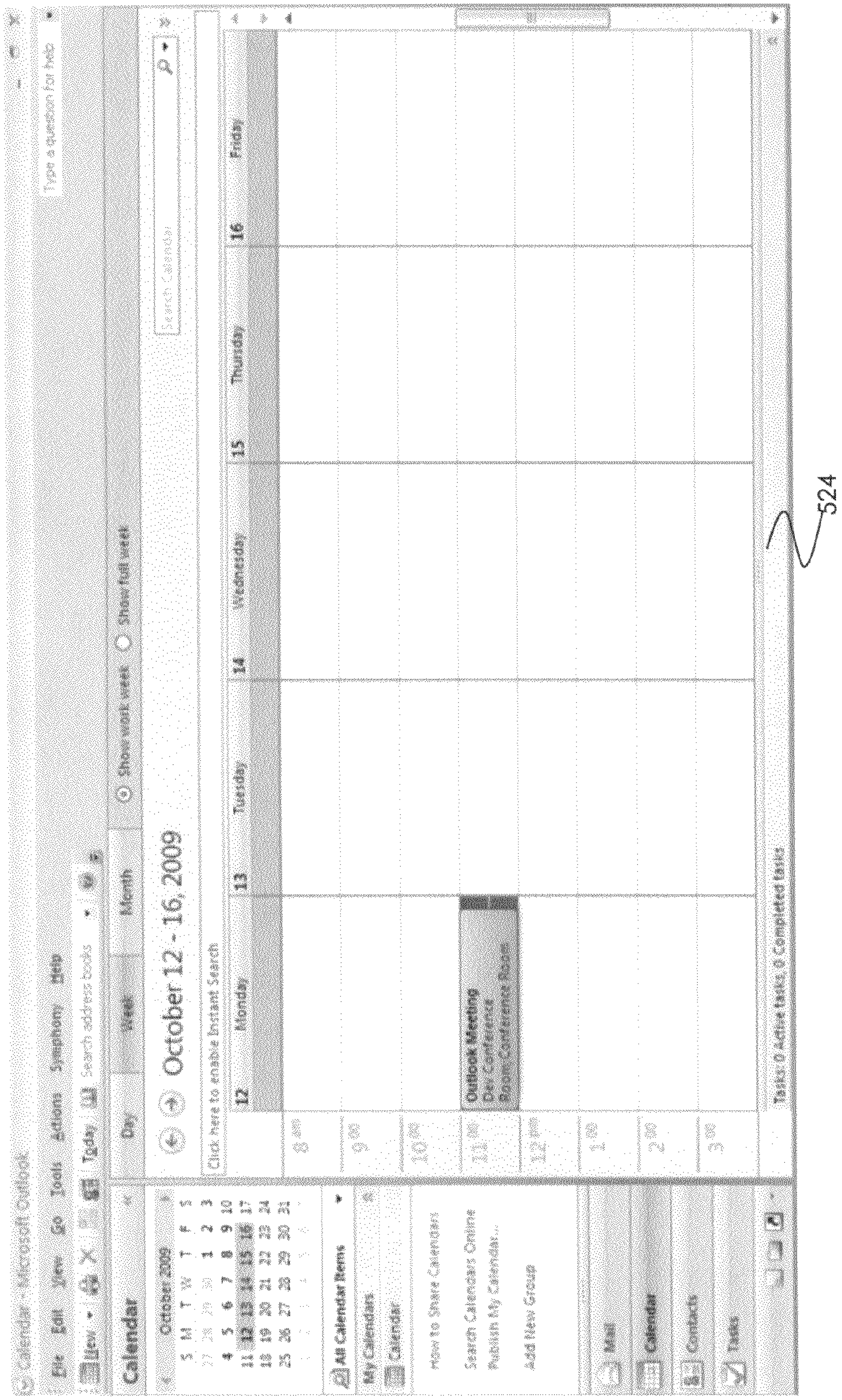

The user is presented with the series of graphical user interfaces 516-524 shown in FIGS. 30A-30P.

An illustration of the scheduling of a conference using the scheduling runbook process for each of the user entry points will now be shown and described. In a first illustration, the Lotus Notes® user entry point 66*d* will be shown. In this illustration, note that the user is presented with a GUI 516, with a Lotus® Calendar that appears when using Lotus Notes® which is available from International Business Machines Corporation, of Armonk, N.Y. Note that the user highlights a date, such as July 21 in the illustration, and then selects the "add meeting" button 516*a* whereupon the GUI 516 (FIG. 30B) is shown for scheduling a new meeting. After the user populates the fields 516*b* (FIG. 30B), the GUI 516 becomes populated as illustrated in FIG. 30C.

Once the meeting schedule has been assigned, the user selects the "participants" button 516*c* (FIG. 30C) upon which a popup 516*d* (FIG. 30D) is shown for the user to use to populate the meeting participants. The user selects a directory button 516*e* and is presented with a directory 516*f* (FIG. 30E) that the user can select names from the directory or add names to the directory as shown. Once the names are selected and the user depresses the "Okay" button 516*f*1, the information is saved in the IDR 40.

As illustrated in FIG. 30F, the user next populates the various conference rooms, meeting rooms and geographic locations by selecting the location space button 516*g* (FIG. 30F) upon which the popup 516*h* appears for the user to select the rooms, geographic locations and terminals 14-28, desktops 32 and/or gatekeepers 34 associated therewith. Once the information is complete, the user selects the "okay" button 516*i* (FIG. 30F) and the meeting summary screen 518 (FIG. 30G) is shown which summarizes the meeting with the title, account or user name, start date, start time, duration, end time of the meeting, participants and the like. The user selects the "submit" or "cancel" button 518*a* or 518*b*, respectively, to save or cancel the requested meeting. If it is saved, the meeting and its respective details are saved in the IDR 40 and the GUI 520 (FIG. 30H) is presented to the user showing the meeting reserved on the selected date in the Lotus Notes® program.

Similarly, if the user entry point 66*c* is the Outlook® program available from Microsoft Corporation then the interfaces illustrated in FIGS. 30I-30P are representative examples of GUIs that may be used. In this illustration, the Microsoft Outlook® calendaring program comprises an add-on program or is modified to provide access to the scheduling runbook process 58*d*. Note in FIG. 30I, the program is modified to comprise a menu in the illustration, labeled as Symphony™ drop down menu, that enables the user to schedule or synchronize a meeting. In the illustration, the user uses the GUI 522 (FIG. 30I) and selects the button 522*a* which presents the user with a dropdown button 522*b* which enables the user to select a meeting button 522*c* after the user selects the date and time from the conventional Microsoft Outlook® calendar as illustrated in FIG. 30J.

Upon selecting the scheduled video meeting 522*d*, the user is presented with the GUI 524 (FIG. 30K), whereupon the user can select the various meeting details using the buttons 524*b* (FIG. 30L), 524*c*, 524*d*, 524*e* and 524*f*. For example, the user may select the "meeting details" button 524*c* (FIG. 30L) whereupon the pop-up 524*c*1 is provided for the user to select the date, title and location. Once the fields of the pop-up of the 524*c*1 are populated the user selects the next button 524*c*2, the space or terminals 14-28, desktops 32 and/or gatekeepers 34 may be selected by participation in the meeting. Note in the illustration being described, the user can drag and drop the spaces, such as spaces 524*c*3 and 524*c*4 (FIG. 30M), to the area 524*c*7 which causes them to be scheduled by the system 10. As alluded to earlier, note the picture 524*c*5 and 524*c*6 may be associated with each of these spaces or conference rooms as illustrated for facilitating the ease with which the user identifies or selects the conference room to be added to the conference.

After the user has selected the spaces, he selects the "next" button 524*d* whereupon the attendees and resources that will participate in the meeting are selected using the pop-up 524*e* (FIG. 30N). Once the user selects the participants or attendees, the user selects the "okay" button 524*f* (FIG. 30N) in which case the confirmation of the meeting is confirmed in a pop-up 524*g* (FIG. 30O) whereupon the user selects "okay" button 524*h* and then the meeting is shown as being scheduled in the Microsoft Outlook® program as shown in FIG. 30P.

It should be understood that when the user is selecting the participants as described earlier relative to FIG. 30N, the attributes and resources (i.e., terminals 14-28, desktops 32 and/or gatekeepers 34) are automatically associated with the participant or attendee being selected. Recall that these were provisioned, associated or assigned to the user during the provisioning runbook process 58*a* described earlier. For example, the users that are capable of being added to a conference are associated with a user office or organization accounts and their resources, which are saved in the IDR 40.

Referring now to FIG. 31A, a touch screen computer/mobile interface 526 is shown and illustrates the use of this touch screen computer/mobile interface 526 for engaging the scheduling runbook process 58*d* will now be described relative to FIGS. 31A-31×.

Figure 31B:
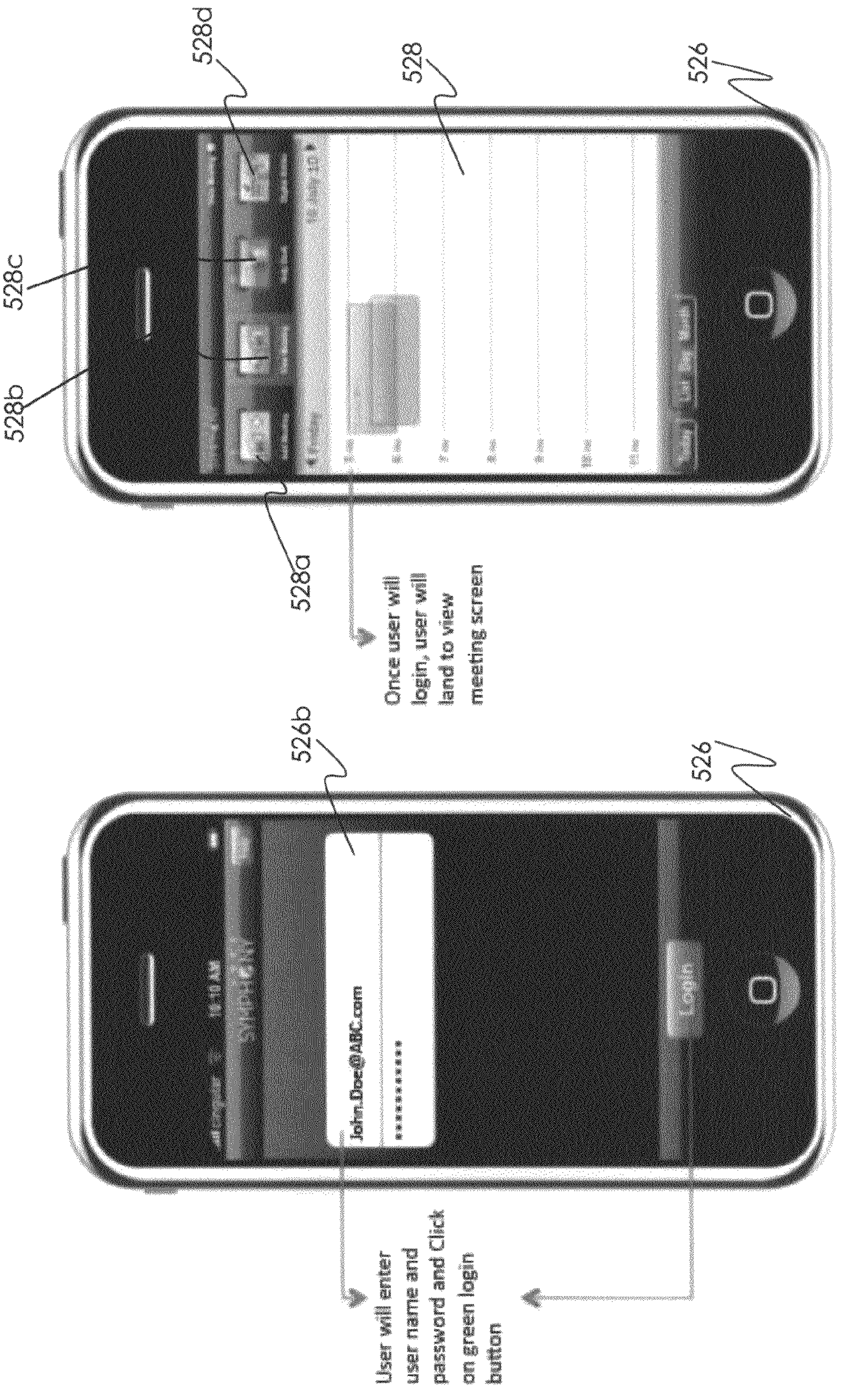

The touch screen computer/mobile interface 526 comprises a button 526*a* that is actuated by the user whereupon a login screen 526*b* is presented to the user as shown in 31A. The user enters the user name and password in a login screen (FIG. 31B) and once the user logs in, the user will be directed to view a meeting screen 528 (FIG. 31B). As shown in FIG. 31B, the meeting screen 528 comprises a plurality of icons or buttons, including an "add meeting" button 528*a*, a "view meeting" button 528*b*, a "help desk" button 528*cc* and other button 528*d* that are presented to the user.

Figure 31C:
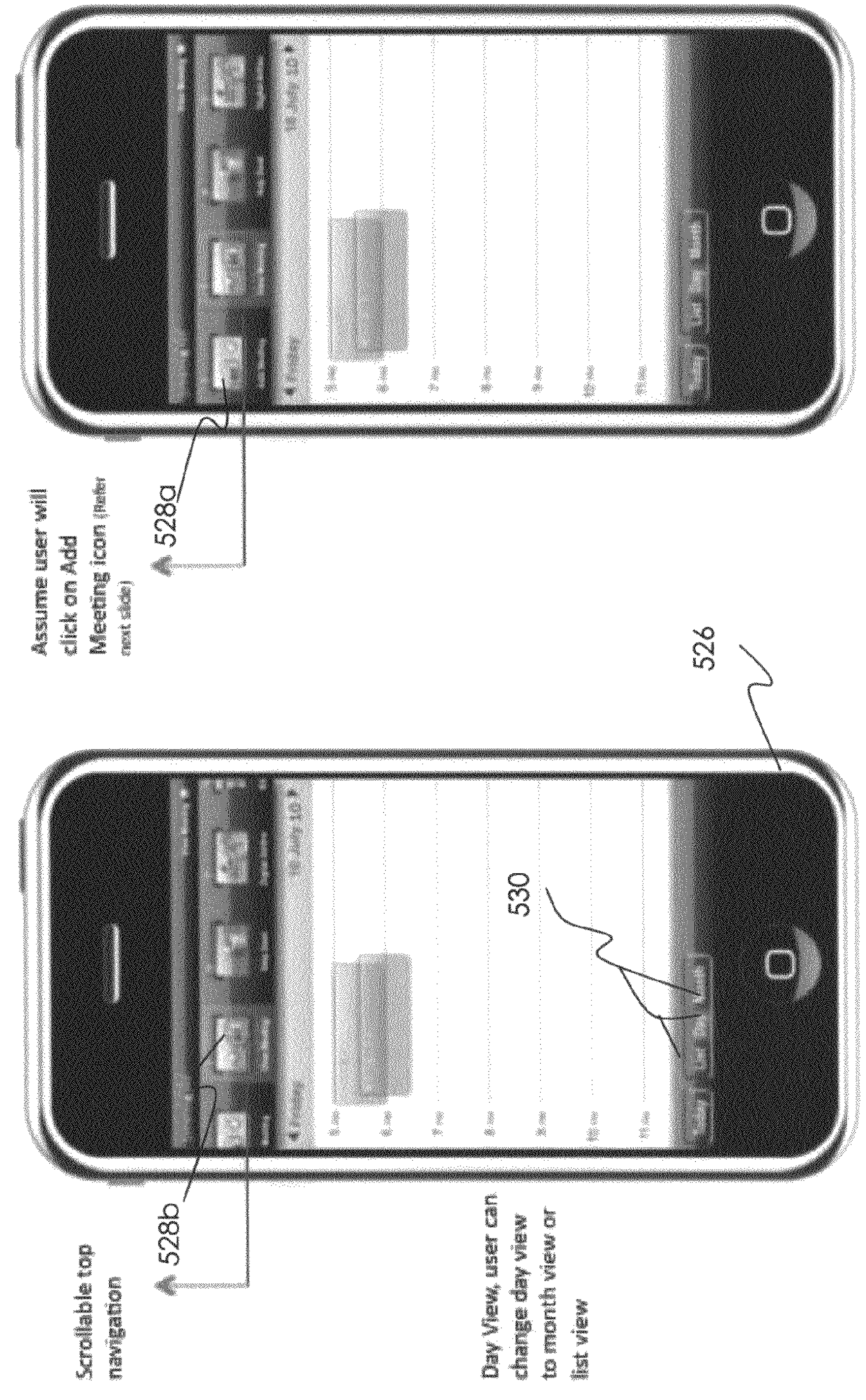
Figure 31D:
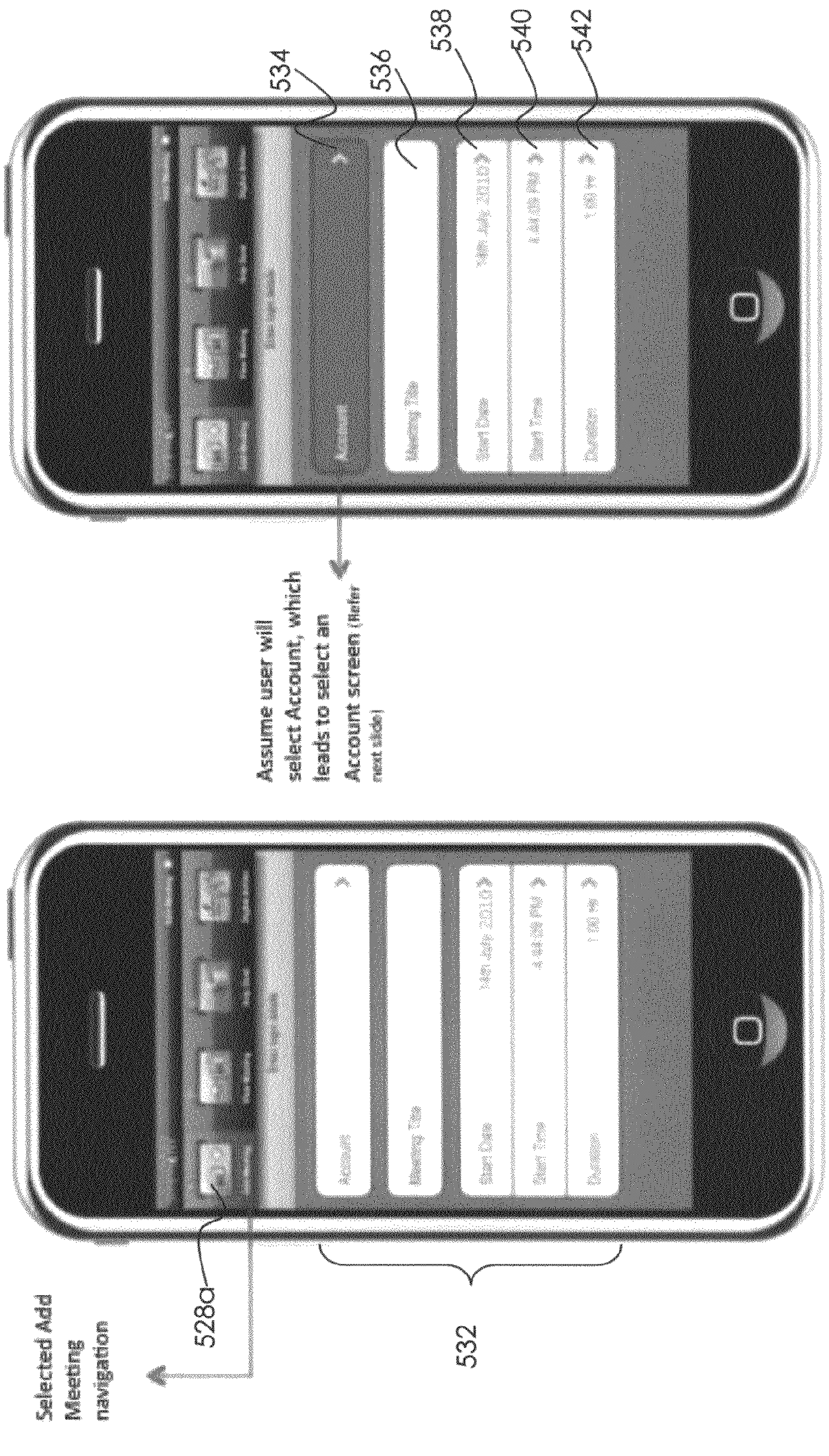
Figure 31E:
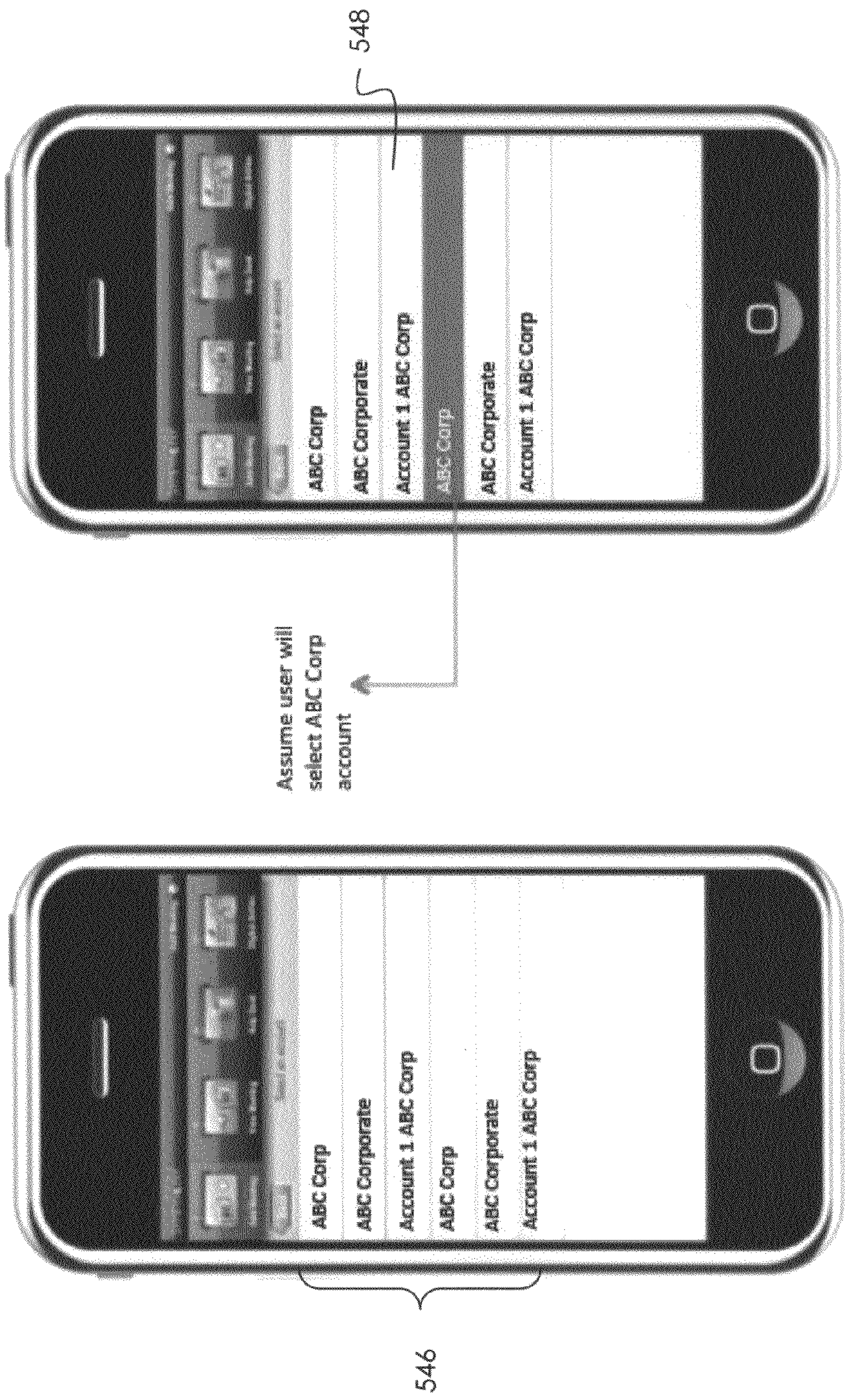
Figure 31F:
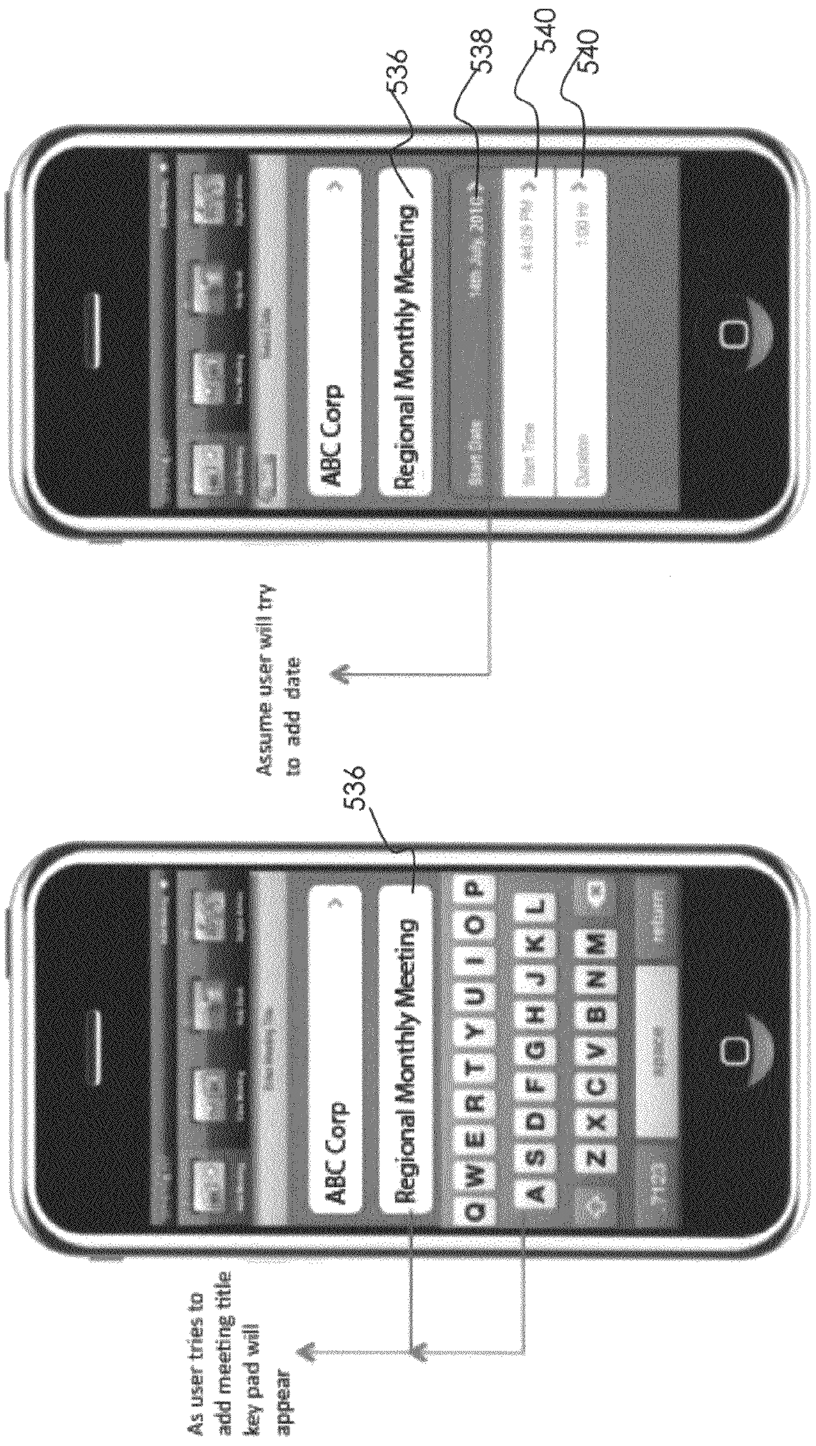
Figure 31G:
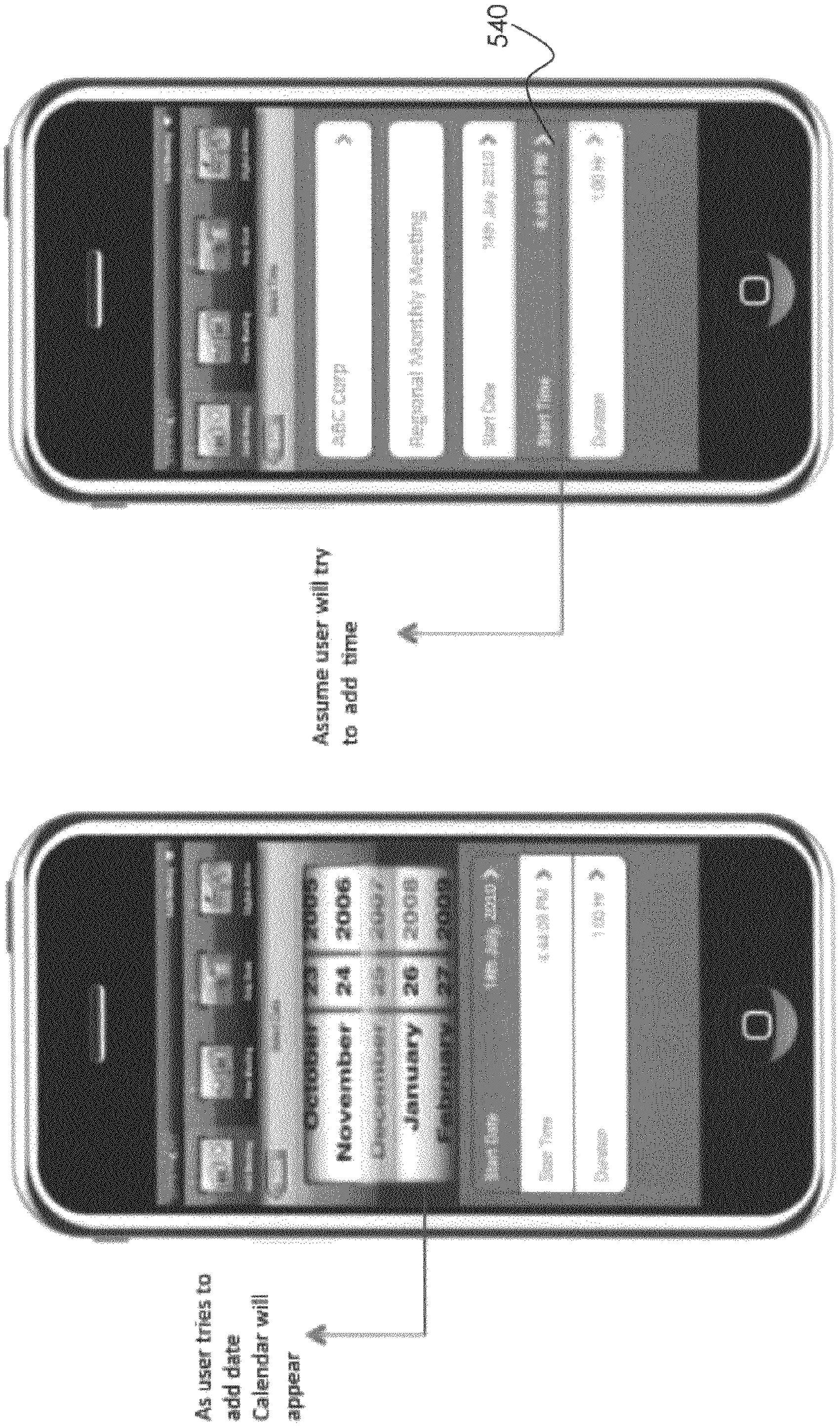

As illustrated in FIG. 31C, note that at the bottom of the touch screen computer/mobile interface 526, the user can view the date and time in a day view, month view, or hourly view by selecting one or more of the buttons 530 after, for example, the user has selected the view meeting button (FIG. 31C). In the illustration being described, it is assumed that the user will actuate the "add meeting" button 528*a* (FIG. 31D) in which case the user is presented with an "add meeting" screen 532 whereupon the user can select, for example, the account button 534, meeting title button 536, start date button 538, start time button 540 or duration button 542. In the illustration, it will assumed the user has selected 534 whereupon the user is presented with the various accounts 546 that are associated with this user and listed on the screen as shown in FIG. 31E. Assuming the user selects the illustrative ABC CORP account 548 (FIG. 31E), the account has been identified and the user is next presented with a meeting title 536 and keypad 550 (FIG. 30F) whereupon the user enters the user enters the meeting title.

Figure 31H:
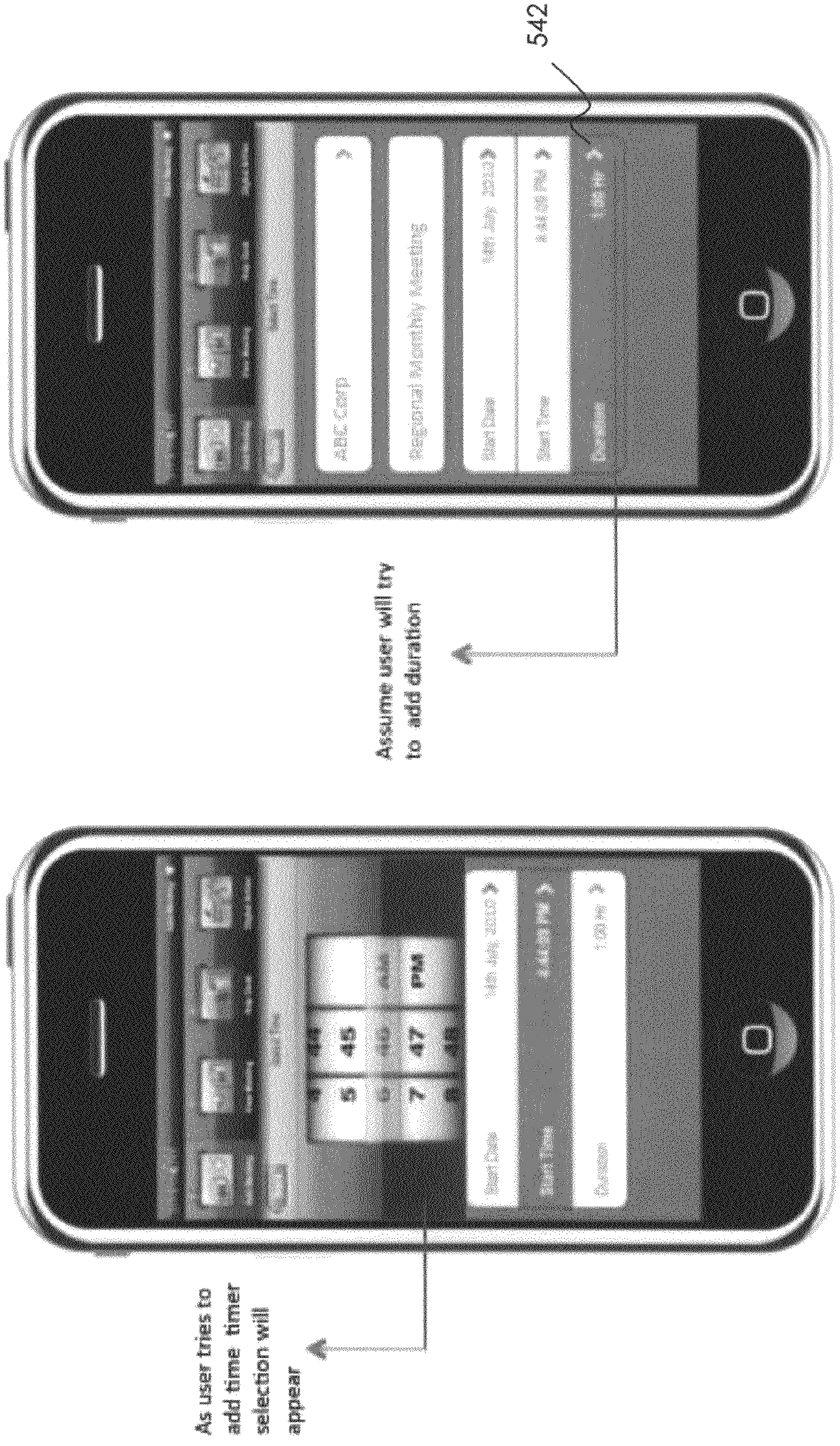

After the meeting title is entered, the user then steps through each of the other buttons 538-542 and selects the date button 538 and enters the date (FIG. 31G), the user selects the time button 540 and selects the time (FIG. 31H. The user will also add a duration time, which corresponds to the duration of the conference, by selecting the duration button 542 and entering the appropriate duration time, as shown in FIG. 31I.

Figure 31I:
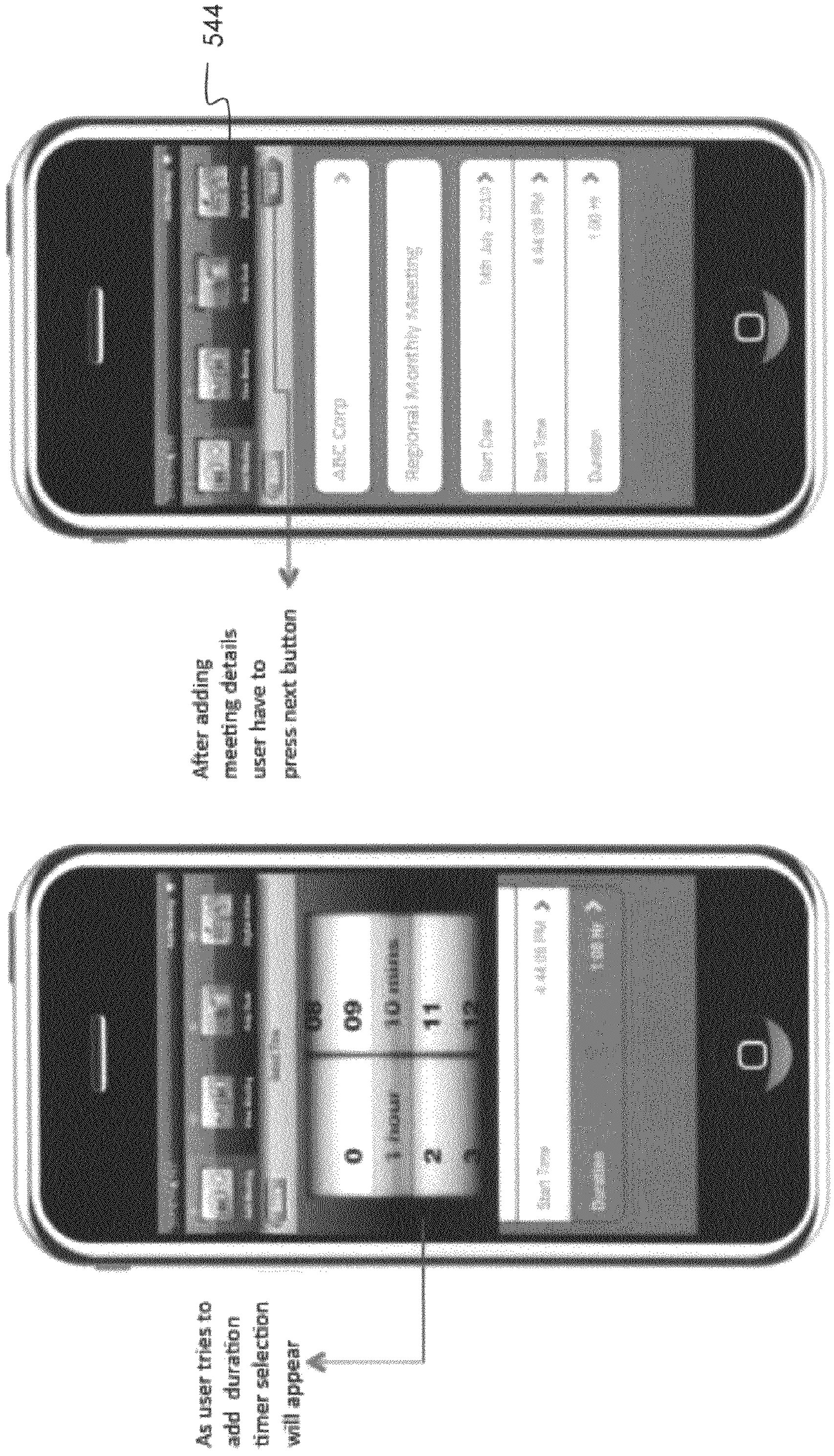

After adding the meeting details, the user may select the next button 544 in FIG. 31I whereupon the user selects the locations, organization or users that will be participating in the meeting. In this regard, note that the touch screen computer/mobile interface 526 is provided with a scrollable list of each of the terminals 14-28, desktops 32 and/or gatekeepers 34 that may participate in the meeting. The user selects one or more of the participants, such as the user 546 (FIG. 31L). It should be understood as illustrated in FIGS. 31J and 31K that the list of terminals 14-28, desktops 32 and/or gatekeepers 34 are stored in the IDR 40 and associated with the user via the provisioning runbook process 58*a* mentioned earlier herein.

Figure 31J:
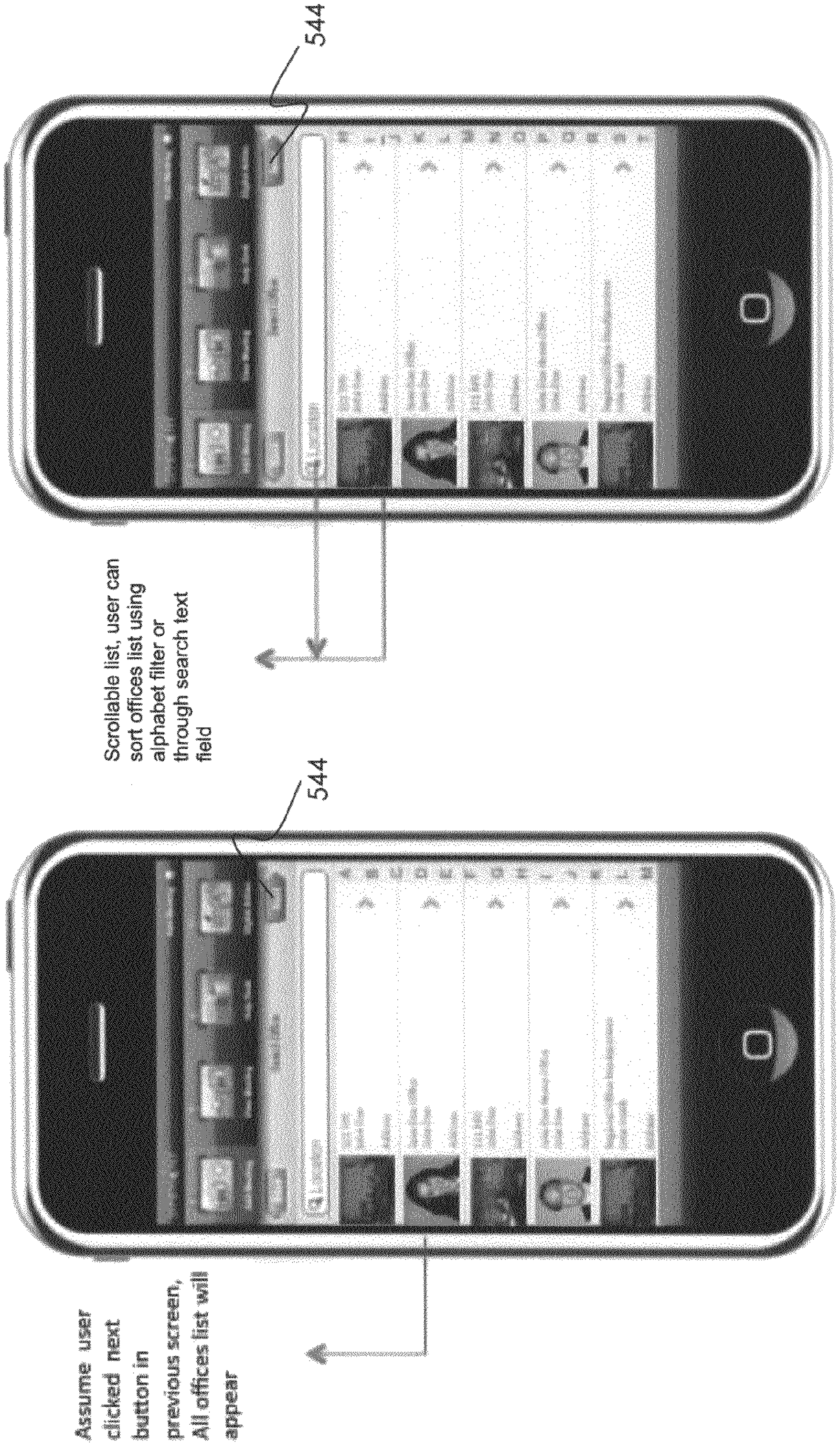
Figure 31K:
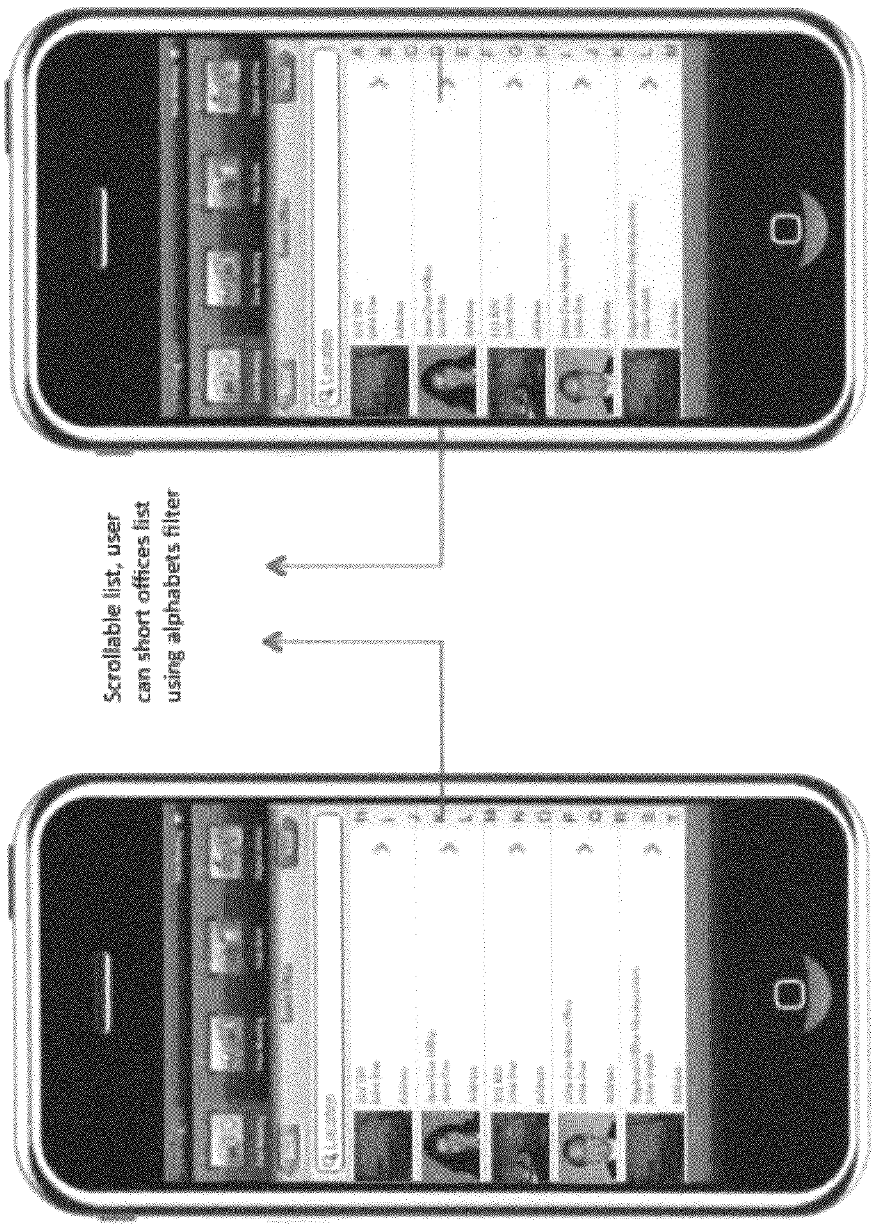
Figure 31L:
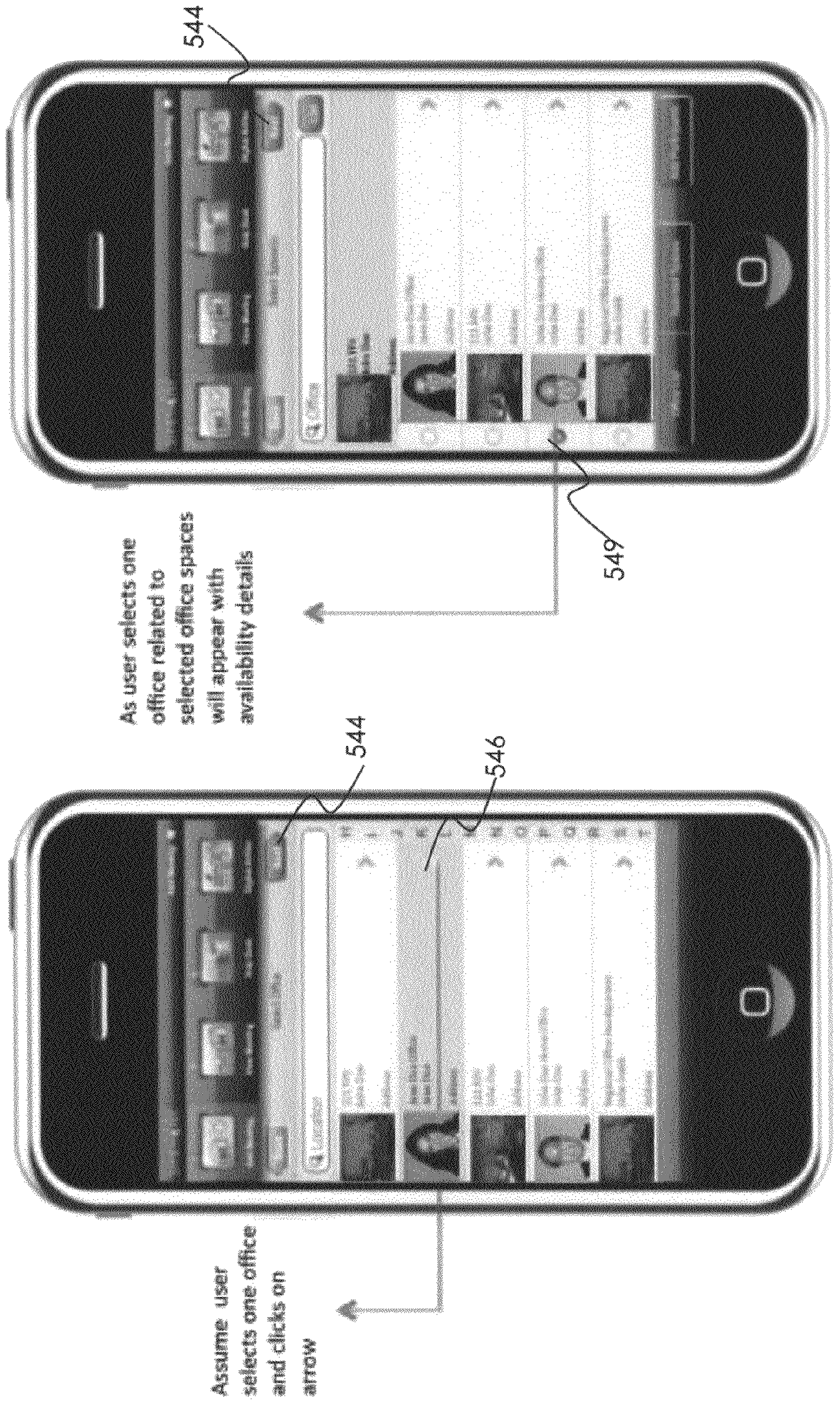

As illustrated in FIGS. 31J and 31K, the scrollable list can be perused using an alphabet filter which associates an alphabetic character to each of the one or more terminals 14-28, desktops 32 and/or gatekeepers 34. After the user selects one or more of the terminals, such as the terminal associated with the user 546 in FIG. 31L, the availability details associated with that terminal will be presented to the user. In this illustration shown in FIG. 31L, an indicator, such as a red signal 549 is presented to the user if the requested terminal is not available.

Figure 31M:
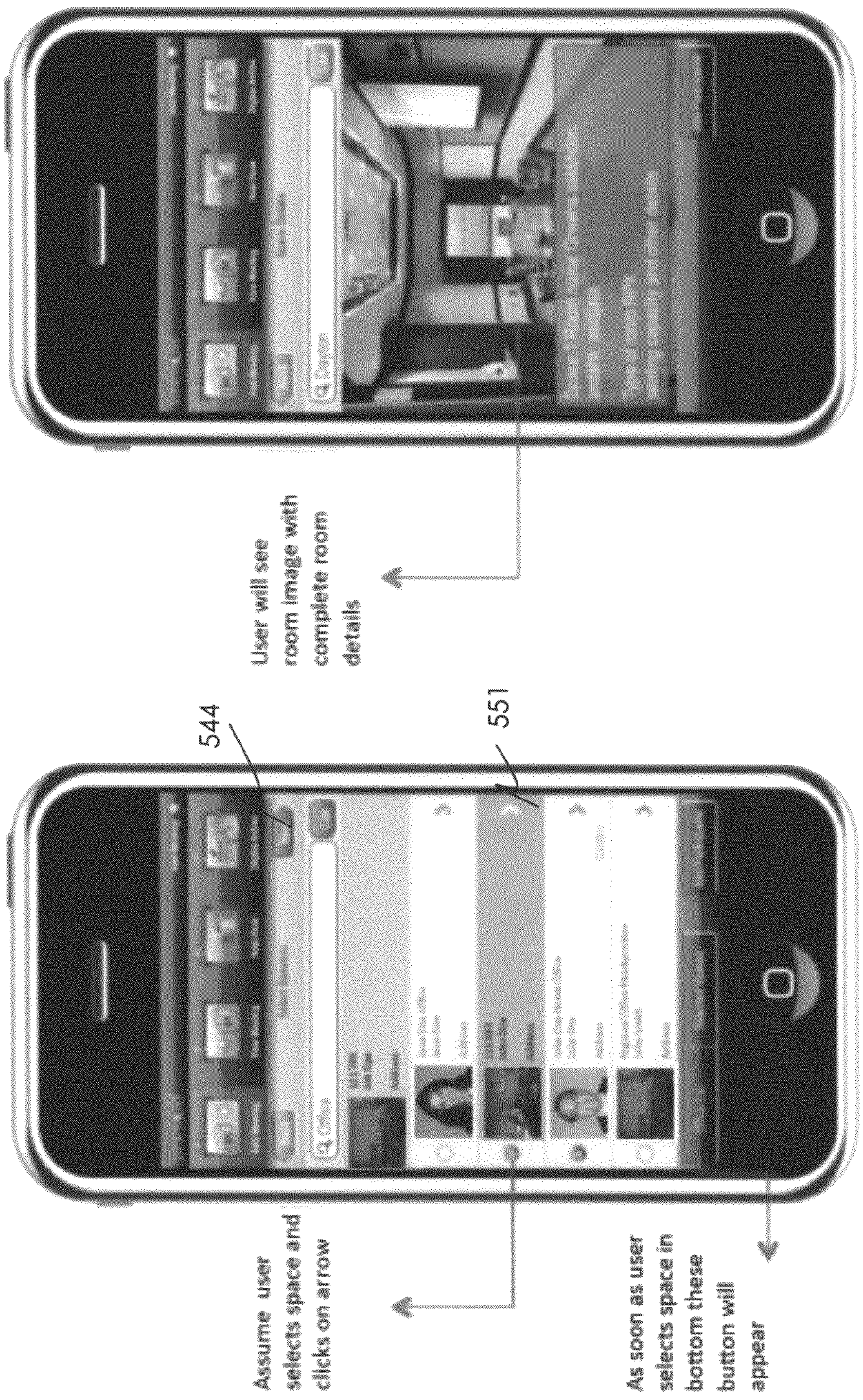
Figure 31N:
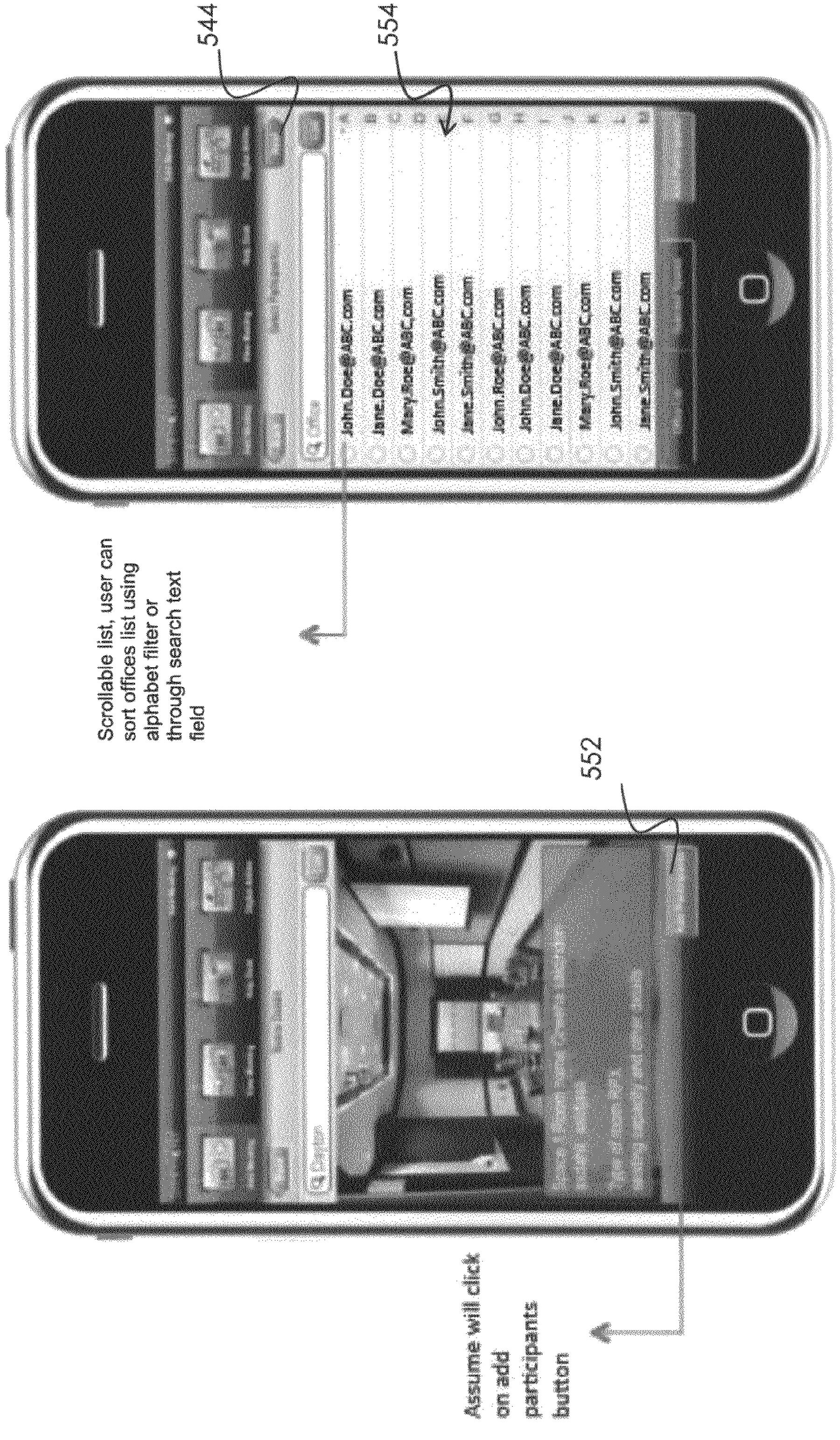

Referring now to FIG. 31M, assuming the user selects another terminal, such as the terminal associated with button 551, the user will see an image of the terminal, including complete details of the geographic location and room or environment where the terminal is situated. As alluded to earlier, during the provisioning runbook process 58*a* when the terminal is provisioned, information and/or attributes about the terminal, such as seating capacity, availability of peripheral devices, catering and the like will also be presented to the user as illustrated in FIG. 31M.

Figure 31O:
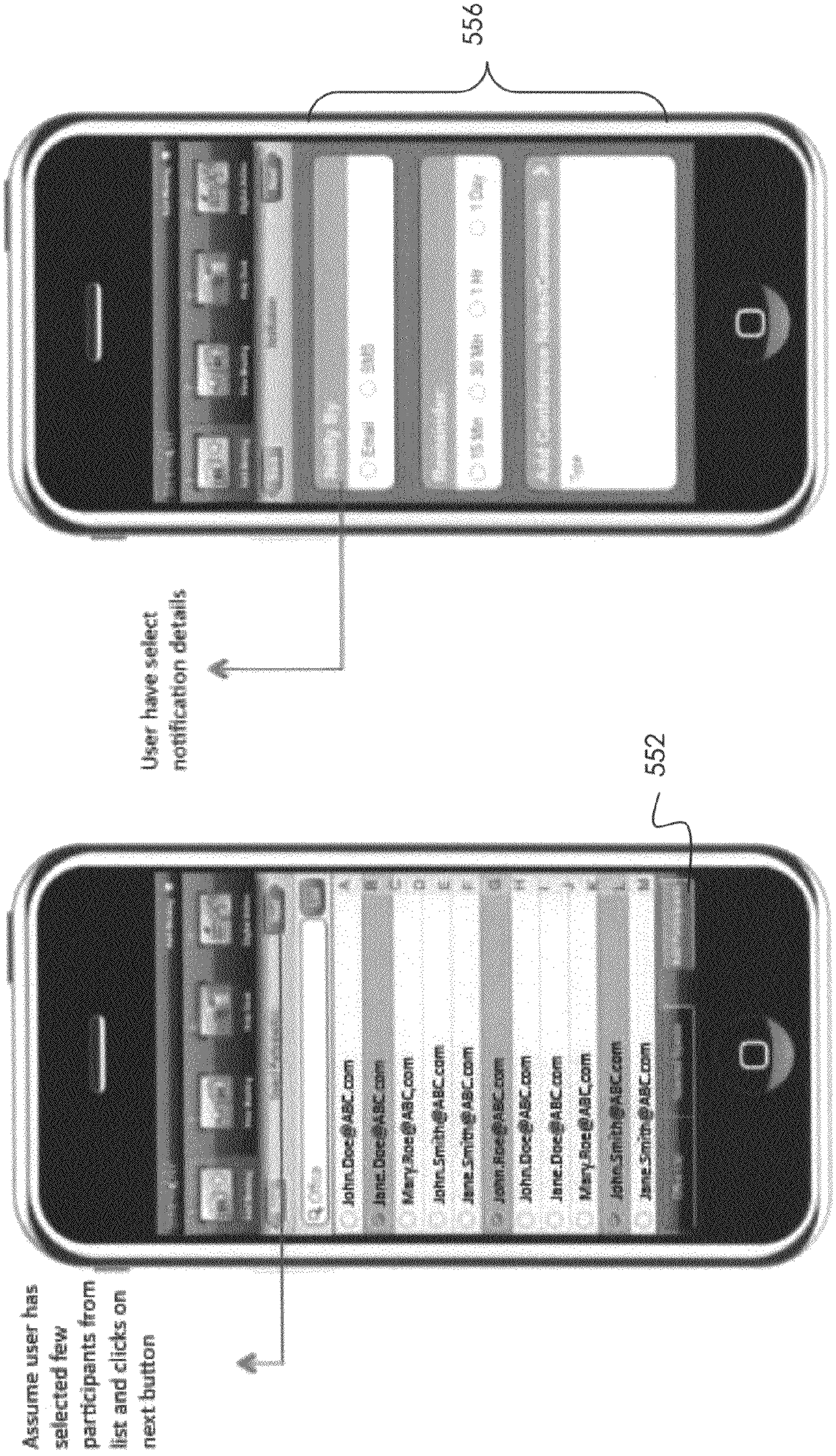
Figure 31P:
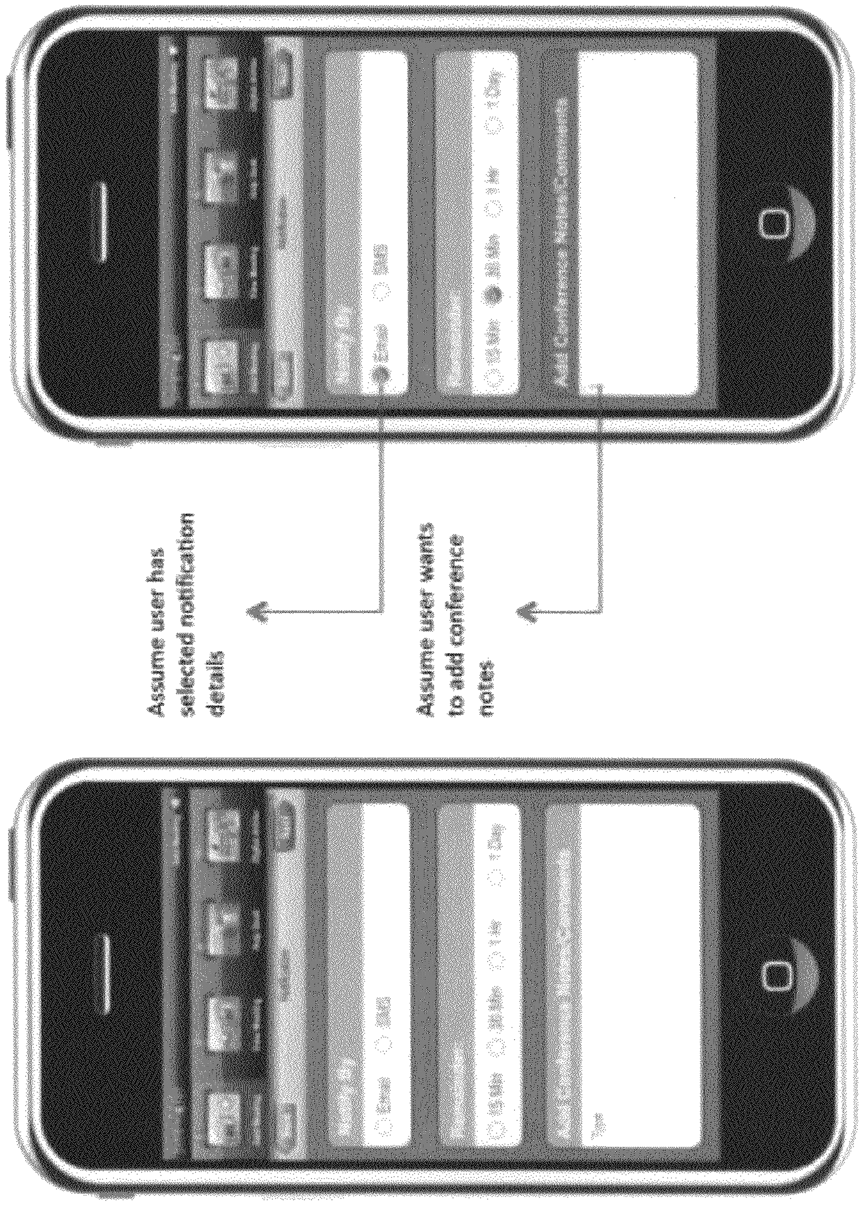
Figure 31Q:
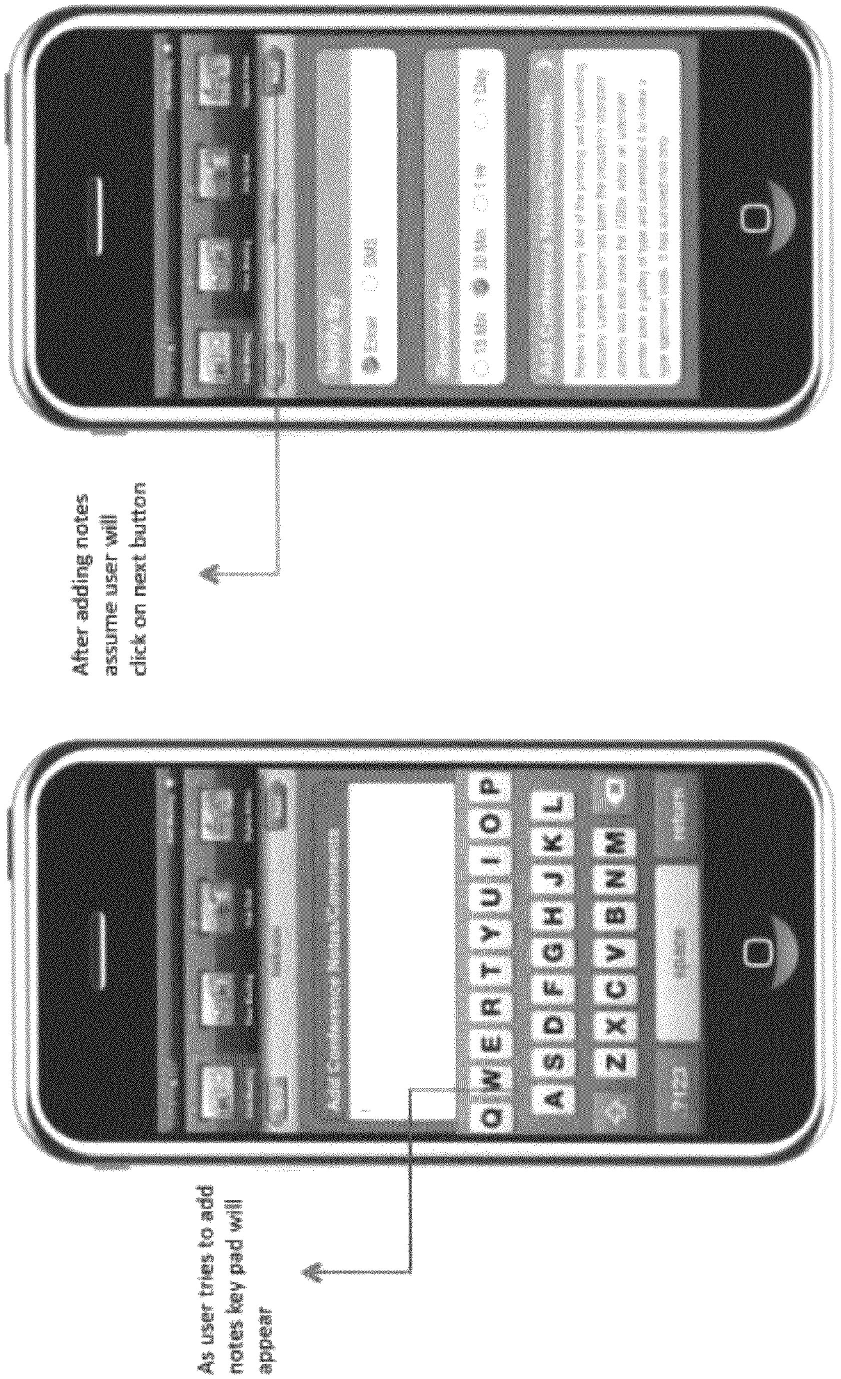

After selection of the terminals and associated organizations and locations, the user may select the add participants button 552 (FIG. 31N), whereupon a scrollable list 554 is provided. The user can select on or more or the participants from the scrollable list as illustrated in FIG. 31O and after actuating the add participants button 552 a notifications screen is presented 556 to enable the user to select notification details, such as details of the manner by which the system 10 notifies the participants selected. The user may also add a reminder time and a note or comment that will be received by the participants after the user enters the comments using the keypad 550 as illustrated in FIGS. 31O-31Q.

Figure 31R:
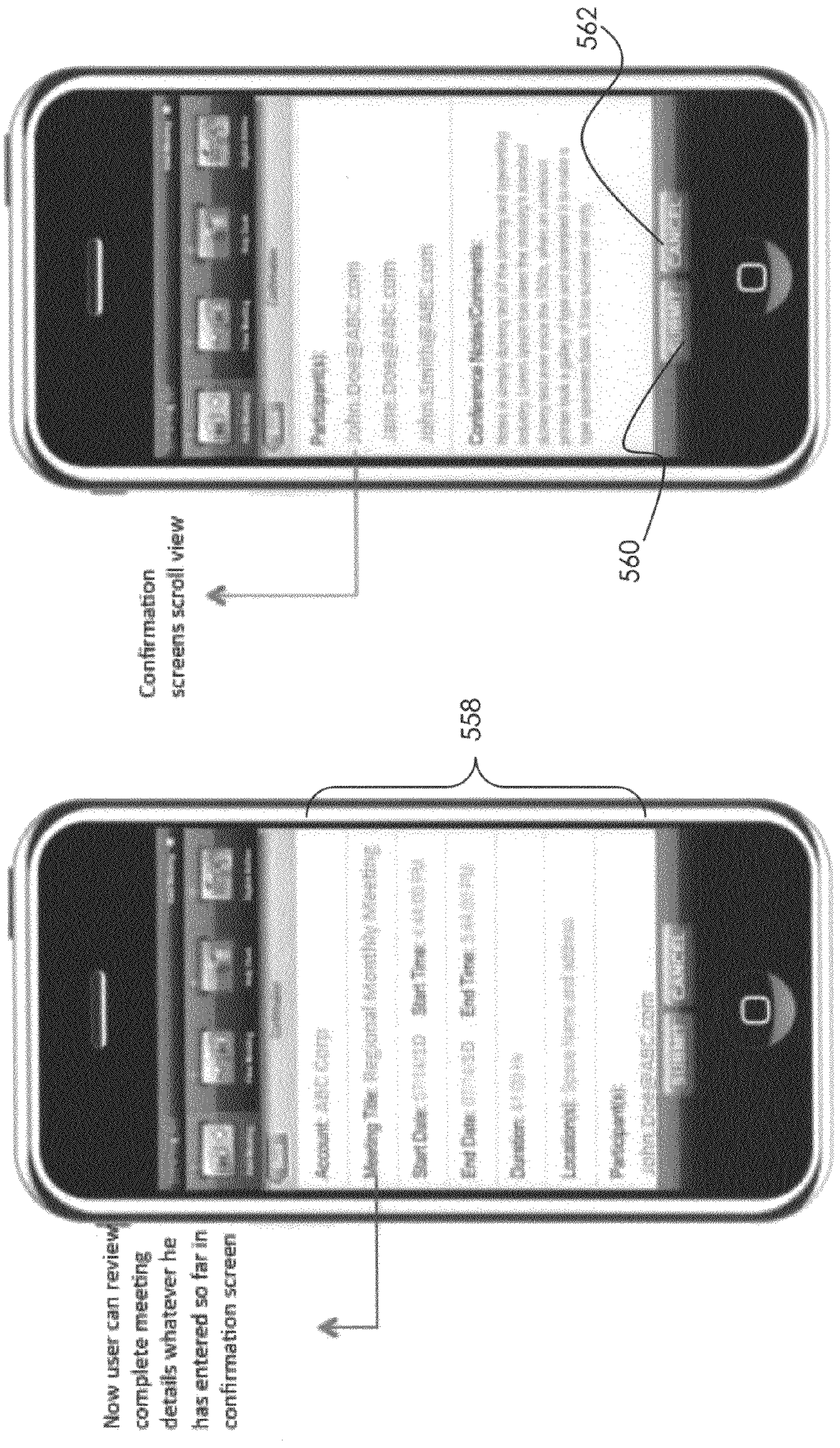

After the user adds the conference notes or comments the user may select the next button 544, whereupon the user is presented with a confirmation screen 558 so that the user can review complete meeting details of whatever has been entered. After reviewing the meeting details, the user can select the submit button 560 or the cancel button 562. Assuming the user has selected the submit button the meeting and its associated details will automatically be scheduled and added to the IDR 40 (as illustrated in FIG. 31R and FIG. 31S).

Figure 31T:
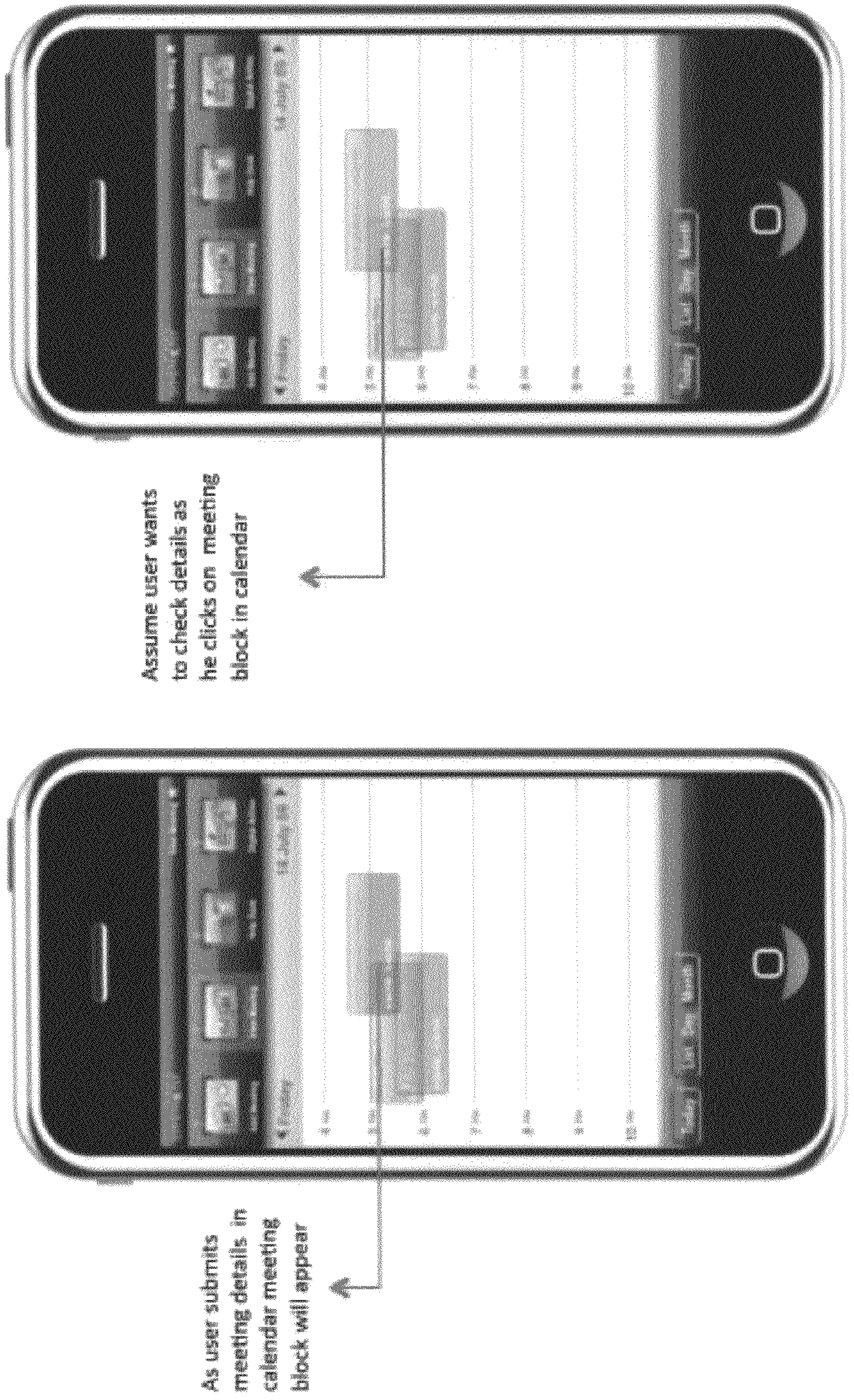

Once the user has submitted the meeting details, the meeting block will appear in the user's calendar as illustrated in FIG. 31T. If the user wishes to confirm the details or review the details, the user need merely to select that meeting block in the calendar.

Figure 31U:
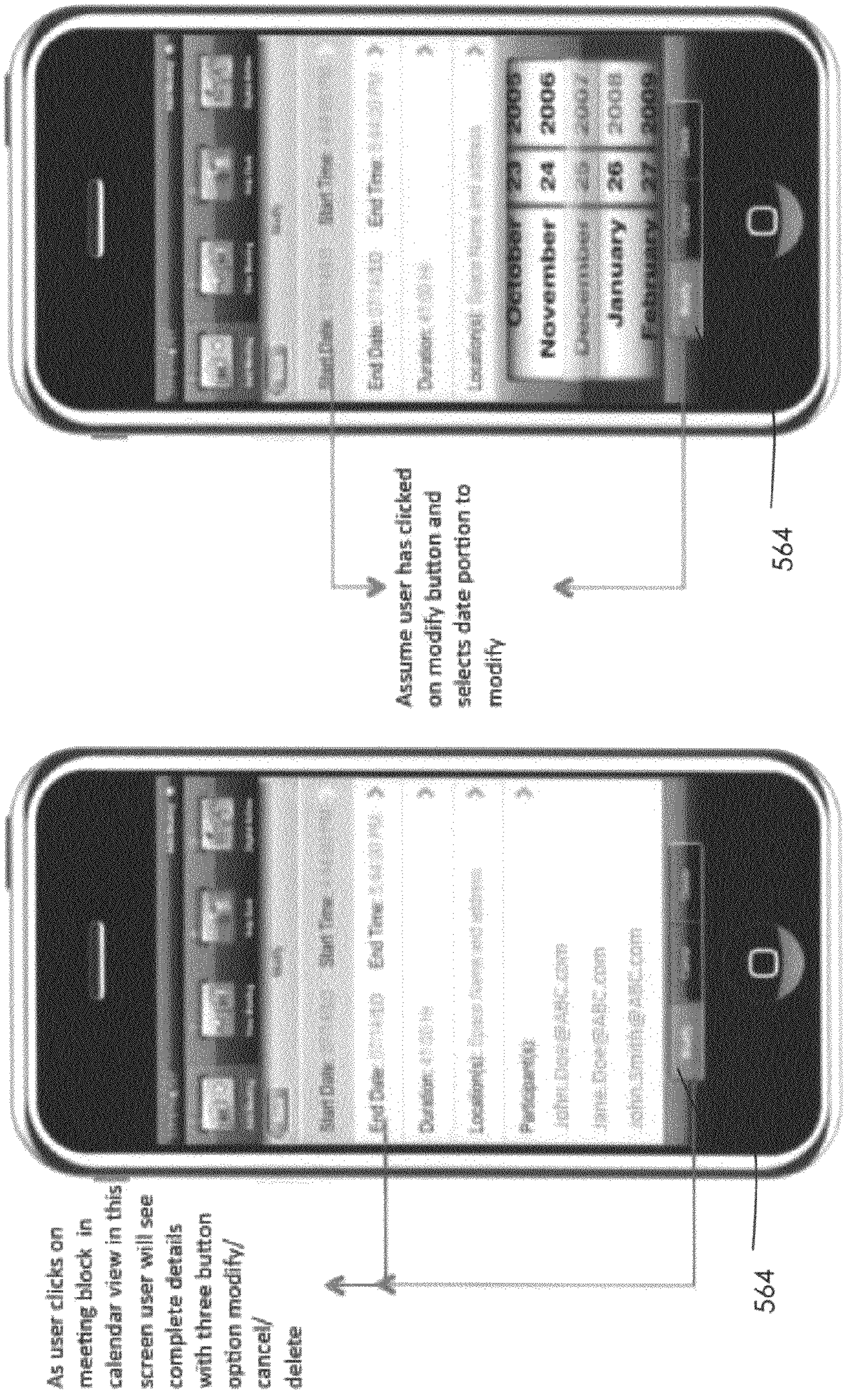
Figure 31V:
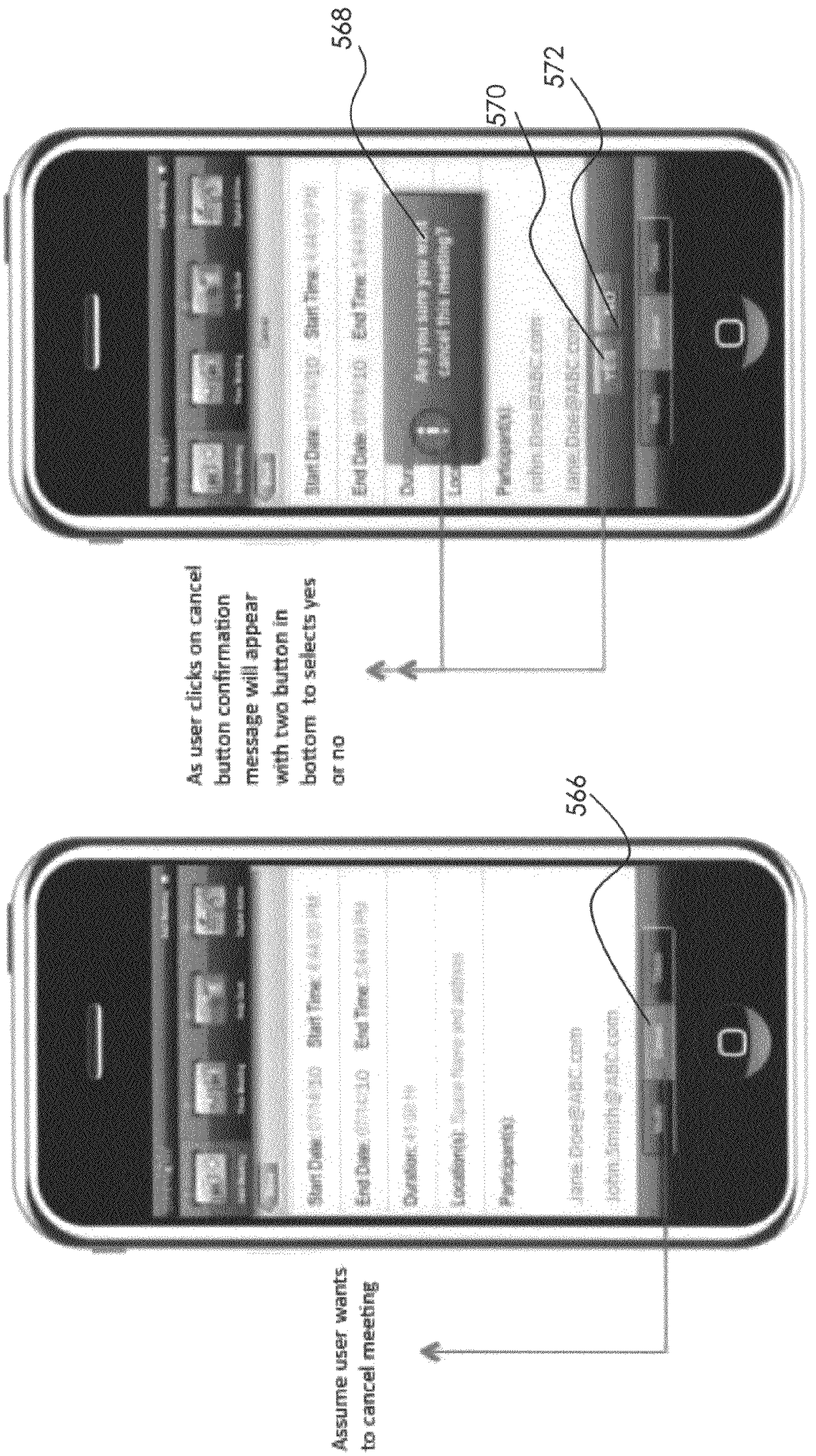

When the user wishes to modify the meeting, the user selects the meeting block or actuates the modify button 564 (FIG. 31U), whereupon the user is presented with the meeting details as shown in FIG. 31U. The user can select any one of the meeting detail fields, such as the start date. The user may select the start date and then adjust it by selecting another date as illustrated in right hand side of 31U. If the user wishes to cancel meeting, then the cancel button 566 is actuated whereupon a confirmation message 568 will appear for the user to confirm or reject the cancellation request by actuating the yes button 570 or no button 572 as shown in FIG. 31V.

Figure 31W:
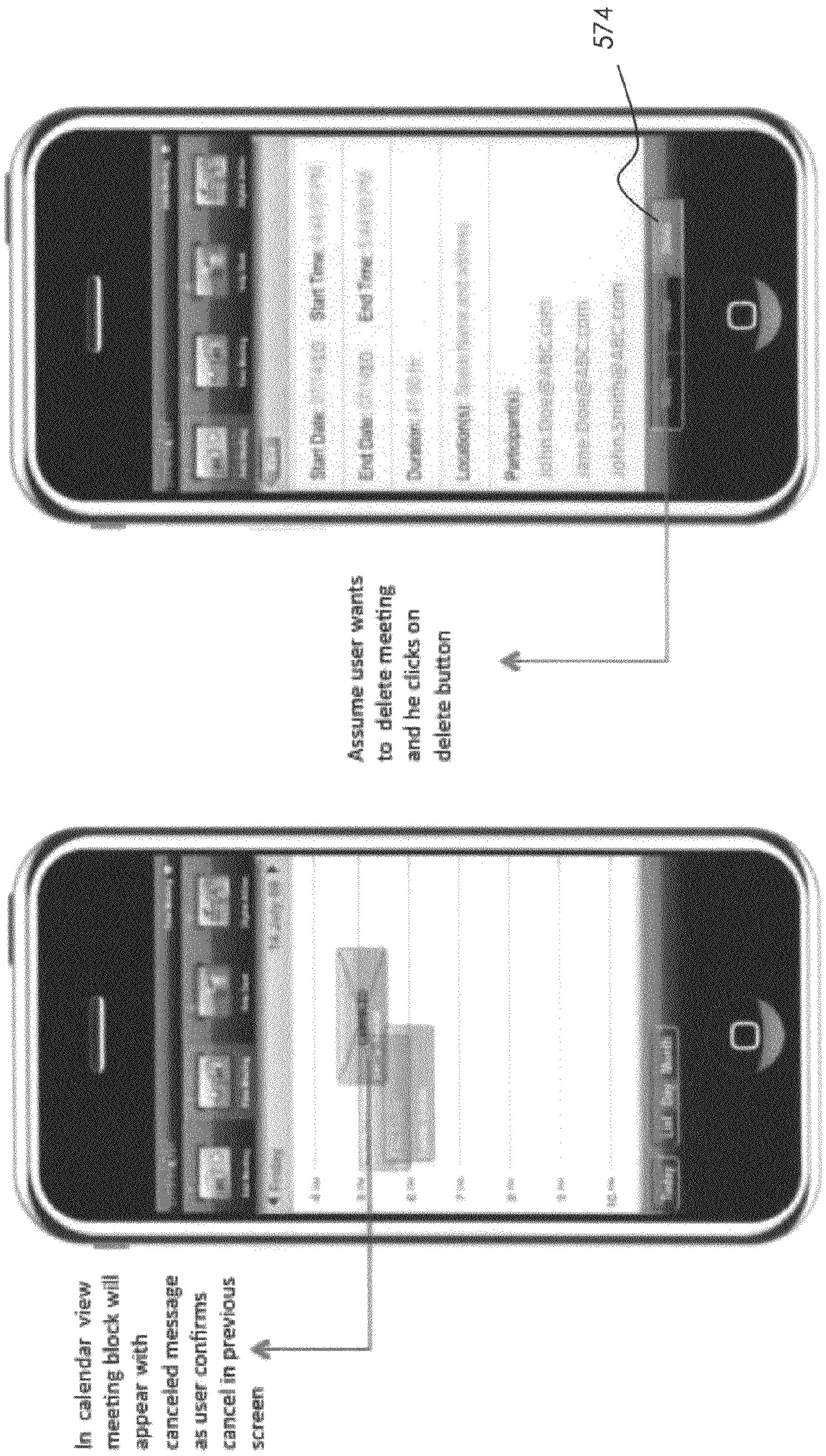
Figure 31X:
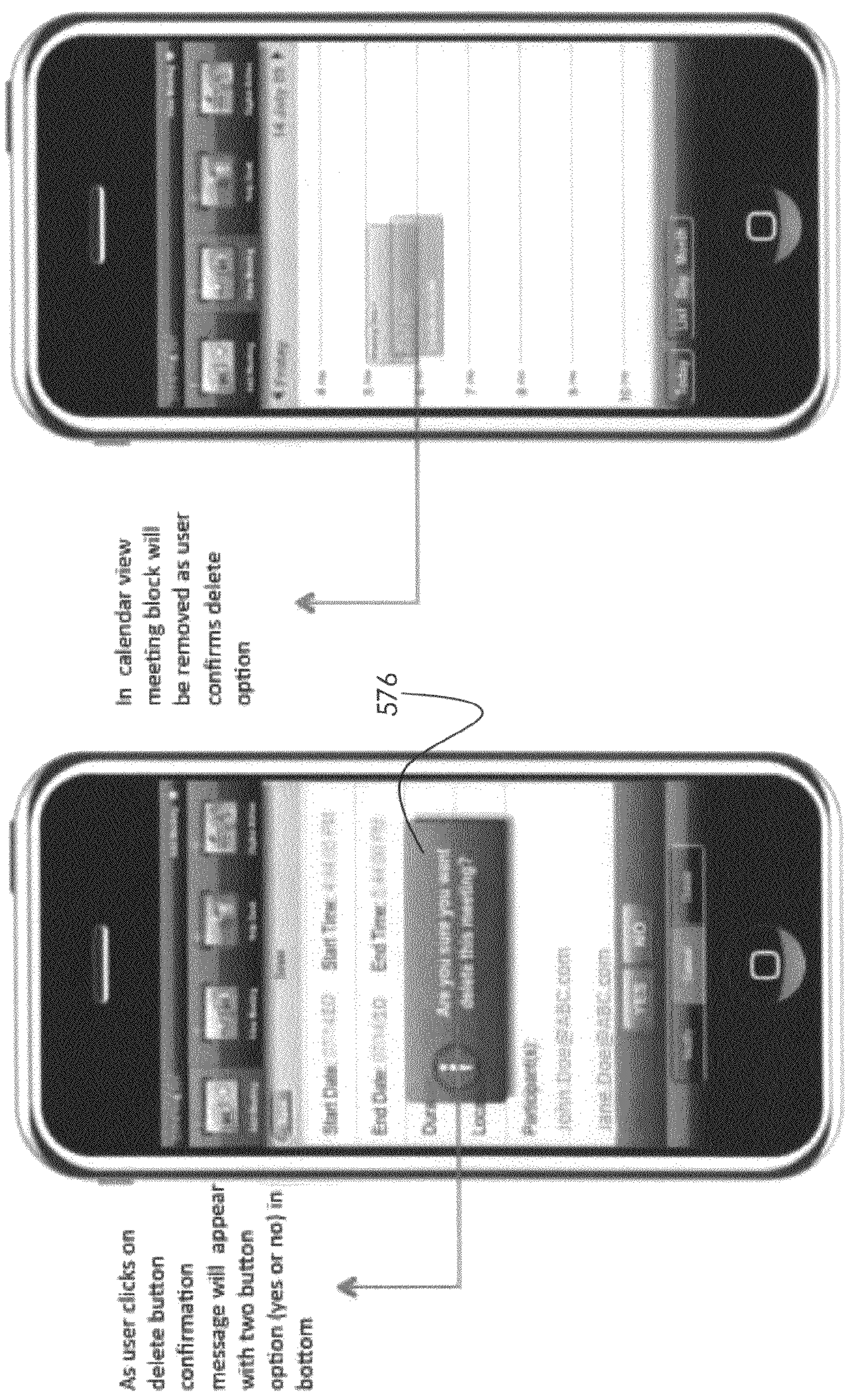

Referring now to FIG. 31W, when the user has initiated a cancellation and confirmed the cancellation, note that the ACMCE 38 will display the cancel message as illustrated in the left of 31W. Assuming the user wishes to delete the meeting the user may click on the delete button 574 whereupon the confirmation message 576 will be presented to the user and the user can again actuate the yes or no button as shown. Note that if the user deletes a meeting, no history of it will appear in the user's calendar. Advantageously, it may be desirable to allow the user to delete a meeting and erase any details of its existence. The delete feature is an administrative feature that allows the meeting to be completely removed from IDR 40. Cancelling a meeting is available to the general user and does not remove the record from IDR 40, thereby enabling statistics to be captured about cancelled meetings.

Next, the scheduling of a meeting using the web portal 66*a* user entry point 66 described earlier will now be described relative to FIGS. 32A-32J. Note that after the user selects a schedule meeting button or navigates to the portal 66*a* and authenticates to the system 10, the user may actuate the add meeting button 578 whereupon the user is presented with a form 580 having a plurality of fields that identify the title 582, owner email 584, requester email 586, start date 588, end date field 590, and setup time 591. After the user enters the appropriate information, the user selects the next button 592 whereupon the organization, locations or terminals associated with that user will be presented to the user for selection. Assuming the user selects the location 594, note that the system 10 populates the field 596 of the screen so that the user may see the terminals or organization selected. As described earlier relative to the provisioning process 58*a*, the picture selected for each of the terminals 14-28, desktops 32 and/or gatekeepers 34 may be a picture of the physical environment or room or it may be a picture of the person associated with that that room for ease of review and selection by the user. In this illustration shown in FIG. 32C, note that a picture of a person has been used in association with the terminals 14-28, desktops 32 and/or gatekeepers 34 or organization. It should be understood that if there is more than one location or terminal associated with the location identified by 594, a plurality of terminals would appear in column or area 596.

Figure 32A:
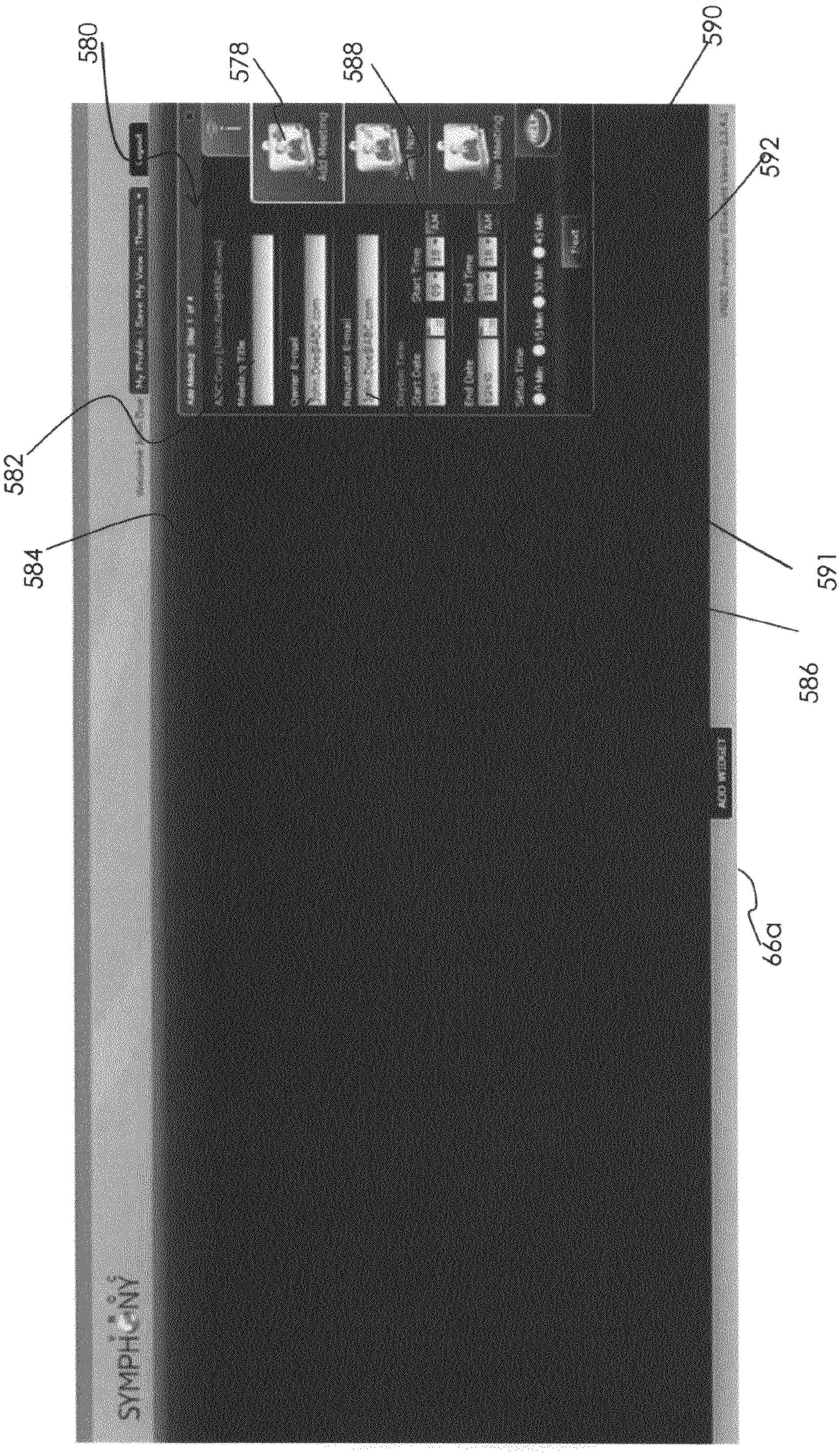
FIGS. 32A-32M illustrate still another user entry point in the form of Microsoft Outlook for providing a user entry point for using the system 10.
Figure 32B:
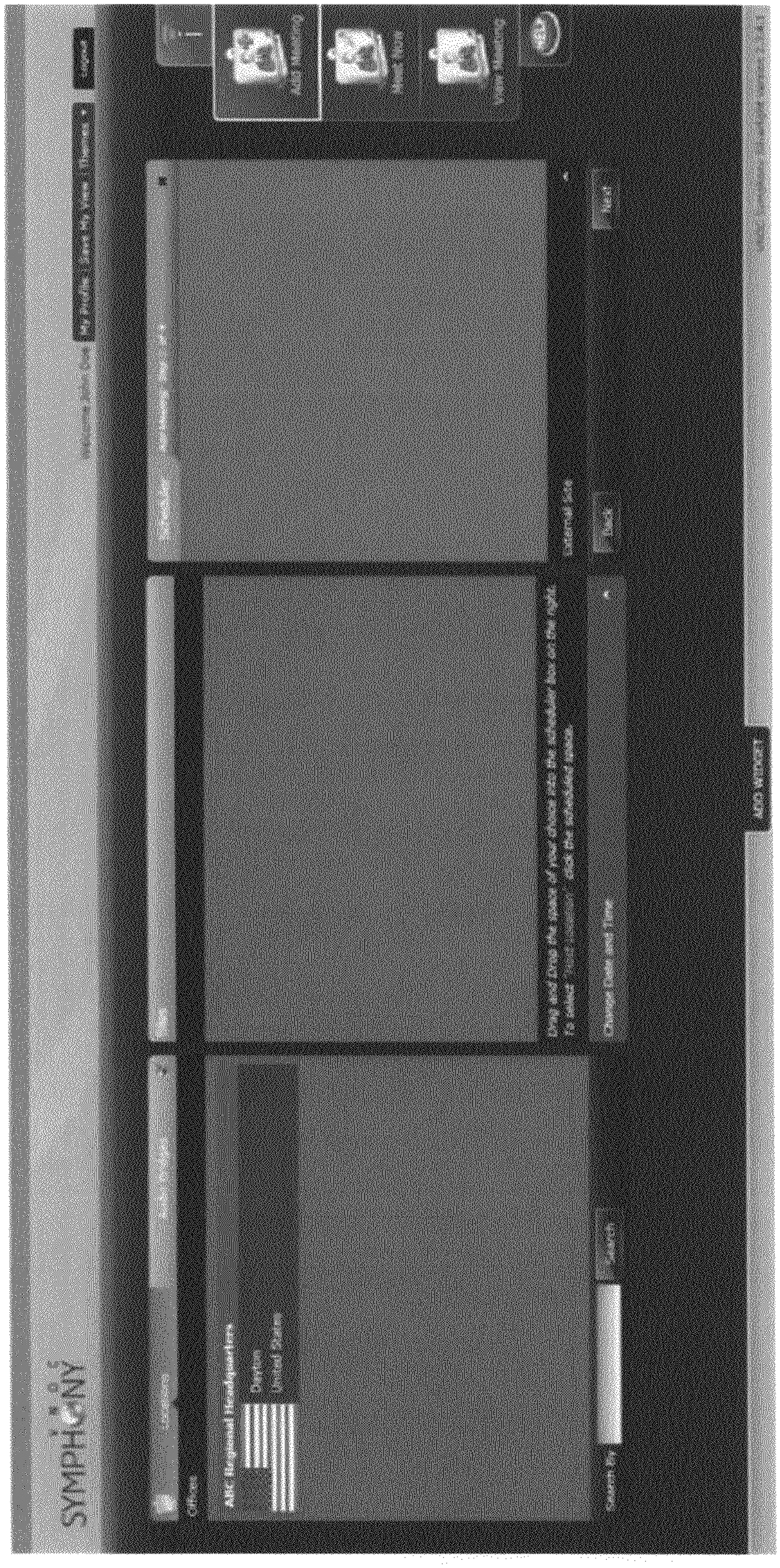
Figure 32C:
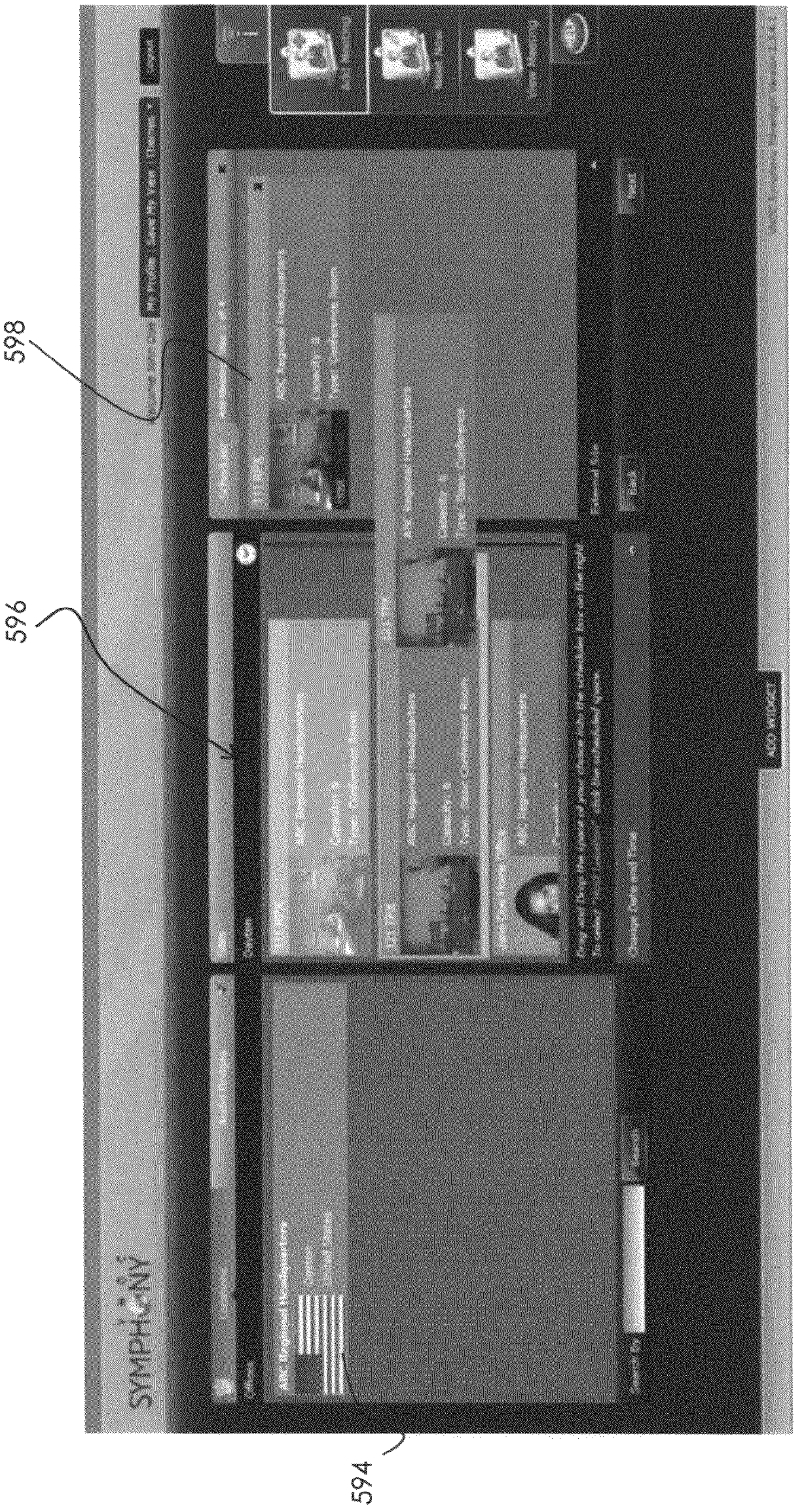
Figure 32D:
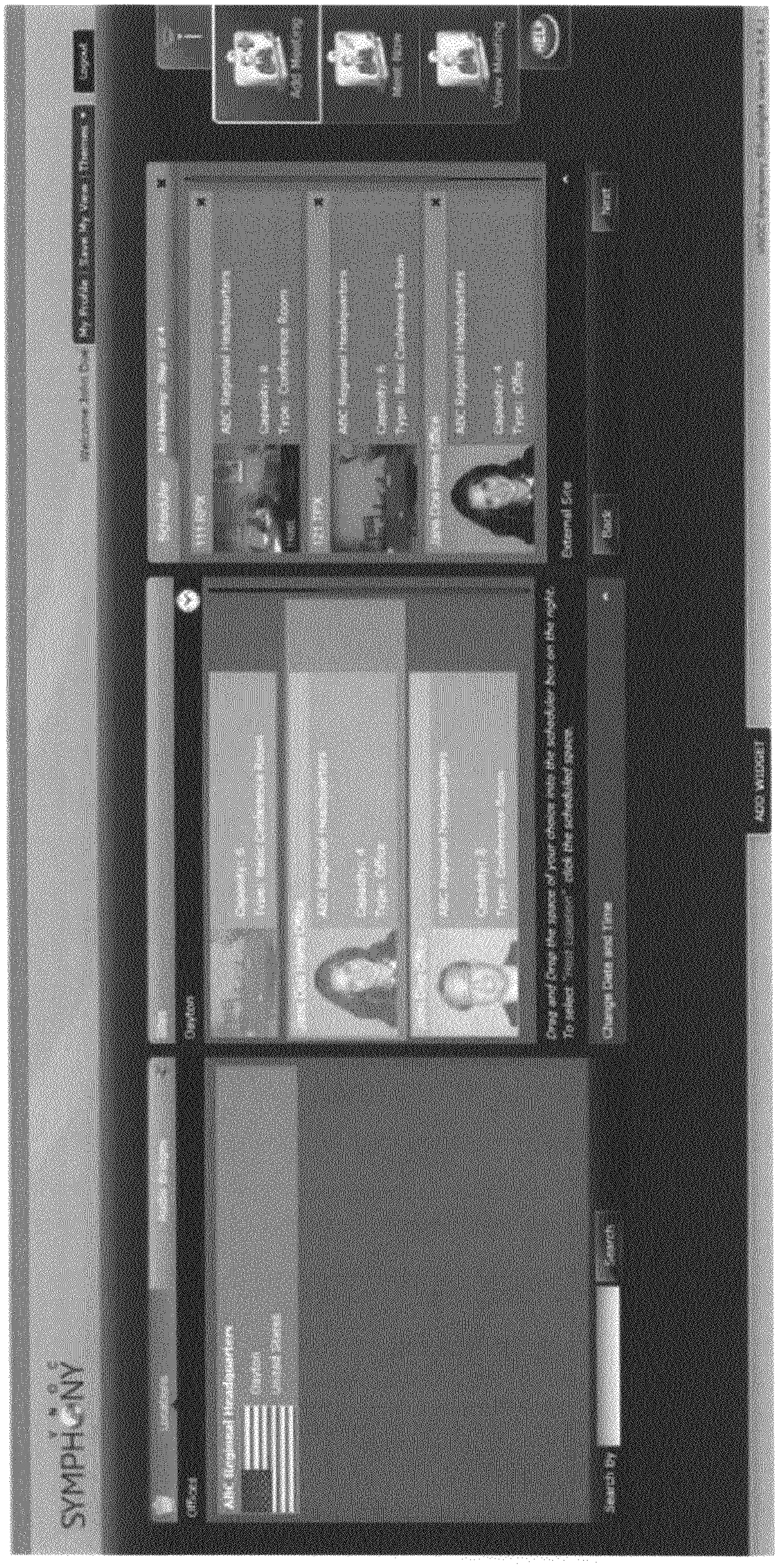

Note in FIGS. 32C and 32D that after a user has identified a terminal by selecting the button 594, the user is presented with the terminals 14-28, desktops 32 and/or gatekeepers 34 associated with that button 594 whereupon the user can simply drag and drop the desired participants terminals from 596 to scheduler column 598 in order to schedule those terminals in the meeting. Note in FIG. 32D, for example, that the user has selected Jane Doe's Home Office office for participation in the meeting or conference. In this illustration, it is assumed that the user could input or search by different fields, such as country name, by entering information into the search field 600 (FIG. 32E) and select another terminal to be added to the meeting using the same procedure.

Figure 32E:
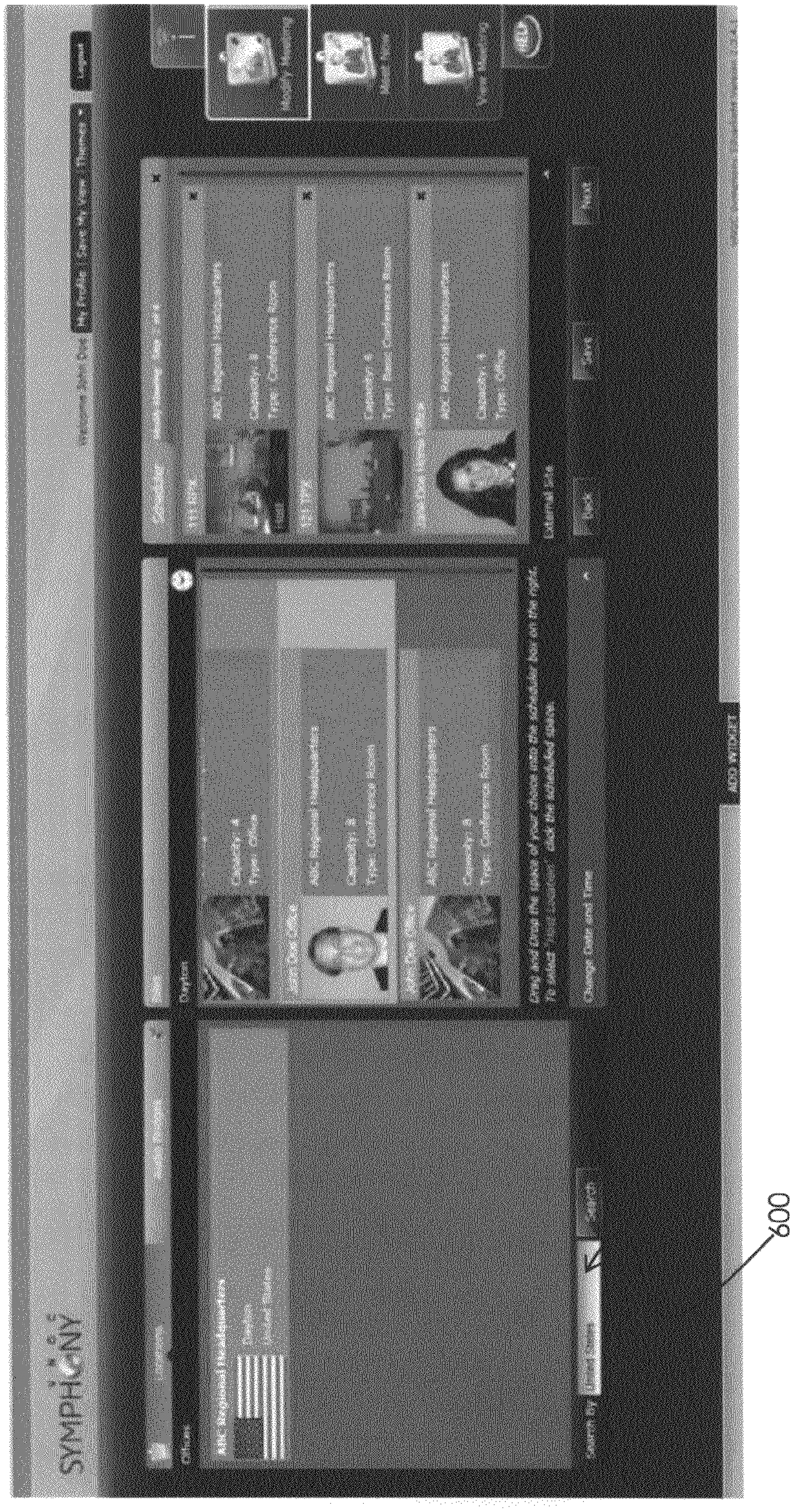
Figure 32F:
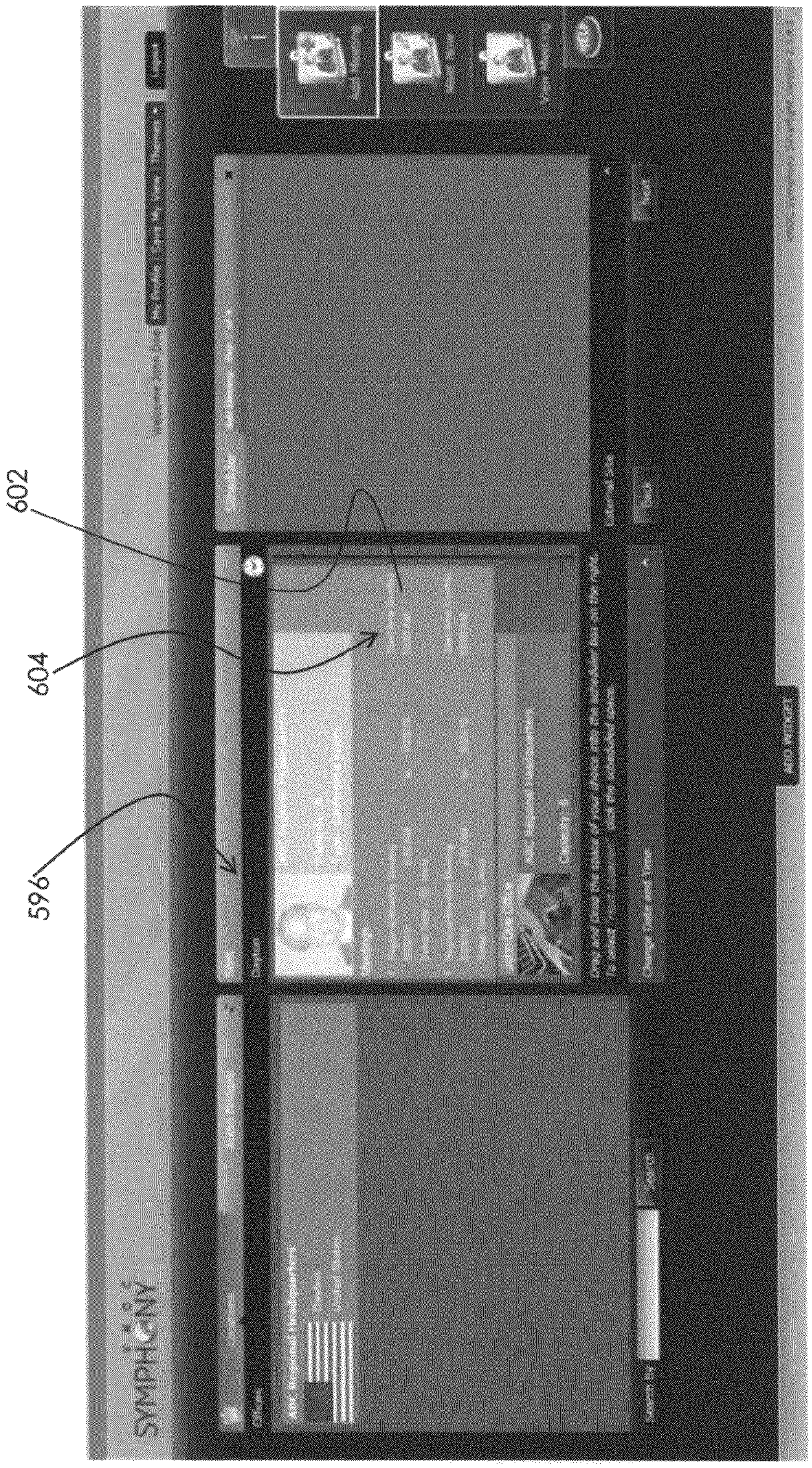
Figure 32G:
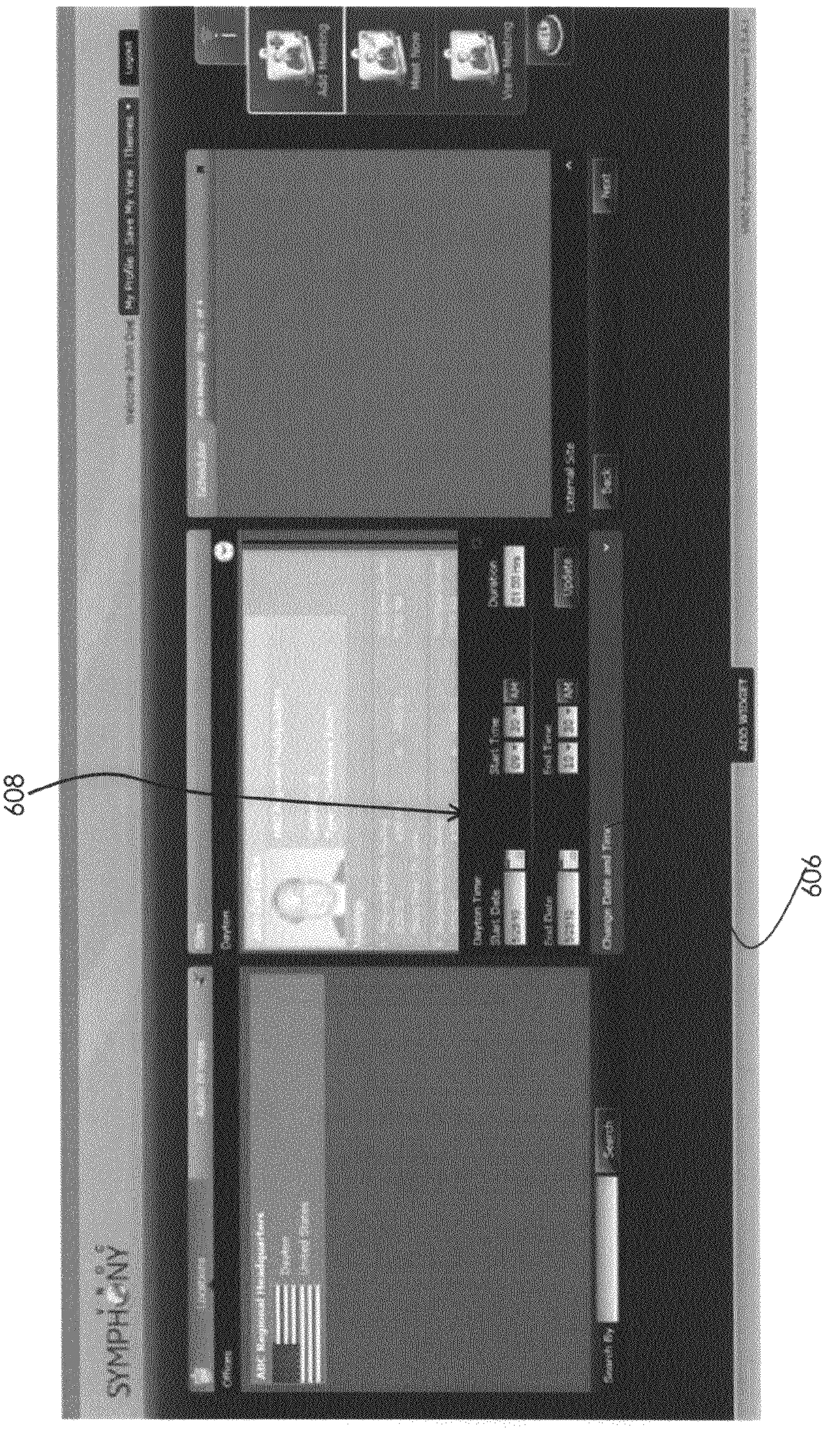
Figure 32H:
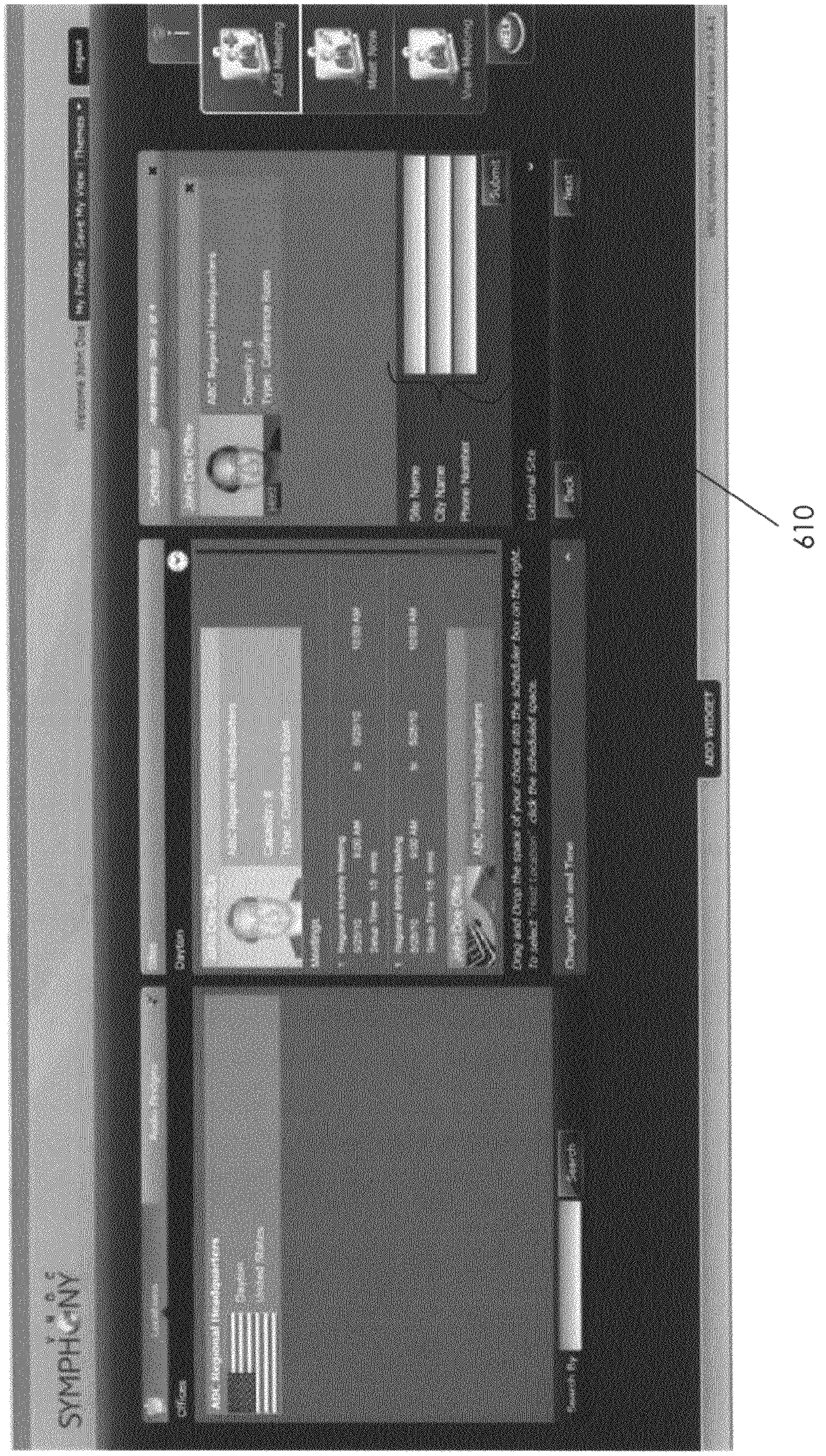

Note in FIG. 32E that the user has selected three terminals or organizations to participate in the meeting. The user may select a user or organization that is not available or that has a conflict as illustrated in FIG. 32F, where information about the conflict may be presented to the user. In the illustration, note that a start time conflict notification 602 is identified in the lower portion of the highlighted screen 604. In the illustration (FIG. 32G) being described, the user may actuate a change date and time icon 606 and in response, the ACMCE 38 will present the user with date, time and duration fields 608 whereupon the user can select a different start time, date or duration. It has been found that this feature is advantageous because it enables the user to identify the availability of alternate start and end times for the terminals 14-28, desktops 32 and/or gatekeepers 34 being selected in response to the conflict.

It should be appreciated that after the user has selected the terminals 14-28, desktops 32 and/or gatekeepers 34 that will be participating in the meeting, the user may add information about external sites that are not provisioned in the system 10. Note in the lower right hand portion of FIG. 32H, the fields 610 may be filled in by the user. Although the information may be filled in, it should be understood that the system 10 has not provisioned resources associated with that field. When a user completes the fields, a notification is sent to a human who is responsible for provisioning terminals 14-28, desktops 32 and/or gatekeepers 34 in the system 10. The human would then provision the terminals 14-28, desktops 32 and/or gatekeepers 34 in a manner described earlier herein so that the terminals 14-28, desktops 32 and/or gatekeepers 34 can participate in the meeting being scheduled.

Figure 32I:
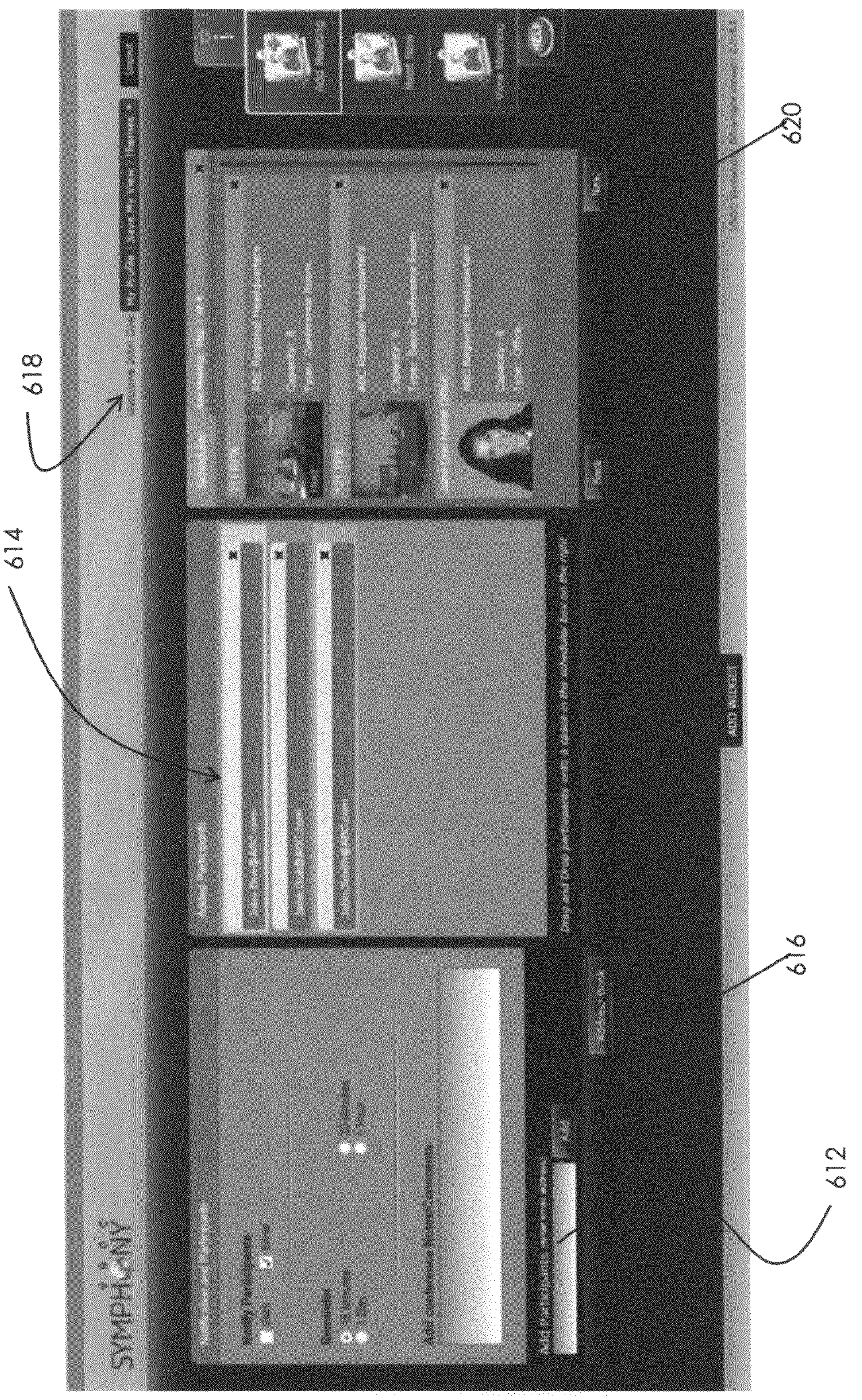
Figure 32J:
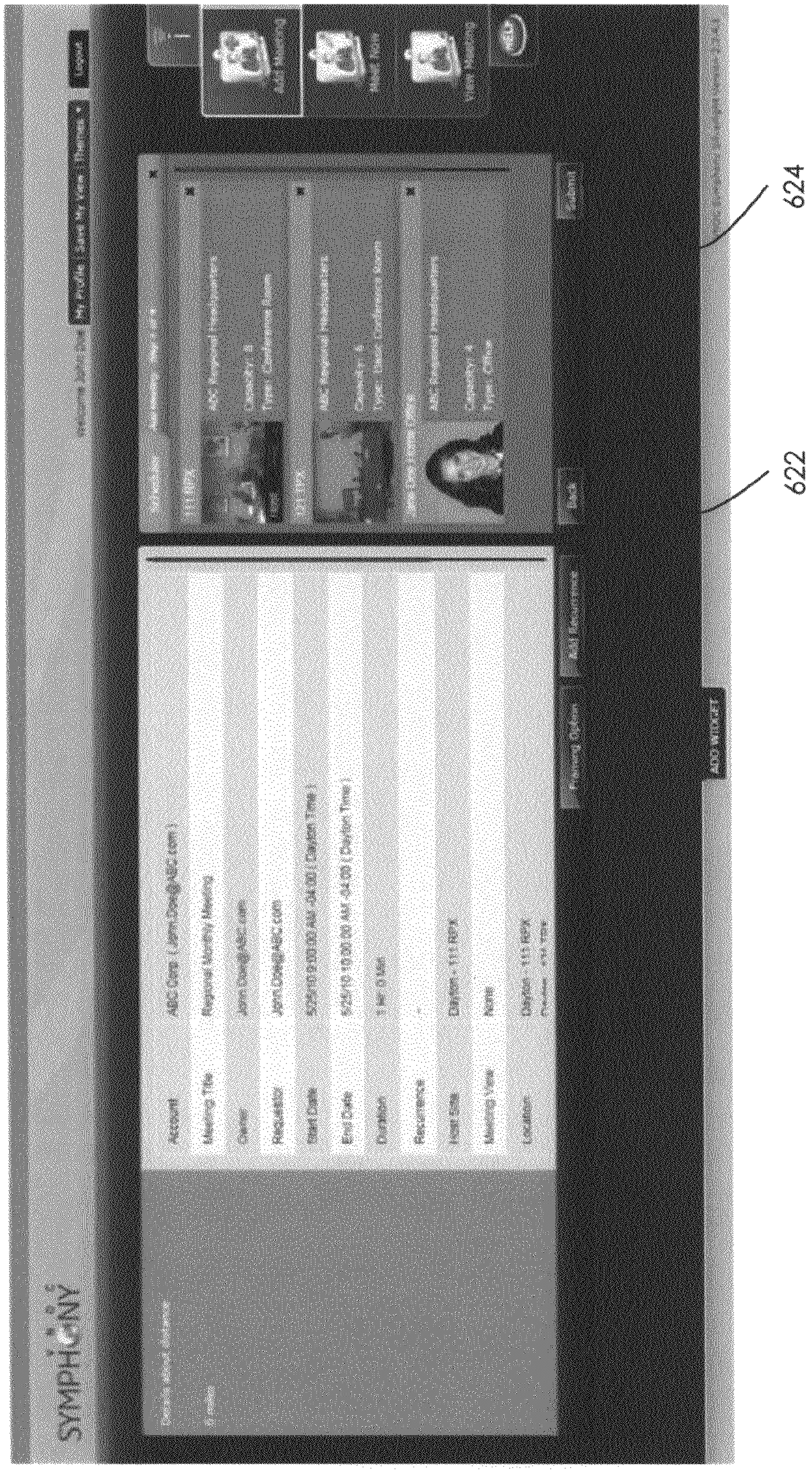
Figure 32K:
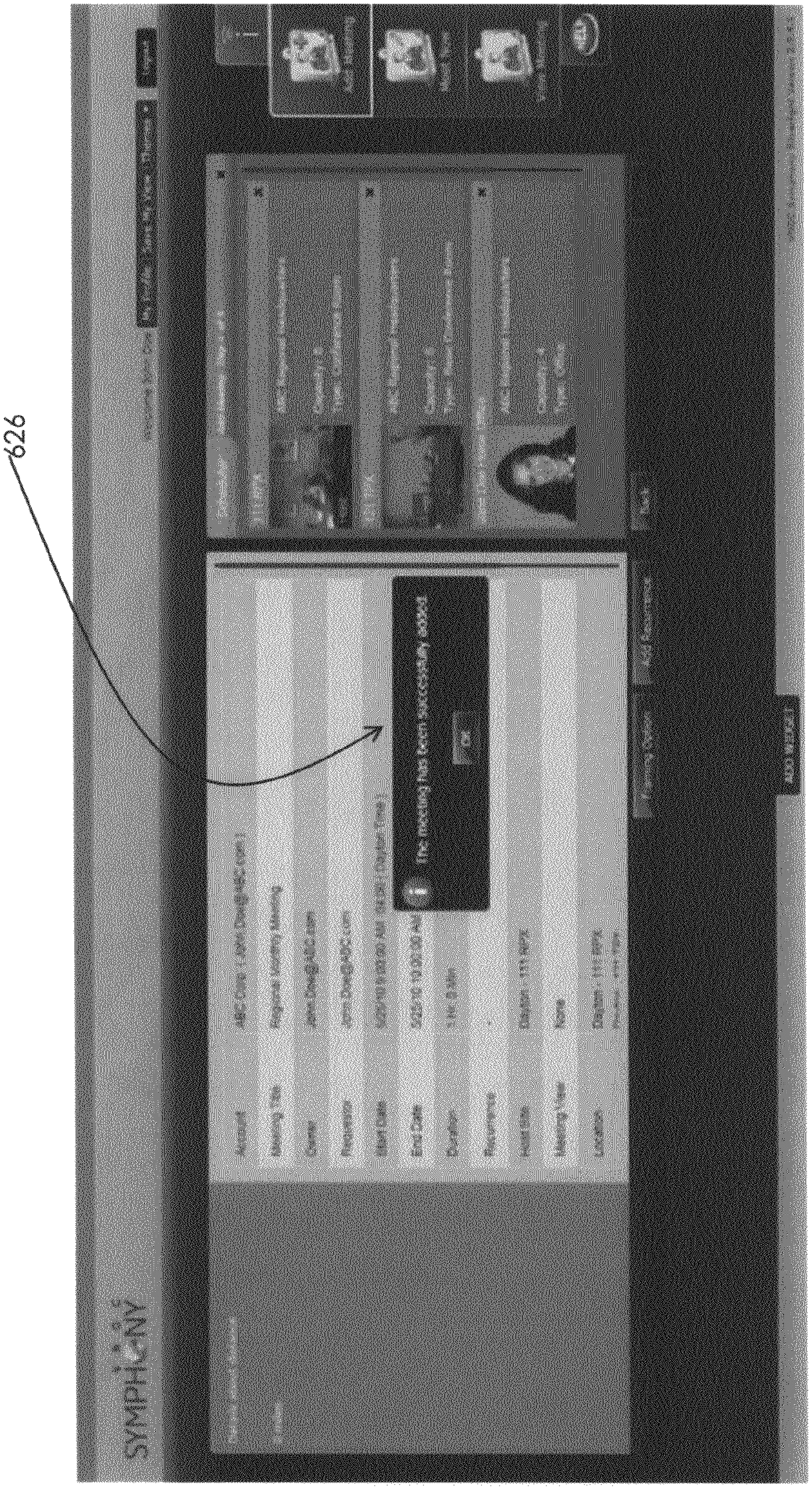
Figure 32L:
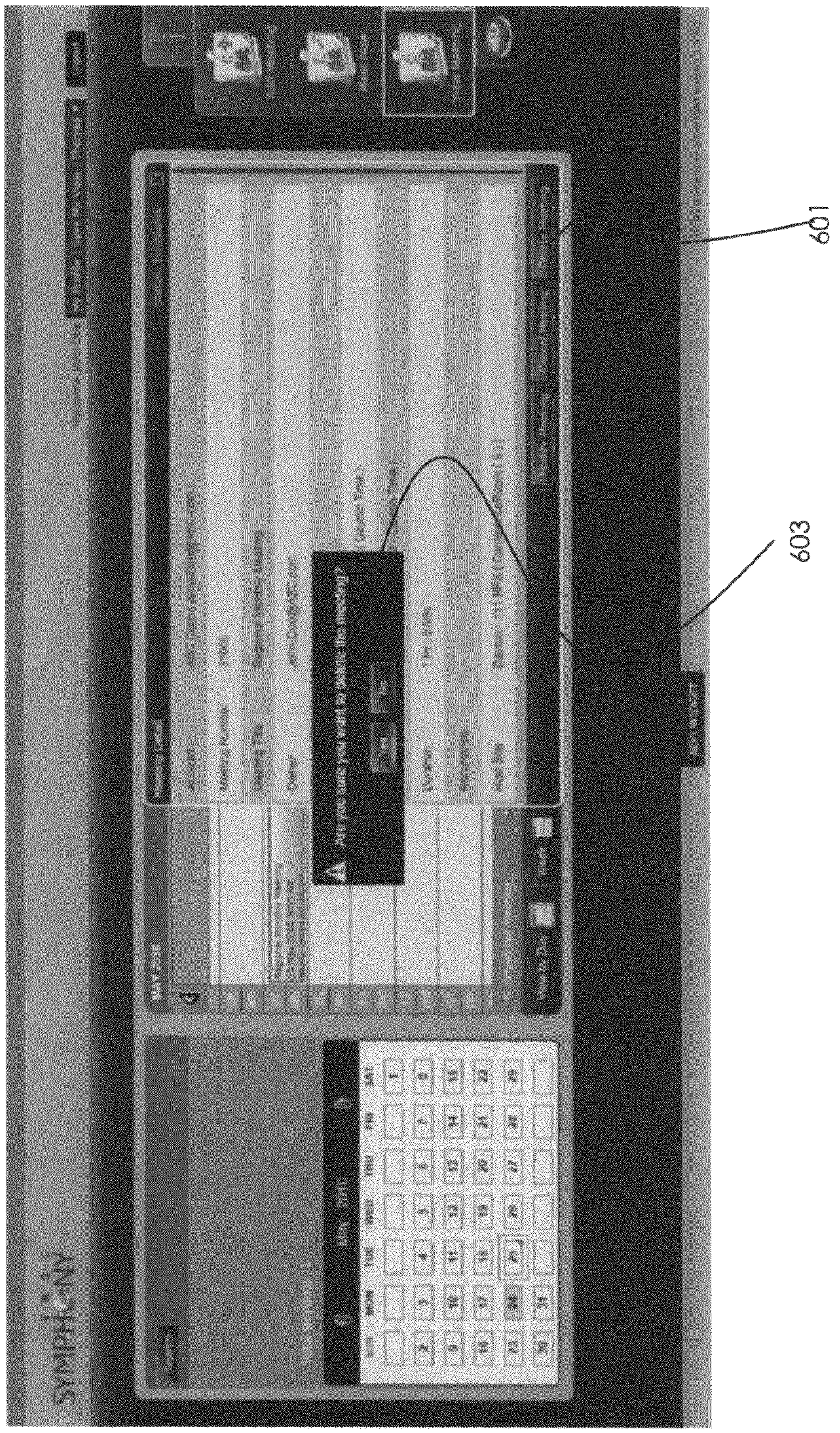
Figure 32M:
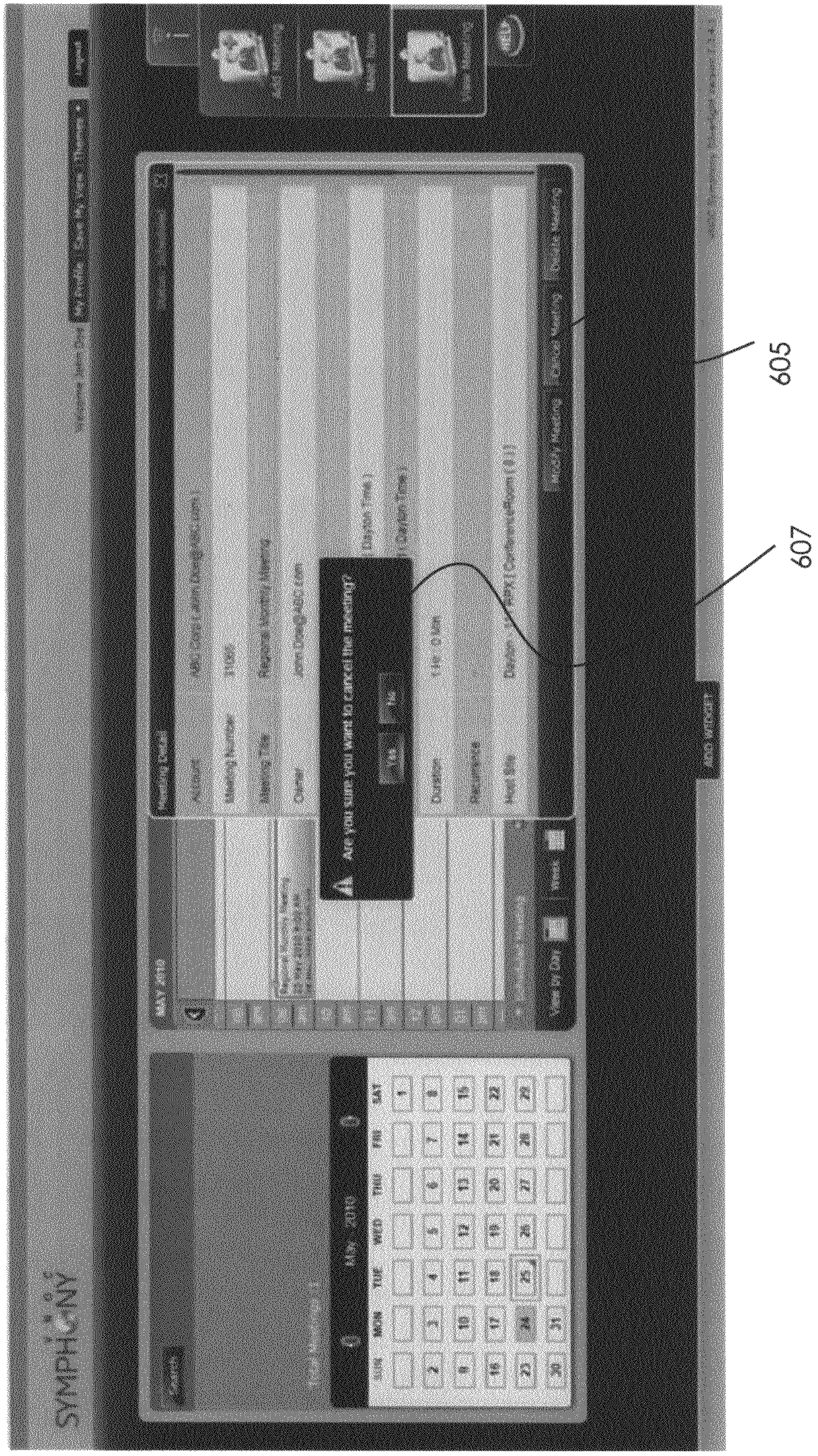

FIG. 32I illustrates the user interface 36 that is presented to the user that enables the user to add participants to the meeting by entering participant information in the field 612 whereupon the added participants column 614 of the screen will be populated with at least one or a plurality of participants depending on the information that was input into the field 610. If the user wishes to view the entire directory, the user can simply select the address book button 616.

Note that once the add participants column is populated, the participant can be dragged and dropped by from column 614 to column 618 so that a participant can be assigned to the terminals 14-28, desktops 32 and/or gatekeepers 34 or location that was previously scheduled. In the left hand column 620 in FIG. 32I, the user may complete the fields which will enable the user to identify a mode of a reminder notification to the participants a predetermined time prior to the meeting and notes that will be viewed by the participants when the notification is sent.

After the user selects the next button in FIG. 32I, the user is presented with the details about the meeting for their review. Note that the user reviews the information input at which point the user may actuate the back button 622 if the user wishes to make changes. If the meeting details are correct, then the user actuates the submit button 624 (FIG. 32J) whereupon the user is presented with a confirmation notification 626 that the meeting has successfully been saved to IDR 40.

It should be understood that after the completion of the conference start up process, the database poller 46*c* continuously polls the IDR 40 for runbook processes 58 and associated activities 60 that have to be executed. For example, the conference management runbook process 58*e* would be initiated and would be caused to monitor the ongoing conference, such as, for example, by pinging one or more of the terminals 14-28, desktops 32 and gatekeepers 34 in the illustration to make certain that they are in an "on" state. Also, the get-statistics activity 58*e*4 which is within the conference management runbook process 58 is executed and gathers statistics regarding the conference. As alluded to earlier herein, such statistics may include data packet loss, video jitter, audio packet loss and other statistics. If the statistics returned during this monitoring process fall outside predetermined statistical boundaries or thresholds, which are stored in the IDR 40, then the ACMCE 38 initiates the fault management runbook process 58*i* which was described earlier herein. This may include running at least one or a plurality of the remediation or escalation runbook processes 58*h* or 58*g* described earlier herein.

Thus, it should be understood that the system 10 facilitates and causes the automated management and control of the network(s) and the components of the system 10 and the terminals 14-28, desktops 32 and gatekeepers 34 so that an automated management of the network and conference can occur. This facilitates reducing or eliminating the need for human and technical interaction and intercession, which facilitates reducing human error and the management of the conference and the networks associated therewith, as well as increasing the number of terminals 14-28, desktops 32 and gatekeepers 34 that can be connected into the conference. In the illustration being described, therefore, it should be appreciated that the system 10 provides a dynamic and workflow driven automated management and control of the terminals 14-28, desktops 32 and gatekeepers 34 and the networks associated therewith.

At the end time of the conference, the database poller 46*c* (FIG. 5) will poll the IDR 40 and the conference tear down runbook process that is stored therein. When the conference end time is reached, the launch processer 46*b* causes the tear down runbook process 58*e*3 portion of the conference management runbook process 58*e* to execute and begin shutting down the conference in the manner described earlier herein.

After the conference is complete and in the manner described earlier herein, the user may obtain statistics and information regarding the conference using one of the entry points 66 and the conference log process 58*k*.

Advantageously, the ACMCS 12 uses the conference management process and the predetermined conference information in the IDR 40 to set up, start and ultimately disconnect any conferences that are scheduled within the ACMCS 12. There are sub-processes that comprise the conference management process. A first sub-process is a conference setup process whereby the ACMCE 38 establishes the connection between or among a plurality of terminals 14-28, desktops 32 and/or gatekeepers 34, as well as the establishment of data sharing between or among the plurality of the terminals 14-28, desktops 32 and/or gatekeepers 34 in a predetermined period of time (e.g. go 5 minutes, 15 minutes, 30 minutes, et cetera) prior to the requested conference date and start time. The ACMCE 38 uses web services 110 to access the predetermined conference information from the IDR 40, The ACMCE 38 process observer and launcher monitors stored data resident in the IDR 40 for the purpose of initiating the aforementioned process resident in the IDR 40. In the illustration being described, the OPL 46 runs as a Microsoft® Win32® service (reference hardware inserted above). Another sub-process is a conference tear down process that enables the ACMCE 38 to disconnect one or more of the plurality of terminals 14-28, desktops 32 and/or gatekeepers 34 from the active conference, relative to FIG. 18.

ILLUSTRATIVE EMBODIMENT

Returning to the illustration, the ACMCE 38 processes the information received from the user in the manner described herein relative to FIG. 5.

The activities mentioned earlier herein are categorized for each runbook process 58. Each runbook process 58 attribute may be used by the ACMCE 38 to determine a flow of the process or how the runbook process 58 will execute. For example, the scheduling conference runbook process 58*d* has a start time attribute and an end time attribute, among others. The ACMCE 38 receives the start time from the user and uses that information or data to determine, based upon the start time, whether or not the conference is ad hoc (i.e., meet now) or a conference that is scheduled for the future. Depending on the start time attribute data input by the user, the ACMCE 38 will cause the scheduling conference runbook process 58*d* to flow or execute a desired set of commands or instructions. Thus, the activities 60 input into by the user determine the flow or how the runbook process will run or execute. Stated another way, each runbook process is responsive to the information or data that is input by the user, and the runbook processes execute and flow in response to this information or data.

During the execution of at least one or a plurality of the runbook processes 58, the ACMCE 38 may call upon one or more of the enterprise systems 44 to execute or fulfill the various runbook processes 58 and their associated activities 60. For example, while a conference is in process, the user may also be accessing the system 10 to schedule another conference and/or another ongoing conference that is occurring during the same period of time or that touches the same period of time as the first conference could be occurring. It should be understood that one or more of the runbook processes 58 described herein could, therefore, be executed and conducted simultaneously during each or all of the conferences. It should be appreciated that the same or different plurality of runbook processes 58 could be executed concurrently.

The system 10 was created with the specific purpose and intent to automate and manage video network operation center services and resources. An unexpected result is that the system is also able to manage non-video rooms and resources and that governance can be enabled through runbook processes for both video and non-video services and resources.

Automation of the one or more of the runbook processes 58 is achieved by using the user customized processes stored in the IDR 40 that were customized by the user during the provisioning runbook process 58*a* as executed by the workflow engine. One component is IDR 40 and items in FIG. 5 shown as being part of IDR 40, OPL 46 and the components for the composer and the producer and the WF that is clearly disclosed With the components and how they interact and operate as described herein enables automating management, scheduling, monitoring, controlling and data collaboration of one or a plurality of conferences.

Advantageously, the system and method provides many advantages, some of which include:

1. Provides an automatic system and method to automate, manage and control a plurality of resources used during at least one or a plurality of conferences;
2. An automated system and method for automated managing and controlling provisioning of resources for an organization or enterprise system, with such resources being capable of being scheduled by the scheduling entity, which can be the same or different from a provisioning entity or user.
3. An automated system and method for automating at least one or a plurality of resources and runbook processes or programs that are required, necessary or desired to be run in order to automate, manage and control the scheduling of a plurality of resources for a conference.

4. The system and method provides a framework of interacting modules, with visibility to video endpoints and infrastructure; provides users with multiple ways (interfaces) to view information; tools to schedule simple and complex video meetings; and tools to automatically launch telepresence conferences; and/or multiple runbook process automaters, enterprise system modules; and/or
5. Which govern all runbook processes 58; and/or
6. Which govern multiple parameters are configurable to ensure departmental or global directives are followed, including but not limited to setup times; Startup messaging; Teardown messaging; In-progress meeting modification messaging; Custom messaging; Remedial functions; Escalation processes; Email and SMS notifications; Charge-backs; Conflict management; and/or many other processes that regulate a complex enterprise deployment.
7. A system and method for categorizing and storing key information regarding Video Conferences and regarding Video Endpoints, such as terminals 14-28, desktop 32 and gatekeepers 34, associated with one or more videoconference rooms
8. Provides an Application Programmable Interface for Adding key information model entities regarding Video Conferences, Video Endpoints, Infrastructure, Videoconference Rooms, Videoconference Users, Service Level Contracts, Custom user entry points or widgets
9. Provides an Application Programmable Interface for Modifying key information model entities regarding Video Conference, Video Endpoints, Infrastructure, Videoconference Rooms, Videoconference Users, Service Level Contracts, Custom user entry points or widgets.
10. Provides an Application Programmable Interface for Removing key information model entities regarding Video Conferences, Video Endpoints, Infrastructure, Videoconference Rooms, Videoconference Users, Service Level Contracts, Custom user entry points or widgets.
11. Provides an Application Programmable Interface for Finding key information model entities regarding Video Conferences, Video Endpoints, Infrastructure, Videoconference Rooms, Videoconference Users, Service Level Contracts, custom user entry points or widgets.
12. Provides an Application Programmable Interface for Adding one or more runbook processes 58 to a Service Level Contract, Modifying one or more runbook processes 58 for a Service Level Contract, Removing one or more runbook processes 58 to a Service Level Contract and/or Finding one or more runbook processes 58 to a Service Level Contract.
13. The system and method evaluates the availability for scheduling the use of two or multiple systems, without limit, of terminals 14-28, desktops 32 and gatekeepers 34, and
14. The terminals 14-28, desktops 32 and gatekeepers 34 can be located in the same or different time zones to schedule connections and the requestor's and the scheduling entity or user feedback information by the system and method shows all the video system availabilities and pre-existing reservations converted his own time zone regardless of the time zone location of the video systems, and/or
15. The system and method also permits or enables every participant located in any time zone their local reservation information based upon their local time zone, and/or
16. The system and method evaluates the types of terminals 14-28, desktops 32 and gatekeepers 34, such as a (codec) and associated networks utilized by all the proposed meeting's equipment to judge the video standards that will be necessary to accomplish the connection, and/or
17. The system and method evaluates all the variables in all of the above, and/or
    A) Then the interface 36 shows the reservation requestor or scheduling entity the availability of the terminals 14-28, desktops 32 and gatekeepers 34 requested factoring in the information above; and
    B) Either grants the requested reservation; or
    C) Gives through the interface 36 an alternate suggestion to change times, video systems or terminals 14-28, desktops 32 and gatekeepers 34 to accommodate the request; and
    D) The system and method allocates the cost of the meeting to the appropriate departments identified and/or associated with the requestor or scheduling entity's reservation request according to a table of cost distribution customized by the user utilizing the interface 36, and
18. The system and method provides users the ability to modify Customer, Organization and Account specific business processes dynamically; and/or dynamically add, modify or delete terminals 14-28, desktops 32 and gatekeepers 34 that are associated with a user, such as a Customer, an Organization or an Account.
19. The system and method implements the Cancel Reservation Activity, Delete Reservation Activity, Modify Reservation Activity, Create Reservation Activity, check Location Availability Activity, Perform Alternate Location Lookup Activity
20. The system and method automatically: connects Conference Participants; disconnects Conference Participants; checks terminals 14-28, desktops 32 and gatekeepers 34 (such as a codec) for status of active or inactive; Handle Issue, Modify Meeting Participants, Mute Conference Participants Microphone, Mute Conference Participants Speaker, Ping Endpoints, Pre Setup Conference Notification, Pre Start Conference Notification, Pre Tear Down Conference Notification, Post Setup Conference Notification, Post Start Conference Notification, Post Tear Down Conference Notification, Send Endpoint Message, Sleep Conference Participant, Request Statistics, Un-mute Conference Participant Microphone, Un-mute Conference Participant Speaker, Un-mute Conference Participant Video, Wait, Wake Conference Participant and/or Frame Conference Participants.
21. Provides a system and method with organization/customer specific New Conference Confirmation Messages, Modified Conference Confirmation Messages, Cancelled Conference Confirmation Messages, New Ticket Messages, Updated Ticket Messages, and/or Closed Ticket Messages
22. Provides a system and method with organization/customer specific Ticket Search Options, Ticket Categories, Ticket properties, Ticket Closure, and/or Ticket Modifications
23. The system and method evaluates external requests and module-initiated requests using a defined set of authentication and authorization functions; evaluates the availability of the circuit bandwidth needed to connect all the terminals 14-28, desktops 32 and gatekeepers 34 requested by the reservation request; gives administrators the ability to modify specific business processes and the ability to add, modify or delete conferences; automatically selects and enforces specific business processes for the VNOC reservation module (new reservation, edit reservation, cancel reservation, delete reservation); automatically selects and enforces specific business processes for the VNOC meeting management module (meeting setup, meeting messaging, meeting extensions, meeting billing, meeting tear down, real-time bridge availability); automatically selects and enforces specific business processes for the VNOC incident Tracking Module (Ticket Creation, Ticket Escalation, Ticket Closure, Ticket Linking, Ticket Messaging, Ticket Modification, Ticket Reassignment); automatically selects and enforces specific business processes or parameters for providing notification during the notification runbook process 58*f*; automatically selects and enforces specific business processes for the notification runbook process (Notification Policies, Notification Modes, Notification formatting), automatically selects and enforces specific business processes for the system and method (Circuit Availability, SNMP Polling, Autonomous Circuit Modifications, ICMP Polling); automatically selects and enforces specific business processes for the runbook process; automates the production of a telepresence conference via the orchestration of modules plugged into Module Slots; Supports a COTS (Commercial Off The Shelf) system as a single module; Supports custom-built systems as a single module; and/or autonomously controls flow of information and marshals external requests through defined business processes.

24. The system and method supports all web-service enabled video endpoint management; web-service enabled scheduling; web-service enabled monitoring; web-service enabled issue tracking systems; execution time system extensibility through control interfaces; and/or provides a significant innovation through which the virtual network operations and control of conferences and resources used during conferences becomes fully automated.
25. The system and method plots live conferences on a geo-spatial interactive map; and/or
26. The system and method all point-to-point video connections in geo-spatial graphical presentation; and/or
27. The system and method shows all multipoint meetings in geo-spatial graphical presentation; and/or
28. The system and method displays multiple video systems interconnected on a campus network in close proximity; and/or
29. The system and method displays the operational status of all profiled video endpoints and infrastructure in colored presentation; and/or
30. The system and method, provides the user with data that represents travel avoidance and return on investment information for their video endpoints and infrastructure; and/or
31. The system and method provides calculations on carbon footprints for offsets.
32. The system and method allows users to see photographs of each meeting room; and/or
33. Add participants to each site or as a general meeting participant; and/or
34. Choose MCU framing; and/or
35. View time zones of each location; and/or
36. Modify in-progress meetings; and/or
37. Multiple other features.
38. The system and method lets users quickly create a reservation with one step; and/or
39. Lists the last ten meetings and ten sites in quick start selections.
40. The system and method enables users to request immediate video services for sites selected.
41. The system and method allows users to view real-time information of remedial action in-progress; and/or
42. To report issues for assistance or corrective actions; and/or
43. Utilize automated ticket opening system based upon device threshold monitoring; and/or
44. Device interrogation.

These and other objects and advantages of the invention will be apparent from the following description, the accompanying drawings and the appended claims:

APPENDIX A

The following is a representative schema for the user; the data and the information required by representative runbook processes 58 in the IDR 40. The data 62, activities 60 and objects 74 that are organized in the IDR 40 are driven by the run book processes 58 mentioned earlier.

VNOC Product Type

```
<?xml version="1.0" encoding="UTF-8"?>
<xs:schema xmlns:xs="http://www.w3.org/2001/XMLSchema" elementFormDefault="qualified"
    attributeFormDefault="unqualified">
<xs:complexType name="T_ProductDefinition">
  <xs:sequence>
    <xs:element name="VNOCProduct">
      <xs:annotation/>
      <xs:complexType>
        <xs:sequence>
          <xs:element name="Manufactuer" type="xs:string"/>
          <xs:element name="SnmpRules" type="xs:anyURI" nillable="true" />
          <xs:element name="Name" type="xs:string"/>
          <xs:element name="Description" type="xs:string"/>
          <xs:element name="Category">
            <xs:simpleType>
              <xs:restriction base="xs:string">
                <xs:enumeration value="Room"/>
                <xs:enumeration value="Endpoint"/>
                <xs:enumeration value="Recording"/>
                <xs:enumeration value="Auxilary Equipment"/>
                <xs:enumeration value="MCU"/>
```

-continued

```
            <xs:enumeration value="Infrastructure"/>
          </xs:restriction>
        </xs:simpleType>
      </xs:element>
      <xs:element name="ConnectionModes">
        <xs:complexType>
          <xs:sequence>
            <xs:element name="Mode" type="T_ConnectionMode" maxOccurs="6" minOccurs="1"/>
          </xs:sequence>
        </xs:complexType>
      </xs:element>
    </xs:sequence>
  </xs:complexType>
 </xs:element>
 </xs:sequence>
</xs:complexType>
 <xs:simpleType name="T_ConnectionMode">
  <xs:restriction base="xs:string">
   <xs:enumeration value="IP"/>
   <xs:enumeration value="H.323"/>
   <xs:enumeration value="H.321"/>
   <xs:enumeration value="E.164"/>
   <xs:enumeration value="ISDN"/>
   <xs:enumeration value="SIP"/>
  </xs:restriction>
 </xs:simpleType>
</xs:schema>
```

VNOC Conference

```
<?xml version="1.0" encoding="UTF-8"?>
<xs:schema xmlns:xs="http://www.w3.org/2001/XMLSchema" elementFormDefault="qualified"
        attributeFormDefault="unqualified">
 <xs:include schemaLocation="VNOCOrganization.xsd" id="vnoc_organization"/>
  <xs:element name="VNOC_Conference">
   <xs:annotation>
    <xs:documentation>Comment describing your root element</xs:documentation>
   </xs:annotation>
   <xs:complexType>
    <xs:sequence>
     <xs:element ref="Recurrence"/>
     <xs:element ref="Schedule"/>
     <xs:element ref="Type"/>
     <xs:element ref="Requestor"/>
     <xs:element ref="Framing"/>
     <xs:element ref="PictureMode"/>
     <xs:element ref="ChargebackCode"/>
     <xs:element ref="Account"/>
     <xs:element ref="Owner"/>
     <xs:element ref="ManagedSpaces"/>
     <xs:element ref="UnmanagedSpaces"/>
     <xs:element ref="UnprofiledParticipants" />
     <xs:element ref="Private"/>
     <xs:element ref="Status"/>
     <xs:element name="GreenITData" type="xs:anyType" nillable="true"/>
     <xs:element name="AdditionalData" type="xs:anyType" nillable="true"/>
    </xs:sequence>
   </xs:complexType>
  </xs:element>
  <xs:element name="Recurrence">
   <xs:complexType>
    <xs:sequence>
     <xs:element name="RecurrencePattern">
      <xs:complexType>
       <xs:sequence>
        <xs:element name="Frequency">
         <xs:complexType>
          <xs:choice>
           <xs:element name="Daily" type="T_RecurrenceRepeat"/>
           <xs:element name="Weekly" type="T_RecurrenceRepeatCustom"/>
           <xs:element name="Monthly" type="T_RecurrenceRepeatCustom"/>
           <xs:element name="Yearly" type="T_RecurrenceRepeatCustom"/>
          </xs:choice>
         </xs:complexType>
        </xs:element>
       </xs:sequence>
      </xs:complexType>
     </xs:element>
    </xs:sequence>
   </xs:complexType>
  </xs:element>
```

-continued

```
<xs:element name=“Schedule”>
  <xs:complexType>
    <xs:sequence>
      <xs:element name=“UtcStart” type=“xs:dateTime”/>
      <xs:element name=“UtcEnd” type=“xs:dateTime”/>
      <xs:element name=“UtcSetup” type=“xs:dateTime”/>
      <xs:element name=“UtcTeardown” type=“xs:dateTime” minOccurs=“0”/>
      <xs:element name=“AllowOvertime” type=“xs:boolean”/>
    </xs:sequence>
  </xs:complexType>
</xs:element>
<xs:element name=“Type”>
  <xs:simpleType>
    <xs:restriction base=“xs:string”>
      <xs:enumeration value=“Maintenance”/>
      <xs:enumeration value=“Room Only”/>
      <xs:enumeration value=“Point to Point”/>
      <xs:enumeration value=“Multipoint”/>
      <xs:enumeration value=“Certification”/>
      <xs:enumeration value=“Network Only”/>
    </xs:restriction>
  </xs:simpleType>
</xs:element>
<xs:element name=“Requestor” type=“T_Email”/>
<xs:element name=“Framing” nillable=“true”>
  <xs:annotation>
    <xs:documentation>Reserved For Future Use</xs:documentation>
  </xs:annotation>
</xs:element>
<xs:element name=“PictureMode”>
  <xs:simpleType>
    <xs:restriction base=“xs:string”>
      <xs:enumeration value=“Continuous Presence”/>
      <xs:enumeration value=“Voice Switched”/>
    </xs:restriction>
  </xs:simpleType>
</xs:element>
<xs:element name=“ChargebackCode” type=“xs:string”/>
<xs:element name=“Account” type=“T_VNOC_Account”/>
<xs:element name=“Owner” type=“T_Email”/>
<xs:element name=“UnProfiledParticipants”>
  <xs:complexType>
    <xs:sequence>
      <xs:element name=“ParticipantEmailAddress” type=“T_Email” nillable=“false”/>
      <xs:element name=“Type”>
        <xs:complexType>
          <xs:choice>
            <xs:element name=“DialIn” type=“T_ParticipantType”/>
            <xs:element name=“DialOut”>
              <xs:complexType>
                <xs:simpleContent>
                  <xs:extension base=“T_ParticipantType”>
                    <xs:attribute name=“dial-out-information” type=“xs:string”/>
                  </xs:extension>
                </xs:simpleContent>
              </xs:complexType>
            </xs:element>
          </xs:choice>
        </xs:complexType>
      </xs:element>
    </xs:sequence>
  </xs:complexType>
</xs:element>
<xs:element name=“ManagedSpaces”>
  <xs:complexType>
    <xs:sequence>
      <xs:element name=“Space” type=“T_ConferenceSpace” maxOccurs=“unbounded”/>
    </xs:sequence>
  </xs:complexType>
</xs:element>
<xs:element name=“UnmanagedSpaces” nillable=“true”>
  <xs:complexType>
    <xs:sequence>
      <xs:element name=“Space” type=“T_ConferenceSpace” minOccurs=“0” maxOccurs=“unbounded”/>
    </xs:sequence>
  </xs:complexType>
</xs:element>
<xs:element name=“Private” type=“xs:boolean”/>
<xs:element name=“Status”>
  <xs:simpleType>
```

-continued

```
      <xs:restriction base="xs:string">
        <xs:enumeration value="Cancelled"/>
        <xs:enumeration value="Scheduled"/>
        <xs:enumeration value="Completed"/>
        <xs:enumeration value="Active"/>
        <xs:enumeration value="Deleted"/>
      </xs:restriction>
    </xs:simpleType>
  </xs:element>
  <xs:complexType name="T_ConferenceSpace">
    <xs:sequence>
      <xs:element ref="VNOC_Space"/>
      <xs:element name="ConnectionSpeed" type="xs:string"/>
      <xs:element name="Participants" type="xs:anyType"/>
      <xs:element name="GreenITData" type="xs:anyType" nillable="true"/>
      <xs:element name="AdditionalData" type="xs:anyType" nillable="true"/>
    </xs:sequence>
  </xs:complexType>
  <xs:complexType name="T_RecurrenceRepeat">
    <xs:sequence>
      <xs:element name="Start" type="xs:dateTime"/>
      <xs:element name="EndAfter">
        <xs:complexType>
          <xs:choice>
            <xs:element name="SpecificDate" type="xs:dateTime"/>
            <xs:element name="Occurrences" type="xs:int"/>
          </xs:choice>
        </xs:complexType>
      </xs:element>
    </xs:sequence>
  </xs:complexType>
  <xs:complexType name="T_RecurrenceRepeatCustom">
    <xs:sequence>
      <xs:element name="Repeat" type="T_RecurrenceRepeat"/>
      <xs:element name="RepeatEvery">
        <xs:complexType>
          <xs:choice>
            <xs:element name="Week">
              <xs:complexType>
                <xs:sequence>
                  <xs:element name="On" type="T_WeekDay" maxOccurs="7"/>
                </xs:sequence>
              </xs:complexType>
            </xs:element>
            <xs:element name="Month">
              <xs:complexType>
                <xs:choice>
                  <xs:element name="Each" maxOccurs="31">
                  <xs:simpleType>
                    <xs:restriction base="xs:int">
                      <xs:maxInclusive value="31"/>
                    </xs:restriction>
                  </xs:simpleType>
                </xs:element>
                <xs:element name="OnThe" type="T_OnTheRestriction"/>
              </xs:choice>
            </xs:complexType>
          </xs:element>
          <xs:element name="Yearly">
            <xs:complexType>
              <xs:choice>
                <xs:element name="In" maxOccurs="12">
                  <xs:simpleType>
                    <xs:restriction base="xs:string">
                      <xs:enumeration value="January"/>
                      <xs:enumeration value="February"/>
                      <xs:enumeration value="March"/>
                      <xs:enumeration value="April"/>
                      <xs:enumeration value="May"/>
                      <xs:enumeration value="June"/>
                      <xs:enumeration value="July"/>
                      <xs:enumeration value="August"/>
                      <xs:enumeration value="September"/>
                      <xs:enumeration value="October"/>
                      <xs:enumeration value="November"/>
                      <xs:enumeration value="December"/>
                    </xs:restriction>
                  </xs:simpleType>
                </xs:element>
                <xs:element name="OnThe" type="T_OnTheRestriction"/>
```

-continued

```
        </xs:choice>
       </xs:complexType>
      </xs:element>
     </xs:choice>
    </xs:complexType>
   </xs:element>
  </xs:sequence>
 </xs:complexType>
 <xs:complexType name="T_OnTheRestriction">
  <xs:sequence>
   <xs:element name="OnThe">
    <xs:simpleType>
     <xs:restriction base="xs:string">
      <xs:enumeration value="First"/>
      <xs:enumeration value="Second"/>
      <xs:enumeration value="Third"/>
      <xs:enumeration value="Fourth"/>
      <xs:enumeration value="Last"/>
     </xs:restriction>
    </xs:simpleType>
   </xs:element>
   <xs:element name="WeekDay" type="T_WeekDay"/>
  </xs:sequence>
 </xs:complexType>
 <xs:simpleType name="T_WeekDay">
  <xs:restriction base="xs:string">
   <xs:enumeration value="Sunday"/>
   <xs:enumeration value="Monday"/>
   <xs:enumeration value="Tuesday"/>
   <xs:enumeration value="Wednesday"/>
   <xs:enumeration value="Thursday"/>
   <xs:enumeration value="Friday"/>
   <xs:enumeration value="Saturday"/>
  </xs:restriction>
 </xs:simpleType>
 <xs:simpleType name="T_ParticipantType">
  <xs:restriction base="xs:string">
   <xs:enumeration value="IP Video"/>
   <xs:enumeration value="IP Telephone"/>
   <xs:enumeration value="ISDN Video"/>
   <xs:enumeration value="Telephone"/>
  </xs:restriction>
 </xs:simpleType>
</xs:schema>
```

VNOC Organization

```
<?xml version="1.0" encoding="UTF-8"?>
<xs:schema xmlns:xs="http://www.w3.org/2001/XMLSchema" elementFormDefault="qualified"
        attributeFormDefault="unqualified">
 <xs:include schemaLocation="VNOCOrganizationalOffice.xsd" id="vnoc_organizational_office"/>
 <xs:include schemaLocation="contract.xsd" id="vnoc_bill_plan"/>
 <xs:element name="VNOC_Organization">
  <xs:annotation>
   <xs:documentation>Comment describing your root element</xs:documentation>
  </xs:annotation>
  <xs:complexType>
   <xs:sequence>
    <xs:element name="OrganizationalLocations">
     <xs:complexType>
      <xs:sequence>
       <xs:element ref="VNOC_Organizational_Office" maxOccurs="unbounded"/>
      </xs:sequence>
     </xs:complexType>
    </xs:element>
    <xs:element name="Accounts" nillable="true">
     <xs:complexType>
      <xs:sequence>
            <xs:element name="Account" type="T_VNOC_Account" nillable="true" minOccurs="0"
                  maxOccurs="unbounded" />
      </xs:sequence>
     </xs:complexType>
    </xs:element>
   </xs:sequence>
  </xs:complexType>
 </xs:element>
 <xs:complexType name="T_VNOC_Account">
  <xs:sequence>
   <xs:element name="AccountId" nillable="false" minOccurs="1" maxOccurs="1" type="xs:string"/>
   <xs:element name="contract" nillable="true">
    <xs:complexType>
```

-continued

```
      <xs:sequence>
        <xs:element ref="VNOC_Bill_Plan" minOccurs="0"/>
        <xs:element name="AuthorizedUsers">
          <xs:complexType>
            <xs:sequence>
              <xs:element name="User" type="T_User" maxOccurs="unbounded"/>
            </xs:sequence>
          </xs:complexType>
        </xs:element>
      </xs:sequence>
    </xs:complexType>
  </xs:element>
 </xs:sequence>
</xs:complexType>
<xs:complexType name="T_User">
 <xs:sequence>
  <xs:element name="FirstName" type="xs:string"/>
  <xs:element name="LastName" type="xs:string"/>
  <xs:element name="VnocUserName" type="xs:string"/>
  <xs:element name="PrimaryEmailAddress" type="T_Email"/>
  <xs:element name="SecondaryEmailAddress" type="T_Email" minOccurs="0"/>
  <xs:element name="VnocOrganizationalOfficeId" type="xs:string"/>
  <xs:element name="VnocRole" type="xs:string"/>
  <xs:element name="VnocPassword" type="xs:string"/>
  <xs:element name="VnocSecretQuestion" type="xs:string"/>
  <xs:element name="VnocEmailSettings" type="xs:string"/>
 </xs:sequence>
</xs:complexType>
<xs:simpleType name="T_Email">
 <xs:restriction base="xs:string">
  <xs:pattern value=".+@.+\..+" />
 </xs:restriction>
</xs:simpleType>
</xs:schema>
```

VNOC Organization Office

```
<?xml version="1.0" encoding="UTF-8"?>
<xs:schema xmlns:xs="http://www.w3.org/2001/XMLSchema" elementFormDefault="qualified"
    attributeFormDefault="unqualified">
 <xs:include schemaLocation="VNOCSpace.xsd" id="vnoc_space"/>
 <xs:element name="VNOC_Organizational_Office">
  <xs:annotation>
   <xs:documentation>Comment describing your root element</xs:documentation>
  </xs:annotation>
  <xs:complexType>
   <xs:sequence>
    <xs:element name="OrganizationalOfficeId" type="xs:string" nillable="false" minOccurs="1" maxOc-
curs="1"/>
    <xs:element name="TimeZone" type="T_TimeZone" nillable="false"/>
    <xs:element name="Address" type="T_Address" nillable="false"/>
    <xs:element name="InteriorSpaces" nillable="true">
     <xs:complexType>
      <xs:sequence>
       <xs:element ref="VNOC_Space" minOccurs="0" maxOccurs="unbounded"/>
      </xs:sequence>
     </xs:complexType>
    </xs:element>
    <xs:element name="Type" type="T_OfficeType" nillable="false">
     <xs:annotation>
      <xs:documentation>Enumerated Value Options are:   [Home Office, Organization Headquarters, Regional
       Office, Regional Headquarters, Retail Office, PangeAir Location, Other]</xs:documentation>
     </xs:annotation>
    </xs:element>
    <xs:element name="NetworkConnections" type="xs:string" nillable="true"/>
   </xs:sequence>
  </xs:complexType>
 </xs:element>
 <xs:complexType name="T_TimeZone">
  <xs:sequence>
   <xs:element name="Name" type="xs:string" nillable="false"/>
   <xs:element name="StartTimeDTS" type="xs:string" nillable="false"/>
   <xs:element name="EndTimeDTS" type="xs:string" nillable="false"/>
   <xs:element name="GMTOffset" type="xs:string" nillable="false"/>
  </xs:sequence>
 </xs:complexType>
 <xs:complexType name="T_Address">
  <xs:sequence>
   <xs:element name="Name" type="xs:string"/>
   <xs:element name="Street" type="xs:string"/>
   <xs:element name="Street2" type="xs:string"/>
```

-continued

```
      <xs:element name="City" type="xs:string"/>
      <xs:element name="State" type="xs:string"/>
      <xs:element name="Country" type="xs:string"/>
      <xs:element name="PostalCode" type="xs:string"/>
    </xs:sequence>
  </xs:complexType>
  <xs:simpleType name="T_OfficeType">
    <xs:restriction base="xs:string">
      <xs:enumeration value="Home Office"/>
      <xs:enumeration value="Organization Headquarters">
      <xs:enumeration value="Regional Office"/>
      <xs:enumeration value="Regional Headquarters"/>
      <xs:enumeration value="Retail Office"/>
      <xs:enumeration value="PangeAir Location"/>
      <xs:enumeration value="Other"/>
    </xs:restriction>
  </xs:simpleType>
</xs:schema>
```

While the system, apparatus and method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A system for managing at least one audio and video conference among a plurality of resources, said system comprising:

an information and data repository for storing virtual network operation information for establishing and managing the said at least one audio and video conference;

a processing engine adapted to access and use said virtual network operation information;

wherein said virtual network operation information comprises:

at least one runbook process for performing at least one activity associated with said at least one audio and video conference;

video network operations center data;

user data inputted by a user into the information and data repository;

wherein said processing engine executes said at least one runbook process to perform said at least one activity using at least one of said video network operations center data or said user data in order to schedule, manage and control said at least one audio and video conference;

wherein said processing engine provisions an outlet that is adapted to and supports at least one enterprise system associated with said user if said processing engine determines that no outlet exists for said user's at least one enterprise system, and after such provisioning, said at least one enterprise system is added to said information and data repository, thereby enabling said user's at least one enterprise system to be ready for use within the system, said outlet facilitating communication between said at least one enterprise system and said processing engine.

2. The system as recited in claim 1 wherein said at least one runbook process comprises at least one of the following:

a provisioning runbook process;

a service runbook process;

a supported terminals, software versions and enterprise systems runbook process;

a scheduling runbook process;

a notification runbook process;

a conference management runbook process;

an escalation runbook process;

a remediation runbook process;

a fault management runbook process;

a daily site sweep runbook process;

a conference log runbook process;

a quality control runbook process;

a root cause analysis (RCA) template runbook process; or a reporting deliverables runbook process.

3. The system as recited in claim 2 wherein said provisioning runbook process comprises a plurality of predetermined usage parameters adapted to a user, said plurality of predetermined usage parameters being input by said user during and in response to said provisioning runbook process.

4. The system as recited in claim 3 wherein said provisioning runbook process is adapted to provision a plurality of terminals, desktops or gatekeepers for the user to permit a scheduling entity to schedule said plurality of terminals, desktops or gatekeepers for the conference.

5. The system as recited in claim 2 wherein said provisioning runbook process is adapted to permit provisioning of at least one use parameter for governing the user's use of the system.

6. The system as recited in claim 5 wherein the user comprises at least one scheduler, said at least one use parameter comprising at least one of a contract parameter or a user rule, each of which are adapted to define at least one parameter for governing said at least one scheduler's use and/or access to the system.

7. The system as recited in claim 1 wherein said system comprises a plurality of runbook processes, each of said plurality of runbook processes comprising at least one activity associated with said at least one audio and video conference.

8. The system as recited in claim 7 wherein said processing engine executes said plurality of runbook processes substantially simultaneously.

9. The system as recited in claim 7 wherein said at least one runbook process comprises at least one of the following:

a provisioning runbook process;

a service runbook process;

a supported terminals, software versions and enterprise systems runbook process;

a scheduling runbook process;

a notification runbook process a conference management runbook process;

an escalation runbook process;

a remediation runbook process;

a fault management runbook process;

a daily site sweep runbook process;

a conference log runbook process;

a quality control runbook process;

a root cause analysis (RCA) template runbook process; or a reporting deliverables runbook process.

10. The system as recited in claim 7 wherein said user is a scheduling entity, said plurality of resources comprises at least one terminal, desktop or gatekeeper, said scheduling runbook process evaluates an availability of at said least one of terminal, desktop or gatekeeper requested to be scheduled by said scheduling entity and generates a notification of such availability that is displayed to said scheduling entity in response thereto.

11. The system as recited in claim 10 wherein said availability of said at least one terminal, desktop or gatekeeper is displayed to said scheduling entity in the scheduling entity's current time zone regardless of a time zone associated with a location of said at least one terminal, desktop or gatekeeper.

12. The system as recited in claim 10 wherein at least one of said at least one terminal, desktop or gatekeeper comprises an associated picture stored in the information and data repository to facilitate selection by said scheduling entity of the said at least one terminal, desktop or gatekeeper during said scheduling runbook process.

13. The system as recited in claim 10 wherein said scheduling runbook process generates a notification to said scheduling entity of an alternate suggested one of said at least one terminal, desktop or gatekeeper if the requested one of said at least one terminal, desktop or gatekeeper is not available for scheduling by said scheduling entity.

14. The system as recited in claim 10 wherein said scheduling runbook process comprises a cost allocator for automatically allocating a cost associated with said conference to at least one entity.

15. The system as recited in claim 10 wherein said scheduling entity and the user are not the same.

16. The system as recited in claim 10 wherein said scheduling entity uses at least one user entry point during said scheduling runbook process, said at least one user entry point comprises at least one of a web portal, a touch screen computer/mobile interface, or a calendar portal.

17. The system as recited in claim 10 wherein said scheduling runbook process comprises an impromptu scheduler for enabling said scheduling entity to schedule a real-time, impromptu conference.

18. The system as recited in claim 10 wherein said scheduling runbook process comprises an express scheduler for enabling said scheduling entity to schedule a conference in a using a single scheduling interface.

19. A system for managing at least one audio and video conference among a plurality of resources, said system comprising:

an information and data repository for storing virtual network operation information for establishing and managing the said at least one audio and video conference; and a processing engine adapted to access and use said virtual network operation information;

wherein said virtual network operation information comprises:

at least one runbook process for performing at least one activity associated with said at least one audio and video conference;

video network operations center data;

user data inputted by a user into the information and data repository;

wherein said processing engine executes said at least one runbook process to perform said at least one activity using at least one of said video network operations center data or said user data in order to schedule, manage and control said at least one audio and video conference;

wherein said system comprises a plurality of runbook processes, each of said plurality of runbook processes comprising at least one activity associated with said at least one audio and video conference;

wherein said system comprises or is adapted to generate a geo-spatial graphical display of a plurality of conferences managed by said system, wherein said processing engine provisions an outlet that is adapted to and supports at least one enterprise system associated with said user if said processing engine determines that no outlet exists for said user's at least one enterprise system, and Such provisioning, said at least one enterprise system is added to said information and data repository, thereby enabling said user's at least one enterprise system to be ready to use within the system, said outlet facilitating communication between said at least one enterprise system and said processing engine.

20. A system for managing at least one audio and video conference among a plurality of resources, said system comprising:

an information and data repository for storing virtual network operation information for establishing and managing the said at least one audio and video conference; and a processing engine adapted to access and use said virtual network operation information;

wherein said virtual network operation information comprises:

at least one runbook process for performing at least one activity associated with said at least one audio and video conference;

video network operations center data;

user data inputted by a user into the information and data repository;

wherein said processing engine executes said at least one runbook process to perform said at least one activity using at least one of said video network operations center data or said user data in order to schedule, manage and control said at least one audio and video conference;

wherein said system comprises a plurality of runbook processes, each of said plurality of runbook processes comprising at least one activity associated with said at least one audio and video conference;

wherein said system comprises or is adapted to generate a geo-spatial graphical display of a plurality of conferences managed by said system;

wherein said plurality of resources comprises at least one terminal, desktop or gatekeeper, said system further comprising a fault management process for generating a fault notification if a fault associated with said at least one terminal, desktop or gatekeeper occurs either before or during said conference;

wherein said processing engine provisions an outlet that is adapted to and supports at least one enterprise system associated with said user if said processing engine determines that no outlet exists for said user's at least one enterprise system, and Such provisioning, said at least one enterprise system is added to said information and data repository, thereby enabling said user's at least one enterprise system to be ready to use within the system, said outlet facilitating communication between said at least one enterprise system and said processing engine.

21. The system as recited in claim 1, wherein said video network operations center data comprises information about said plurality of resources such as network connection information, internet protocol address information, bandwidth capability, contract, or physical address.

22. The system as recited in claim 1 wherein said processing engine comprises:

a process composer for receiving said at least one activity and for composing said at least one runbook process in response to a start command to provide at least one composed runbook process;

said process composer using said at least one activity to compose said at least one runbook process.

23. The system as recited in claim 22 wherein said processing engine further receives at least one of said video network operations center data or user data in response to said start command.

24. The system as recited in claim 22 wherein said system further comprises at least one observer/poller/launcher coupled to said process composer and said information and data repository for receiving a start command from said process composer and for launching said at least one runbook process in response thereto.

25. The system as recited in claim 22 wherein said processing engine comprises:

a process conductor for conducting said at least one composed runbook process;

said process conductor conducting said at least one composed runbook process using at least one of said video network operations center data or said user data.

26. The system as recited in claim 22 wherein said process composer enables a user to dynamically modify and or change said at least one activity associated with the runbook process being composed.

27. The system as recited in claim 26, wherein said process composer enables automatic performance of said at least one activity using at least one of said video network operations center data or said user data in order to schedule, manage and control said at least one audio and video conference among a plurality of resources specific to the user's environment.

28. The system as recited in claim 1 wherein said processing engine comprises:

a process conductor for executing said at least one runbook process;

said process conductor conducting said at least one runbook process using said video network operations center data and user data.

29. The system as recited in claim 1 wherein said system further comprises at least one observer/poller/launcher for receiving a start command from said processing engine and for launching said at least one runbook process in response thereto.

30. The system as recited in claim 29 wherein said at least one runbook process comprises a conference management runbook process, said at least one observer/poller/launcher automatically launches said conference management runbook process in response to said start command and launches said at least one runbook process in response thereto.

31. The system as recited in claim 1 wherein said processing engine is adapted to receive at least one of said video network operations center data or user data from at least one user entry point.

32. The system as recited in claim 31 wherein said at least one user entry point comprises at least one of a web portal, a touch screen computer/mobile interface, or a calendar portal.

33. The system as recited in claim 1 wherein said processing engine is adapted to receive at least one of said video network operations center data or user data from a plurality of user entry points.

34. The system as recited in claim 33 wherein said plurality of user entry points comprises at plurality of a web portal, a touch screen computer/mobile interface, or a calendar portal.

35. The system as recited in claim 1 wherein said processing engine is adapted to use or be used by at least one enterprise system.

36. The system as recited in claim 35 wherein said at least one enterprise system comprises a plurality of enterprise systems.

37. The system as recited in claim 36 wherein said plurality of enterprise systems are different.

38. The system as recited in claim 36 wherein said system further comprises:

a plurality of outlets adapted to said plurality of enterprise systems, respectively, to facilitate communication between said processing engine and said plurality of enterprise systems.

39. The system as recited in claim 38 wherein said plurality of outlets comprise a plurality of a ping command, a scheduler, a statistic collector, a third-party integrator or an open session command.

40. The system as recited in claim 1 wherein said system comprises a plurality of runbook processes, each of said plurality of runbook processes comprising at least one activity associated with said at least one audio and video conference, said processing engine further comprising:

a process composer for receiving said at least one activity and for composing said at least one runbook process in response to a start command to provide at least one composed runbook process;

a process conductor for executing said at least one runbook process;

said process conductor conducting said at least one runbook process using at least one of said video network operations center data or said user data.

41. The system as recited in claim 40 wherein said processing engine is adapted to receive at least one of said video network operations center data or user data from a plurality of user entry points, said plurality of user entry points comprising a web portal, a touch screen computer/mobile interface, or a calendar portal.

42. The system as recited in claim 40 wherein said processing engine is adapted to communicate with a plurality of enterprise systems that are not the same.

43. The system as recited in claim 42 wherein said system further comprises:

a plurality of outlets adapted to said plurality of enterprise systems, respectively, to facilitate communication between said processing engine and said plurality of enterprise systems.

44. The system as recited in claim 43 wherein said plurality of outlets comprise a plurality of a ping command, a scheduler, a statistic collector, a third-party integrator or an open session command.

45. The system as recited in claim 1 wherein said plurality of resources comprise at least one terminal, desktop or gatekeeper.

46. A system for managing at least one audio and video conference among a plurality of resources, said system comprising:

an information and data repository for storing virtual network operation information for establishing and managing the said at least one audio and video conference; and a processing engine adapted to access and use said virtual network operation information;

wherein said virtual network operation information comprises:

at least one runbook process for performing at least one activity associated with said at least one audio and video conference;

video network operations center data;

user data inputted by a user into the information and data repository;

wherein said processing engine executes said at least one runbook process to perform said at least one activity using at least one of said video network operations center data or said user data in order to schedule, manage and control said at least one audio and video conference;

wherein said processing engine further comprising:

a process composer for composing said at least one runbook process using said at least one activity in response to a start command to provide at least one composed runbook process;

a process conductor for executing said at least one composed runbook process using said at least one of said video network operations center data and said user data;

said at least one composed runbook process comprising a conference management runbook process adapted to set up or establish a plurality of audio and video conferences among said plurality of resources and to substantially simultaneously monitor said plurality of audio and video conferences after said plurality of audio and video conferences are established;

wherein said processing engine provisions an outlet that is adapted to and supports at least one enterprise system associated with said user if said processing engine determines that no outlet exists for said user's at least one enterprise system, and Such provisioning, said at least one enterprise system is added to said information and data repository, thereby enabling said user's at least one enterprise system to be ready to use within the system, said outlet facilitating communication between said at least one enterprise system and said processing engine.

47. The system as recited in claim 1 wherein said plurality of resources are associated with a single organization.

48. The system as recited in claim 1 wherein said plurality of resources are associated with a plurality of organizations.

49. The system a recited in claim 1 wherein said at least one or a plurality of runbook processes are adaptable to the user.

50. A video network operations center management system for managing at least one conference between a first terminal, desktop or gatekeeper and at least one second terminal, desktop or gatekeeper, said video network operations center management system comprising:

a process composer for composing a plurality of runbook processes to be executed to automate, manage and control the at least one conference, each of said plurality of runbook processes comprising at least one activity;

a process conductor for executing said plurality of runbook processes; and a repository for storing each of said plurality of runbook processes and data for use by at least one of said plurality of runbook processes;

said plurality of runbook processes comprising at least one of the following:

a provisioning runbook process;

a service runbook process;

a supported terminals, software versions and enterprise systems runbook process;

a scheduling runbook process;

a notification runbook process a conference management runbook process;

an escalation runbook process;

a remediation runbook process;

a fault management runbook process;

a daily site sweep runbook process;

a conference log runbook process;

a quality control runbook process;

a root cause analysis (RCA) template runbook process; or a reporting deliverables runbook process;

wherein said process conductor and said process composer are adapted to use or be used by at least one enterprise system;

wherein an outlet is adapted to and supports said at least one enterprise system associated with a user if no outlet exists for said user's at least one enterprise system and after such provisioning, said at least one enterprise system is added to said repository, thereby enabling said user's at least one enterprise system to be ready for use within the system, said outlet enabling communication between said at least one enterprise system and said process composer.

51. A video network operations center management system for managing at least one conference between a first terminal, desktop or gatekeeper and at least one second terminal, desktop or gatekeeper, said video network operations center management system comprising:

a process composer for composing a plurality of runbook processes to be executed to automate, manage and control the at least one conference, each of said plurality of runbook processes comprising at least one activity;

a process conductor for executing said plurality of runbook processes; and a repository for storing each of said plurality of runbook processes and data for use by at least one of said plurality of runbook processes;

said plurality of runbook processes comprising at least one of the following:

a provisioning runbook process;

a service runbook process;

a supported terminals, software versions and enterprise systems runbook process;

a scheduling runbook process;

a notification runbook process a conference management runbook process;

an escalation runbook process;

a remediation runbook process;

a fault management runbook process;

a daily site sweep runbook process;

a conference log runbook process;

a quality control runbook process;

a root cause analysis (RCA) template runbook process; or a reporting deliverables runbook process;

wherein said conference management runbook process is adapted to set up or establish a plurality of conferences among a plurality of terminals, desktops or gatekeepers and to substantially simultaneously monitor said plurality of conferences for faults after said plurality of conferences are established;

wherein said video network operations center management system provisions an outlet that is adapted to and supports at least one enterprise system associated with a user if said video network operations center management system determines that no outlet exists for said user's at least one enterprise system, and after such provisioning, said at least one enterprise system is added to an information and data repository, thereby enabling said user's at least one enterprise system to be ready for use within the system, said outlet facilitating communication between said at least one enterprise system and said video network operations center management system.

52. The video network operations center management system as recited in claim 51 wherein said first terminal, desktop or gatekeeper and said at least one second terminal, desktop or gatekeeper are associated with a single organization.

53. The video network operations center management system as recited in claim 51 wherein said first terminal, desktop or gatekeeper and said at least one second terminal, desktop or gatekeeper are associated with a plurality of distinct organizations.

54. The video network operations center management system as recited in claim 51 wherein said service runbook process comprises an authentication process adapted to enabling the video network operations center management system to authenticate and govern access to and use of the video network operations center management system by the user.

55. The video network operations center management system as recited in claim 51 wherein said supported terminals, software versions and enterprise systems runbook process provides means for identifying and verifying which of said terminal, desktop, gatekeeper or enterprise system are supported by said user.

56. The video network operations center management system as recited in claim 51 wherein said notification runbook process is adapted to define at least one template or format said user is notified in response to at least one of said plurality of runbook processes.

57. The video network operations center management system as recited in claim 51 wherein said conference management runbook process provides means for setting up, starting, monitoring or disconnecting the at least one conference.

58. The video network operations center management system as recited in claim 51 wherein said escalation runbook process escalates at least one fault issue identified by another of said plurality of runbook processes.

59. The video network operations center management system as recited in claim 51 wherein said remediation runbook process remediates at least one fault that occurs during the at least one conference.

60. The video network operations center management system as recited in claim 51 wherein said daily site sweep runbook process executes a sweep of said first terminal, desktop or gatekeeper or said at least one second terminal, desktop or gatekeeper to provide a check of said first terminal, desktop or gatekeeper or said at least one second terminal, desktop or gatekeeper before a fault with at least one of said first terminal, desktop or gatekeeper or said at least one second terminal, desktop or gatekeeper occurs.

61. The video network operations center management system as recited in claim 51 wherein said conference log runbook process generates a log of a plurality of details for scheduled conferences.

62. The video network operations center management system as recited in claim 61 wherein said log of said plurality of details comprise meeting title, account or location.

63. The video network operations center management system as recited in claim 51 wherein said quality control runbook process identifies and prevents a plurality of faults associated with the user inputting data to the video network operations center management system.

64. The video network operations center management system as recited in claim 63 wherein at least one of said plurality of faults is a scheduling conflict associated with either a participant or at least one of said first terminal, desktop or gatekeeper or said at least one second terminal, desktop or gatekeeper.

65. The video network operations center management system as recited in claim 51 wherein said root cause analysis template process comprises a template that the user follows to document at least one question or problem in response to a root cause analysis being requested by the user.

66. The video network operations center management system as recited in claim 51 wherein said reporting deliverables runbook process generates at least one report to the user regarding at least one of said first terminal, desktop or gatekeeper or said at least one second terminal, desktop or gatekeeper.

67. The video network operations center management system as recited in claim 66 wherein said at least one report comprises utilization of said video network operations center management system, number of reservations within said video network operations center management system or number of conferences within said video network operations center management system.

68. The video network operations center management system as recited in claim 51 wherein said system further comprises an observer/poller/launcher for causing at least one of said plurality of runbook processes to be launched in response to a start command.

69. The video network operations center management system as recited in claim 68 wherein said observer/poller/launcher automatically launches said conference management runbook process in response to a start command generated by said process conductor.

70. The video network operations center management system as recited in claim 68 wherein said observer/poller/launcher is coupled to said process composer and said repository for receiving a start command from said process composer and for launching at least one of said plurality of runbook processes in response thereto.

71. The video network operations center management system as recited in claim 51 wherein said process conductor executes said plurality of runbook processes substantially simultaneously.

72. The video network operations center management system as recited in claim 51 wherein said repository comprises a library of activities, said process composer composing each of said plurality of runbook processes using said library of activities.

73. The video network operations center management system as recited in claim 51 wherein said data stored on said repository comprises video network operations center data and or user data, said at least some of said video network operations center data and said user data being used by at least one of said plurality of runbook processes.

74. The video network operations center management system as recited in claim 51 wherein said data comprises video network operations center data and user data, said process conductor conducts each of said plurality of runbook processes using at least one of said video network operations center data or said user data.

75. The video network operations center management system as recited in claim 51 wherein said system is adapted to communicate with at least one user entry point to enable a user to input at least some of said data into said repository using said at least one user entry point in response to at least one of said plurality of runbook processes.

76. The video network operations center management system as recited in claim 75 wherein said at least one user entry point comprises at least one of a web portal, a touch screen computer/mobile interface, or a calendar portal.

77. The video network operations center management system as recited in claim 51 wherein said system is adapted to receive at least one of either video network operations center data or user data from a plurality of user entry points.

78. The video network operations center management system as recited in claim 77 wherein said plurality of user entry points comprises at least one of a web portal, a touch screen computer/mobile interface, or a calendar portal.

79. The video network operations center management system as recited in claim 77 wherein said plurality of user entry points comprise at least one graphical user interface for use by a user to input said video network operations center data or user data into said repository for use by said at least one of said plurality of runbook processes, said at least one graphical user interface providing fields corresponding to said video network operations center data or user data associated with said at least one of said plurality of runbook processes.

80. The video network operations center management system as recited in claim 51 wherein said process conductor and said process composer are adapted to use or be used by at least one enterprise system.

81. The video network operations center management system as recited in claim 80 wherein said at least one enterprise system comprises a plurality of enterprise systems.

82. The video network operations center management system as recited in claim 81 wherein each of said plurality of runbook processes comprises at least one activity, said process composer and said process conductor being adapted to receive said data from said repository inputted by a user from at least one of a plurality of user entry points, said plurality of user entry points comprising a web portal, a touch screen computer/mobile interface, or a calendar portal.

83. The video network operations center management system as recited in claim 81 wherein said plurality of enterprise systems are different.

84. The video network operations center management system as recited in claim 83 wherein said plurality of enterprise systems that are not the same.

85. The video network operations center management system as recited in claim 84 wherein said system further comprises:

a plurality of outlets adapted to said plurality of enterprise systems, respectively, to facilitate communication between a processing engine and said plurality of enterprise systems.

86. The video network operations center management system as recited in claim 85 wherein said plurality of outlets comprise a plurality of a ping command, a scheduler, a statistic collector, a third-party integrator or an open session command.

87. The video network operations center management system as recited in claim 81 wherein said system further comprises:

a plurality of outlets adapted to said plurality of enterprise systems, respectively, to facilitate adaptation or use of said plurality of runbook processes with said plurality of enterprise systems.

88. The video network operations center management system as recited in claim 87 wherein said plurality of outlets comprise a plurality of a ping command, a scheduler, a statistic collector, a third-party integrator or an open session command.

89. The video network operations center management system as recited in claim 51 wherein said first terminal, desktop or gatekeeper comprises a terminal screen on which a plurality of conference participants from different locations are displayed, said first terminal, desktop or gatekeeper being adapted to define N fields or terminals for receiving and displaying said plurality of conference participants, respectively.

90. The video network operations center management system as recited in claim 51 wherein said provisioning runbook process comprises a plurality of predetermined usage parameters adapted to a user, said plurality of predetermined usage parameters being input by said user during and in response to said provisioning runbook process.

91. The video network operations center management system as recited in claim 51 wherein said provisioning runbook process is adapted to provision a plurality of terminals, desktops or gatekeepers to provide a plurality of provisioned terminals, desktops or gatekeepers so that a scheduling entity associated with the user may schedule said plurality of terminals, desktops or gatekeepers for the at least one conference during said scheduling runbook process.

92. The video network operations center management system as recited in claim 91 wherein a plurality of said plurality of provisioned terminals, desktops or gatekeepers comprises an associated picture stored in said repository to facilitate selection by the scheduling entity of at least one of said plurality of provisioned terminals, desktops or gatekeepers during said scheduling runbook process.

93. The video network operations center management system as recited in claim 91 wherein said scheduling runbook process generates a notification to the scheduling entity of an alternate suggested one of said plurality of provisioned terminals, desktops or gatekeepers if the requested one of said at least one of said plurality of terminals, desktops or gatekeepers is not available for scheduling by the scheduling entity.

94. The video network operations center management system as recited in claim 91 wherein said scheduling runbook process comprises a cost allocator for automatically allocating a cost associated with said at least one conference to at least one entity.

95. The video network operations center management system as recited in claim 91 wherein said scheduling entity and the user are not the same.

96. The video network operations center management system as recited in claim 91 wherein said scheduling entity uses at least one user entry point during said scheduling runbook process, said at least one user entry point comprises at least one of a web portal, a touch screen computer/mobile interface, or a calendar portal.

97. The video network operations center management system as recited in claim 91 wherein said scheduling runbook process evaluates an availability of at least one of said plurality of provisioned terminals, desktops or gatekeepers requested to be scheduled by the scheduling entity and generates a notification of such availability that is displayed to said scheduling entity in response thereto.

98. The video network operations center management system as recited in claim 97 wherein said availability of said at least one of said plurality of provisioned terminals, desktops or gatekeepers is displayed to the scheduling entity in the scheduling entity's current time zone regardless of a time zone associated with a location of said at least one of said terminals, desktops or gatekeepers.

99. The video network operations center management system as recited in claim 51 wherein said provisioning runbook process is adapted to permit provisioning of at least one use parameter for governing the user's rights during use of the system.

100. The video network operations center management system as recited in claim 99 wherein said at least one use parameter comprises at least one of a contract parameter or a user rule, each of which are adapted to define at least one parameter for governing at least one scheduler's use and/or access to the system.

101. The video network operations center management system as recited in claim 51 wherein said scheduling runbook process comprises an impromptu scheduler for enabling a scheduling entity to schedule a real-time, impromptu conference.

102. The video network operations center management system as recited in claim 51 wherein said scheduling runbook process comprises an express scheduler for enabling a scheduling entity to schedule a conference using a single scheduling interface.

103. A video network operations center management system for managing at least one conference between a first terminal, desktop or gatekeeper and at least one second terminal, desktop or gatekeeper, said video network operations center management system comprising:

a process composer for composing a plurality of runbook processes to be executed to automate, manage and control the at least one conference, each of said plurality of runbook processes comprising at least one activity;

a process conductor for executing said plurality of runbook processes; and a repository for storing each of said plurality of runbook processes and data for use by at least one of said plurality of runbook processes;

said plurality of runbook processes comprising at least one of the following:

a provisioning runbook process;

a service runbook process;

a supported terminals, software versions and enterprise systems runbook process;

a scheduling runbook process;

a notification runbook process a conference management runbook process;

an escalation runbook process;

a remediation runbook process;

a fault management runbook process;

a daily site sweep runbook process;

a conference log runbook process;

a quality control runbook process;

a root cause analysis (RCA) template runbook process; or a reporting deliverables runbook process;

wherein said fault management runbook process generates a geo-spatial graphical display of a plurality of conferences managed by said system;

wherein said video network operations center management system provisions an outlet that is adapted to and supports at least one enterprise system associated with a user if said video network operations center management system determines that no outlet exists for said user's at least one enterprise system, and after such provisioning, said at least one enterprise system is added to an information and data repository, thereby enabling said user's at least one enterprise system to be ready for use within the system, said outlet facilitating communication between said at least one enterprise system and said video network operations center management system.

104. The video network operations center management system as recited in claim 51 wherein said fault management process is adapted to generate a fault notification if a fault associated with either said first terminal, desktop or gatekeepers or said at least one second terminal, desktop or gatekeeper either before or during said at least one conference.

105. A system for establishing and managing conferences comprising:

a conference management database for storing a plurality of runbook processes and operation data, a plurality of activities and data associated with said plurality of runbook processes;

an automated conference management and control engine for using said plurality of runbook processes and operation data, said plurality of activities and said data associated with said plurality of runbook processes to automatically initiate, manage and control each of the conferences; and an observer/poller/launcher for launching at least one of said plurality of runbook processes in response to a command from said automated conference management and control engine;

wherein said automated conference management and control engine provisions an outlet that is adapted to and supports at least one enterprise system associated with a user if said automated conference management and control engine determines that no outlet exists for said user's at least one enterprise system, and after such provisioning, said at least one enterprise system is added to a conference management database, thereby enabling said user's at least one enterprise system to be ready for use within the system, said outlet facilitating communication between said at least one enterprise system and said automated conference management and control engine.

106. The system as recited in claim 105 wherein said plurality of runbook processes comprises a provisioning runbook process for enabling a user to provision or assign at least one resource using at least one user entry point;

said at least one resource comprising at least one of a terminal, a desktop or a gateway.

107. The system as recited in claim 106 wherein said at least one user entry point comprises at least one of a web portal, a touch screen computer/mobile interface, or a calendar portal each of which comprise at least one user interface for enabling the user to input said data into said conference management database.

108. The system as recited in claim 106 wherein said provisioning runbook process is adapted to permit said user to associate an image with said at least one resource so that said image may be used to schedule said at least one resource for at least one of said conferences.

109. The system as recited in claim 105 wherein said automated conference management and control engine is adapted to receive said data from a user from a plurality of user entry points.

110. The system as recited in claim 109 wherein said plurality of user entry points comprises at plurality of a web portal, a touch screen computer/mobile interface, or a calendar portal.

111. The system as recited in claim 105 wherein said automated conference management and control engine is adapted to use or be used by said at least one enterprise system.

112. The system as recited in claim 111 wherein said at least one enterprise system comprises a plurality of enterprise systems.

113. The system as recited in claim 112 wherein said plurality of enterprise systems comprise operating platforms that are not the same.

114. The system as recited in claim 112 wherein said system further comprises:

a plurality of outlets adapted to said plurality of enterprise systems, respectively, to facilitate communication between said automated conference management and control engine and said plurality of enterprise systems.

115. The system as recited in claim 114 wherein said plurality of outlets comprise a plurality of a ping command, a scheduler, a statistic collector, a third-party integrator or an open session command.

116. The system as recited in claim 105 wherein system comprises at least one user entry point, said plurality of runbook processes comprising a scheduling runbook process, said scheduling runbook process comprising at least one scheduling user interface adapted to said at least one user entry point for permitting a user to input scheduling data for at least one of the conferences in response to said scheduling runbook process, said scheduling data being stored in said conference management database;

said automated conference management and control engine and said observer/poller/launcher automatically launching and managing said at least one of the conferences in response to said data.

117. The system as recited in claim 116 wherein said at least one scheduling user interface and said scheduling runbook process enables a user to reserve at least one resource for said at least one of the conferences.

118. The system as recited in claim 117 wherein said at least one scheduling user interface and said scheduling runbook process generates a notification to the user if said at least one resource is not available for said at least one of the conference.

119. The system as recited in claim 117 wherein said at least one resource is a terminal, desktop or gatekeeper.

120. The system as recited in claim 119 wherein said at least one resource is a terminal that comprises a codec and a terminal screen having at least N viewing areas, where N corresponds to a number of remote conference participants who are being view on said terminal screen.

121. The system as recited in claim 105 wherein each of said conference management database comprises a plurality of activities associated with said plurality of runbook processes, said automated conference management and control engine further comprising:

a process composer for receiving said at least one of said plurality of activities and for composing at least one of said plurality of runbook processes in response to a start command to provide at least one composed runbook process;

a process conductor for executing said at least one composed runbook process;

said process conductor conducting said at least one composed runbook process using said data.

122. The system as recited in claim 105 wherein said system further comprises a plurality of user entry points, said automated conference management and control engine being adapted to receive conference data from at least one of said plurality of user entry points, said plurality of user entry points comprising a web portal, a touch screen computer/mobile interface, or a calendar portal when a user desires to schedule a at least one conference;

said conference data being used by a plurality of said plurality of runbook processes to initiate, maintain, control and invoice said at least one conference.

* * * * *